US011467712B1

(12) United States Patent
Boyers

(10) Patent No.: US 11,467,712 B1
(45) Date of Patent: Oct. 11, 2022

(54) METHOD AND GRAPHICAL USER INTERFACE FOR POSITIONING A PRESELECTION AND SELECTING ON A SMART-WATCH WITH A TOUCH-SENSITIVE DISPLAY

(71) Applicant: David Graham Boyers, Los Altos, CA (US)

(72) Inventor: David Graham Boyers, Los Altos, CA (US)

( * ) Notice: Subject to any disclaimer, the term of this patent is extended or adjusted under 35 U.S.C. 154(b) by 0 days.

(21) Appl. No.: 16/838,973

(22) Filed: Apr. 2, 2020

Related U.S. Application Data

(60) Provisional application No. 62/828,648, filed on Apr. 3, 2019.

(51) Int. Cl.
*G06F 3/04883* (2022.01)
*G06F 3/0482* (2013.01)
*G06F 3/04817* (2022.01)

(52) U.S. Cl.
CPC ........ *G06F 3/0482* (2013.01); *G06F 3/04817* (2013.01); *G06F 3/04883* (2013.01)

(58) Field of Classification Search
CPC ............... G06F 3/0482; G06F 3/0484; G06F 3/04817; G06F 3/0485; G06F 3/04883
See application file for complete search history.

(56) References Cited

U.S. PATENT DOCUMENTS

| | | | |
|---|---|---|---|
| 7,469,381 B2 | 12/2008 | Ording | |
| 7,786,975 B2 | 8/2010 | Ording et al. | |
| 7,958,456 B2 | 6/2011 | Ording et al. | |
| 8,209,606 B2 | 6/2012 | Ording | |
| 9,021,386 B1* | 4/2015 | Rasmussen | G06F 3/04817 715/786 |
| 9,354,803 B2 | 5/2016 | Ording et al. | |
| 10,175,866 B2 | 6/2019 | Block et al. | |
| 2011/0165913 A1* | 7/2011 | Lee | G06F 3/04855 455/566 |
| 2014/0160073 A1* | 6/2014 | Matsuki | G06F 3/04886 345/174 |
| 2018/0081453 A1 | 3/2018 | Ely | |
| 2018/0129381 A1* | 5/2018 | Chaudhri | G06F 3/0482 |

* cited by examiner

*Primary Examiner* — Andrea C Leggett

(57) ABSTRACT

A mobile computing device, comprising: a touch-sensitive display; a processor; a memory configured to store one or more programs; and wherein the processor is configured to execute the one or more programs to cause the mobile computing device to: display a control icon; display an item preselection in a list of items; detect a contact on the touch-sensitive display; and in response to detecting a change in a position of the contact beginning anywhere on the control icon, change a position of the item preselection with respect to the list of items by an amount proportional to the change in a position of the contact; and in response to detecting a gesture on the control icon, select an item at a position of the item preselection in the list of items.

31 Claims, 87 Drawing Sheets

METHOD AND GRAPHICAL USER INTERFACE FOR POSITIONING A PRESELECTION AND SELECTING ON A SMART-WATCH WITH A TOUCH-SENSITIVE DISPLAY

RELATED APPLICATIONS

This application is related to US Patent Application, "Methods and Graphical User Interfaces for Positioning the Cursor and Selecting Text on Computing Devices with Touch-Sensitive Displays" (Utility patent application Ser. No. 15/040,717), filed by the applicant.

This application is related to US Patent Application, "Methods and User Interfaces for Positioning a Selection, Selecting, and Editing on a Computing Device running under a Touch-Based Operating System, using Gestures on a Touchpad Device. (Utility patent application Ser. No. 16/278,084), filed by the applicant.

This application is related to US Patent Application, "Methods and User Interfaces for Positioning a Selection, Selecting, and Editing on a Computing Device running under a Touch-Based Operating System (Utility patent application Ser. No. 16/395,181), filed by the applicant.

This application claims priority from US Provisional Patent Application, "Methods and Graphical User Interfaces for Positioning a Preselection and Selecting on a Computing Device with a Touch-Sensitive Display (U.S. Provisional Application No. 62/828,648), filed by applicant.

TECHNICAL FIELD

The disclosed embodiments relate generally to computing devices with a touch-sensitive display, particularly to computer-implemented methods and graphical user interfaces for enabling a user to position an item preselection in a list of items and select an item at a position of the item preselection in a list of items on a smart-watch or other computing device with a touch-sensitive display.

BACKGROUND

Modern phones and tablet computing devices with a touch-sensitive display have been the fastest growing category of mobile computing devices since their introduction by Apple in 2007 and 2010 respectively. These devices have the potential to displace notebook and desktop computers as the preferred platform for many tasks that users engage in every day. Watches with touch-sensitive displays have recently emerged as a new and rapidly growing category of mobile computing devices. Whereas modern smart-phones and tablets have a display diagonal size ranging from 100 mm to 330 mm, a smart-watch has a display diagonal size of 40 mm or less. The graphical user interface and method for scrolling a list of items, and tapping on an item to select an item, originally developed for use on a smart-phone and tablet, has a number of deficiencies when applied to a smart-watch and other devices with a small display size. These deficiencies include the following:

a) The list item height and item-to-item separation, to insure each item can be reliably selected with a tap gesture on the item, reduces the number of items that can be displayed to about four items on a smart-watch with a screen height of about 35 mm.

b) The list item height and item-to-item separation, to insure each item can be reliably selected with a tap gesture on the item, is much larger than the list item height and item-to-item separation suitable for good readability; a list of about twelve items can be displayed with good readability on a smart-watch with a screen height of about 35 mm; the design goal that items be sized and spaced apart, so that each item can be reliably selected with a tap on the item, adds a severe constraint on the user interface design.

c) The limitation of displaying about four items within a watch screen size can requires user to scroll any list longer than four items before selecting an item with a tap gesture on the item; this substantially degrades device usability when selecting from a typical length list of items.

d) The use of a direct scroll gesture on a list, to view an item in a list, and the use of a tap gesture on an item, to select an item in a list, is a slow method of selecting from a list on a device.

e) The use of a tap gesture on a small navigation icon at the top of the display, to navigate within a hierarchically organized list of items, is an awkward and error prone solution on a device with a small display size.

We have developed new methods and user interfaces selecting from a 1-D list of items (a one-dimensional list of items) or 2-D list of items (a two-dimensional list of items) on a computing device, which not only overcome the deficiencies of existing solutions, but also add valuable new functionality for the user of any computing device running applications under a touch-based operating system. This includes not only phone, tablet, and other computing devices with displays having a screen diagonal ranging from 100 mm to 330 mm, but other devices such as smart-watch mobile computing devices with displays having a screen diagonal of 40 mm or less. We have developed new methods and user interfaces for positioning an item preselection in a list of items, and selecting an item at a position of the item preselection on any of these devices. This can include methods and user interfaces for positioning an item preselection, and for selecting one or more items in a list of items. This can include methods and user interfaces for navigating within a hierarchically organized list of items. This can include methods and user interfaces wherein, in response to detecting a second gesture on a second-end of the control icon, an option list of items applicable to a list of items is displayed. This can include methods and user interfaces wherein, in response to detecting a second gesture on a second-end of the control icon, an option list of items applicable to the item at a position of an item preselection in a list of items is displayed. Finally, this includes methods and user interfaces and user selectable settings to provide enhanced user accessibility for a broad range of users.

BRIEF DESCRIPTION OF THE DRAWINGS

For a better understanding of the example embodiments of the device, method, or graphical user interface, reference should be made to the detailed description, in conjunction with the following drawings in which like reference numerals refer to corresponding parts throughout the figures.

FIGS. 6F-6J illustrate this for displaying an item preselection in a list of items, changing the position of an item preselection in a list of items, and selecting a contact name item at the position of the item preselection within a hierarchically organized list of contacts on a smart-watch where more than one contact name is selected. FIGS. 6K-6L illustrate displaying an item preselection in a list of items, changing the position of an item preselection in a list of items, and selecting a contact action item at the position of the item preselection in a list of contact actions to initiate a contact action with respect to more than one contact.

FIGS. 8M-8N illustrate selecting and playing a selected song on the user's smart-watch.

FIGS. 9J-9L illustrate displaying an item preselection in a list of items, changing the position of an item preselection in a list of items, and selecting a contact action item in a list of contact actions to initiate a contact action with respect to a contact.

FIGS. 11A-11C illustrate this for displaying an item preselection in a list of font family attribute items, changing the position of an item preselection in a list of font family attribute items, and applying the font family attribute to a content selection in editable text content. FIGS. 11D-11F illustrate this for displaying an item preselection in a list of font color attribute items, changing the position of an item preselection in a list of font color attribute items, and applying the font color attribute to a content selection in editable text content.

The method can include in response to selecting an item at a position of the item preselection in a list of items, displaying a child list of items; the method can include in response to detecting a first gesture on a first end of the control icon, displaying a parent list of items.

FIGS. 23A-23L illustrate an exemplary user interface and method for displaying a content selection in editable content, displaying an item preselection in a list of content editing items; in response to detecting a change in a position of contact beginning anywhere on the control icon, changing a position of the item preselection in the list of content editing items; in response to detecting a select gesture on the control icon, selecting a content edit item at the position of the item preselection, and applying the content edit item to the selection in the content. The method can include, in response to detecting a change in a position of contact beginning anywhere on the control icon, changing a position of the item preselection in the list of content editing items and applying the content edit item to the selection in content if the edit item is in a bottom level list of a hierarchically organized list of content edit items. An example of this is changing a position of the item preselection in the list of font color items and immediately applying the font color item to a text selection in text content; this enables a user to "tune" the font color in real time.

Figure 24:
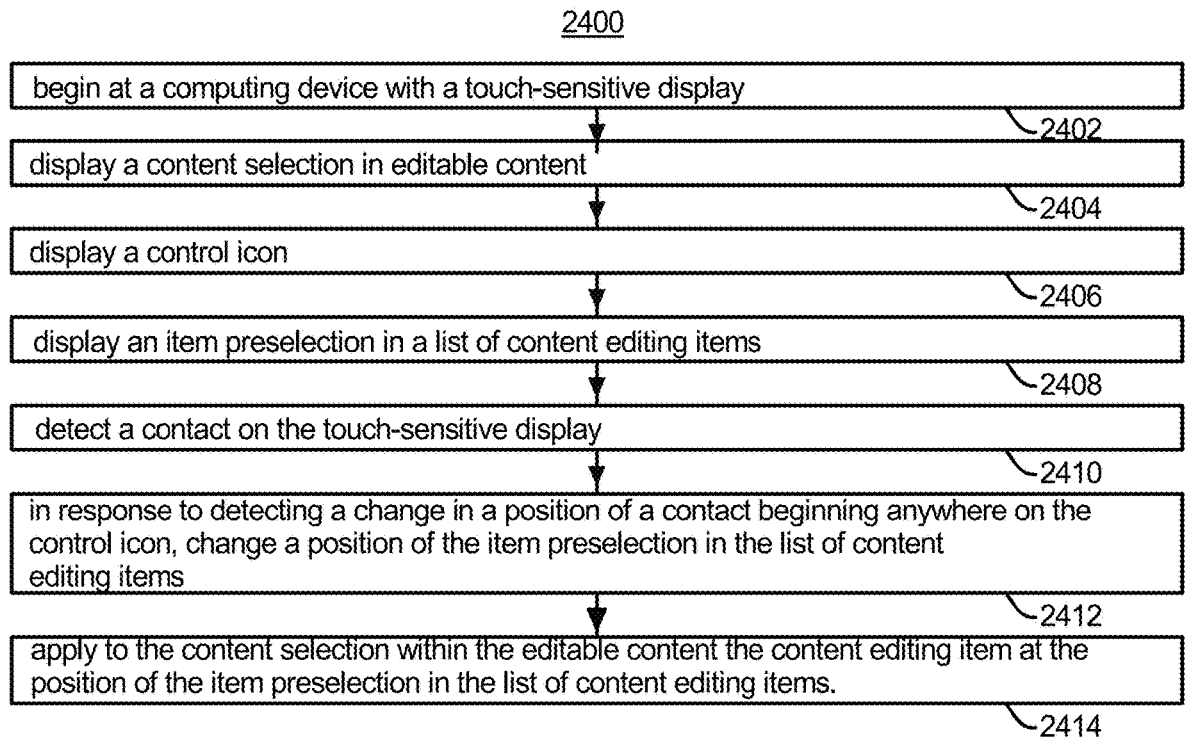

FIG. 24 is a flow diagram illustrating a method for displaying a content selection in editable content, displaying an item preselection in a list of content editing items, in response to detecting a change in a position of contact beginning anywhere on the control icon, changing a position of the item preselection in the list of content editing items. The method can include applying to the content selection within the editable content the content editing item at the position of the item preselection in the list of content editing items if the edit item is in a bottom level list of a hierarchically organized list of content edit items.

Figure 25:
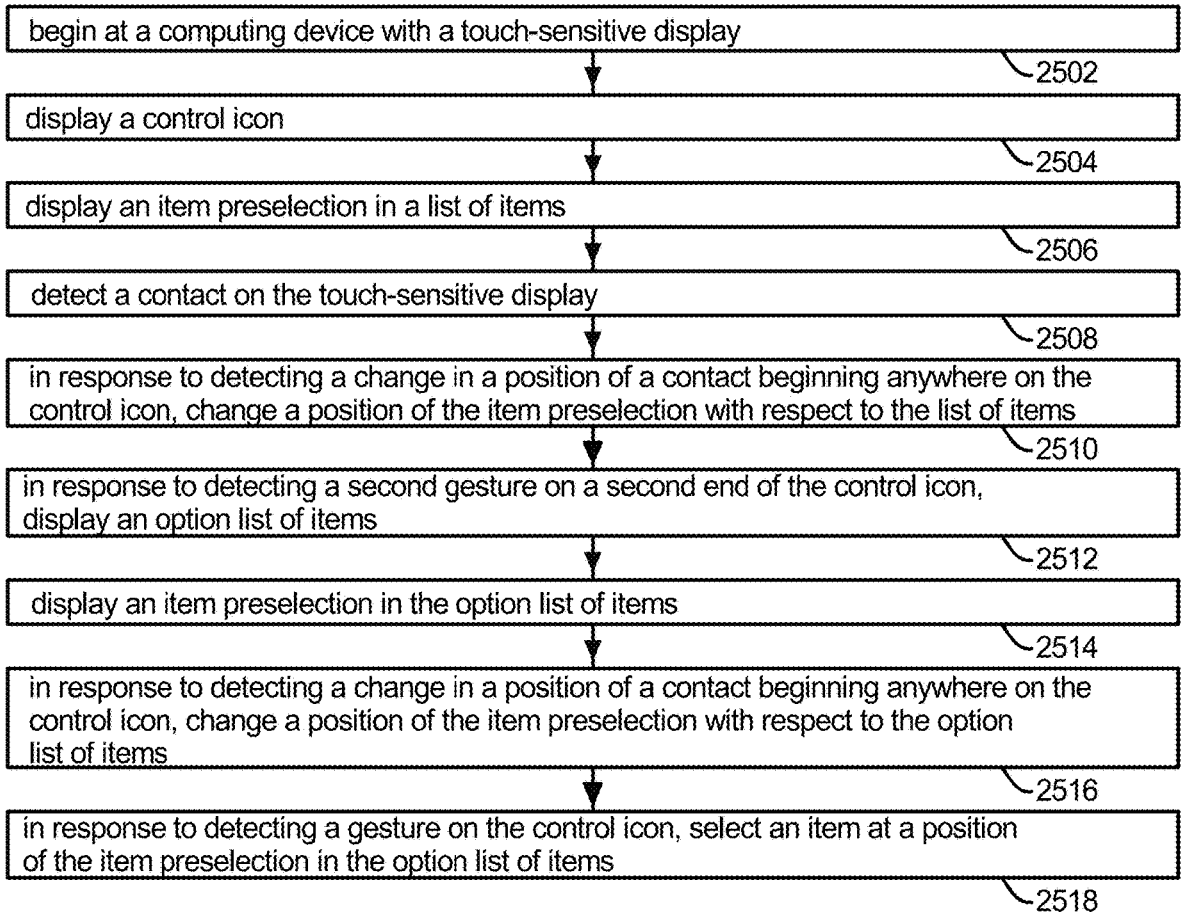

FIG. 25 is a flow diagram illustrating a method for positioning an item preselection in a list of items on a computing device with a touch-sensitive display in accordance with some embodiments. The method includes in response to detecting a second gesture on a second end of the control icon, displaying an option list of items. The method includes positioning an item preselection in the option list of items and selecting an item at a position of the item preselection in the option list of items.

Figure 26:
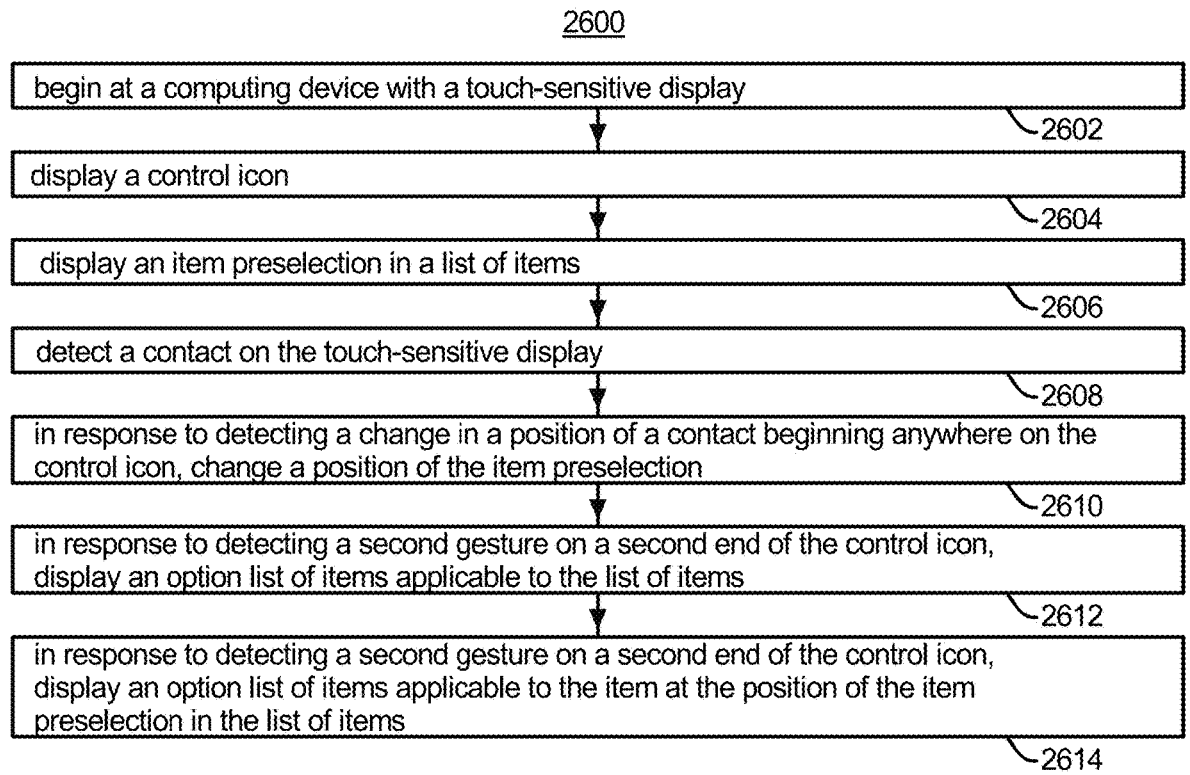

FIG. 26 is a flow diagram illustrating a method for positioning an item preselection in a list of items on a computing device with a touch-sensitive display in accordance with some embodiments. The method can include, in response to detecting a second gesture on a second end of the control icon, displaying an option list of items applicable to the list of items. The method can include, in response to detecting a second gesture on a second end of the control icon, displaying an option list of items applicable to the item at the position of the item preselection in the list of items.

DETAILED DESCRIPTION

Reference will now be made in detail to embodiments, examples of which are illustrated in the included drawings. In the following detailed description, many specific details are set forth in order to provide a thorough understanding of the present device, method, or graphical user interface. However, it will be apparent to one of ordinary skill in the art that the present device, method, or graphical user interface can be practiced without these specific details. In other embodiments, well-known methods, procedures, components, circuits, and networks have not been described in detail so as to not obscure aspects of the embodiments.

The terminology used in the description of the device, method, or graphical user interface is for the purpose of describing particular embodiments only and is not intended to be limiting of the device, method, or graphical user interface. As used in the description, the singular forms "a", "an", and "the" are intended to include the plural forms as well, unless the context clearly indicates otherwise. It will also be understood that the term "and/or" as used herein refers to and encompasses any and all possible combinations of one or more of the associated referenced items.

Embodiments of computing devices, user interfaces for such devices, and associated processes for using such devices are described. In some embodiments, the computing device can be a mobile computing device worn by the user such as a smart-watch. In some embodiments, the computing device can be a handheld mobile computing device such as a smart-phone. In some embodiments, the computing device can be a handheld mobile computing device such as a tablet. Examples of such handheld mobile computing devices include, without limitation, the iPhone by Apple computer, the Windows phone by Microsoft, and Galaxy phone by Samsung, the Pixel phone by Google, the iPad by Apple computer, the Surface by Microsoft, and the Galaxy Tab by Samsung, and the Pixel tablet by Google. The device can support a variety of applications including a web browser, an email application, a contacts application, and productivity applications included with the device when sold. The device also supports a variety of applications (apps) developed by third parties that are available for purchase and download from an application store. Typically, an application store makes available applications written to run on a particular mobile operating system. Exemplary operating systems for handheld mobile computing devices include, without limitation, iOS by Apple, watchOS by Apple, Windows by Microsoft, and Android by Google.

Figure 1:
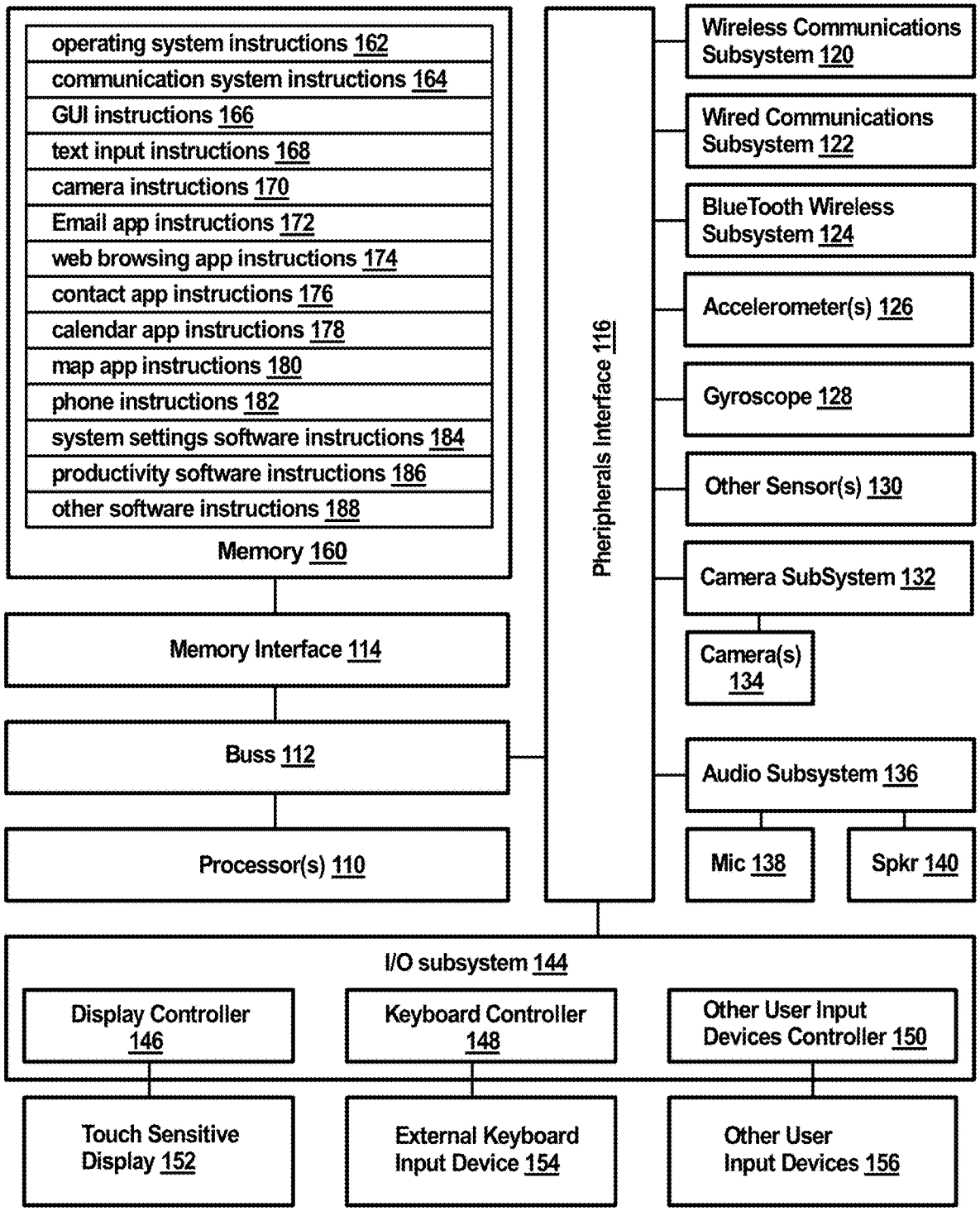
FIG. 1 is a block diagram illustrating a mobile computing device with a touch-sensitive display.

FIG. 1 is a block diagram illustrating a computing device 100 with a touch-sensitive display in accordance with some embodiments. The device includes processor(s) 110 connected via buss 112 to memory interface 114 to memory 160. The memory will typically contain operating system instructions 162, communication system instructions 164, GUI (graphical user interface) instructions 166, and text input instructions 168. The memory can contain camera instructions 170, email app instructions 172, web browsing app instructions 174, contact app instructions 176, calendar app instructions 178, map app instructions 180, phone app instructions 182, system settings software instructions 184, productivity software instructions 186, and other software instructions 188. The device also includes processors(s) 110 connected via buss 112 to peripherals interface 116. Peripherals interface 116 can be connected to a wireless communications subsystem 120, wired communications subsystem 122, Bluetooth wireless communications subsystem 124, accelerometer(s) 126, gyroscope 128, other sensor(s) 130, camera subsystem 132, and audio subsystem 136. The wireless communication system includes elements for supporting wireless communication via Wi-Fi or cellular or any other wireless networking system. The accelerometers provide information regarding device orientation to the GUI instructions to enable the change of the orientation of the graphical user interface to match the orientation of the device as some devices can viewed in more than one orientation. The camera subsystem is connected to camera (s) 134. These cameras can include one or more cameras for supporting real time video conferencing over a network connection. The audio system can be connected to microphone 138 and speaker 140. The peripherals interface 116 is connected to I/O subsystem 144 comprising display controller 146, keyboard controller 148, and other user input devices controller 150. Display controller 146 is connected to touch-sensitive display 152. Keyboard controller 148 can be connected to other physical keyboard input device including external keyboard input device 154.

It should be understood that the device 100 is only one example of a computing device 100, and that the device 100 can have more or fewer components than those shown, can combine two or more components, or can have a different configuration or arrangement of components. The components shown in FIG. 1 can be implemented in hardware, software, or a combination of hardware and software.

Attention is now directed towards embodiments of user interfaces and methods that may be implemented on handheld mobile computing device 100. The device detects the location of a finger contact and movement of a finger contact across a touch-sensitive display. In some embodiments the finger contact is part of a finger gesture. The device detects the location of a finger gesture and type of finger gesture. Example finger gestures include, but are not limited to, a tap finger gesture (momentary contact of a single finger on touch-sensitive display 152 with no motion across touch-sensitive display 152, a long-press finger gesture (extended contact of a single finger on the touch-sensitive display 152 with no motion across touch-sensitive display 152 with the duration of the finger contact being approximately 0.5 seconds for example), a two-finger-tap finger gesture (momentary and simultaneous contact of two fingers on touch-sensitive display 152 with no motion across touch-sensitive display 152, a double-tap finger gesture (two successive momentary contacts of a single finger on touch-sensitive display 152 with no motion across touch-sensitive display 152, a slide finger gesture (extended and uninterrupted contact of a single finger on touch-sensitive display 152 together with motion across touch-sensitive display 152, and a tap-and-slide finger gesture (momentary contact of a single finger on touch-sensitive display 152 with no motion across touch-sensitive display 152, followed by extended and uninterrupted contact of a single finger on touch-sensitive display 152 together with motion across touch-sensitive display 152 which begins at the location of the initial tap). The device responds to user gestures and displays a UI based upon the location and type of gesture that the device detects.

Figure 2A:
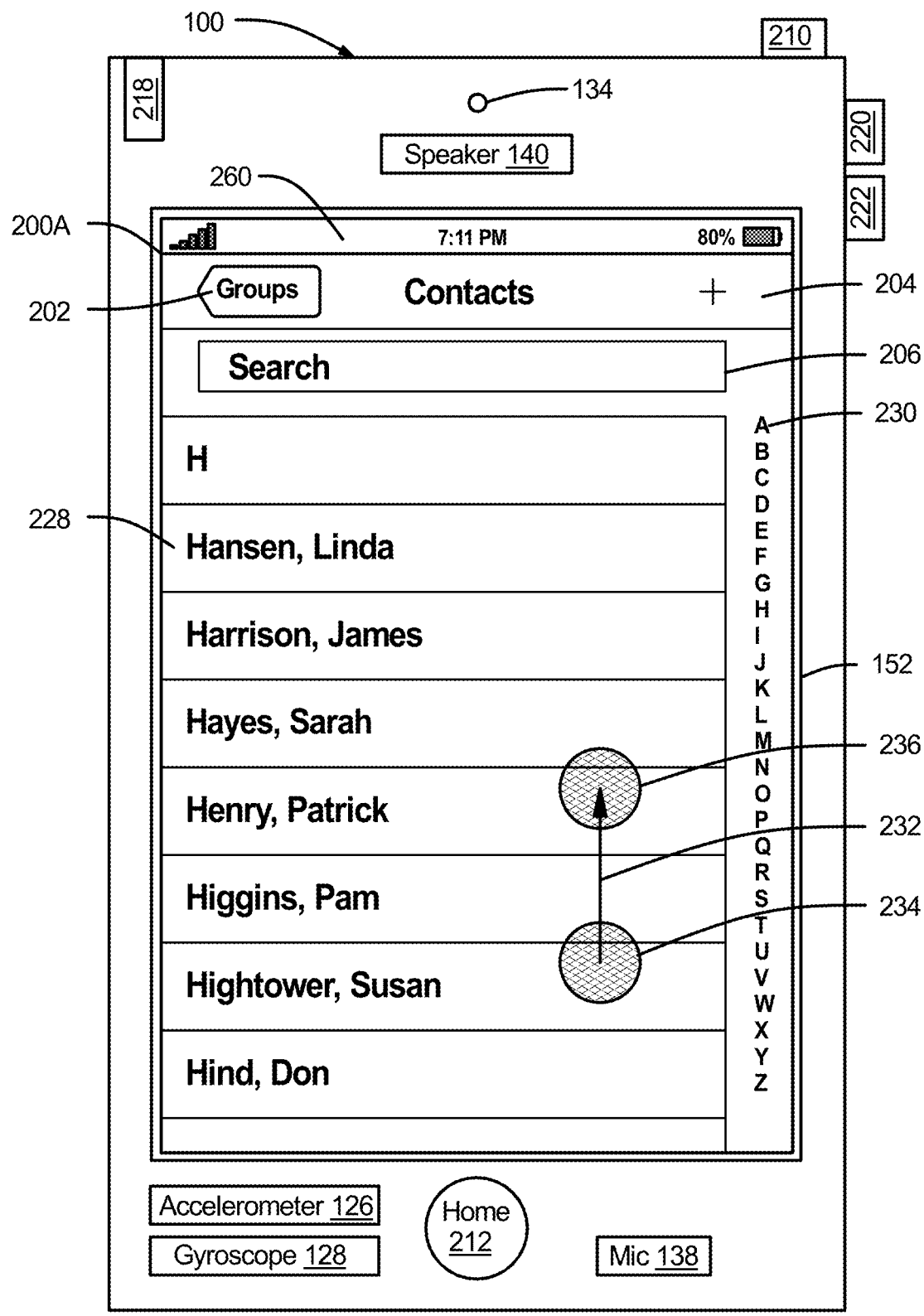
FIGS. 2A-2C illustrate selecting from a vertically scrollable table on a smart-phone.
Figure 2B:
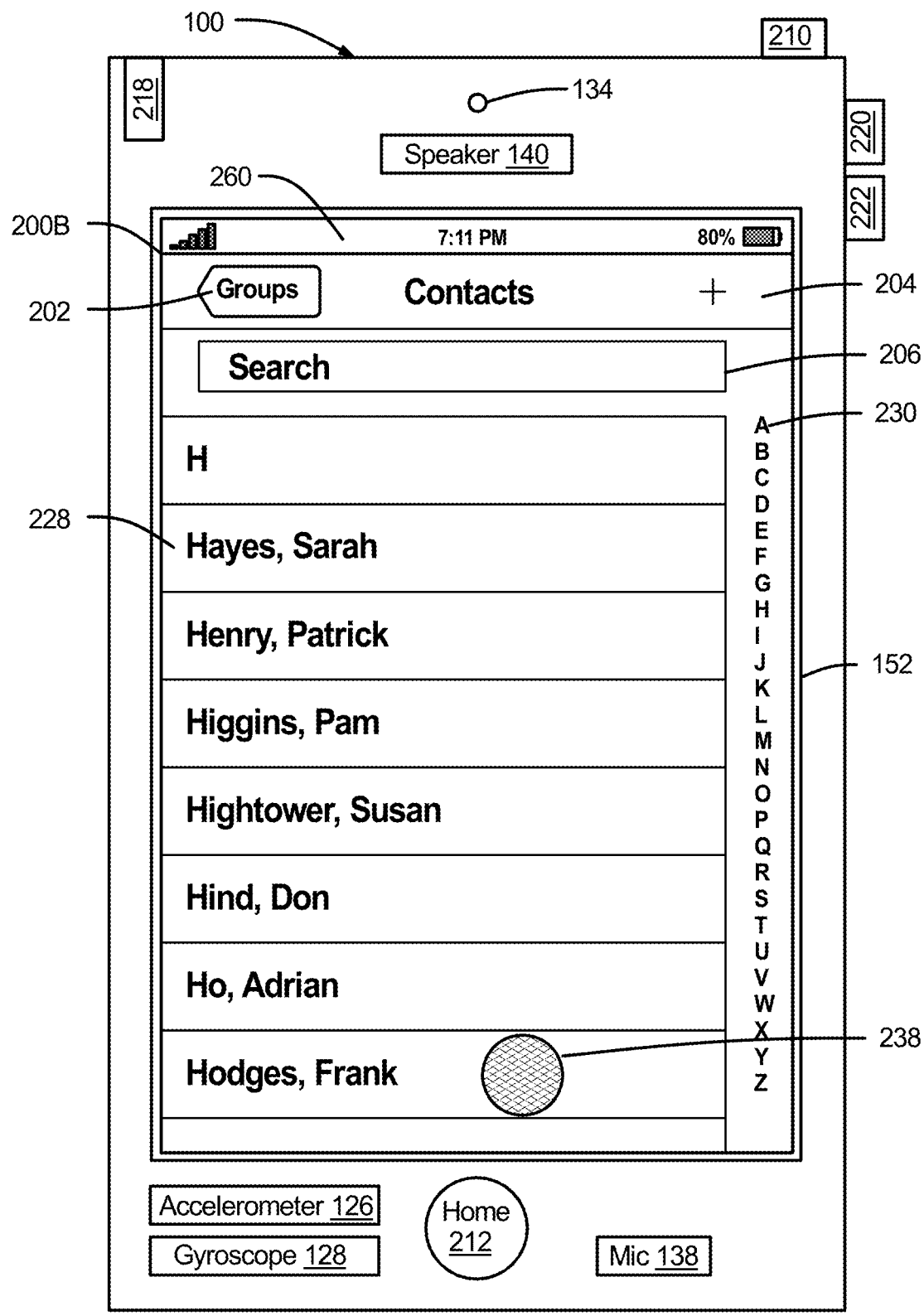
Figure 2C:
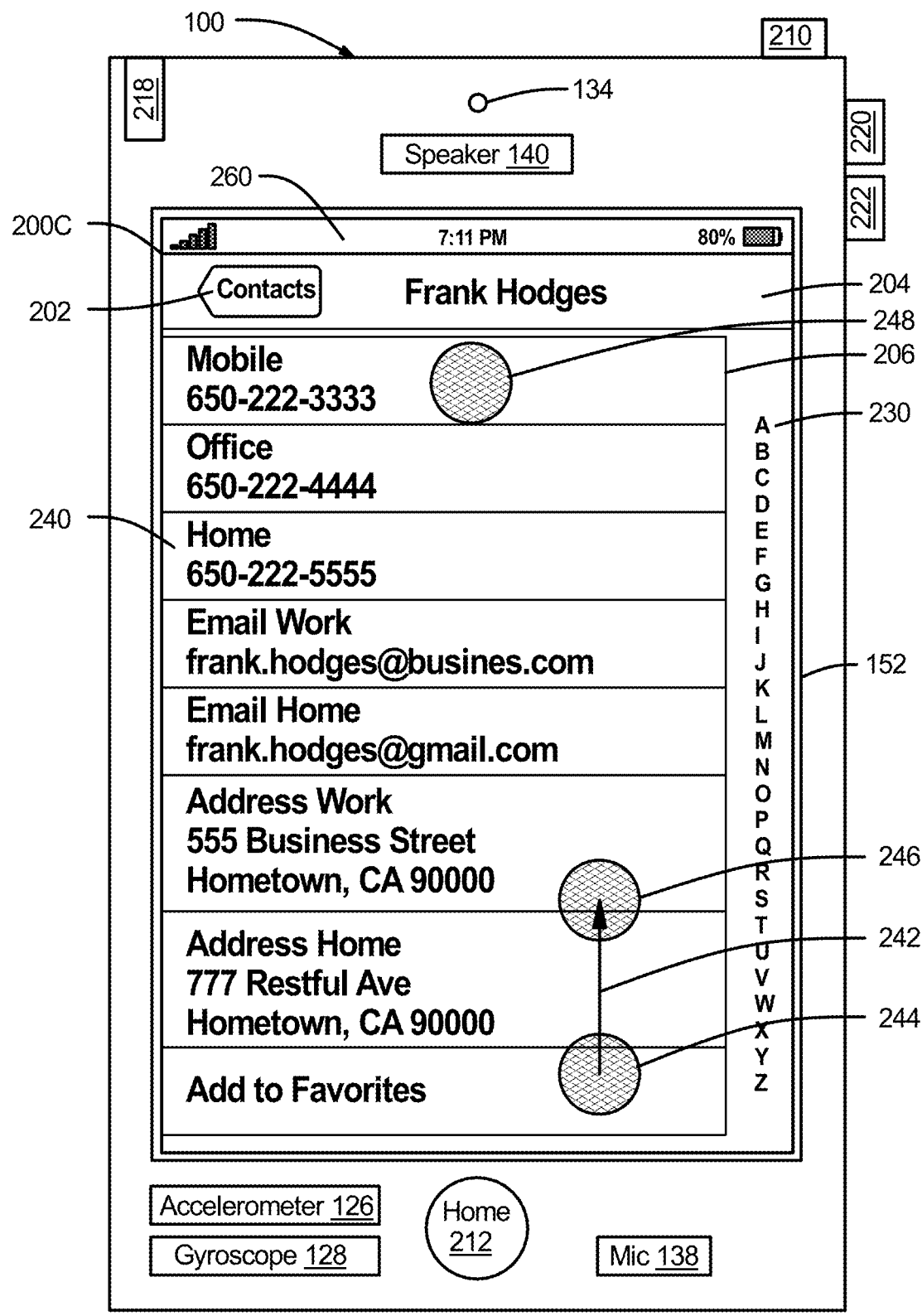

FIGS. 2A-2C illustrate a graphical user interface and method for selecting from a vertically scrollable list of contacts on a smart-phone mobile computing device 100 having a touch-sensitive display 152. Device 100 can include one or more physical buttons such as sleep/wake or power off/on button 210, home button 212, and volume up and down button pair 220 and 222. The device can include one or more accelerometers 126, a gyroscope 128 for sensing the position of the device position in space. The device can include a microphone 138, and speaker 140. The device can include earphone/microphone jack 218 for connection to an external headset, or a wireless connection to a wireless earphone/microphone. The device can include camera 134, status bar, and soft keyboard 240. FIG. 2A illustrates the device in portrait orientation. Device 100 can detect the location of a finger contact and movement of a finger contact, across touch-sensitive display 152. In some embodiments the finger contact is part of a finger gesture. Device 100 can detect the type of finger gesture as described above.

A user can perform a vertical scroll gesture 232 from 234 to 236 on the up/down scrollable list of contacts 228 as illustrated in UI 200A (FIG. 2A). In response to detecting the vertical scroll gesture in the upward direction on the list of contacts 228, the device can scroll the list up as illustrated in UI 200B (FIG. 2B). A user can perform tap gesture 238 to select a contact as illustrated in FIG. 2B. In this example, the selected item is the contact "Hodges, Frank". In response to detecting tap gesture 238, the device can display list of contact details 240 (a child list of items) for the selected item "Hodges, Frank" as illustrated in FIG. 2C. A user can perform a tap gesture on navigation icon 202 to navigate up the hierarchy to the list of contacts (a parent list of items).

A user can perform a vertical scroll gesture 242 from 244 to 246 on the list of contact details 240. In response to detecting the upward scroll gesture on the list of contact details 240, the device can scroll up the list of items. In response to detecting tap gesture 248 on the contact detail "Mobile—650-222-3333" in the list of contact details 240, the device can initiate a call to 650-222-3333.

This is an example of a graphical user interface and method for selecting items from a two-level list of items on a smart-phone. The first level is the list of contact names and the second level is a list of contact details (a child list of items) for a selected contact. The user can scroll the list into position with a scroll gesture on the list and then tap on the item on the list to select the item.

FIGS. 3A-3D illustrate a graphical user interface and method for selecting from a vertically scrollable list of contacts on a smart-watch mobile computing device 100 having a touch-sensitive display 152. Device 100 can include one or more physical buttons such sleep/wake or power off/on button, home button 212, and volume up and down button pair similar to those illustrated for a smart-phone in FIGS. 2A-2C. The device can include one or more accelerometers, a gyroscope for sensing the position of the device position in space. The device can include a microphone, and speaker. For simplicity, only touch-sensitive display 152, home button 212, and navigation icon 302 is shown in the illustration of smart-watch mobile computing device 100. The device can include a wireless connection to a wireless earphone/microphone. The device can include a camera, navigation bar, and soft keyboard or number keypad, within the limitations of the small device screen size. FIGS. 3A-3D illustrate the device in an orientation typical of a wearable smart-watch mobile computing device. Device 100 can detect the location of a finger contact and movement of a finger contact, across touch-sensitive display 152. Device 100 can detect the type of finger gesture as described above.

Figure 3A:
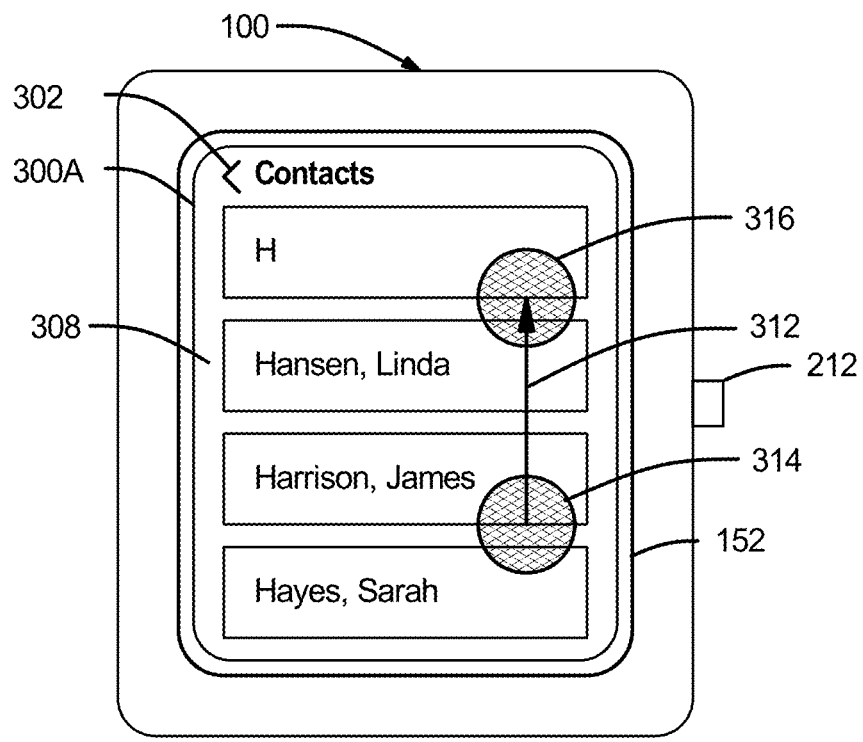
FIGS. 3A-3D illustrate selecting from a vertically scrollable table on a smart-watch.
Figure 3B:
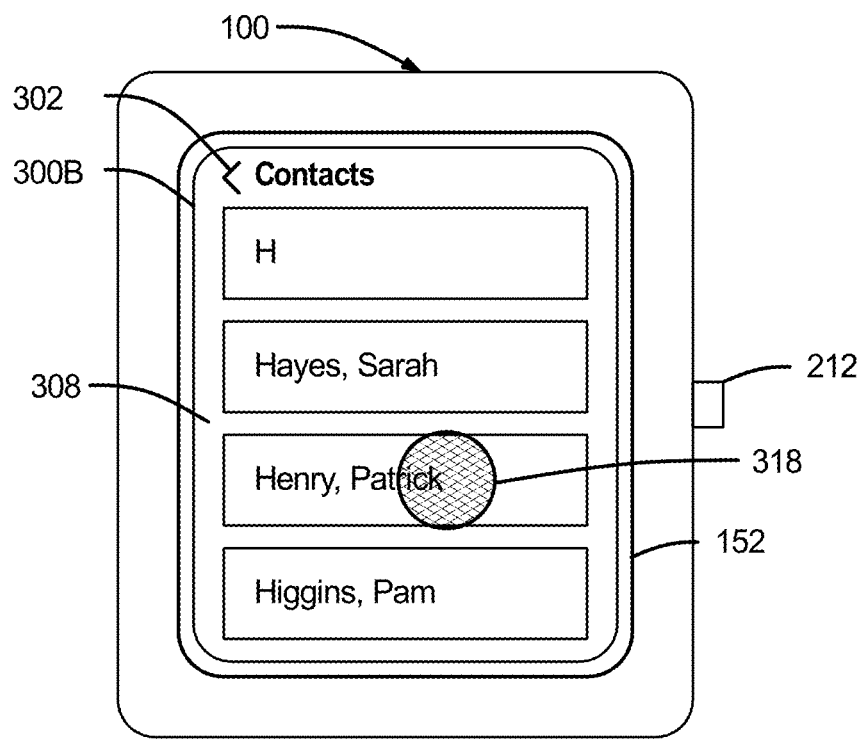
Figure 3C:
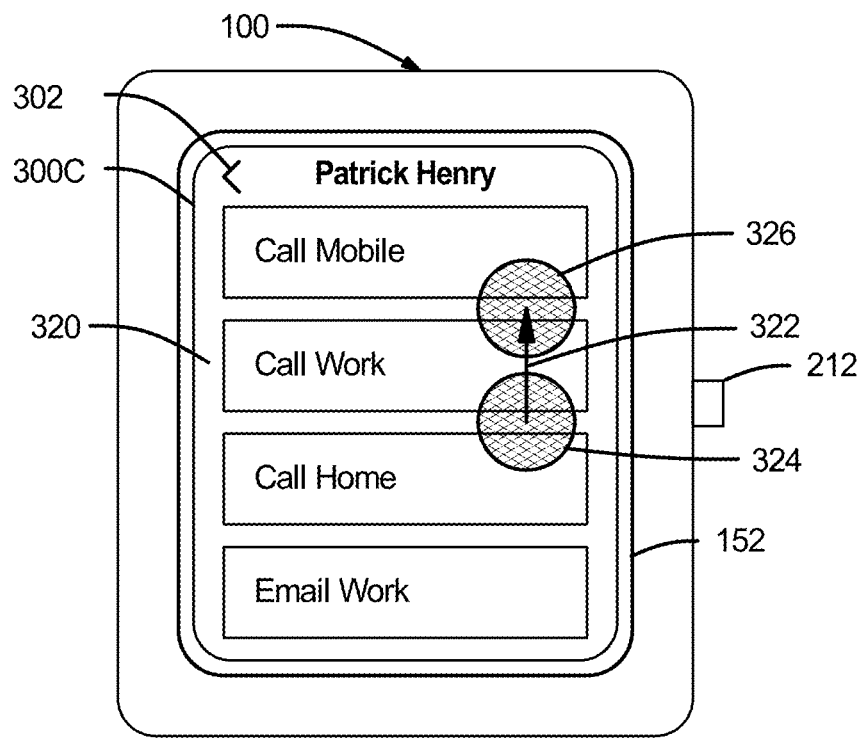

A user can perform a vertical scroll gesture 312 from 314 to 316 on the scrollable list of contacts as illustrated in UI 300A (FIG. 3A). In response to detecting the vertical scroll gesture in the upward direction on the list of contacts 308, the device can scroll the list up as illustrated in UI 300B (FIG. 3B). A user can perform tap gesture 318 to select a contact as illustrated in FIG. 3B. In this example, the selected item is the contact "Henry, Patrick". In response to detecting tap gesture 318, the device can display a list 320 of contact actions for the selected item "Henry, Patrick" as illustrated in FIG. 3C.

A user can perform a tap gesture on navigation icon 302 to navigate back up the hierarchy to the list of contacts at the first level (a parent list of items). However, in the case of a small device such as a smart-watch, navigation icon 302 is typically small. Accordingly, the navigation up the hierarchy can be unreliable—often requiring more than one tap gesture on the icon before the device recognizes the tap gesture. This is the case even when the height and width of the tap sensitive zone for the icon is made larger than height and width of the icon within the constraint of not extending into, or close to, an adjacent tap sensitive zone.

Figure 3D:
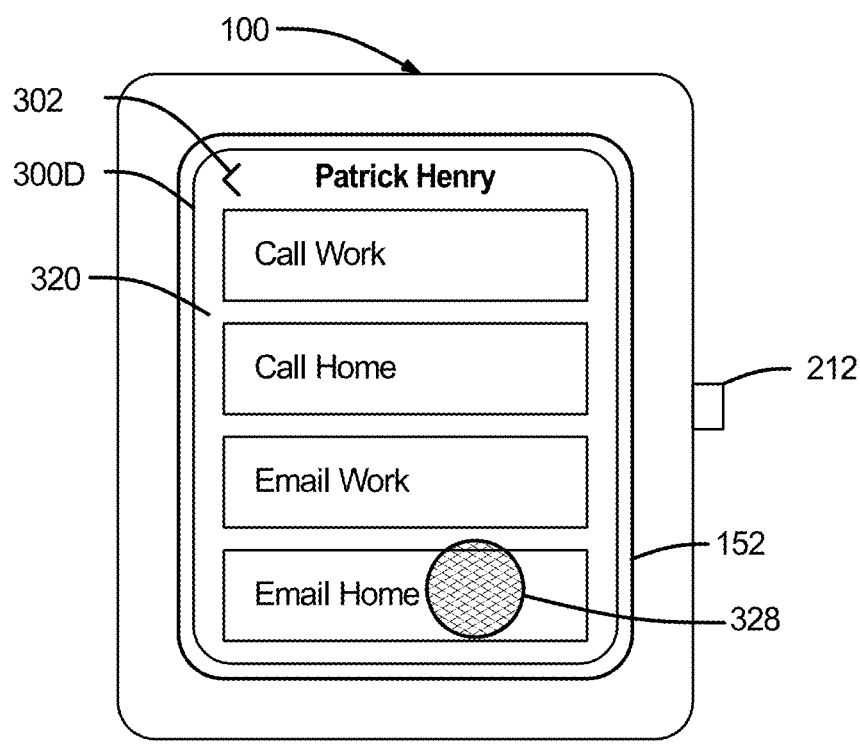

A user can perform a vertical scroll gesture 322 from 324 to 326 on the list of contact actions 320. In response to detecting the upward scroll gesture on the list of contact actions 320, the device can scroll up the list of items as illustrated in FIG. 3D. In response to detecting tap gesture 328 on the contact action "Email Home" in the list of contact actions 320, the device can initiate an "Email Home" action for the selected contact "Patrick Henry".

This is an example of a graphical user interface and method for selecting items from a two-level list of items on a smart-watch mobile computing device where a few items (typically about four items) can be displayed in a list on the small screen because of the design goal to make the items sufficient size to be reliably selectable with a tap gesture on the item. In the example illustrated in FIGS. 3A-3D, the first level is the list of contact names and the second level is a list of contact actions for a selected contact (a child list of items). In the previous example illustrated in FIGS. 2A-2C, the first level is the list of contact names and the second level is a list of contact details for a selected contact (a child list of items). In both examples, a user can scroll the list into position with a scroll gesture on the list and then tap on the item on the list to select the item.

Figure 4A:
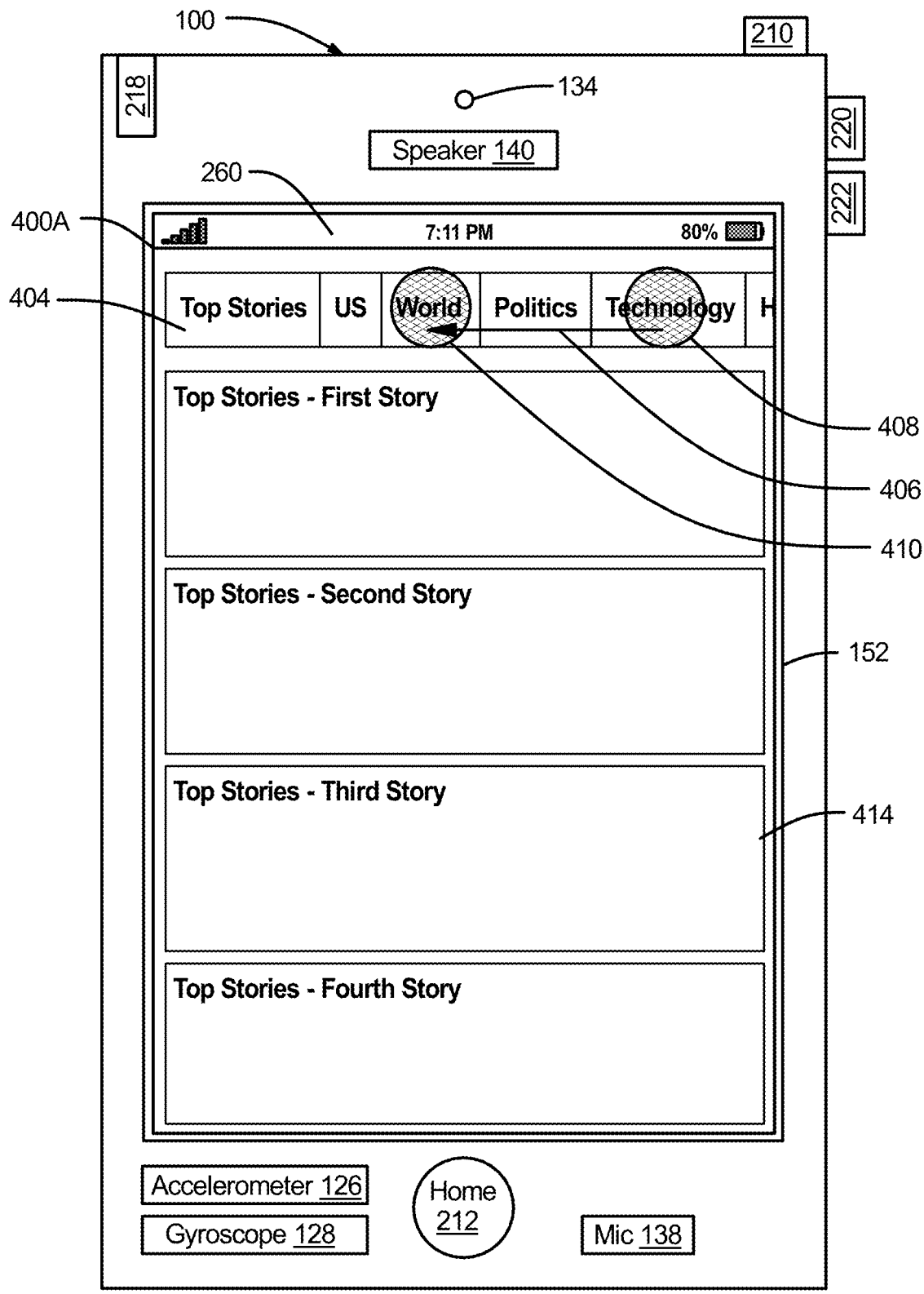
FIGS. 4A-4C illustrate selecting from a horizontally scrollable menu on a smart-phone.
Figure 4B:
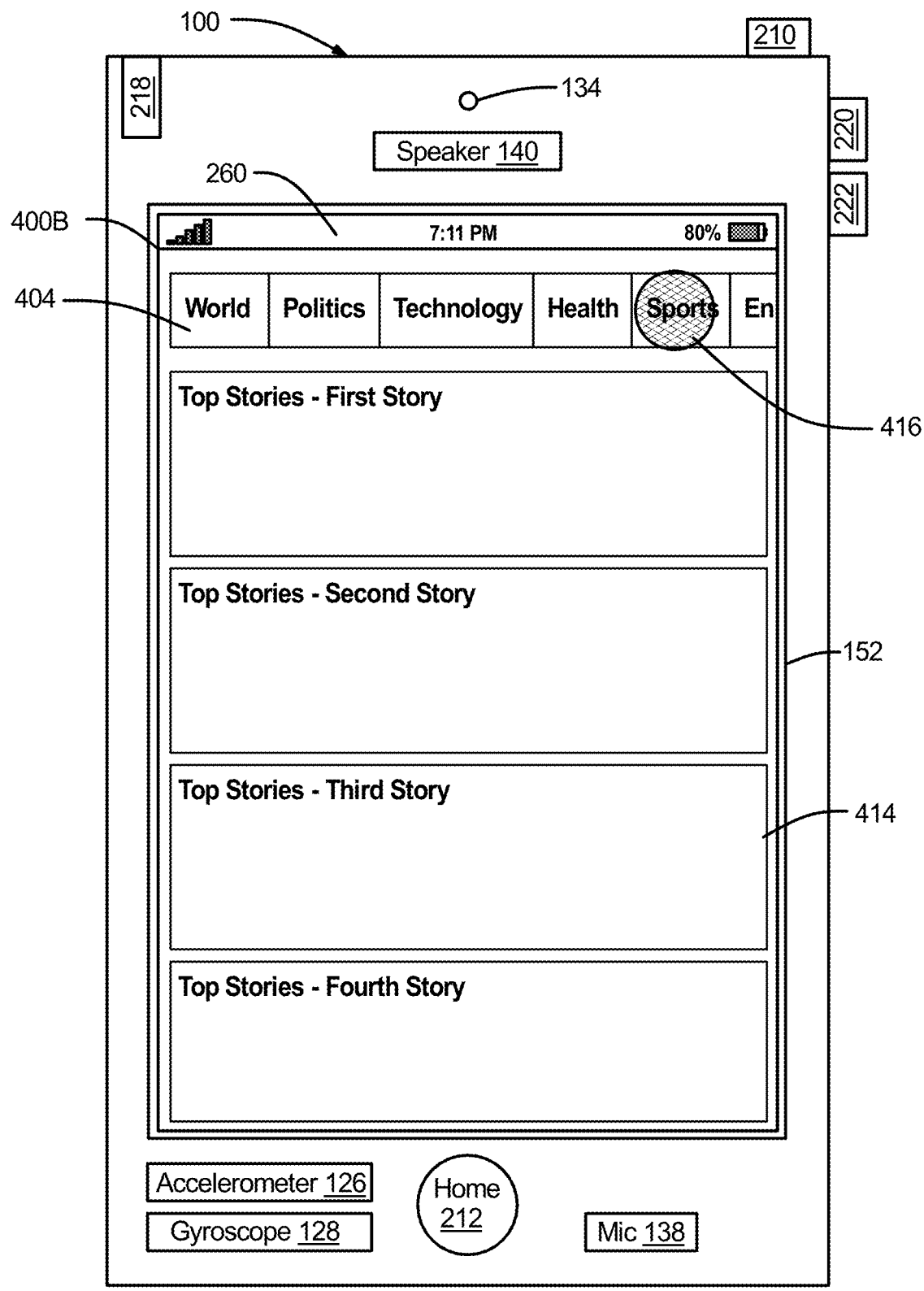
Figure 4C:
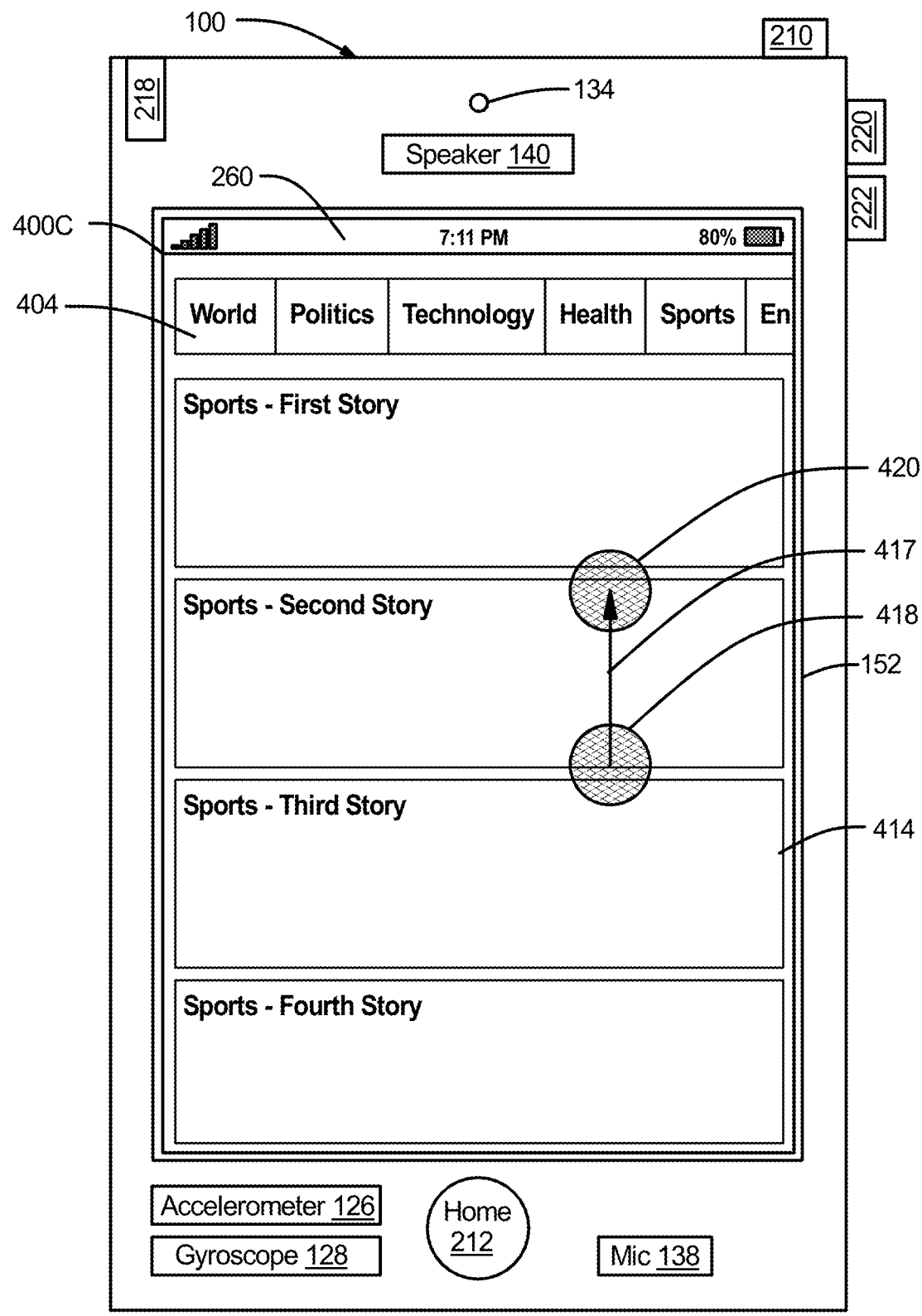

FIGS. 4A-4C illustrate a graphical user interface and method for selecting from a horizontal scrollable menu for a news application on a smart-phone mobile computing device 100 having a touch-sensitive display 152. Left-right scrollable list 404 of news categories is displayed at the top of the application, and vertically scrollable list of news stores 414 for a selected category is listed below.

A user can perform a horizontal scroll gesture 406 from 408 to 410 on left/right scrollable menu 404 of news categories as illustrated in UI 400A (FIG. 4A). In response to detecting the horizontal scroll gesture to the left on left/right scrollable menu 404, the device can scroll the menu to the left as illustrated in UI 400B (FIG. 4B). A user can perform tap gesture 416 to select a category as illustrated in FIG. 4B. In this example, the selected category is "Sports". In response to detecting tap gesture 416, the device can display a list of news stories 414 in the Sports category as illustrated in FIG. 4C. A user can perform a vertical scroll gesture 417 from 418 to 420 on the list of new stories 414. In response to detecting the up-scroll gesture on the list of new stories 414, the device can scroll up list of stories.

This is an example of a graphical user interface and method for selecting items from a two-level list of items. The first level is a list of news categories and the second level is a list of news stories for a selected category (a child list of items). As in the previous examples described in reference to FIGS. 2A-2C and FIGS. 3A-3D, the user can scroll the list into position with a scroll gesture on the list and then tap on the item in the list to select the item.

Figure 5A:
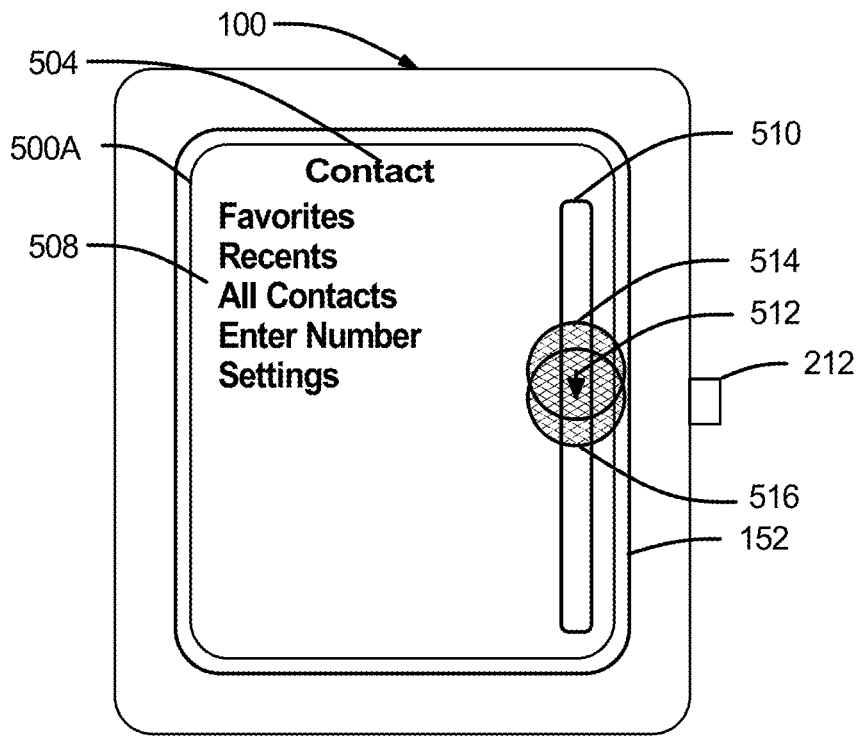
FIGS. 5A-5R illustrate an exemplary user interface and method for displaying an item preselection in a list of items, changing the position of an item preselection in a list of items, and selecting an item at the position of the item preselection within a hierarchically organized list of items on a smart-watch mobile computing device with a touch-sensitive display, in accordance with some embodiments. In this example, the list of items is a hierarchically organized list of contacts and contact actions.
Figure 5B:
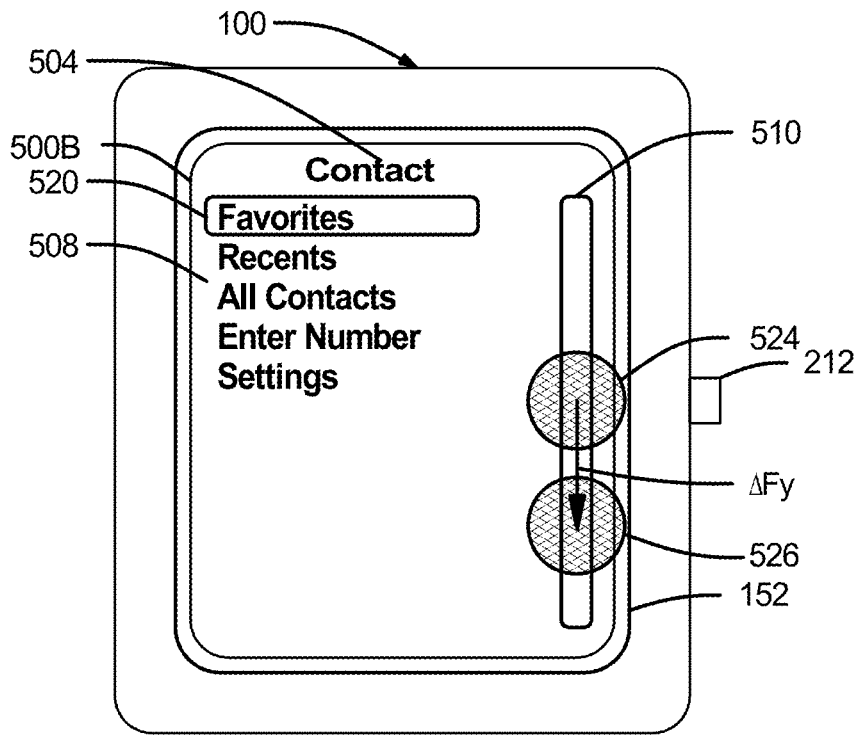
Figure 5C:
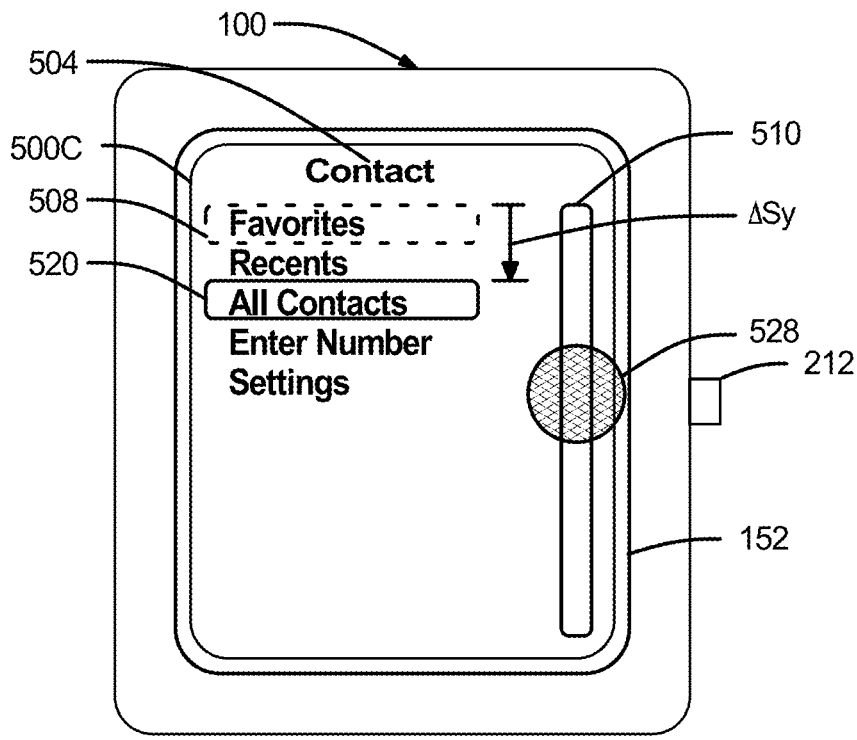
Figure 5D:
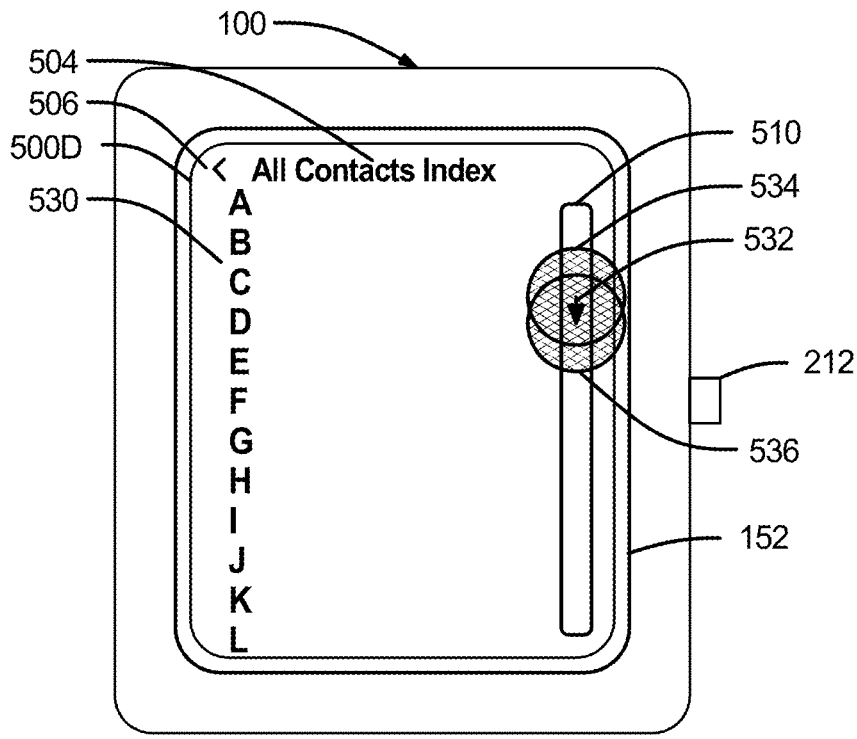
Figure 5E:
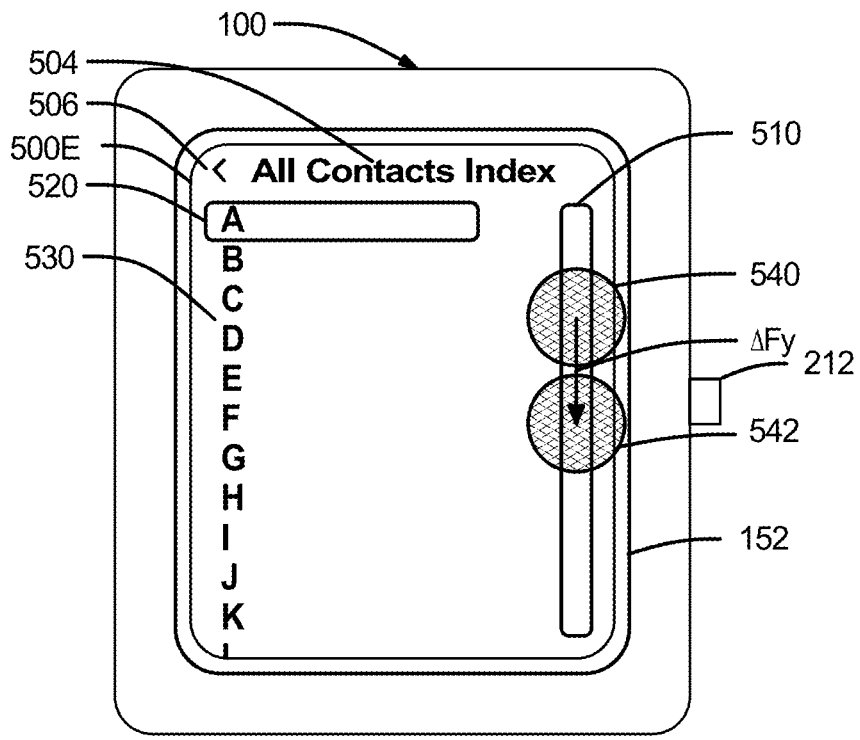
Figure 5F:
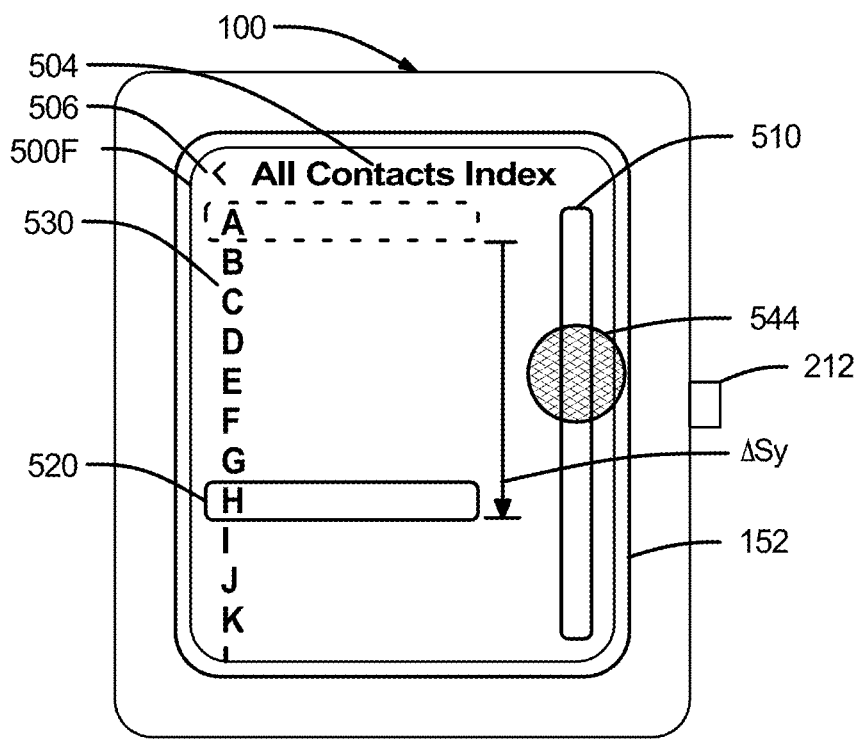
Figure 5G:
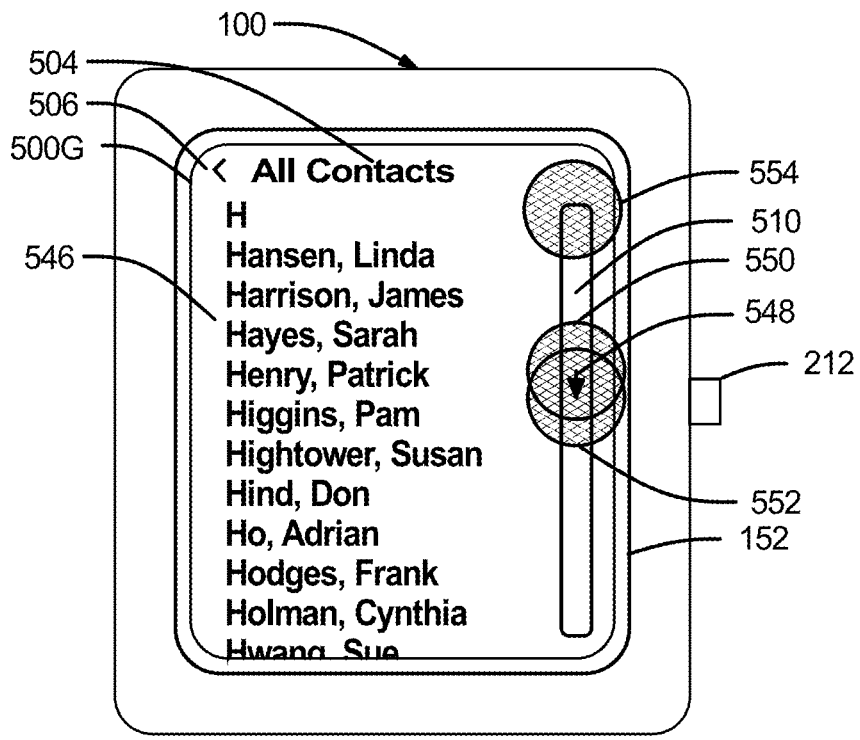
Figure 5H:
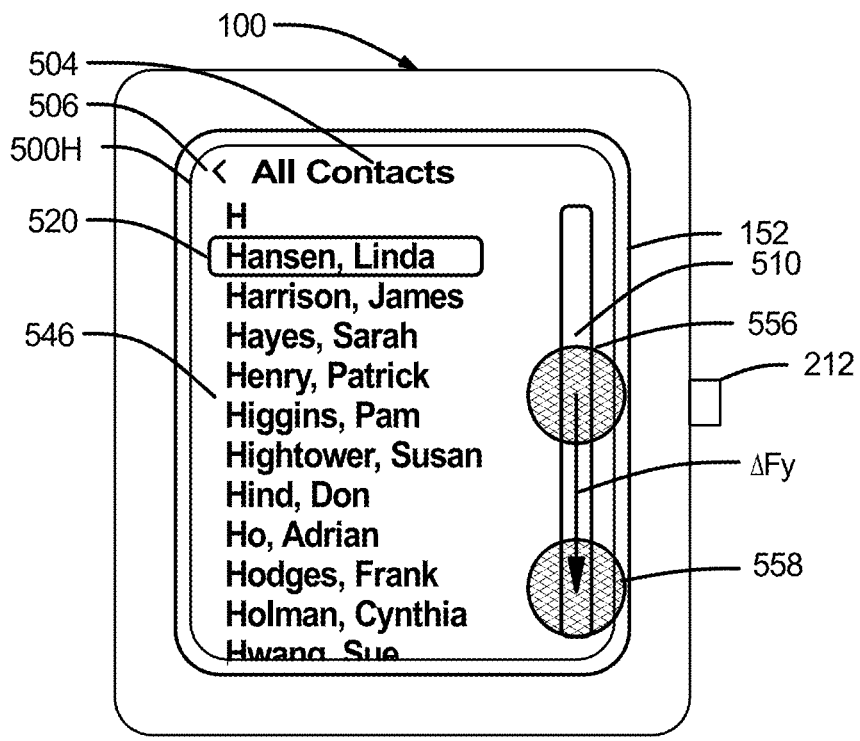
Figure 5I:
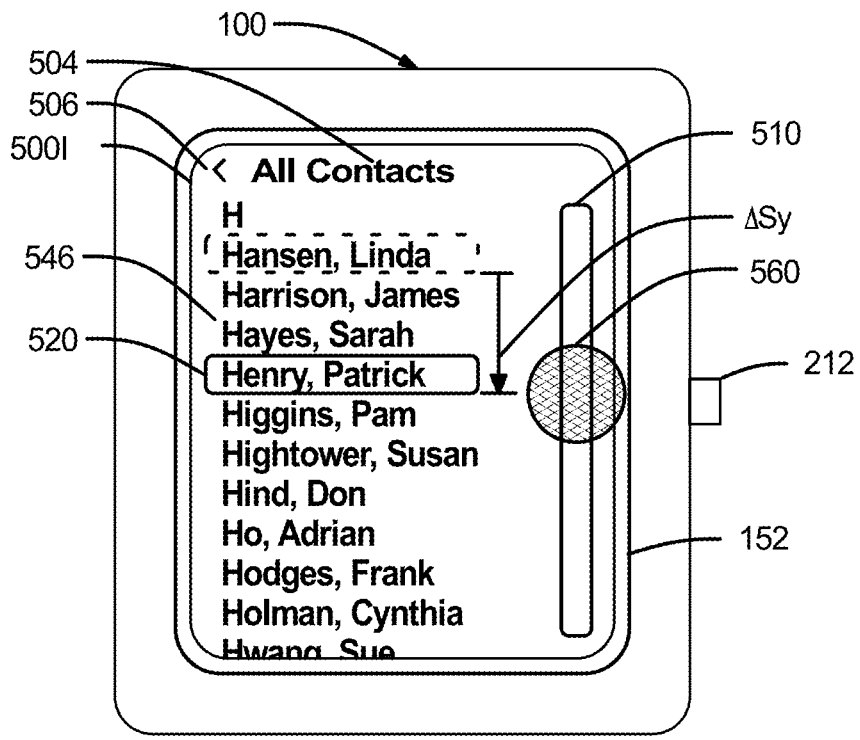
Figure 5J:
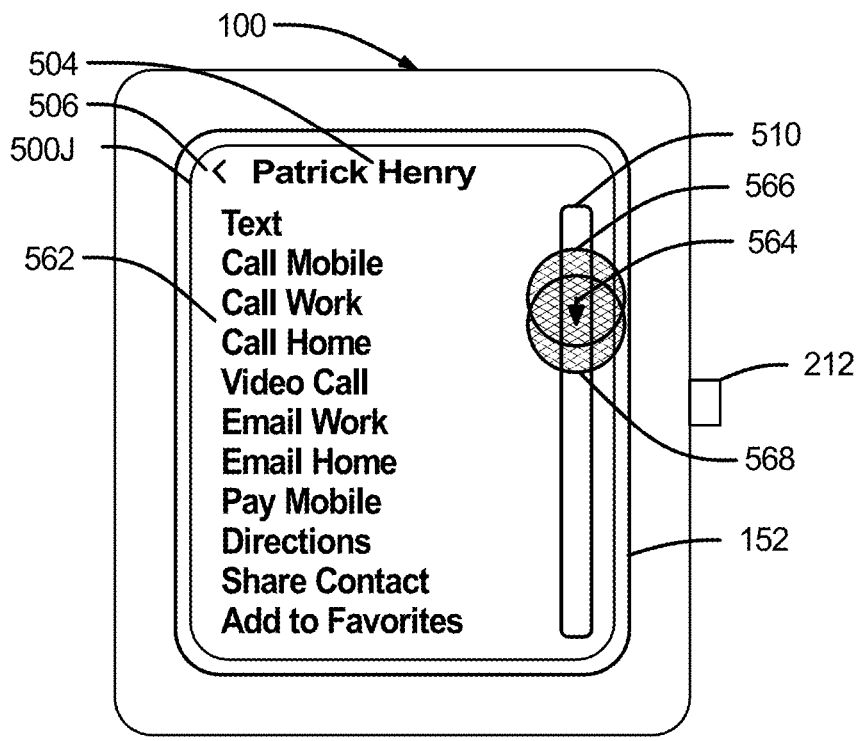
Figure 5K:
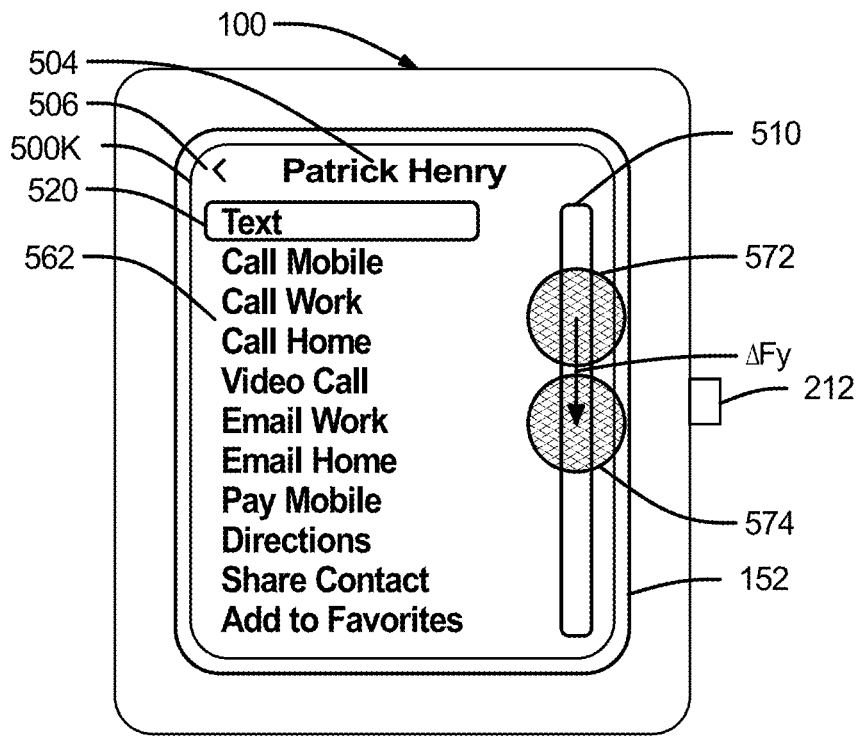
Figure 5L:
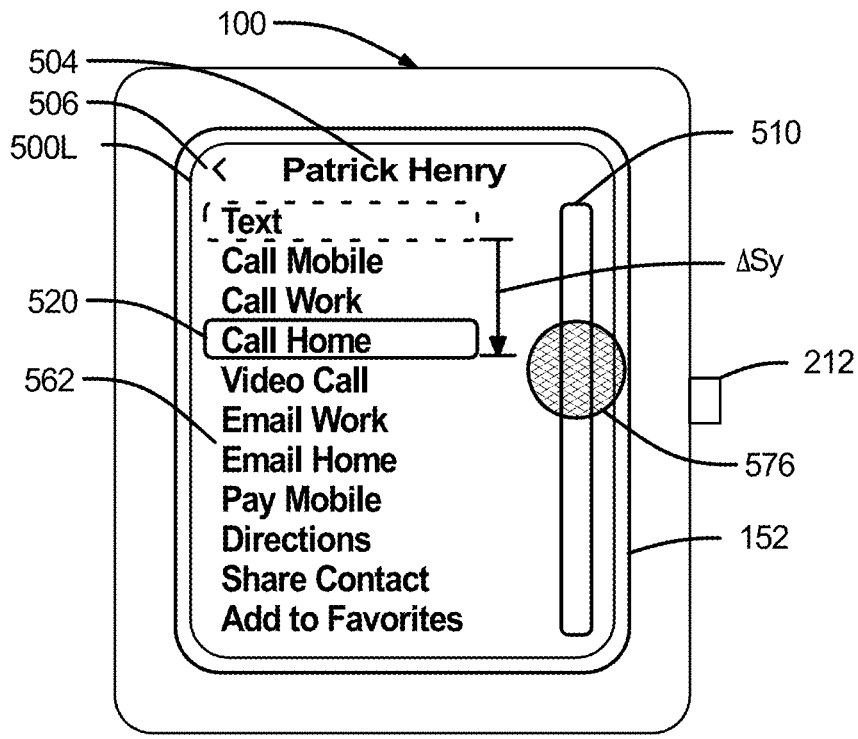
Figure 5M:
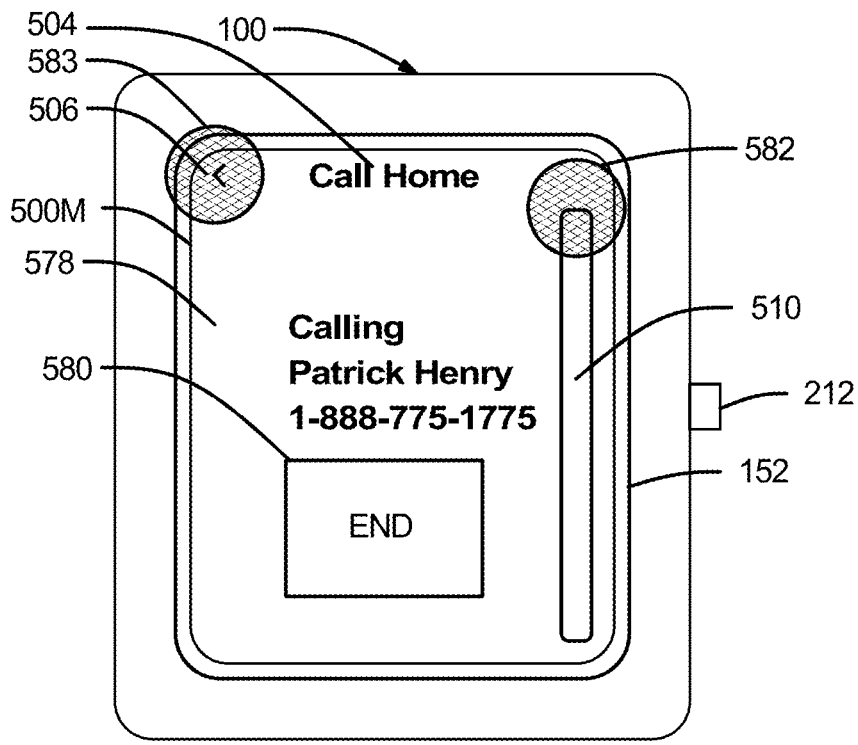
Figure 5N:
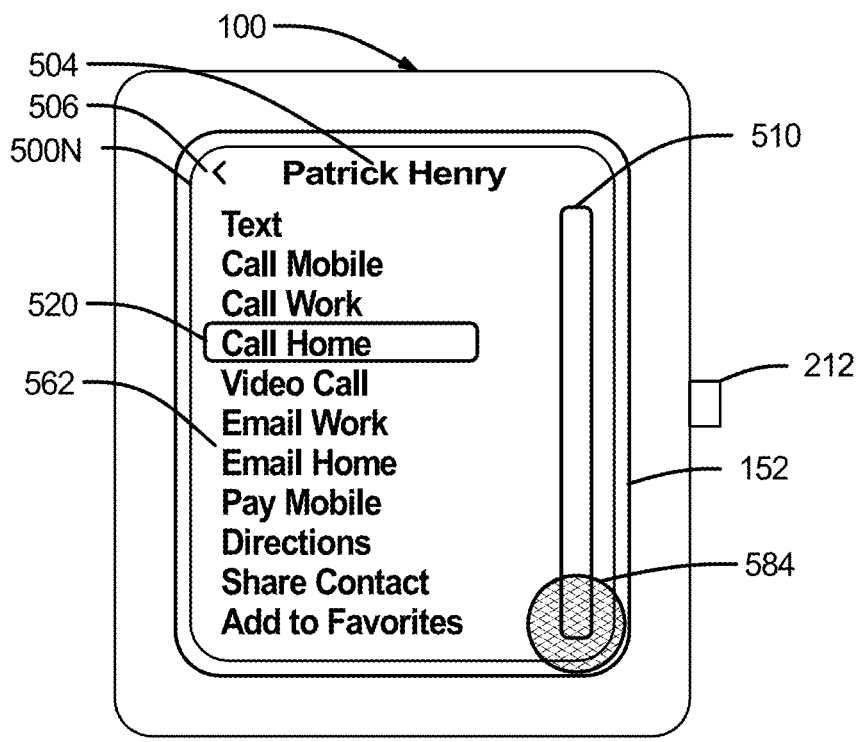
Figure 5O:
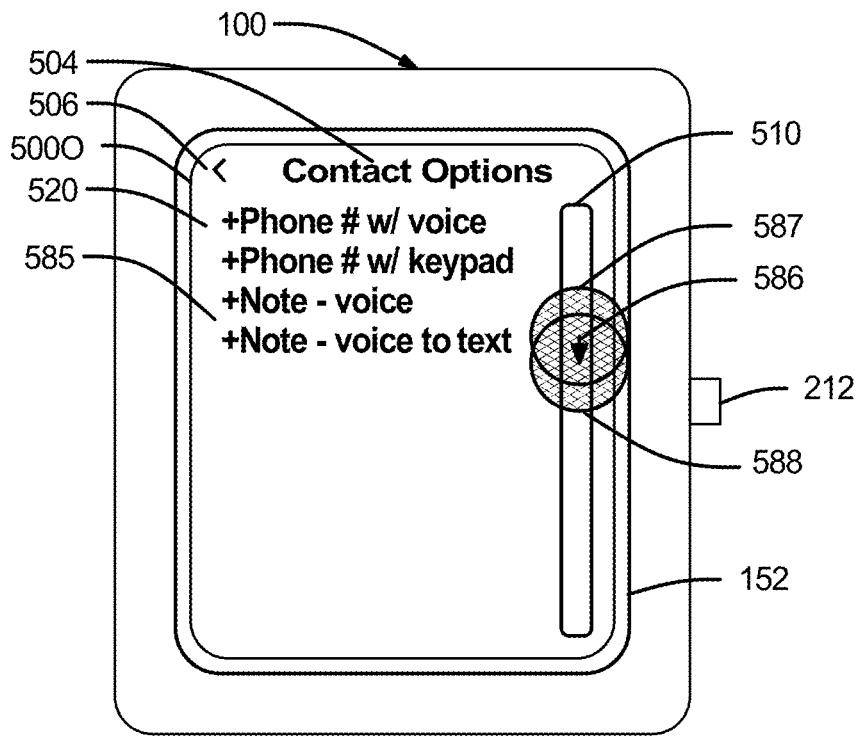
Figure 5P:
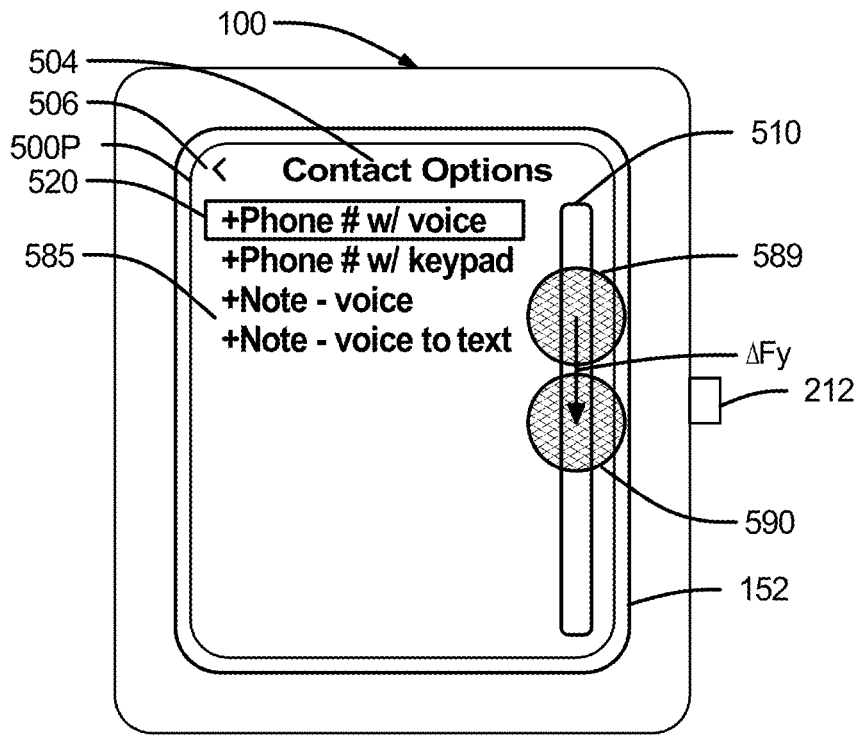
Figure 5Q:
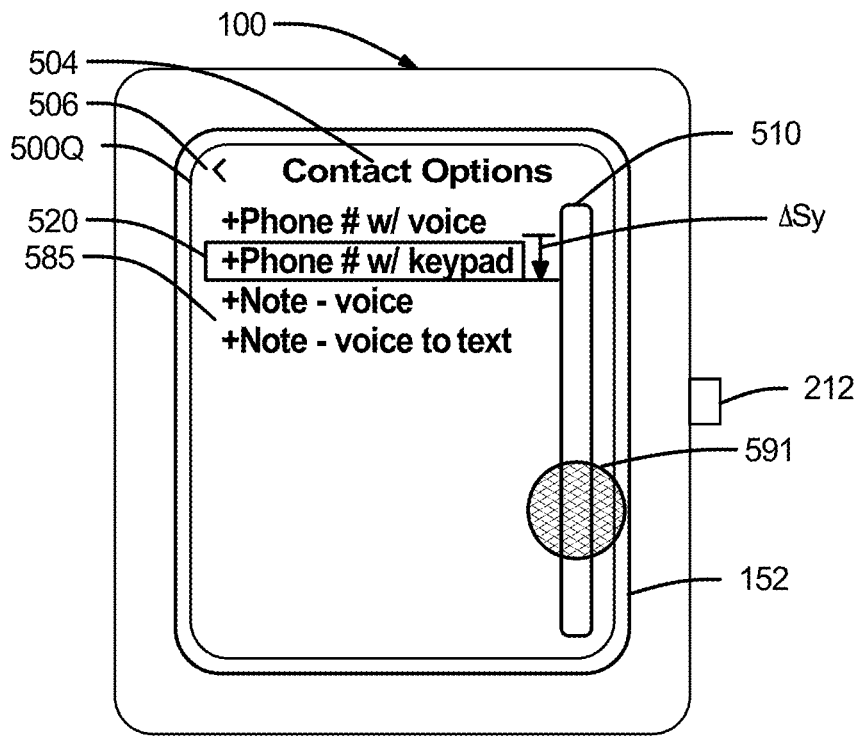
Figure 5R:
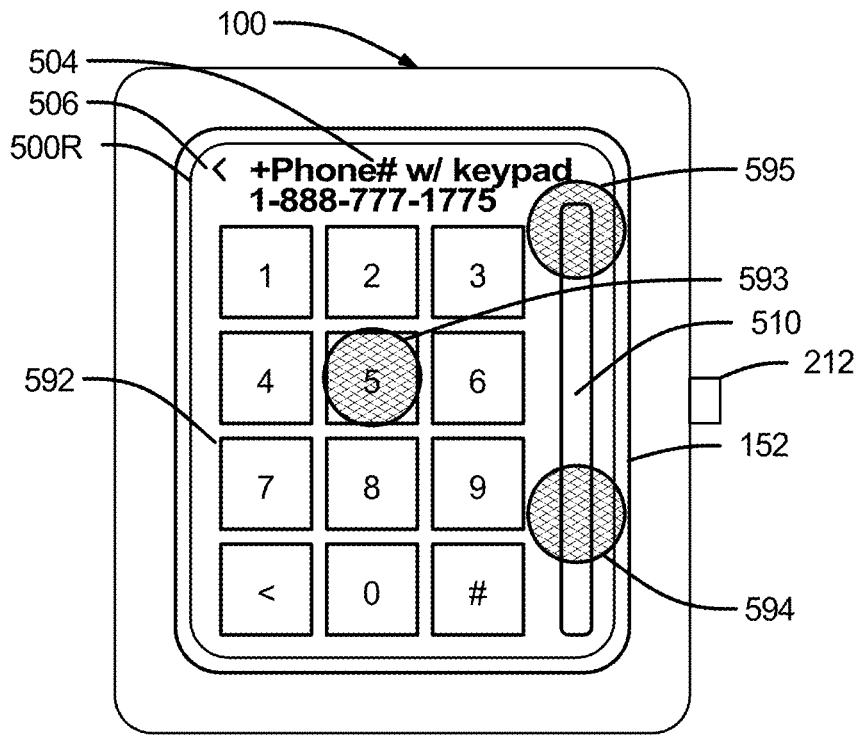

FIGS. 5A-5R illustrate an exemplary user interface and method for displaying an item preselection in a list of items, changing the position of an item preselection in a list of items, and selecting an item at the position of the item preselection within a hierarchically organized list of items on a smart-watch mobile computing device 100 with a touch-sensitive display 152, in accordance with some embodiments. In this example, the list of items is a hierarchically organized list of contacts and contact actions.

A user can perform a vertical slide finger gesture beginning anywhere on control icon 510 as illustrated in UI 500A, UI 500B, and UI 500C (FIG. 5A, FIG. 5B, and FIG. 5C). In response to detecting the initial change 512 in the vertical position of a finger contact from 514 to 516 (FIG. 5A), the device can display item preselection 520 at a first position at the item "Favorites" in the list of items (FIG. 5B). (In some embodiments, if the initial gesture is in an downward direction, the device can display item preselection 520 at a first position at the topmost item in the list of items; if the initial gesture is in an upward direction, the device can display item preselection 520 at a first position at the bottommost item in the list of items.) In response to detecting an additional change in the vertical position of a finger contact from 524 to 526 (FIG. 5B), the device can change the position of item preselection 520 to the item "All Contacts" as illustrated in UI 500C (FIG. 5C). In lieu of performing one slide gesture, a user can perform two or more slide gestures, beginning anywhere on control icon 510, until the device changes the vertical position of item preselection 520 from the item "Favorites" to the item "All Contacts".

In some example embodiments, a slide gesture in a downward direction, beginning anywhere on on control icon 510, can move item preselection 520 toward the bottom of a list; once reaching the bottom of the list, upon detection of an additional slide gesture in a downward direction, the item preselection can be displayed at the top of the list; and a slide gesture in a downward direction, beginning anywhere on control icon 510, can again move item preselection 520 toward the bottom of a list. Similarly, a slide gesture in an upward direction, beginning anywhere on control icon 510, can move item preselection 520 toward the top of a list; once reaching the top of the list, upon detection of an additional slide gesture in a upward direction, the item preselection can be displayed at the bottom of the list; and a slide gesture in a upward direction, beginning anywhere on control icon 510, can again move item preselection 520 toward the top of a list. A similar UI and method can be applied to any list of items.

A similar approach can be applied to horizontally oriented control icons or horizontally oriented lists of items. A similar approach can be applied to movement of the item preselection in two-dimensional list of items such as month calendar displaying the days in the month of May. For example, in response to the detection of one or more slide gestures in a downward direction beginning anywhere on control icon 510, the item preselection can move in sequence to each next day in the calendar; for example, in response to the detection of one or more slides gesture in an upward direction beginning anywhere on control icon 510, and the item preselection can move in sequence to each previous day in the calendar.

Control icon 510 can be displayed near an edge of the touch-sensitive display. In some example embodiments, control icon can be displayed as a vertical line or thin vertical rectangle near an edge of the touch sensitive display as shown in FIGS. 5A-5R. In some example embodiments the control icon can be displayed as a horizontal line as illustrated in FIGS. 11A-11F. In some example embodiments the control icon can be displayed in a position according to the particular application or list being displayed. In some example embodiments, the control icon can be displayed as vertical control icon near the right edge of the display or left edge of the display as specified in a user setting. For example, if a user wears a smart-watch on a left-wrist, and uses right-hand finger-gestures on the watch, the user may set the control icon to displayed near the right-edge of the touch-sensitive display. For example, if a user wears a smart-watch on a right-wrist, and uses left-hand finger-gestures on the watch, the user may set the control icon to displayed near the left-edge of the touch-sensitive display.

The UI can also display list name 504 at the top of the display as shown in FIG. 5A, FIG. 5B, and FIG. 5C. In the example shown the list name is "Contact."

A user can perform tap gesture 528 on control icon 510 (FIG. 5C). In response to detecting a tap gesture on control icon 510, the device can display a second level list of items, a child list of items, as illustrated in UI 500 D (FIG. 5D). In the example shown the second level list of items (child list of items) 530 is a list of items named "All Contacts Index". In addition, the device can display icon 506. Icon 506 can be displayed to indicate to the user that there is a level above the current level (a parent list of items) in the hierarchy. Icon 506 can also be a navigation icon that enables a user to navigate up to the prior level of the hierarchy with a tap on icon 506. A tap on icon 506 can provide an alternative to a tap on the top-end of control icon 510, for navigating up to the prior level of a hierarchically organized list to display a parent list of items. This latter "up navigation" method is described below in reference to FIG. 5N.

In a similar way, a user can perform a vertical slide finger gesture beginning anywhere on control icon 510 as illustrated in UI 500D, UI 500E, and UI 500F (FIG. 5D, FIG. 5E, and FIG. 5F). In response to detecting the initial change 532 in the vertical position of a finger contact from 534 to 536 (FIG. 5D), the device can display preselection 520 at a first item "A" in the list of items (FIG. 5E). In response to detecting an additional change in the vertical position of a finger contact from 540 to 542 (FIG. 5E), the device can change the position of preselection 520 to the item "H" as illustrated in UI 500F (FIG. 5F).

A user can perform a tap gesture 544 on control icon 510 (FIG. 5F). In response to detecting tap gesture on control icon 510, the device can display a third level list of items as illustrated in UI 500 G (FIG. 5G). In the example shown the third level list of items 546 (a child list of items) is a list of items named "All Contacts" with the list of all contacts index beginning with the index letter "H" scrolled into view.

In a similar way, a user can perform a vertical slide finger gesture beginning anywhere on control icon 510 as illustrated in UI 500G, UI 500H, and UI 500I (FIG. 5G, FIG. 5H, and FIG. 5I). In response to detecting the initial change in the vertical position of a finger contact from 550 to 552 (FIG. 5H), the device can display preselection 520 at the first item "Hansen, Linda" in the list of items (FIG. 5H). In response to detecting an additional change in the vertical position of a finger contact from 556 to 558 (FIG. 5H), the device can change the position of preselection 520 to the item "Henry, Patrick" as illustrated in UI 500I (FIG. 5I).

A user can perform a tap gesture 560 on control icon 510 (FIG. 5I). In response to detecting tap gesture on control icon 510, the item "Henry, Patrick" at the position of item preselection 520 is selected. The device can display a fourth level list of items as illustrated in UI 500 J (FIG. 5J). In the example shown the fourth level list of items 562 (a child list of items) is a list named "Patrick Henry" with the list of contact actions available with respect to contact "Patrick Henry."

In a similar way, a user can perform a vertical slide finger gesture beginning anywhere on control icon 510 as illustrated in UI 500J, UI 500K, and UI 500L (FIG. 5J, FIG. 5K, and FIG. 5L). In response to detecting the initial change 564 in the vertical position of a finger contact from 566 to 568 (FIG. 5J), the device can display preselection 520 at a first item "Text" in the list of items (FIG. 5K). In response to detecting an additional change in the vertical position of a finger contact from 572 to 574 (FIG. 5K), the device can change the position of preselection 520 to the item "Call Home" as illustrated in UI 500L (FIG. 5L). In lieu of performing one slide gesture, a user can perform two or more slide gestures, beginning anywhere on control icon 510, until the device changes the vertical position of item preselection 520 from the item "Text" to the item "Call Home".

A user can perform a tap gesture 576 on control icon 510 as illustrated in FIG. 5L. In response to detecting tap gesture 576 on control icon 510, the item at the position of item preselection 520 is selected and a "Call Home" action with respect to the contact Patrick Henry is initiated.

A user can end the call with a tap on icon 580. In some embodiments, after a call is ended, the device can redisplay the prior level list of actions as illustrated in UI 500L (FIG. 5L).

A user can perform an "up" gesture on control icon 510 as illustrated in FIG. 5M. In the example shown the "up" gesture is tap gesture 582 on the top-end of control icon 510. In response to detecting tap gesture 582 on the top-end of control icon 510, the device can redisplay the prior level list of items (a parent list of items) available with respect to item to Patrick Henry as illustrated in UI 500 L (FIG. 5L) without ending the call.

Option gesture to display an option list of items: An "option" gesture (a second-gesture) for displaying an option list of items of with respect to a list of items can be defined, for example, as a second-gesture on a second-end of the control icon. For example, the control icon can be a vertically oriented control icon, the second-gesture can be a tap gesture, and the second-end of the control icon can be the bottom-end of the control icon. For example, user can perform an "option" gesture on control icon 510 as illustrated in FIG. 5N. In the example shown, the option gesture is a tap gesture 584 on the bottom end of control icon 510. In response to detecting option gesture 584 on control icon 510, the device can display contact option list of items 585 with respect to the list named Patrick Henry. An option list of items can be provided for any list of items at any level. However, an option list of items is not required. A displayed option list of items can be context sensitive.

The option list of items can display items applicable to a list of items from which the option list of items was displayed with an "option" gesture on control icon 510 at the list of items. For example, an option list for a list of contacts could list the following items: sort list in alpha order by first name; sort the list in alpha order by last name.

The option list of items can display items applicable to an item at a position of an item preselection in the list of items, from which the option list of items was displayed with an "option" gesture on control icon 510 at the list of items. For example, an option list for a contact at a position of an item preselection in a list of all contacts could list the following items: add contact to favorite contacts; share contact. For example, an option list for a contact at a position of an item preselection in a list of favorite contacts could list the following items: remove contact from favorite contacts; share contact.

Similarly, a context specific option list item, applicable a list of items, or applicable to an item at a position of an item preselection in the list of items, can be displayed for any list of items. Example lists of items, include but are not limited to, a list of contacts, a list of contact actions, a list of software apps, a list of music playlists, a list music albums, a list of music artists, a list music songs, a list movie categories, a list of movie titles, a list of book categories, a list of book titles, a list of photo albums, a list of favorite photos, a list of photos for a particular month, a list of photos at a particular location, a list of grocery categories, a list of grocery product names, a list of coffee shops, a list of restaurants In another example, an option list could be displayed for editing contact details for a selected contact as illustrated in FIGS. 5P-5R. In response to detecting option gesture 584 on control icon 510 as illustrated in FIG. 5P, the device can display contact option list of items 585 with respect to the list named Patrick Henry. A user can perform a vertical slide finger gesture beginning anywhere on control icon 510 as illustrated in UI 5000, UI 500P, UI 500Q (FIG. 5O, FIG. 5P, and FIG. 5Q). In response to detecting the initial change 586 in the vertical position of a finger contact from 587 to 588 (FIG. 5O), the device can display preselection 520 at the first item "+Phone #w/ voice" (add a new phone number to the contact using voice) in the list of items (FIG. 5P). In response to detecting an additional change in the vertical position of a finger contact from 589 to 590 (FIG. 5P), the device can change the position of preselection 520 to the item "+Phone #w/ keypad" (add a new phone number to the contact using keypad) as illustrated in UI 500Q (FIG. 5Q). In lieu of performing one slide gesture, a user can perform two or more slide gestures, beginning anywhere on control icon 510, until the device changes the vertical position of item preselection 520 from the item ""+Phone #w/ voice" to the item "+Phone #w/ keypad". The additional option list items 585 with respect to the contact "Henry, Patrick" are "+Note-voice" (add a note to the contact using voice) and "+Note-voice to text" (add a note to the contact using voice to text).

A user can perform a tap gesture 591 on control icon 510 as illustrated in FIG. 5L. In response to detecting tap gesture 591 on control icon 510, the device can display keypad 592 for entering an additional phone number for Patrick Henry as illustrated in FIG. 5R. Once the last digit of the phone number is entered with a tap 593 on keypad 592, the user can perform a select gesture (a tap gesture for example) on control icon 510 to add the number to the stored contact information for Patrick Henry.

Once an item in an option list is selected, the parent list of items, from which the option menu was displayed, can be displayed with an "up" gesture on control icon 510 as illustrated in FIG. 5R. In the example shown the "up" gesture is tap gesture 595 on the top-end of control icon 510. This is illustrated in FIG. 5P.

If the user does not wish to select any other items from the option list of items for contact Patrick Henry, the user can perform another up gesture on control icon 510 to redisplay the list of items 562 for contact Patrick Henry as illustrated in FIG. 5N.

In another example embodiment of option list navigation, once an item in an option list of items is selected, the parent list of items, from which the option list of items was displayed, can be displayed without waiting for an "up" gesture on control icon 510.

In another example embodiment an option list of items can have more than one level. This option list design can be used when an option list of items has a large number of items that can be more conveniently organized into a two-level option list of items. For example, the top-level option list of items could list option item categories, and second level option lists could option lists for each option item category. A navigation scheme, similar to that used for moving up and down a multilevel list of items, can be used for moving up and down a multilevel option list of items.

In any case, if a user displays an option list of items, and decides to not select an item in the option list of items, the user can perform an up gesture on the control icon to display the parent list of items from which the option list of items was displayed.

$\Delta S = K \Delta F$: In response to detecting a change in the position of a finger contact beginning anywhere on the control icon, the device can change the position of preselection 520 on the display. The change in a position of preselection 520 ($\Delta S$) can be approximately proportional to the change in a position of a finger contact ($\Delta F$). This can be written as $\Delta S = K \Delta F$ where K is a proportionality constant, where K can be less than one, equal to one, or greater than one.

In a first example embodiment, the control icon is oriented vertically, and a change in position of the finger contact on the control icon is in the vertical (y) direction, and a change in the position of item preselection 520 is in the vertical (y) direction. A change in the position $\Delta S_y$ of preselection 520, can be proportional to a change in position $\Delta F_y$ of a finger contact. This could be written as $\Delta S_y = K_y \Delta F_y$. Examples for $K_y<1$, $K_y\sim1$, and $K_y>1$ are illustrated in reference to FIGS. 5A-5R. 1) In the example slide gesture illustrated in FIG. 5B and FIG. 5C, $\Delta S/\Delta F \sim 0.5$ where the average value of $K_y$ is ~0.5 during the slide gesture; 2) In the example slide gesture illustrated in FIG. 5E and FIG. 5F, $\Delta S/\Delta F \sim 3$ where the average value of $K_y$ is ~3 during the slide gesture; 3) In the example slide gesture illustrated in FIG. 5H and FIG. 5I, $\Delta S/\Delta F \sim 0.6$ where the average value of $K_y$ is ~0.6 during the slide gesture. 4) In the example slide gesture illustrated in FIG. 5L and FIG. 5M, $\Delta S/\Delta F \sim 1$ where the average value of $K_y$ is ~1 during the slide gesture.

Other examples of $K<1$, $K\sim1$, and $K>1$ are illustrated in reference to FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L.

In a second example embodiment, the control icon can be oriented horizontally, and a change in position of a finger contact on the control icon can be in the horizontal (x) direction, and a change in the position of item preselection 520 can be in the horizontal (x) direction. A change in the position ΔSx of preselection 520, can be proportional to a change in position ΔFx of a finger contact. This could be written as ΔSx=KxΔFx. An example is illustrated later in this disclosure in reference to FIGS. 11A-11F.

In a third example embodiment, the control icon can be oriented vertically, and a change in position of a finger contact on the control icon can be in the vertical (y) direction, and a change in the position of item preselection 520 can be in the horizontal (x) direction. A change in the position ΔSx of preselection 520, can be proportional to a change in position ΔFy of a finger contact. This could be written as ΔSx=KyΔFy. An example is illustrated later in this disclosure in reference to FIGS. 10K-10L.

In a fourth example embodiment, the control icon can be oriented horizontally, and a change in position of a finger contact on the control icon can be in the vertical (x) direction, and a change in the position of item preselection 520 can be in the horizontal (y) direction. A change in the position ΔSy of preselection 520, can be proportional to a change in position ΔFx of a finger contact. This could be written as ΔSy=KxΔFx.

In any case, K can be less than one, equal to one, or greater than one as illustrated in the figures throughout this disclosure. In some embodiments, K can be a function of the slide gesture speed. In some embodiments, a change in position of preselection 520 can be a function of a change and time rate of change in position of a finger contact. In some embodiments, functional dependence can be user selectable via a tracking speed setting. The setting can be for a particular application running under a touch-based operating system or a global setting for the operating system. In the latter case, a similar user interface and method can be used to select an application from a list of applications on the home page of a device for example. An example is illustrated later in this disclosure in reference to FIGS. 7A-7D.

Additional example applications, of methods and graphical user interfaces for positioning an item preselection and selecting an item at the position of an item preselection, are described below in reference to FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L. These additional example applications are described to illustrate the wide applicability of the methods and graphical user interfaces disclosed herein. Methods for positioning an item preselection and selecting an item at the position of an item preselection are further described below in reference to the method flow diagrams shown in FIGS. 13, 14, 15, 16, 17, 18, 19, 20, 22, 24, 25, and 26.

FIGS. 6A-6L illustrate an exemplary user interface and method for displaying an item preselection in a list of items, changing the position of an item preselection in a list of items, and selecting an item at the position of the item preselection within a hierarchically organized list of items on a smart-watch mobile computing device 100 with a touch-sensitive display 152, in accordance with some embodiments. In this example, the list of items is a hierarchically organized list of contacts and contact actions. In the example shown, more than one item in a list of items is selected.

Figure 6A:
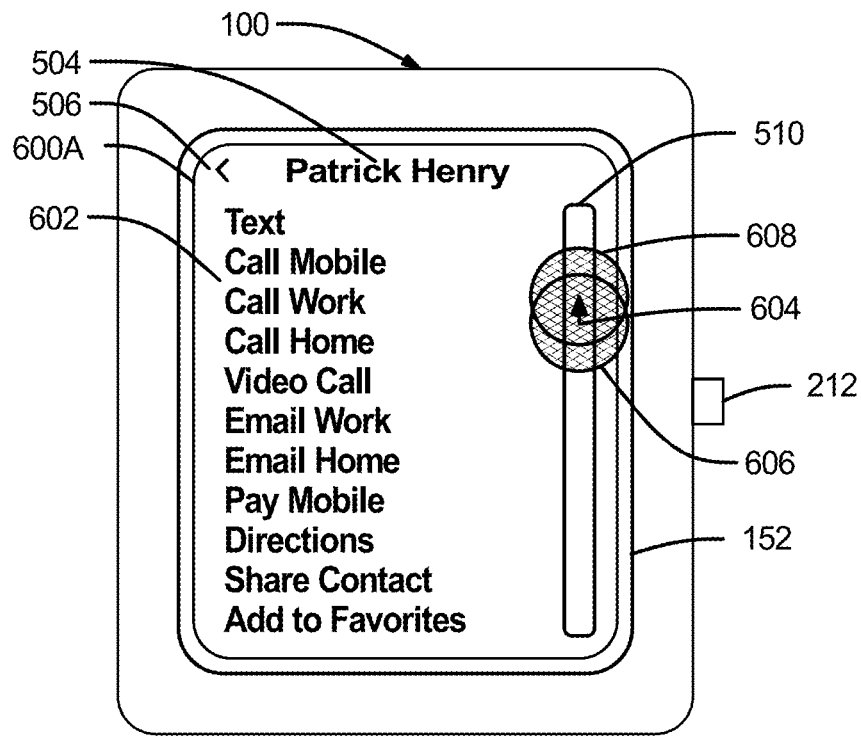
FIGS. 6A-6L illustrate an exemplary user interface and method for displaying an item preselection in a list of items, changing the position of an item preselection in a list of items, and selecting an item at the position of the item preselection within a hierarchically organized list of items on a smart-watch mobile computing device with a touch-sensitive display, in accordance with some embodiments. In this example, the list of items is a hierarchically organized list of contacts and contact actions.
Figure 6B:
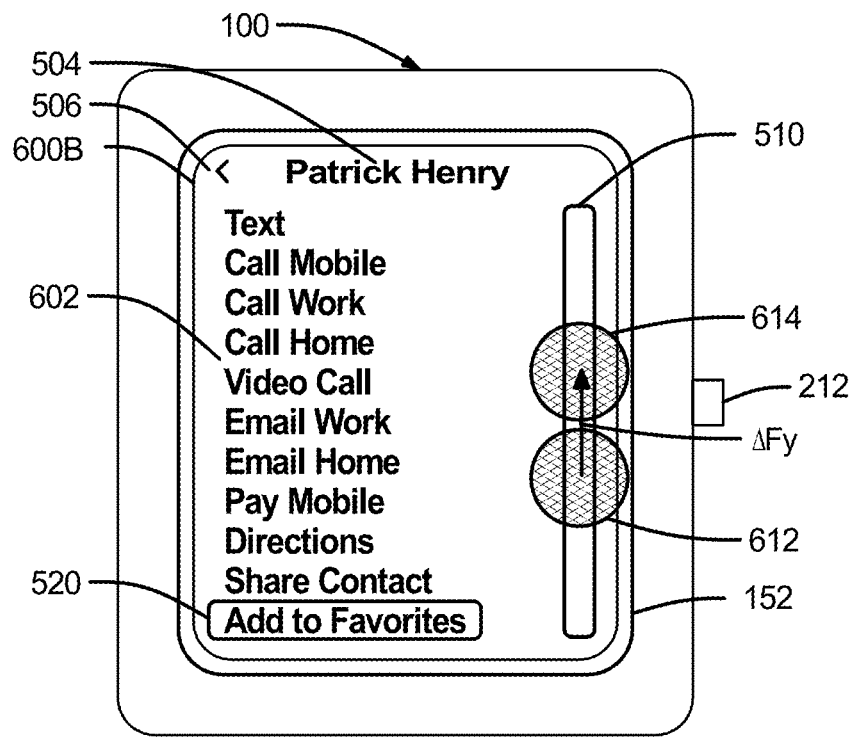
Figure 6C:
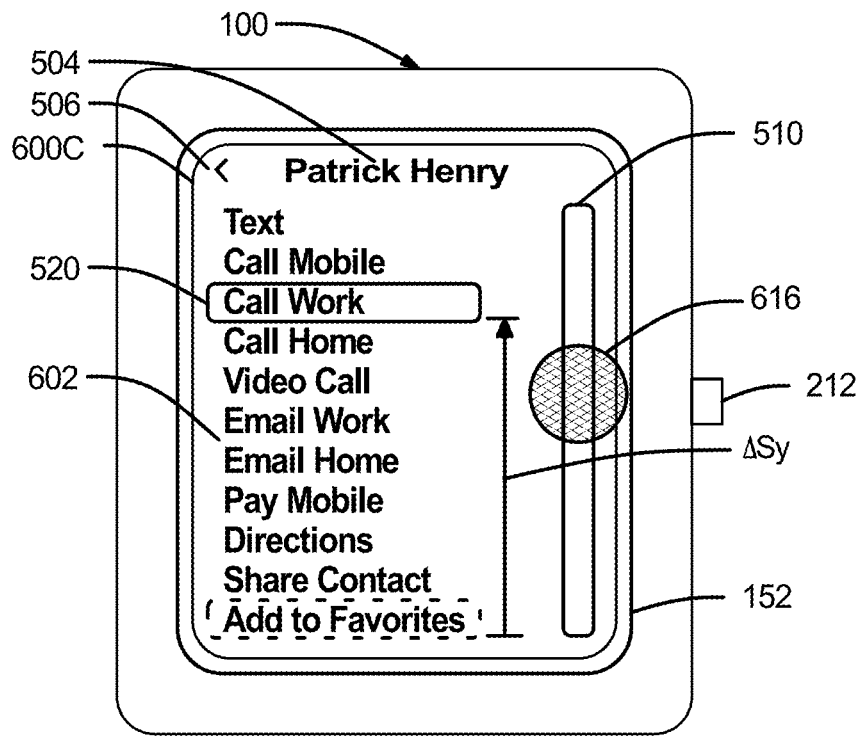

A user can perform a vertical slide finger gesture beginning anywhere on control icon 510 as illustrated in UI 600A, UI 600B, and UI 600C (FIG. 6A, FIG. 6B, and FIG. 6C). In this example, as in the prior example described in FIG. 5, the control icon 510 is a vertical line or thin vertical rectangle displayed near an edge of the touch-sensitive display. In response to detecting the initial change 604 in the vertical position of a finger contact from 606 to 608 (FIG. 6A), the device can display item preselection 520 at the item "Add to Favorites" in the list of items (FIG. 6B). In this example the gesture 606 to 608 is in the upward direction from the bottom toward the top, and item preselection 520 is first displayed at the item at bottom of the list. In response to detecting an additional change in the vertical position of a finger contact from 612 to 614 (FIG. 6B), the device can change the position of preselection 520 to the item "Call Work" as illustrated in UI 600C (FIG. 6C). Once again, In lieu of performing one slide gesture, a user can perform two or more slide gestures, beginning anywhere on control icon 510, until the device changes the vertical position of item preselection 520 from the item "Add to Favorites" to the item "Call Work". The change in position ΔFy of the finger contact, and the change in position ΔSy of preselection 520, is shown on FIGS. 6B and 6C, respectively.

End Call: A user can end the call with a tap on icon 580 illustrated in FIG. 6D. In some embodiments, after a call is ended, the device can redisplay the prior level list of actions as illustrated in UI 600C (FIG. 6C).

Figure 6D:
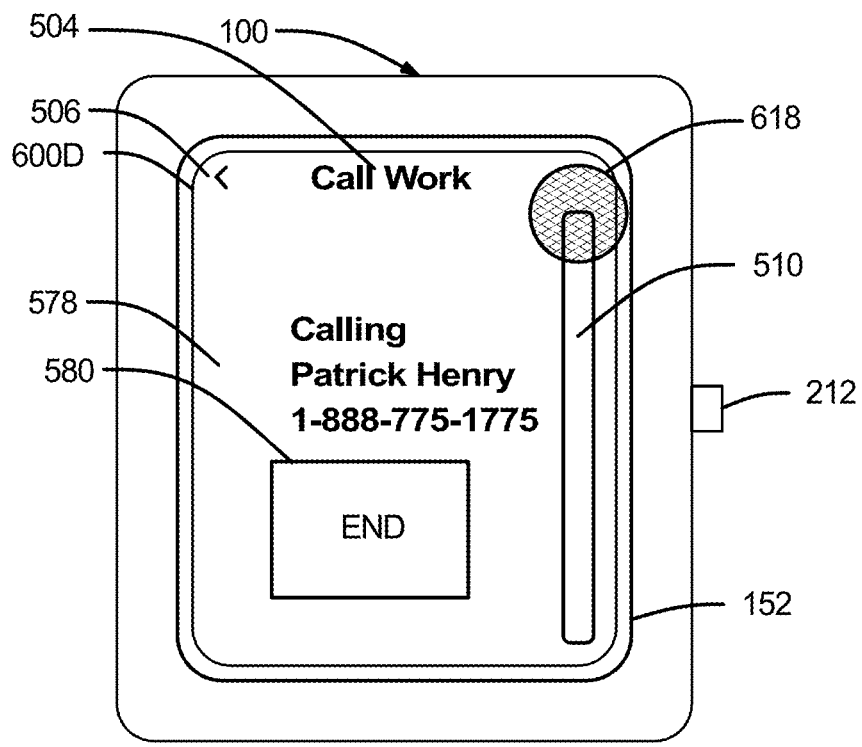

Display Prior Level List: A user can perform tap gesture 618 on the top-end of control icon 510 as illustrated in FIG. 6D. In response to detecting tap gesture 618 on the top-end of control icon 510, the device can redisplay the prior level list of items as illustrated in UI 600 C (FIG. 6C). In this example, the prior level list (a parent list of items) is list 602 of action items available with respect to contact Patrick Henry.

Figure 6E:
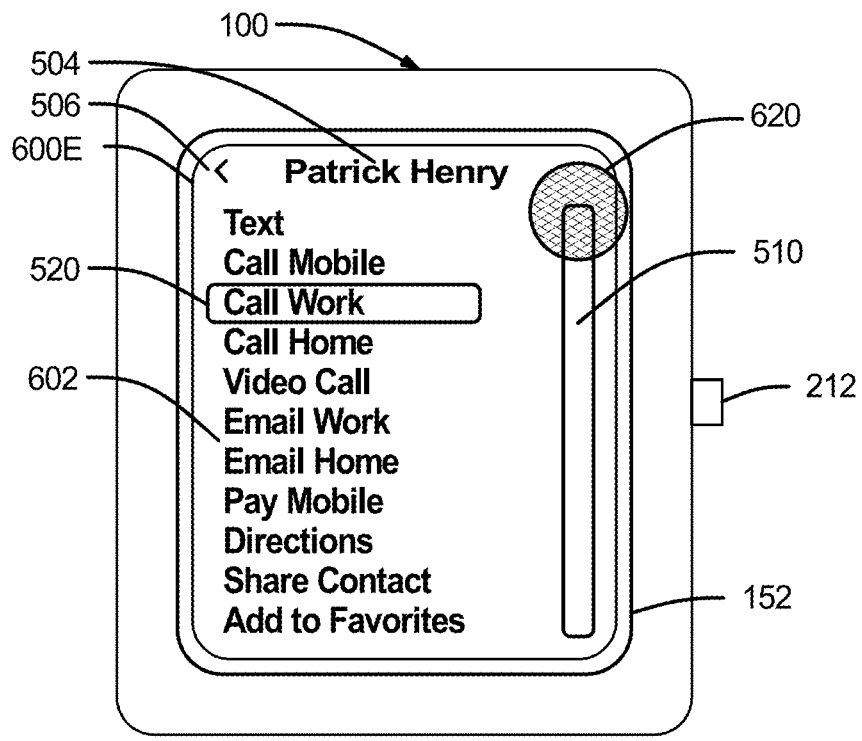

This prior level list of action items available with respect to Patrick Henry is duplicated in UI 600 E (FIG. 6E) to illustrate the next example. A user can perform a tap gesture 620 on the top-end of control icon 510 as illustrated in UI 600E (FIG. 6E). In response to detecting the "up" tap gesture 620 on control icon 510, the device can display the prior level list. In this example the prior level list 622 is list of all contacts. This illustrates an example method for navigating "up" one level in a hierarchically structured list for an "up" gesture on the control icon. In the example shown, the "up" gesture is a tap on the top-end of control icon 510. The two successive "up" gestures, tap gesture 618 and tap gesture 620, moves up two levels and displays list 622 of all contacts in UI 600F (FIG. 6F).

FIGS. 6F-6J illustrate displaying an item preselection in a list of items, changing the position of an item preselection in a list of items, and selecting a contact name item at the position of the item preselection within a hierarchically organized list of contacts on a smart-watch where more than one contact name is selected.

Figure 6F:
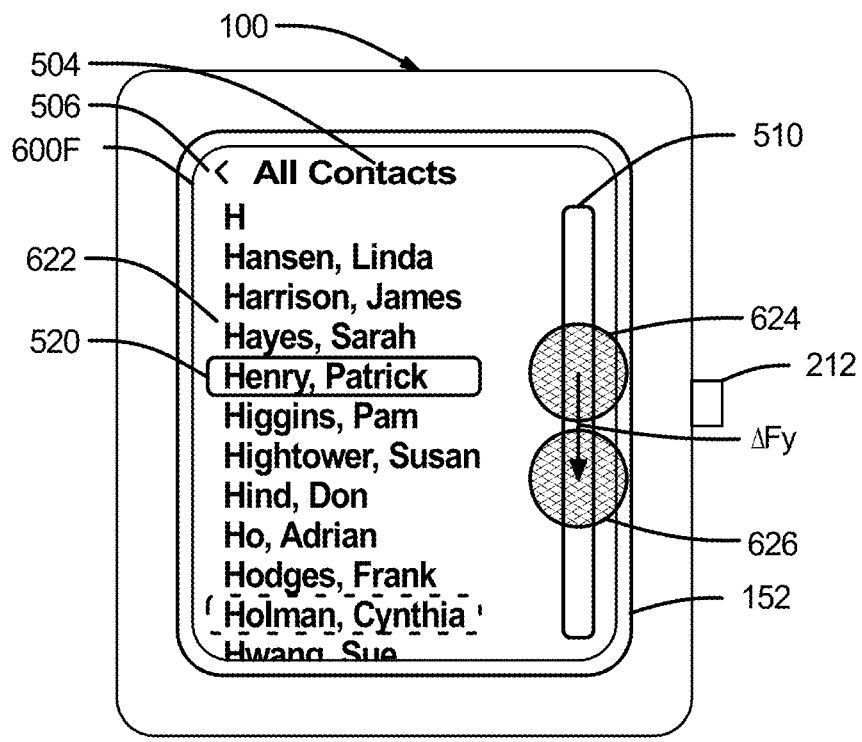
Figure 6G:
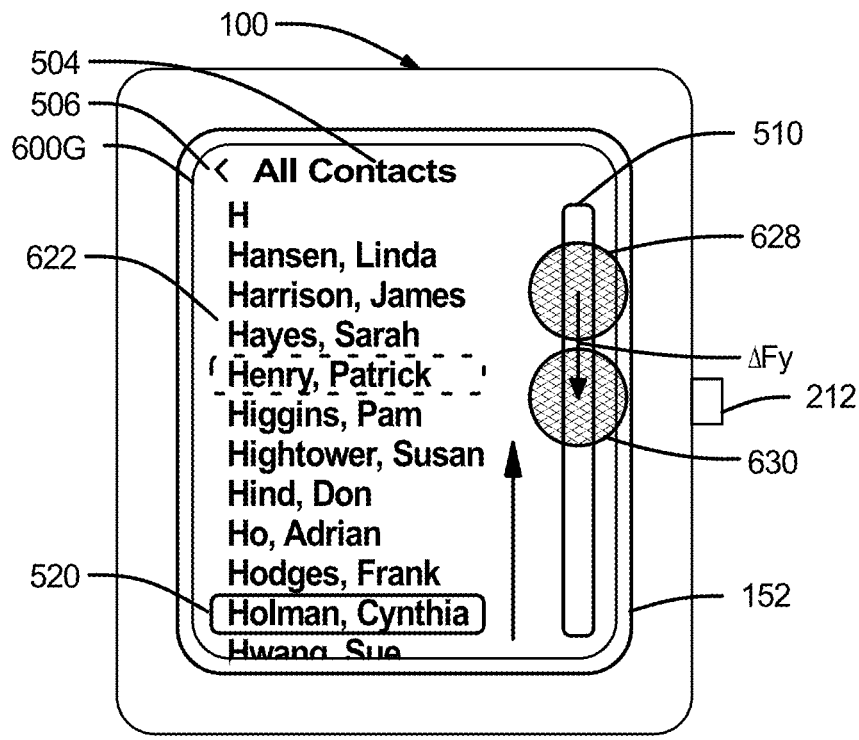
Figure 6H:
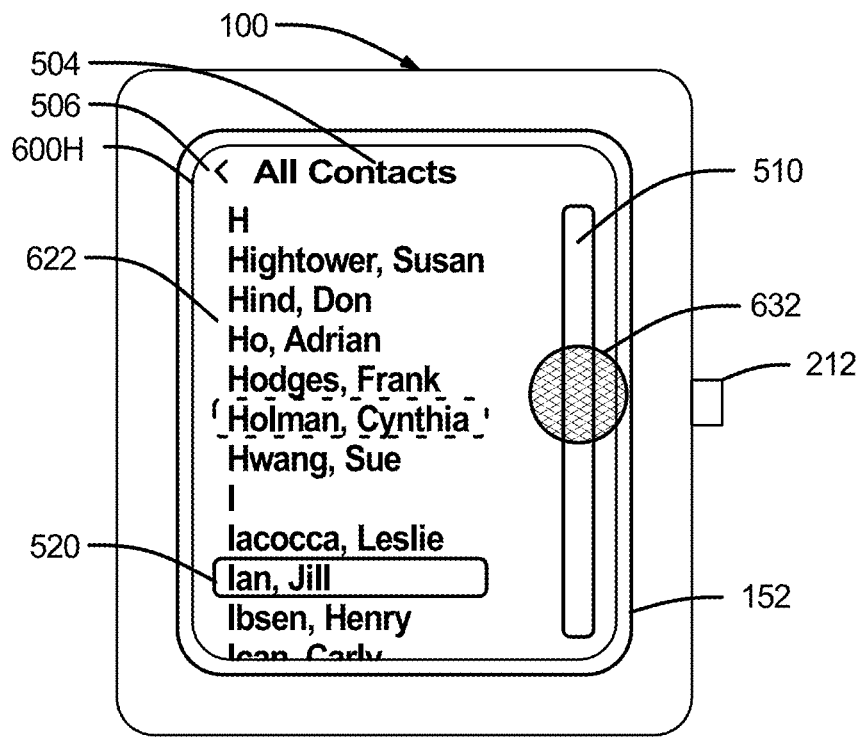

With preselection 520 displayed at the contact "Henry, Patrick" as illustrated in FIG. 6F, user can perform a vertical slide finger gesture beginning anywhere on control icon 510 as illustrated in UI 600F (FIG. 6F). In response to detecting a change in a vertical position of a finger contact from 624 to 626 on control icon 510, the device can change a position of item preselection 520 in list 622 from contact item "Henry, Patrick" to contact item "Holman, Cynthia" as illustrated in FIGS. 6F-6G. With preselection 520 displayed at item "Holman, Cynthia", a user can perform another vertical slide finger gesture beginning anywhere on control icon 510 as illustrated in UI 600G (FIG. 6G). In response to detecting a change in a vertical position of a finger contact from 628 to 630 on control icon 510 the device can change a position of item preselection 520 in list 622 from contact item "Holman, Cynthia" to contact item "Ian, Jill" as illustrated in FIGS. 6G-6H. The device can auto-scroll the contact list 622 when preselection 520 approaches the bottom boundary of the UI 600H as illustrated in FIGS. 6G-6H. We next describe a method for selecting one item from a list and a method for selecting more than one item from a list.

Selecting one item: Selecting one item was previously described in reference to FIGS. 5G-5I. With item preselection 520 displayed at an item in a list of items 546, a user can perform a select gesture (a tap gesture for example) on control icon 510. In response to detecting the select gesture on control icon 510, the device selects the item at the position of item preselection 520 and displays the child level list of items for the selected item. In the example previously described in reference to FIG. 5I, the selected item is a contact name in a list of contacts, and the child level list is a list of all contact actions available with respect to the selected contact name.

Selecting more than one item: In some instances, a user may wish to select more than one item from a list of items using a similar approach. With item preselection 520 displayed at a first item in a list of items, a user can perform a multi-select gesture (a double-tap gesture for example) on control icon 510. In response to detecting the multi-select gesture on control icon 510, the device selects the item at the position of item preselection 520 while continuing to display the list of items to enable the user to select an additional item from the list. The user can position item preselection 520 at an additional item in the list of items, and perform a select gesture on control icon 510 to complete the multi item selection. In response to detecting a select gesture (a tap gesture for example) on control icon 510, the device selects the additional item at the position of item preselection 520, completes the multi item selection for the two items and displays the child level list of items for the selected items comprising the first item and one or more additional selected items. This is described below in reference to FIGS. 6H-6L for the case of selecting two contacts from a list of contacts and displaying a child level list all contact actions available with respect to the two selected contacts.

Figure 6I:
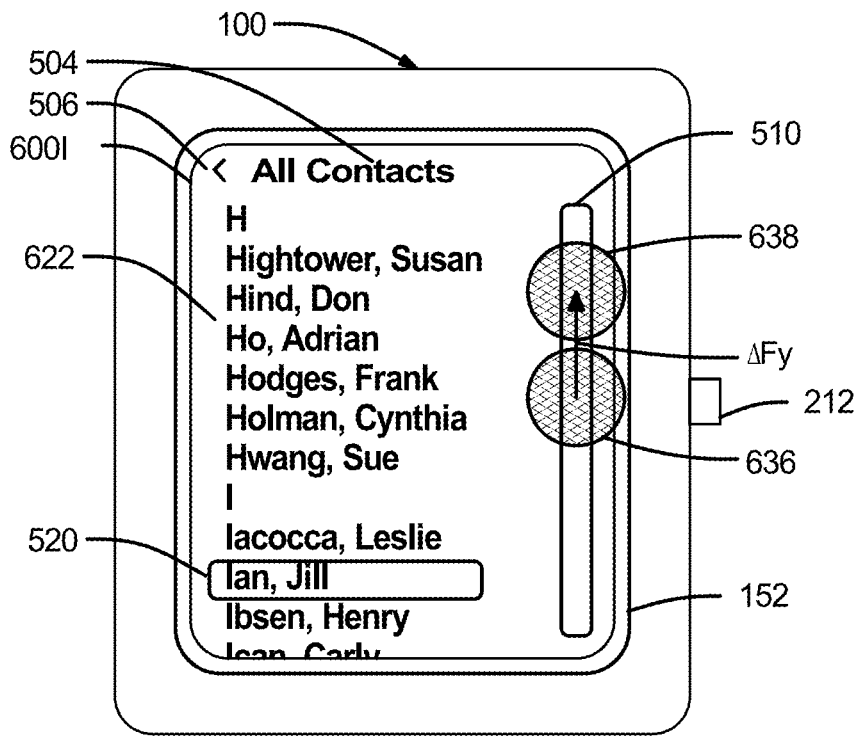
Figure 6J:
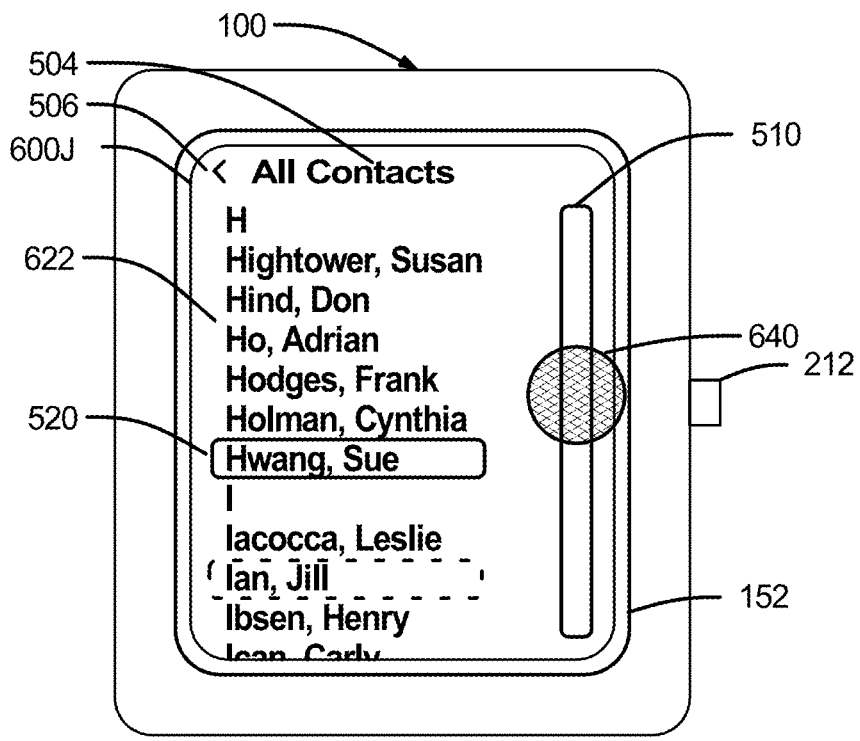

With preselection 520 positioned at the contact "Ian, Jill", as illustrated in FIG. 6H, a user can perform a multi-select gesture 632 (a double-tap gesture for example) on control icon 510 as illustrated in FIG. 6H. In response to detecting multi-select gesture 632 on control icon 510, the device selects the item "Ian, Jill" at the position of item preselection 520 while continuing to display the list of contacts 622 to enable the user to select an additional contact from the list. A user can perform a slide gesture from 636 to 638 on control icon 510 as illustrated in FIG. 6I. In response to detecting a change in a vertical position of a finger contact from 636 to 638 on control icon 510 the device can change a position of item preselection 520 in the list 622 from contact item "Ian, Jill" to contact item "Hwang, Sue" as illustrated in FIGS. 6I-6J. In response to detecting select gesture 640 (a tap gesture for example) on control icon 510, the device can select the item at the position of item preselection 520, end the multi-selection after the selection of the second item, and display the child level list of items 642 for the selected items comprising the first item and the second item. In this example, the child level list of items is the list of all contact actions available with respect to the two selected contacts "Ian, Jill" and "Hwang, Sue".

Figure 6K:
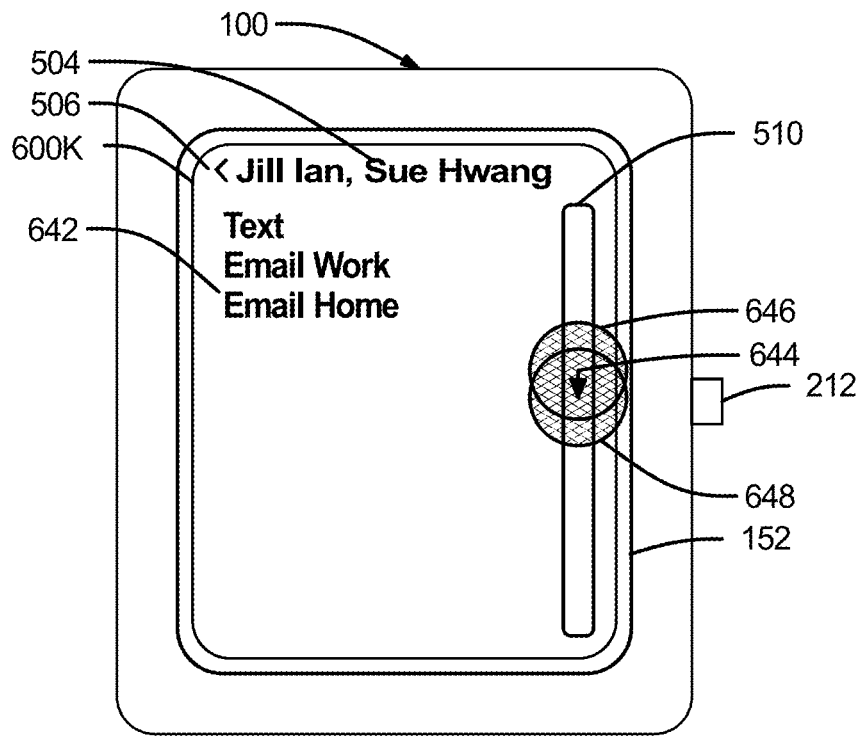
Figure 6L:
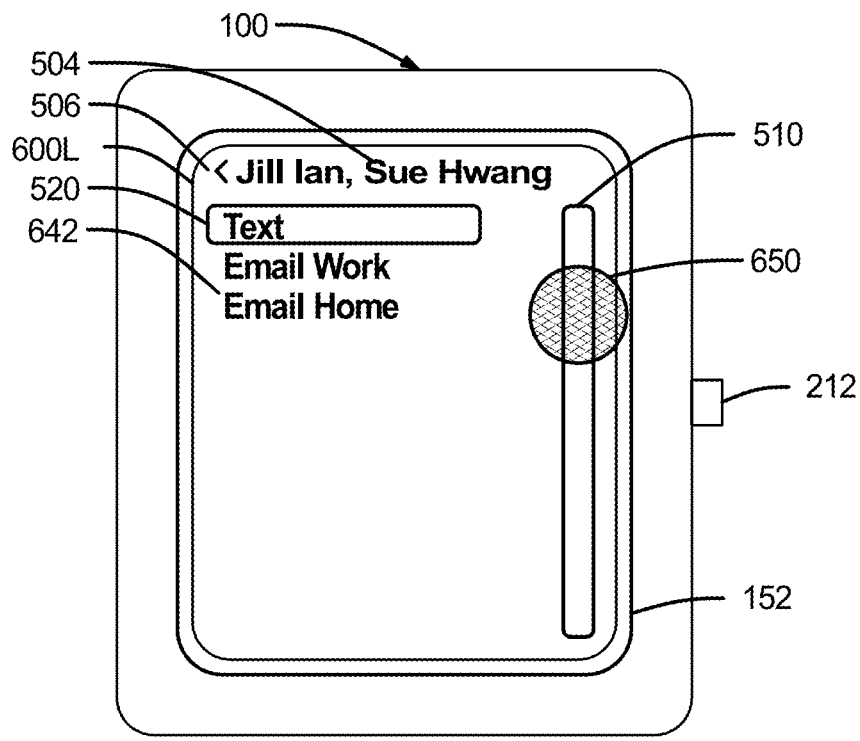

FIGS. 6K-6L illustrate displaying an item preselection in a list of items, changing the position of an item preselection in a list of items, and selecting a contact action item at the position of the item preselection in a list of contact actions to initiate a contact action with respect to more than one contact.

In response to detecting the initial change 644 in the vertical position of a finger contact from 646 to 648 (FIG. 6K), the device can display preselection 520 at the item "Text" in the list of items (FIG. 6K). In this example the gesture 646 to 648 is in the downward direction from the top toward the bottom, and item preselection 520 is first displayed at the item at top of the list.

A user can perform a tap gesture 650 on control icon 510 as illustrated in FIG. 6L. In response to detecting tap gesture 650 on control icon 510, the device can initiate a "Text" action with respect to the contacts Jill Ian and Sue Hwang. In response to the detecting the initiation of a text action with respect to the selected contacts, the device can then display a message content window (not shown) to enable the user to enter message content. In a first example, the message content can be entered via voice and sent to the selected contact(s) as a recording of the voice message. In a second example, the message content can be entered via voice and sent to the selected contact(s) as a text content generated by a voice to text conversion application. In a third example, the message content can be entered by the user selecting one or more standard text snippets from a single-level or multilevel list of text snippets, using the navigation and selection method described above for navigating within a multilevel list and selecting an item at a position of an item preselection in a multilevel list. For example, Text Snippet 1: "Can we schedule a meeting?" Text Snippet 2: "What days and times would work for you?"

FIGS. 7A-7D illustrate an exemplary user interface and method for displaying an item preselection in a list of items, changing the position of an item preselection in a list of items, and selecting an item at the position of the item preselection in a list of items on a smart-watch mobile computing device with a touch-sensitive display, in accordance with some embodiments. In this example, the list of items is a list of applications on a smart-watch home screen.

Figure 7A:
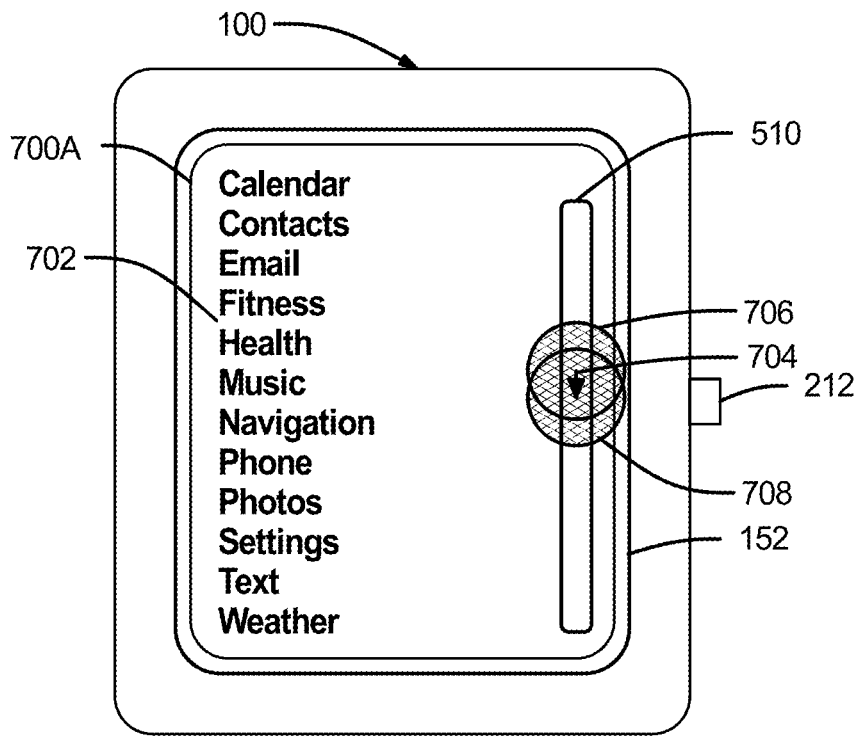
FIGS. 7A-7D illustrate an exemplary user interface and method for displaying an item preselection in a list of items, changing the position of an item preselection in a list of items, and selecting an item at the position of the item preselection in a list of items on a smart-watch mobile computing device with a touch-sensitive display, in accordance with some embodiments. In this example, the list of items is a list of applications on a smart-watch home screen.
Figure 7B:
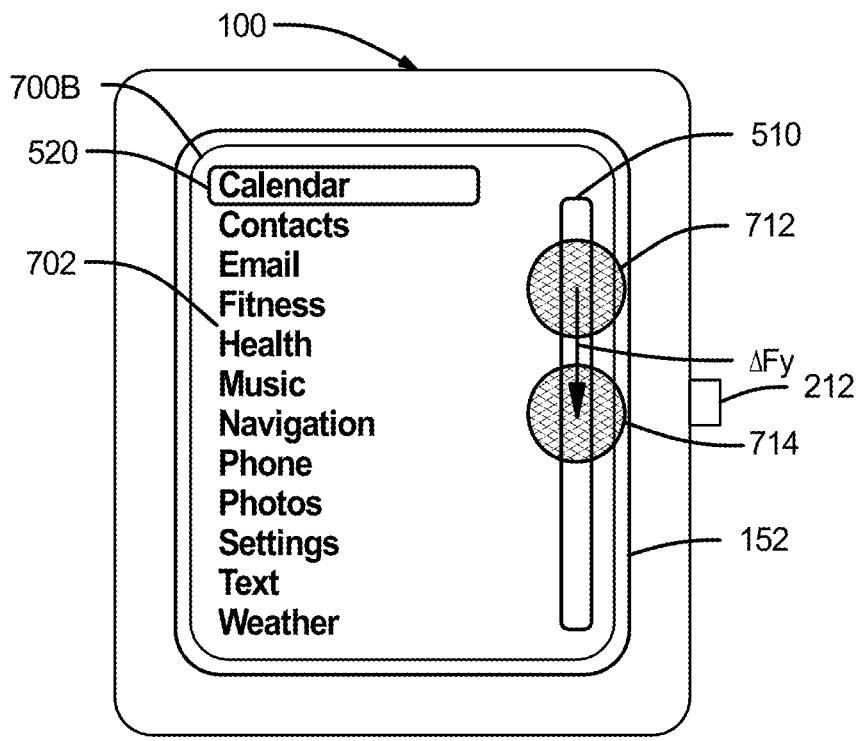
Figure 7C:
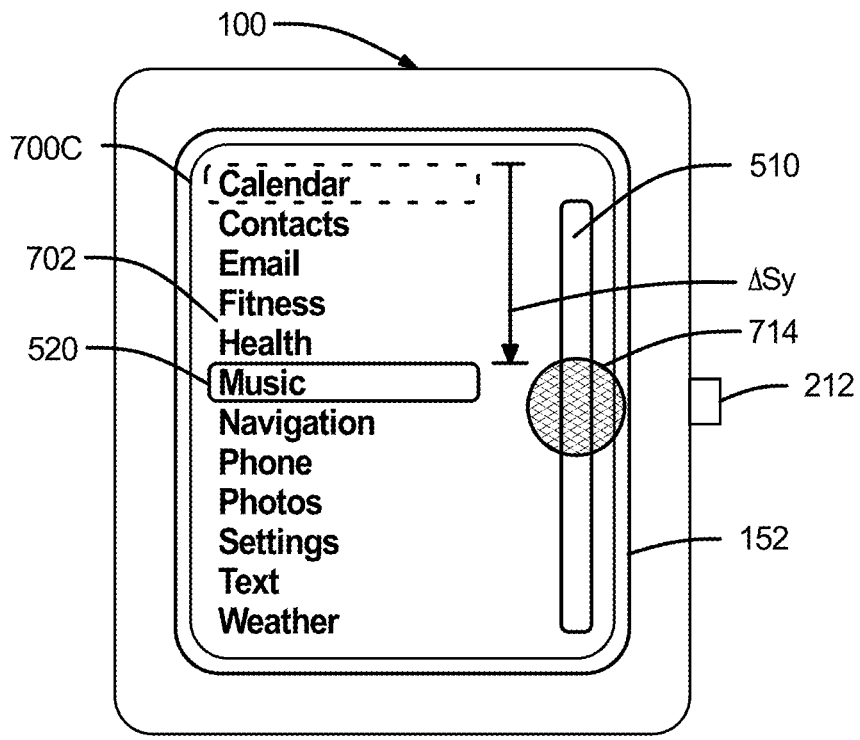

A user can perform a vertical slide finger gesture beginning anywhere on control icon 510 as illustrated in UI 700A, UI 700B, and UI 700C (FIG. 7A, FIG. 7B, and FIG. 7C). In this example control icon 510 is a vertical line or thin vertical rectangle displayed near an edge of the touch-sensitive display. In response to detecting the initial change 704 in the vertical position of a finger contact from 706 to 708 (FIG. 9A), the device can display item preselection 520 at the first item "Calendar" in the list of applications (FIG. 7B). In response to detecting an additional change in the vertical position of a finger contact from 712 to 714 (FIG. 7B), the device can change the position of preselection 520 to the item "Music" as illustrated in UI 700C (FIG. 7C). In lieu of performing one slide gesture, a user can perform two or more slide gestures, beginning anywhere on control icon 510, until the device changes the vertical position of item preselection 520 from the item "Calendar" to the item "Music". As in other examples, the change in position of item preselection 520 can be proportional to the change and the time range of change in the position of a contact on control icon 510.

Figure 7D:
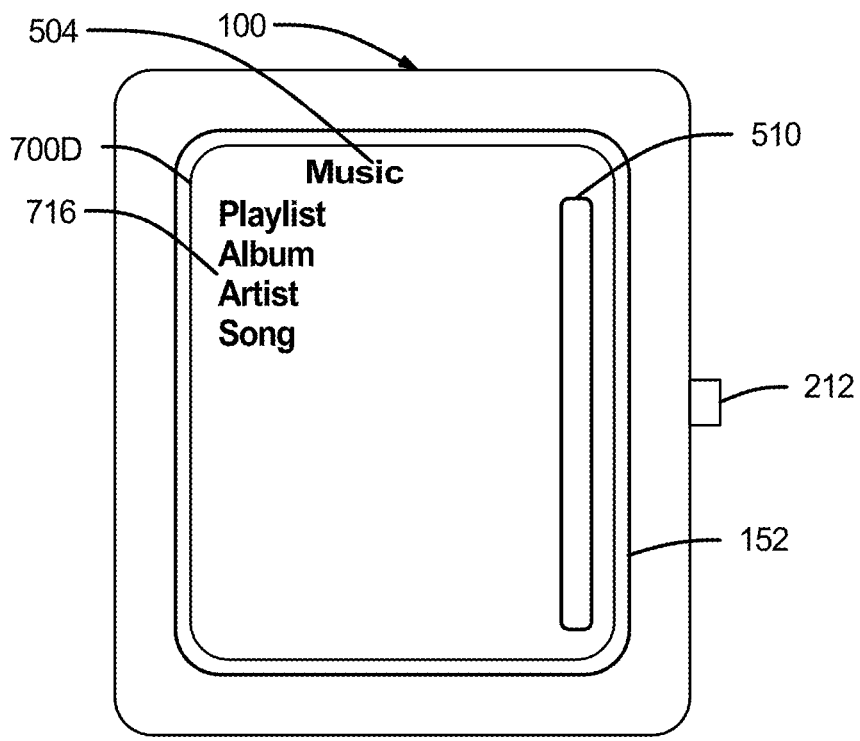

A user can perform a tap gesture 714 on control icon 510 (FIG. 7C). In response to detecting tap gesture on control icon 510, the device can launch the application "Music" as illustrated in UI 700 D (FIG. 7D). In the example shown the application "Music" presents a list of items 716. The list is named "Music". A user can tap on home button 212 to redisplay the list of apps shown in FIG. 7A. Alternatively, a user can perform an "up" gesture on control icon 510, a tap on the top-end of control icon 510 for example, to display the list of apps shown in FIG. 7A.

Figure 8A:
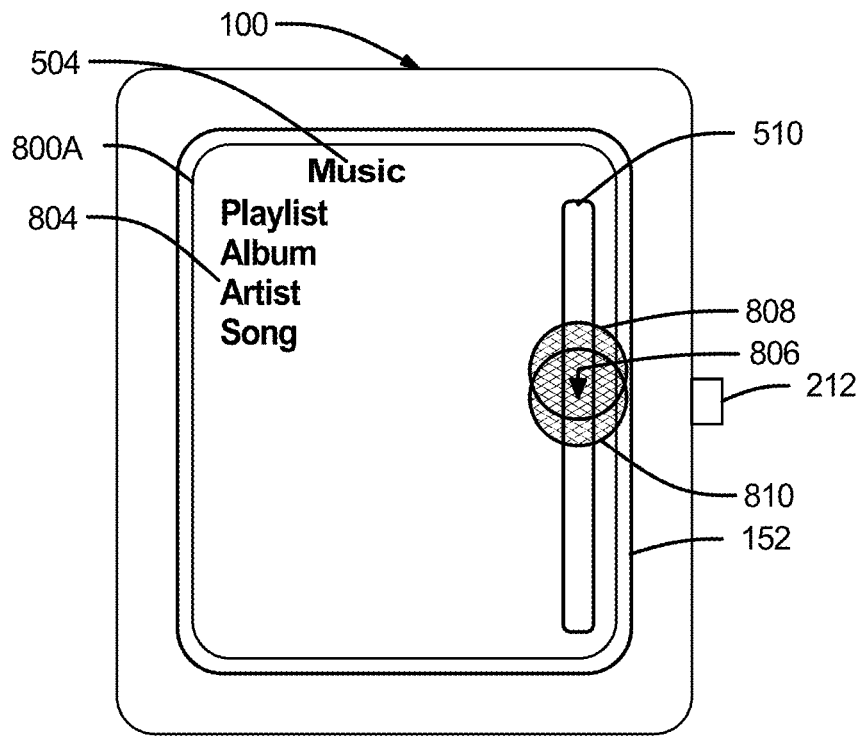
FIGS. 8A-8N illustrate an exemplary user interface and method for displaying an item preselection in a list of items, changing the position of an item preselection in a list of items, and selecting an item at the position of the item preselection within a hierarchically organized library of music on a smart-watch mobile computing device with a touch-sensitive display, in accordance with some embodiments.
Figure 8B:
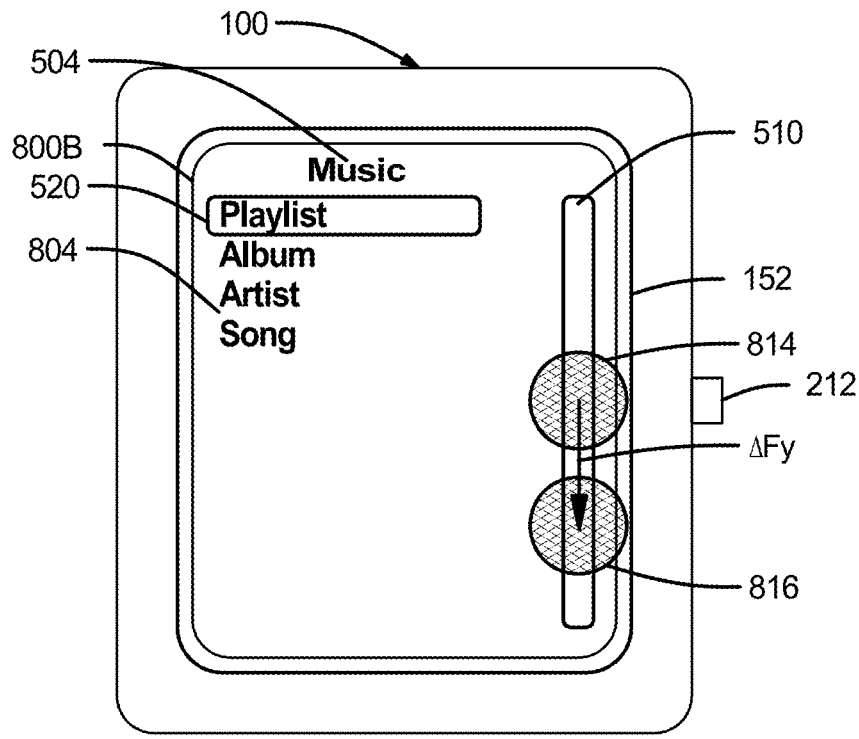
Figure 8C:
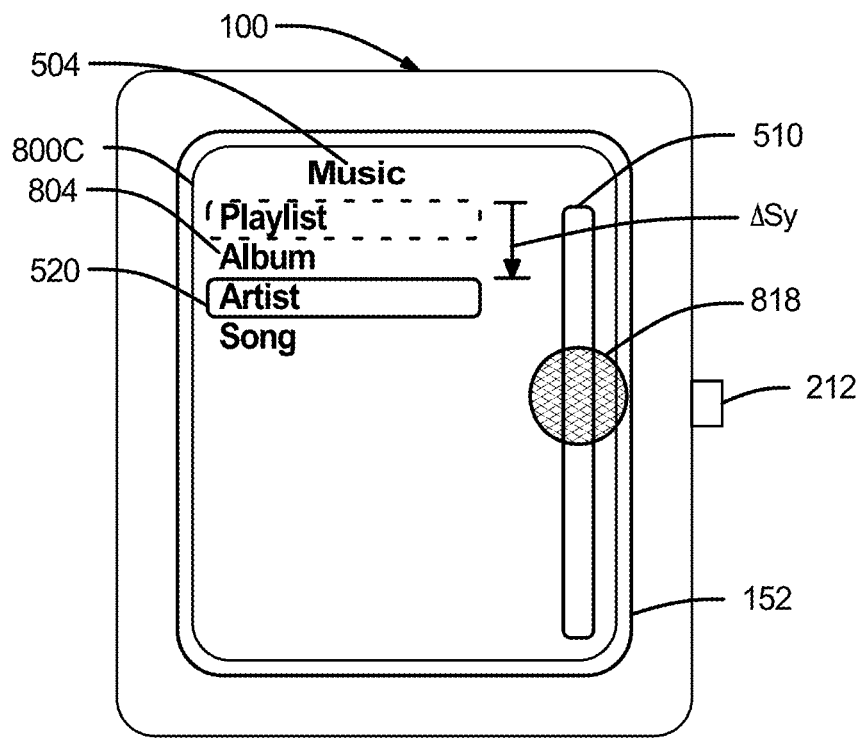
Figure 8D:
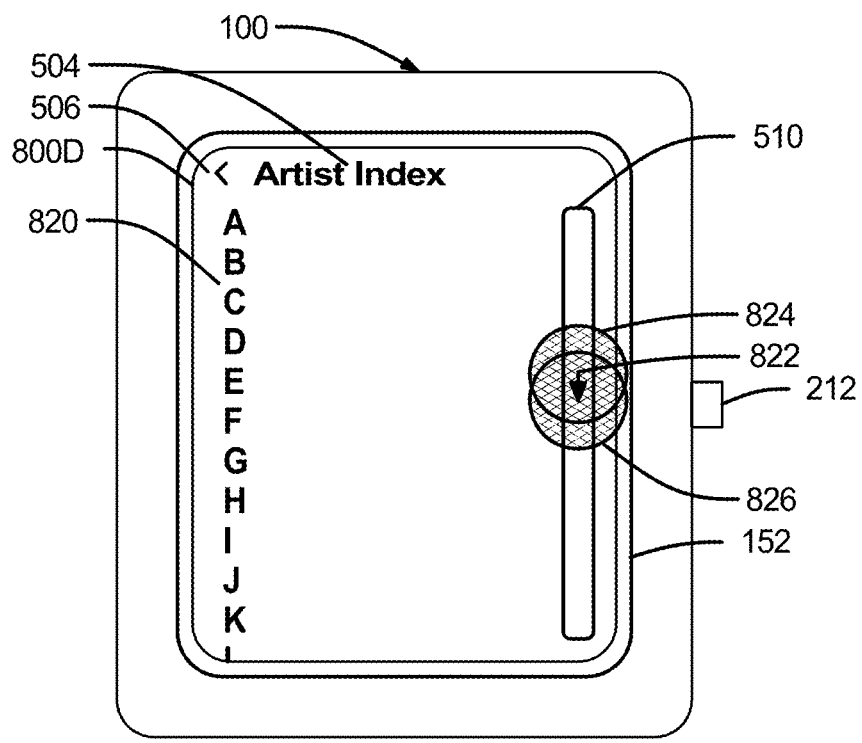
Figure 8E:
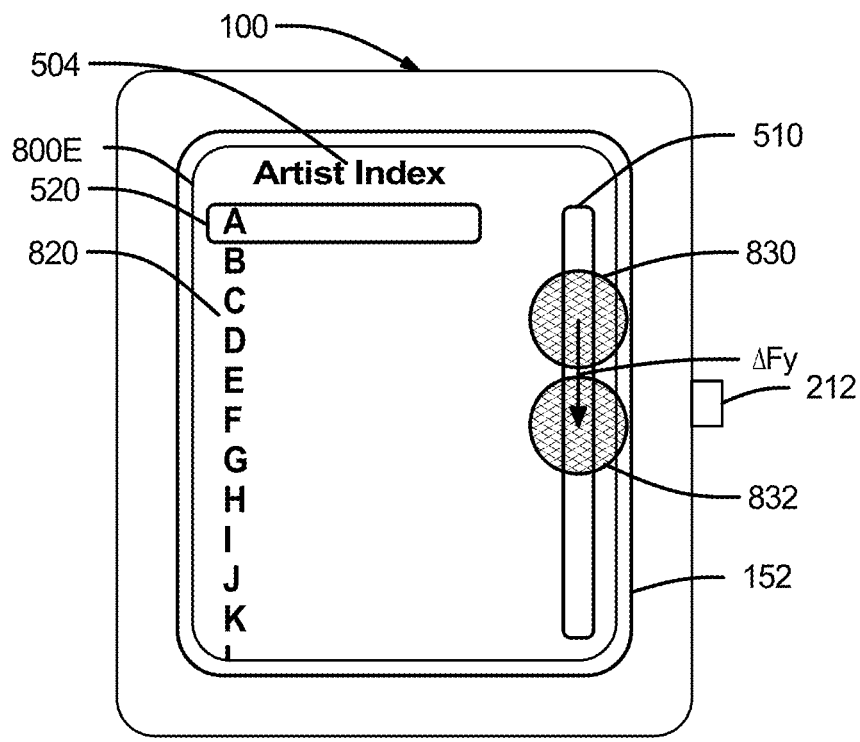
Figure 8F:
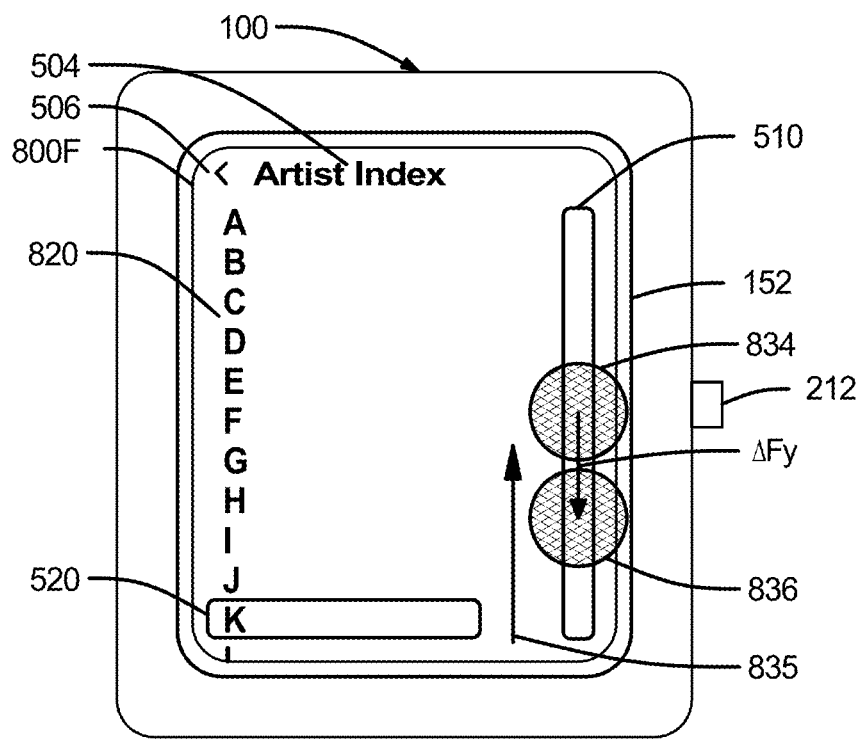
Figure 8G:
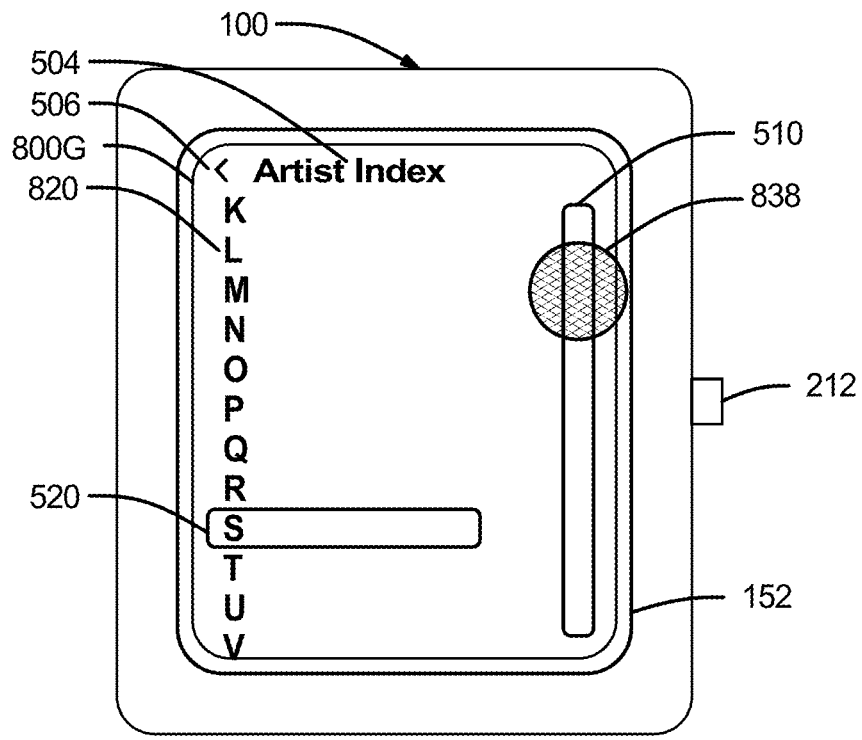
Figure 8H:
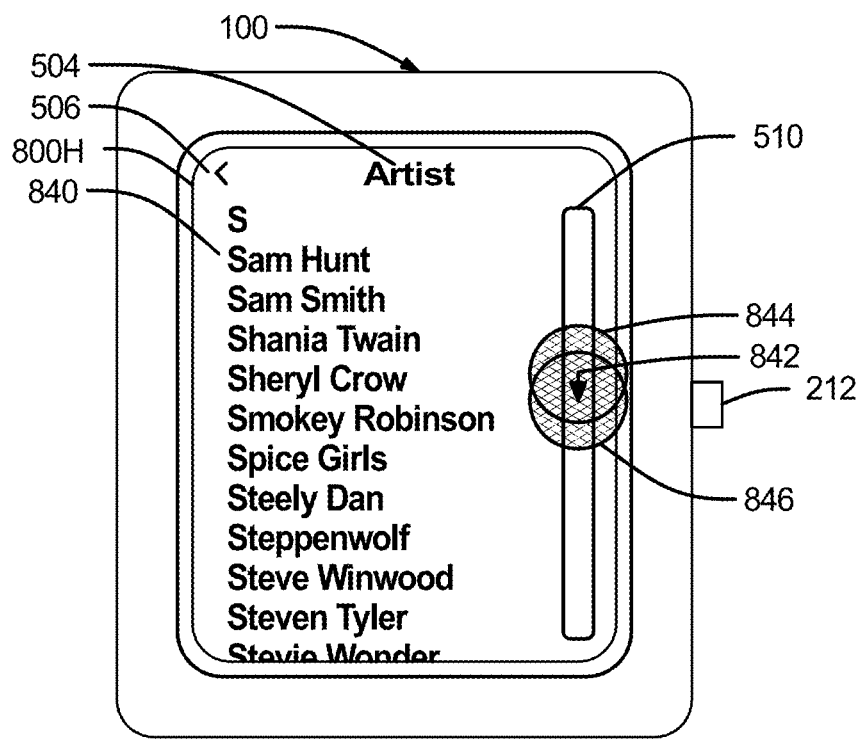
Figure 8I:
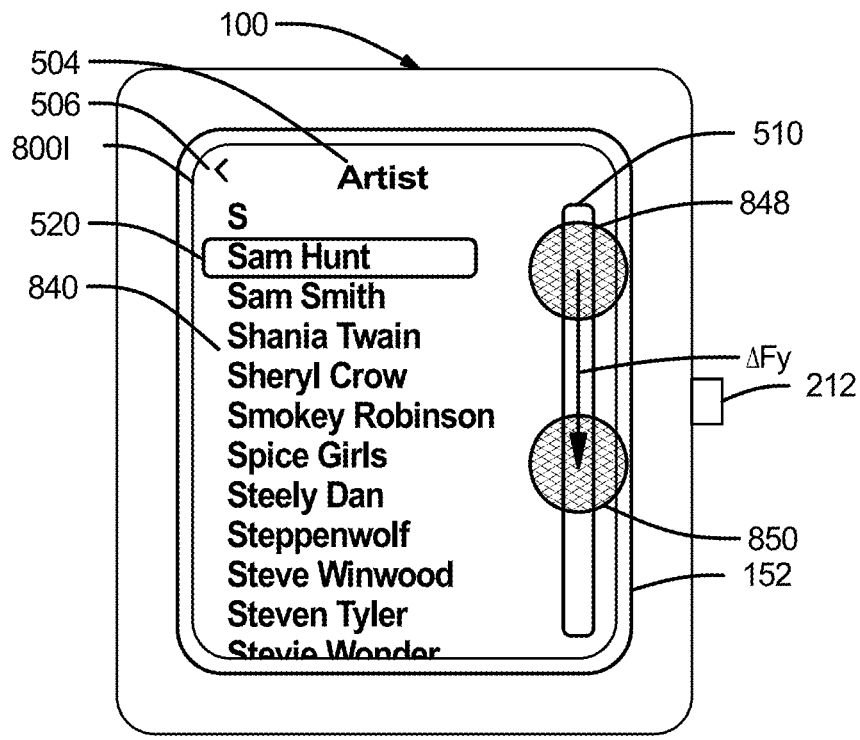
Figure 8J:
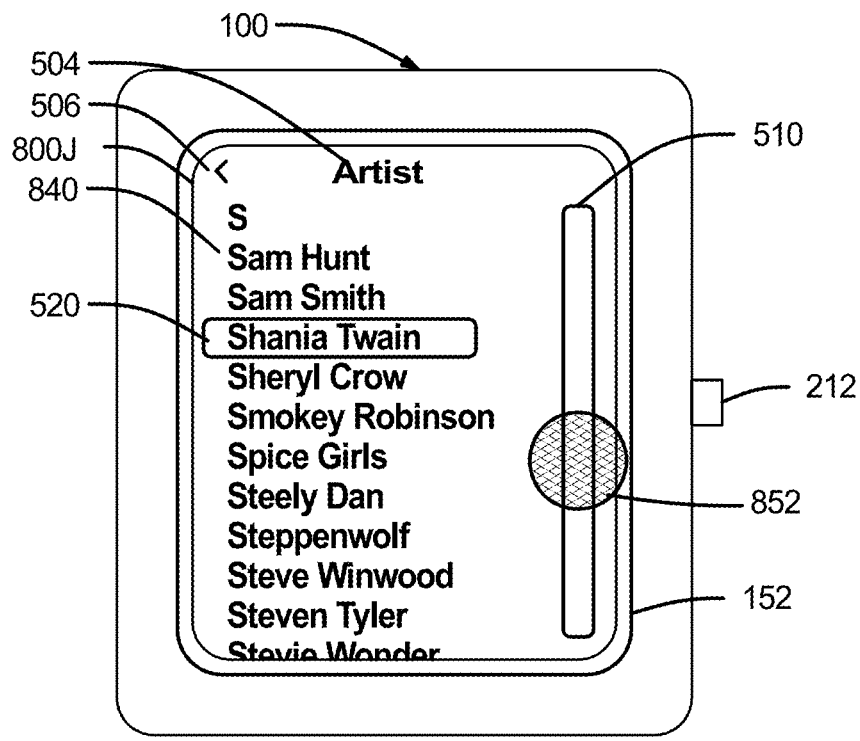
Figure 8K:
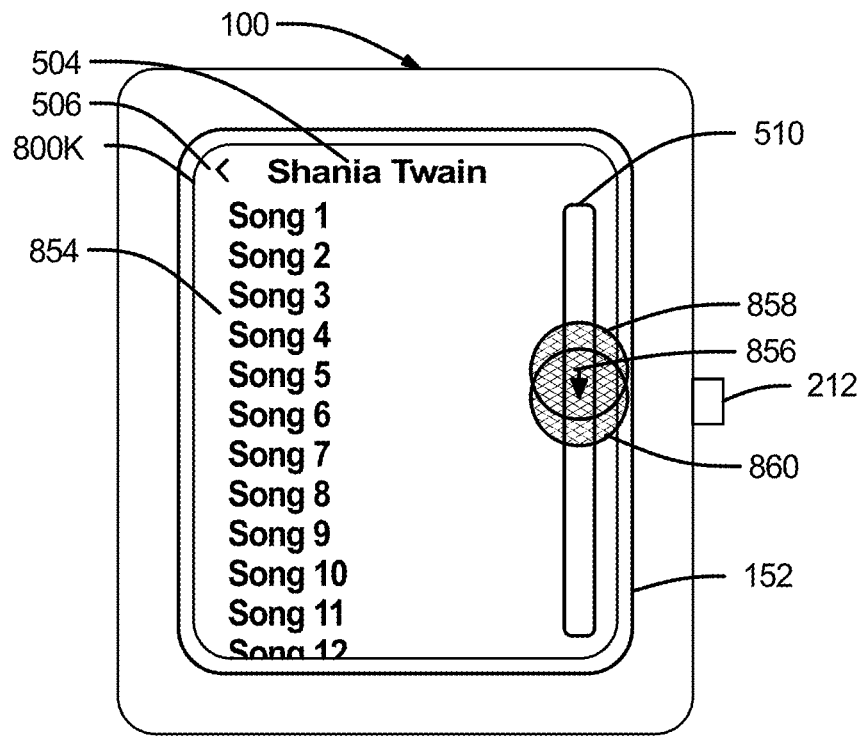
Figure 8L:
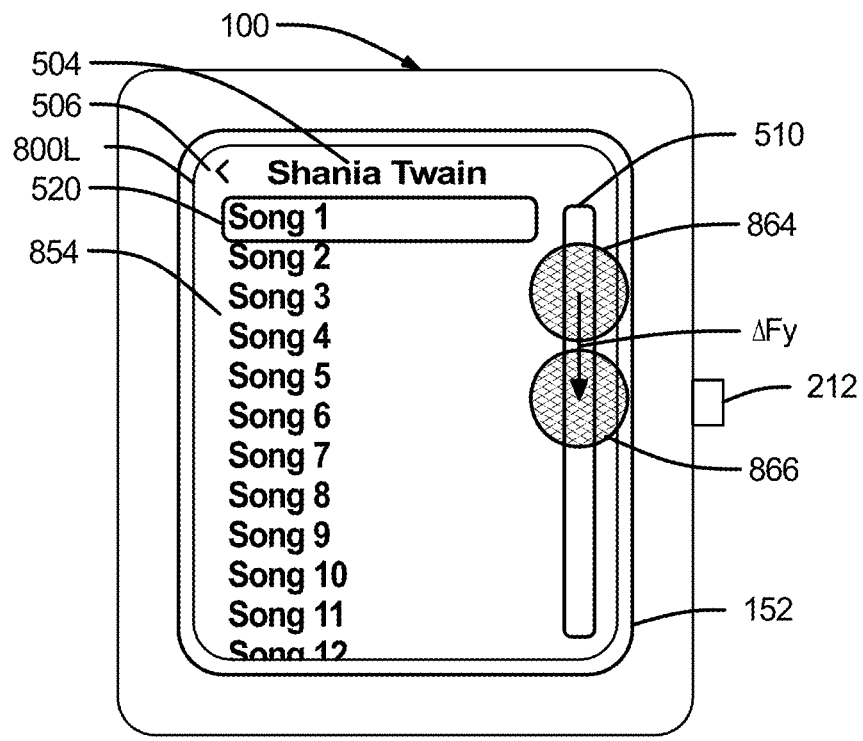
Figure 8M:
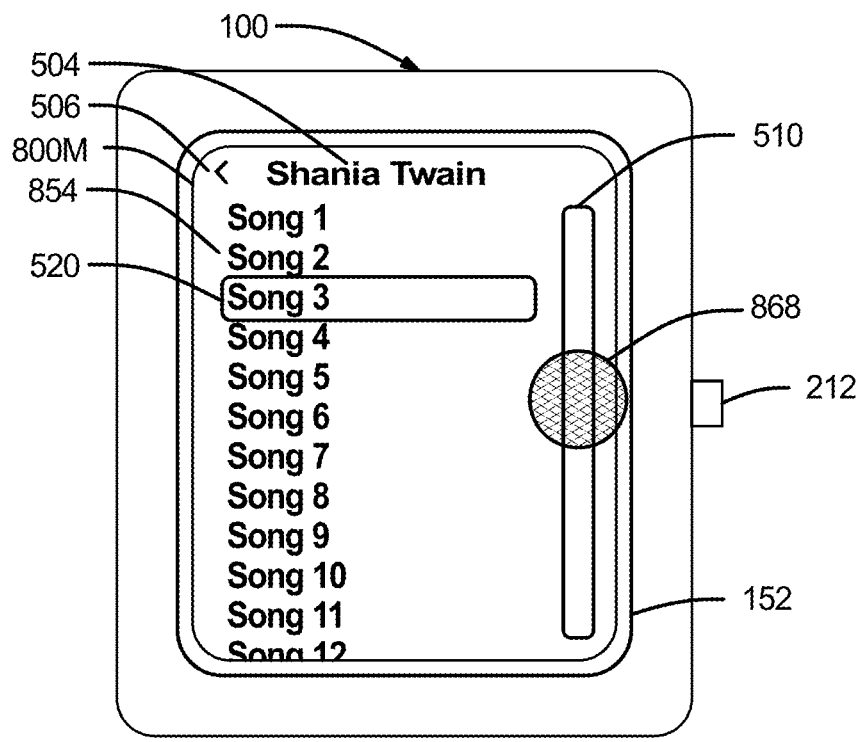
Figure 8N:
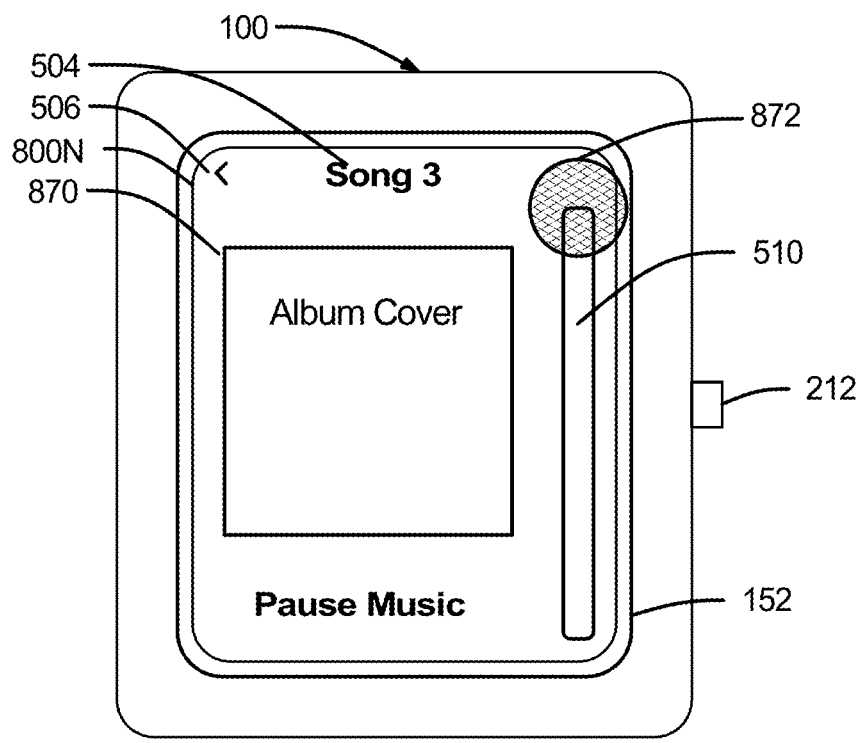

FIGS. 8A-8N illustrate an exemplary user interface and method for displaying an item preselection in a list of items, changing the position of an item preselection in a list of items, and selecting an item at the position of the item preselection within a hierarchically organized library of music on a smart-watch mobile computing device with a touch-sensitive display, in accordance with some embodiments. FIGS. 8M-8N illustrate selecting and playing a selected song on the user's smart-watch.

A user can perform a vertical slide finger gesture beginning anywhere on control icon 510 as illustrated in UI 800A, UI 800B, and UI 800C (FIG. 8A, FIG. 8B, and FIG. 8C). In this example control icon 510 is a vertical line or thin vertical rectangle displayed near an edge of the touch-sensitive display. In response to detecting the initial change 806 in the vertical position of a finger contact from 808 to 810 (FIG. 8A), the device can display preselection 520 at the first item "Playlist" in the list of items as shown in FIG. 8B). In response to detecting an additional change in the vertical position of a finger contact from 814 to 816 (FIG. 8B), the device can change the position of preselection 520 to the item "Artist" as illustrated in UI 800C (FIG. 8C). In lieu of performing one slide gesture, a user can perform two or more slide gestures, beginning anywhere on control icon 510, until the device changes the vertical position of item preselection 520 from the item "Playlist" to the item "Artist".

The UI can also display list name 504 at the top of the display as shown in FIG. 8A, FIG. 8B, and FIG. 8C. In the example shown the list name is "Music." In the case of a top-level list, the list name can be the app name.

A user can perform a tap gesture 818 on control icon 510 (FIG. 8C). In response to detecting tap gesture on control icon 510, the device can display a second level list of items as illustrated in UI 800 D (FIG. 8D). In the example shown the second level list of items 820 is a list of items named "Artist Index". In addition, the device can display icon 506. Icon 506 can be displayed to indicate to the user that there is a list a level above the current level in the hierarchy (a parent list of items). In some embodiments, icon 506 can also be a navigation icon that enables a user to navigate up to the prior level of the hierarchy with a tap on icon 506. A tap on icon 506 can provide an alternative to a tap on the top-end of control icon 510, for navigating up a hierarchically organized list. This latter "up navigation" method is described below in reference to FIG. 8N.

In a similar way, a user can perform a vertical slide finger gesture beginning anywhere on control icon 510 as illustrated in UI 800D, UI 800E, and UI 800F (FIG. 8D, FIG. 8E, and FIG. 8F). In response to detecting the initial change 822 in the vertical position of a finger contact from 824 to 826 (FIG. 8D), the device can display preselection 520 at the first item "A" in the list of items (FIG. 9E). In response to detecting an additional change in the vertical position of a finger contact from 830 to 832 (FIG. 8E), the device can change the position of preselection 520 to the item "K" near the bottom boundary of the display window as illustrated in UI 800F (FIG. 8F). In response to detecting an additional change in the vertical position of a finger contact from 834 to 836 (FIG. 8F), the device can auto-scroll the list up at noted by arrow 835 and change the position of preselection 520 to the item "S" as illustrated in UI 800G (FIG. 8G). A user can perform a tap gesture 838 on control icon 510 (FIG. 8G). In response to detecting tap gesture on control icon 510, the device can display a third level list of items as illustrated in UI 800 H (FIG. 8H). In the example shown the third level list of items 840 (a child list of items) is a list of items named "Artist" with the list of artists beginning with the index letter "S" scrolled into view.

In a similar way, a user can perform a vertical slide finger gesture beginning anywhere on control icon 510 as illustrated in UI 800H, UI 800I, and UI 800J (FIG. 8H, FIG. 8I, and FIG. 8K). In response to detecting the initial change 842 in the vertical position of a finger contact from 844 to 846 (FIG. 8H), the device can display preselection 520 at the first item "Sam Hunt" in the list of items (FIG. 8I). In response to detecting an additional change in the vertical position of a finger contact from 848 to 850 (FIG. 8I), the device can change the position of preselection 520 to the item "Shania Twain" as illustrated in UI 800J (FIG. 8J). In lieu of performing one slide gesture, a user can perform two or more slide gestures, beginning anywhere on control icon 510, until the device changes the vertical position of item preselection 520 from the item "Sam Hunt" to the item "Shania Twain."

A user can perform a tap gesture 852 on control icon 510 (FIG. 8J). In response to detecting tap gesture on control icon 510, the device can display a fourth level list of items as illustrated in UI 800 K (FIG. 8K). In the example shown the fourth level list of items 854 (a child list of items) is a list named "Shania Twain" with the list of songs available to play with respect to artist "Shania Twain."

In a similar way, a user can perform a vertical slide finger gesture beginning anywhere on control icon 510 as illustrated in UI 800K, UI 800L, and UI 800M (FIG. 8K, FIG. 8L, and FIG. 8M). In response to detecting the initial change 856 in the vertical position of a finger contact from 858 to 860 (FIG. 8K), the device can display preselection 520 at a first item "Song 1" in the list of items (FIG. 8L). In response to detecting an additional change in the vertical position of a finger contact from 864 to 866 (FIG. 8L), the device can change the position of preselection 520 to the item "Song 3" as illustrated in UI 800M (FIG. 8M). In lieu of performing one slide gesture, a user can perform two or more slide gestures, beginning anywhere on control icon 510, until the device changes the vertical position of item preselection 520 from the item "Song 1" to the item "Song 3".

A user can perform a tap gesture 868 on control icon 510 (FIG. 8M). In response to detecting tap gesture 868 on control icon 510, the device can play the item "Song 1" as illustrated in UI 800 N (FIG. 8N). A user can pause the song with a tap on icon "pause". In some embodiments, after a song is paused, the device can redisplay the prior level list (a parent list of items) of songs shown in UI 800M (FIG. 8M).

A user can perform a tap gesture 872 on the top-end of control icon 510 as illustrated in FIG. 8N. In response to detecting tap gesture 872 on the top-end of control icon 510, the device can redisplay the prior level list (a parent list of items) of songs available with respect to artist Shania Twain shown in UI 800 M (FIG. 8M) without pausing the song currently playing.

FIGS. 9A-9M illustrate an exemplary user interface and method for displaying an item preselection in a list of items, changing the position of an item preselection in a list of items, and selecting an item at the position of the item preselection within a hierarchically organized list of contacts on a smart-phone mobile computing device with a touch-sensitive display, in accordance with some embodiments. This example is similar to that previously described in reference to FIGS. 5A-5R and FIGS. 6A-6L.

Figure 9A:
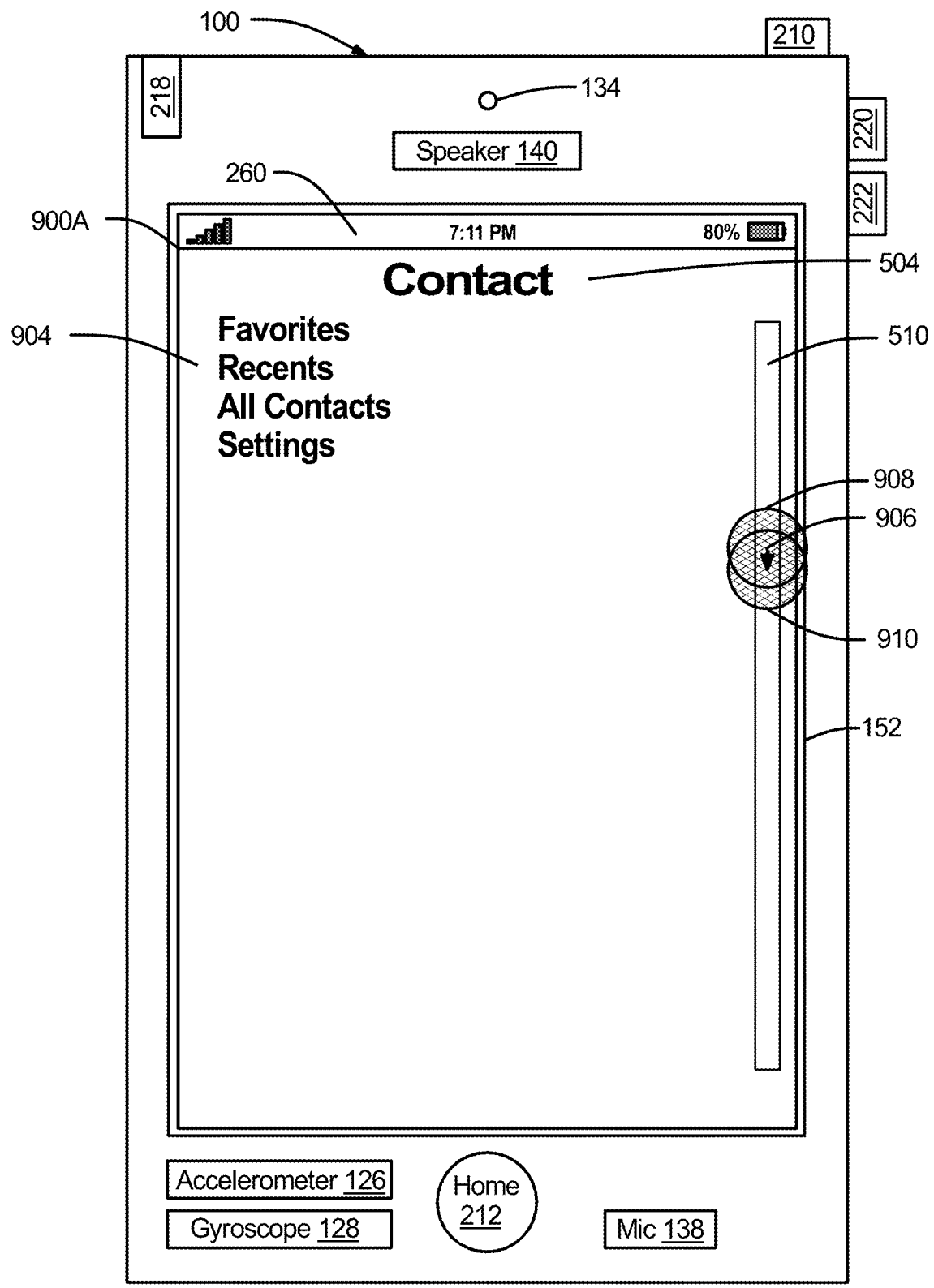
FIGS. 9A-9M illustrate an exemplary user interface and method for displaying an item preselection in a list of items, changing the position of an item preselection in a list of items, and selecting an item at the position of the item preselection within a hierarchically organized list of contacts on a smart-phone mobile computing device with a touch-sensitive display, in accordance with some embodiments.
Figure 9B:
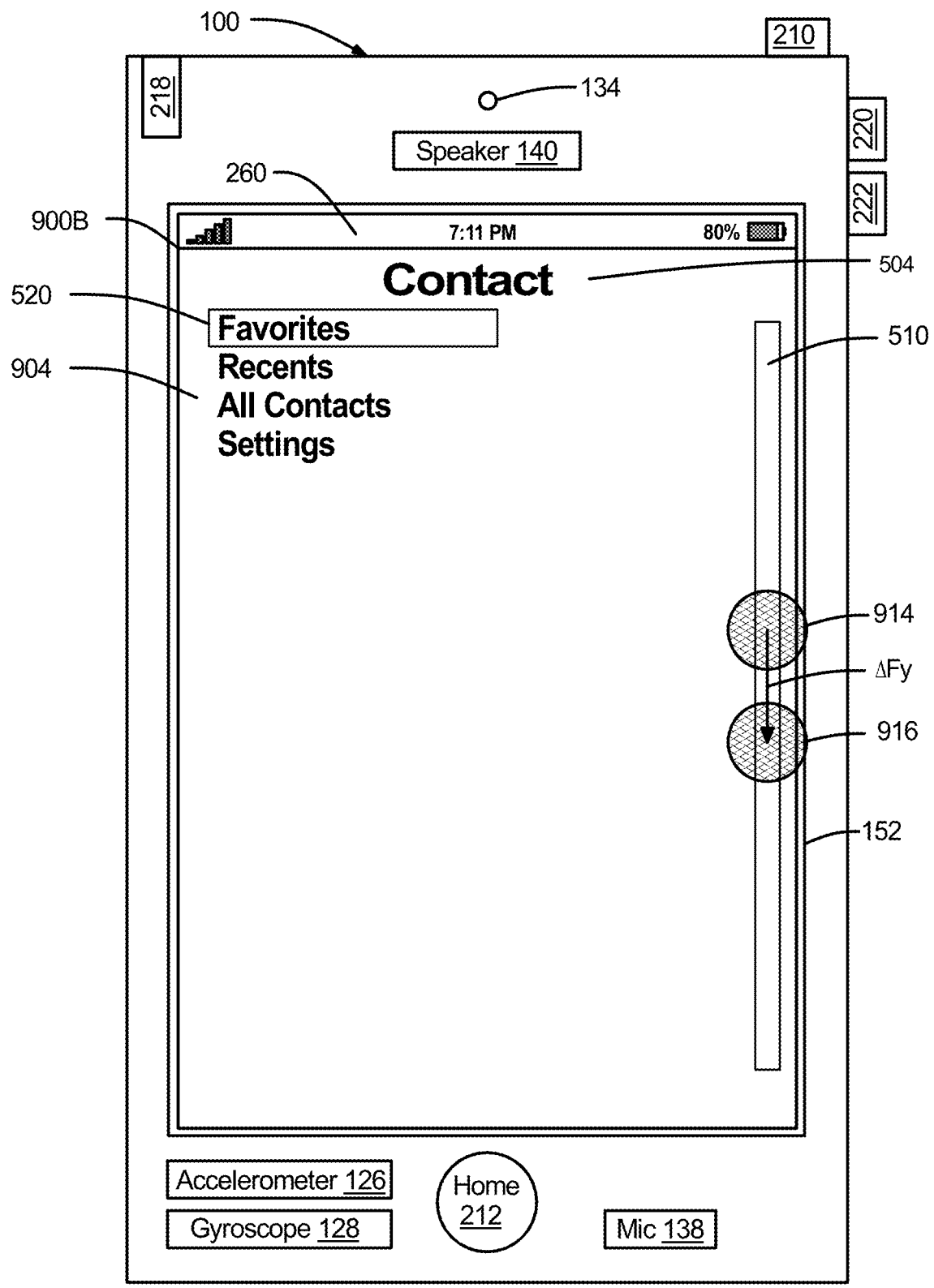
Figure 9C:
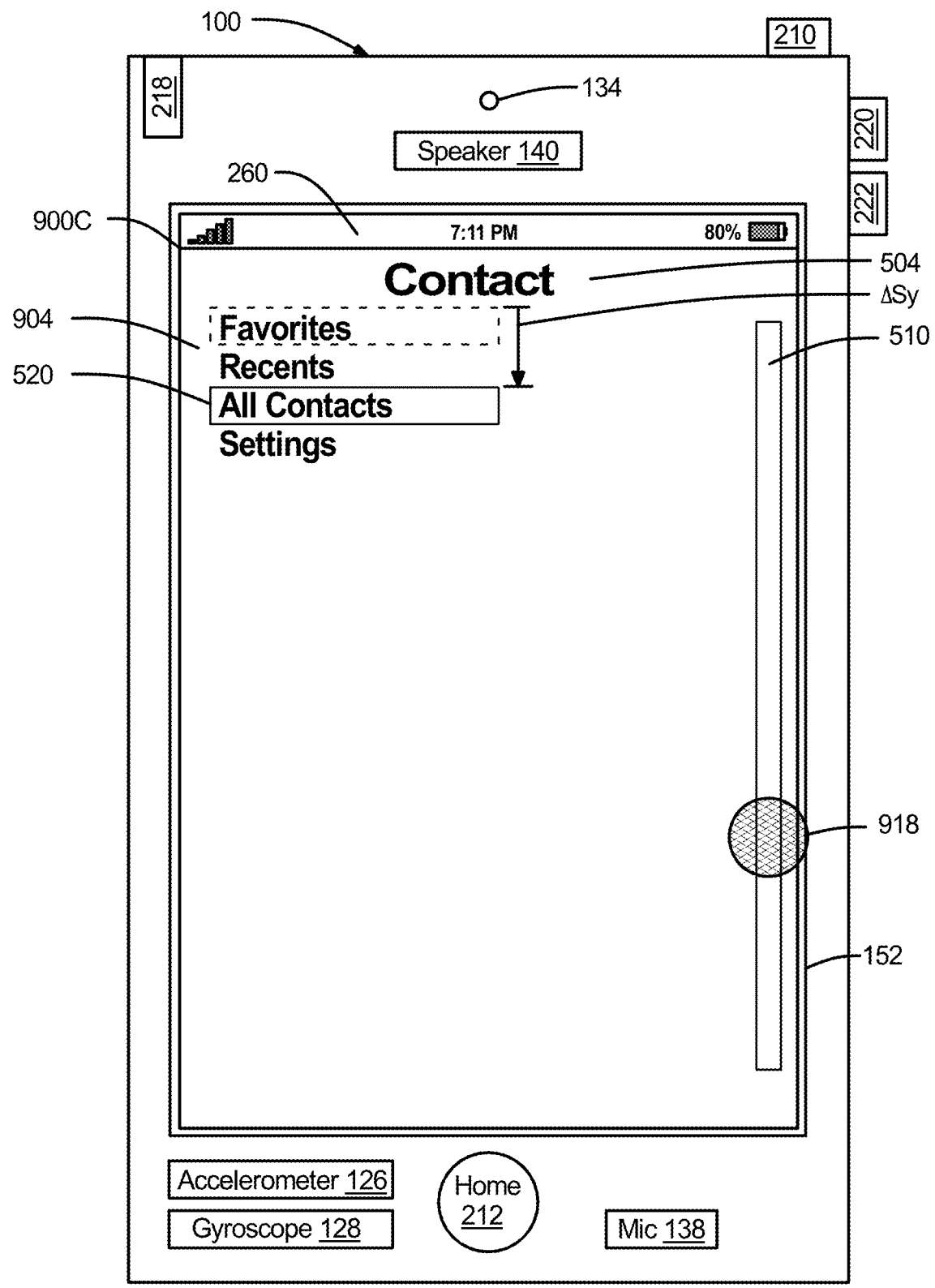

A user can perform a vertical slide finger gesture beginning anywhere on control icon 510 as illustrated in UI 900A, UI 900B, and UI 900C (FIG. 9A, FIG. 9B, and FIG. 9C). In this example control icon 510 is a vertical line or thin vertical rectangle displayed near an edge of the touch-sensitive display. In response to detecting the initial change 906 in the vertical position of a finger contact from 908 to 910 (FIG. 9A), the device can display preselection 520 at the first item "Favorites" in the list of items (FIG. 9B). In response to detecting an additional change in the vertical position of a finger contact from 914 to 916 (FIG. 9B), the device can change the position of preselection 520 to the item "All Contacts" as illustrated in UI 900C (FIG. 9C). In lieu of performing one slide gesture, a user can perform two or more slide gestures, beginning anywhere on control icon 510, until the device changes the vertical position of item preselection 520 from the item "Favorites" to the item "All Contacts".

The UI can also display list name 504 at the top of the display as shown in FIG. 5A, FIG. 5B, and FIG. 5C. In the example shown the name is "Contact."

Figure 9D:
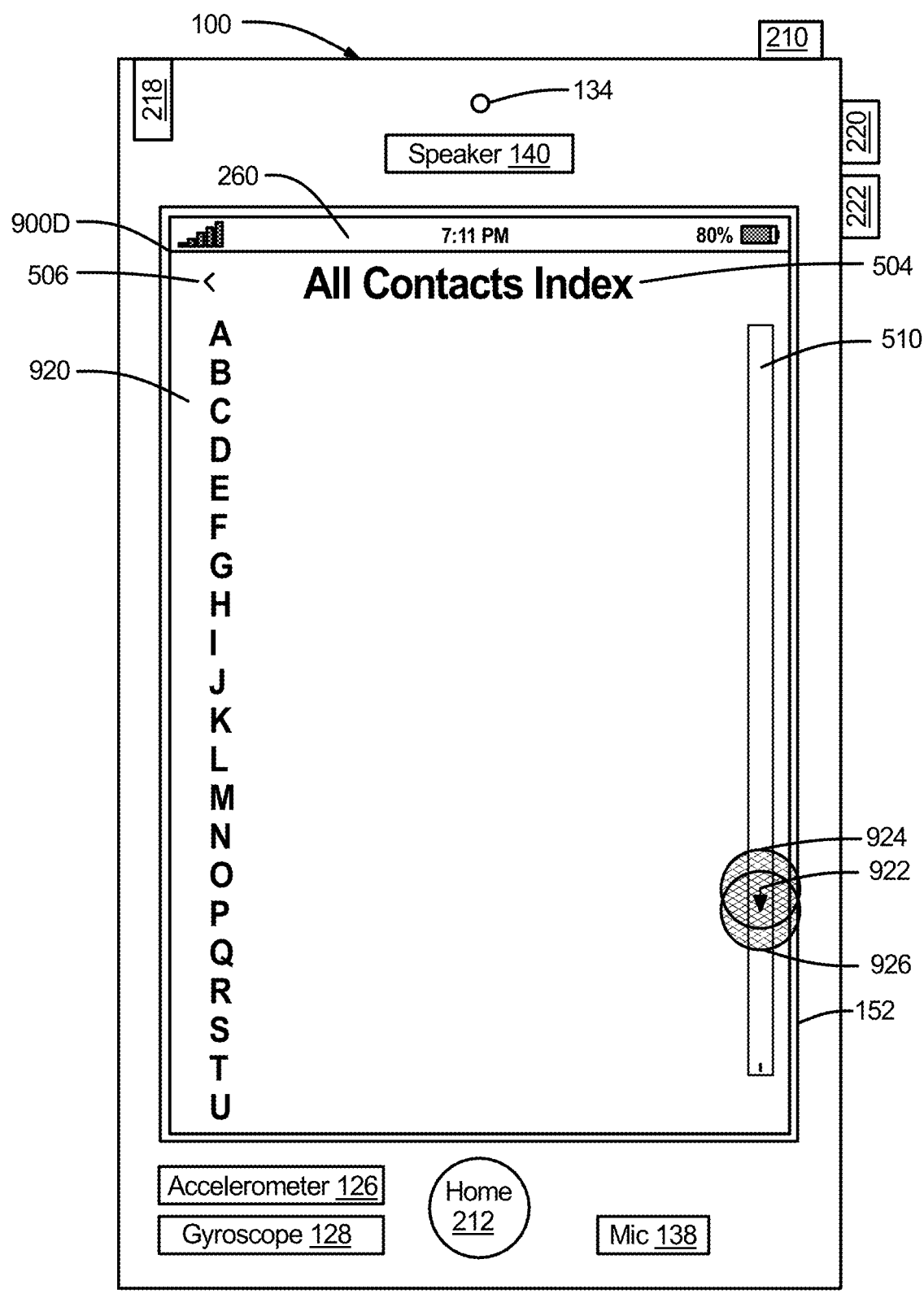
Figure 9E:
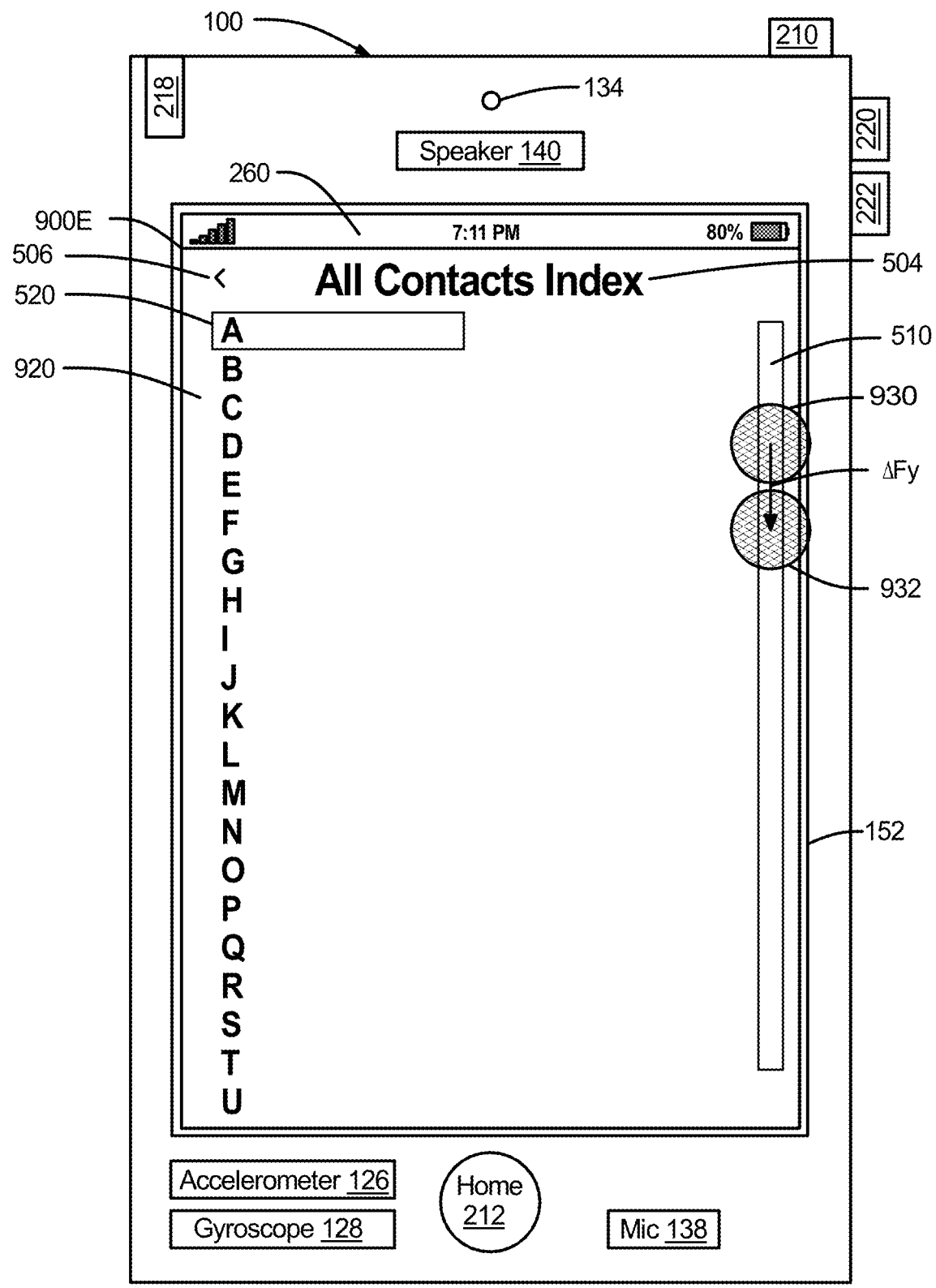

A user can perform a tap gesture 918 on control icon 510 (FIG. 9C). In response to detecting tap gesture 918 on control icon 510, the device can display a second level list of items as illustrated in UI 900 D (FIG. 9D). In the example shown the second level list of items 920 is a list of items named "All Contacts Index". In addition, the device can display icon 506. Icon 506 can be displayed to indicate to the user that there is a level above the current level in the hierarchy (a parent list of items). In some embodiments, icon 506 can also be a navigation icon that enables a user to navigate up to the prior level of the hierarchy with a tap on icon 506. A tap on icon 506 can provide an alternative to a tap on the top-end of control icon 510, for navigating up a hierarchically organized list. This latter "up navigation" method is described below in reference to FIG. 9M.

Figure 9F:
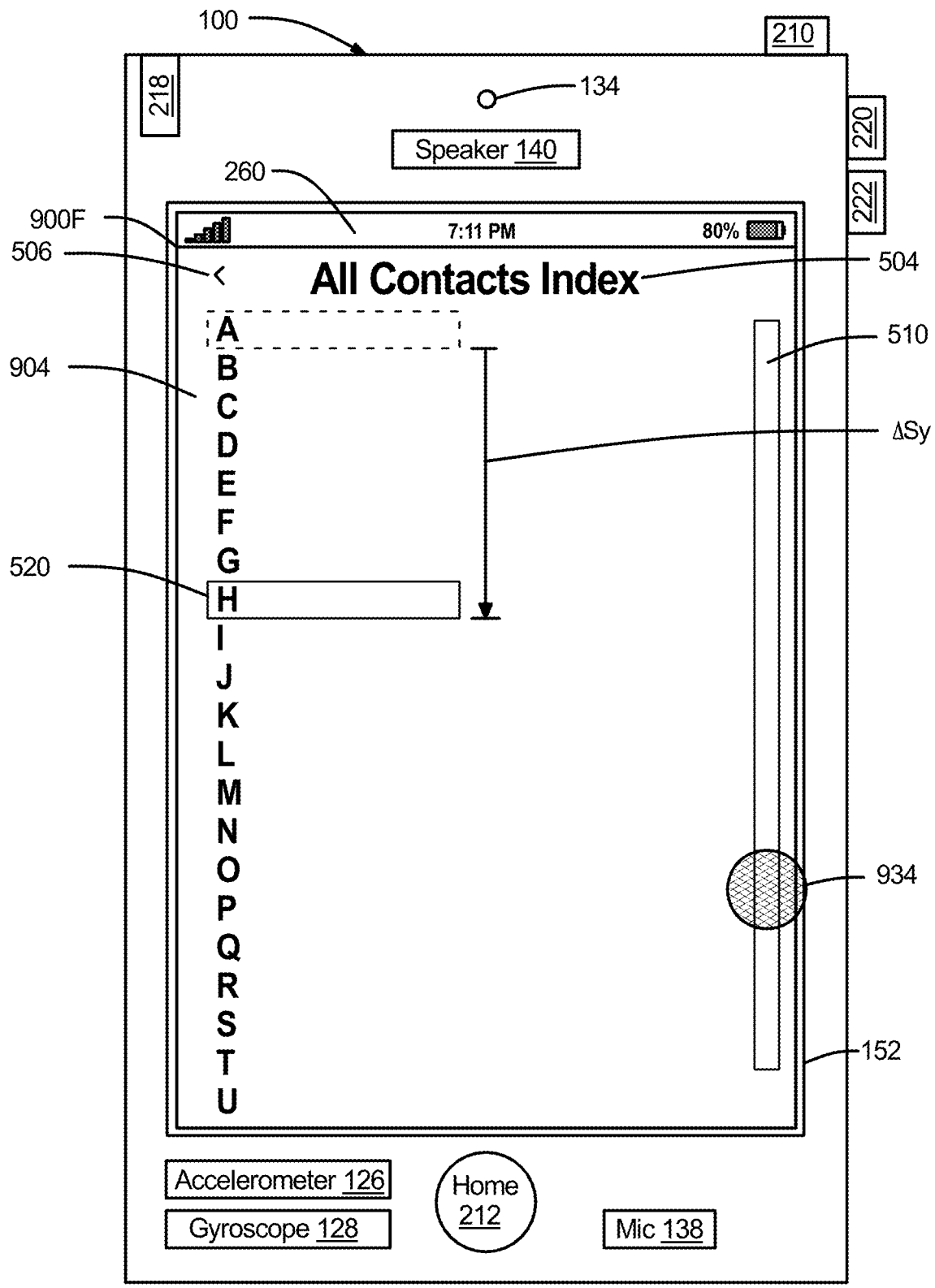

In a similar way, a user can perform a vertical slide finger gesture beginning anywhere on control icon 510 as illustrated in UI 900D, UI 900E, and UI 900F (FIG. 9D, FIG. 9E, and FIG. 9F). In response to detecting the initial change 922 in the vertical position of a finger contact from 924 to 926 (FIG. 9D), the device can display preselection 520 at the first item "A" in the list of items (FIG. 9E). In response to detecting an additional change in the vertical position of a finger contact $\Delta Fy$ from 930 to 932 (FIG. 9E), the device can change the position of preselection 520 by an amount $\Delta Sy$ to the item "H" as illustrated in UI 900F (FIG. 9F). In lieu of performing one slide gesture, a user can perform two or more slide gestures, beginning anywhere on control icon 510, until the device changes the vertical position of item preselection 520 from the item "A" to the item "H."

Figure 9G:
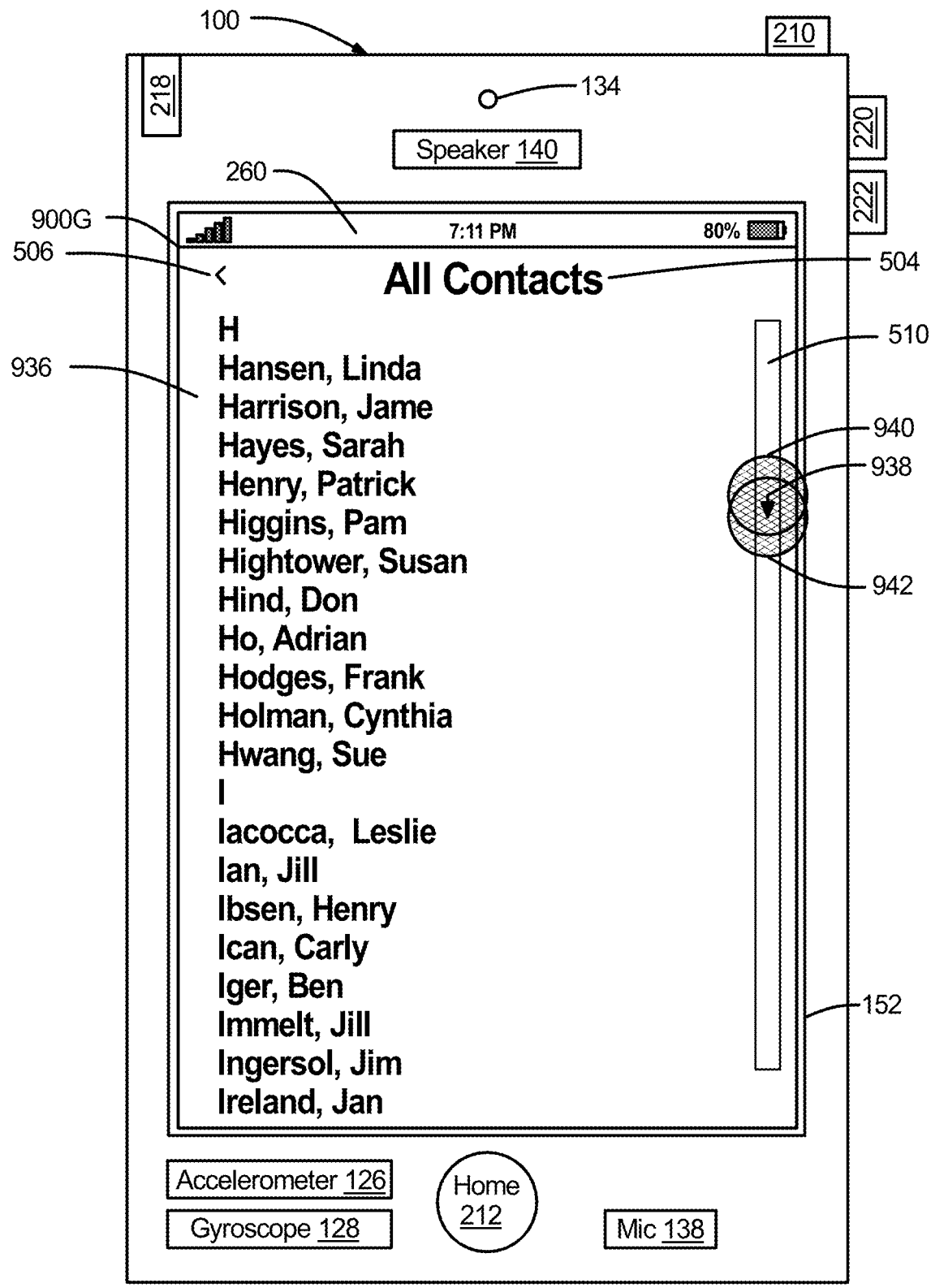

A user can perform a tap gesture 934 on control icon 510 (FIG. 9F). In response to detecting tap gesture on control icon 510, the device can display a third level list of items as illustrated in UI 900 G (FIG. 9G). In the example shown the third level list of items 936 (a child list of items) is a list of items named "All Contacts" with the list of contacts beginning with the index letter "H" scrolled into view.

Figure 9H:
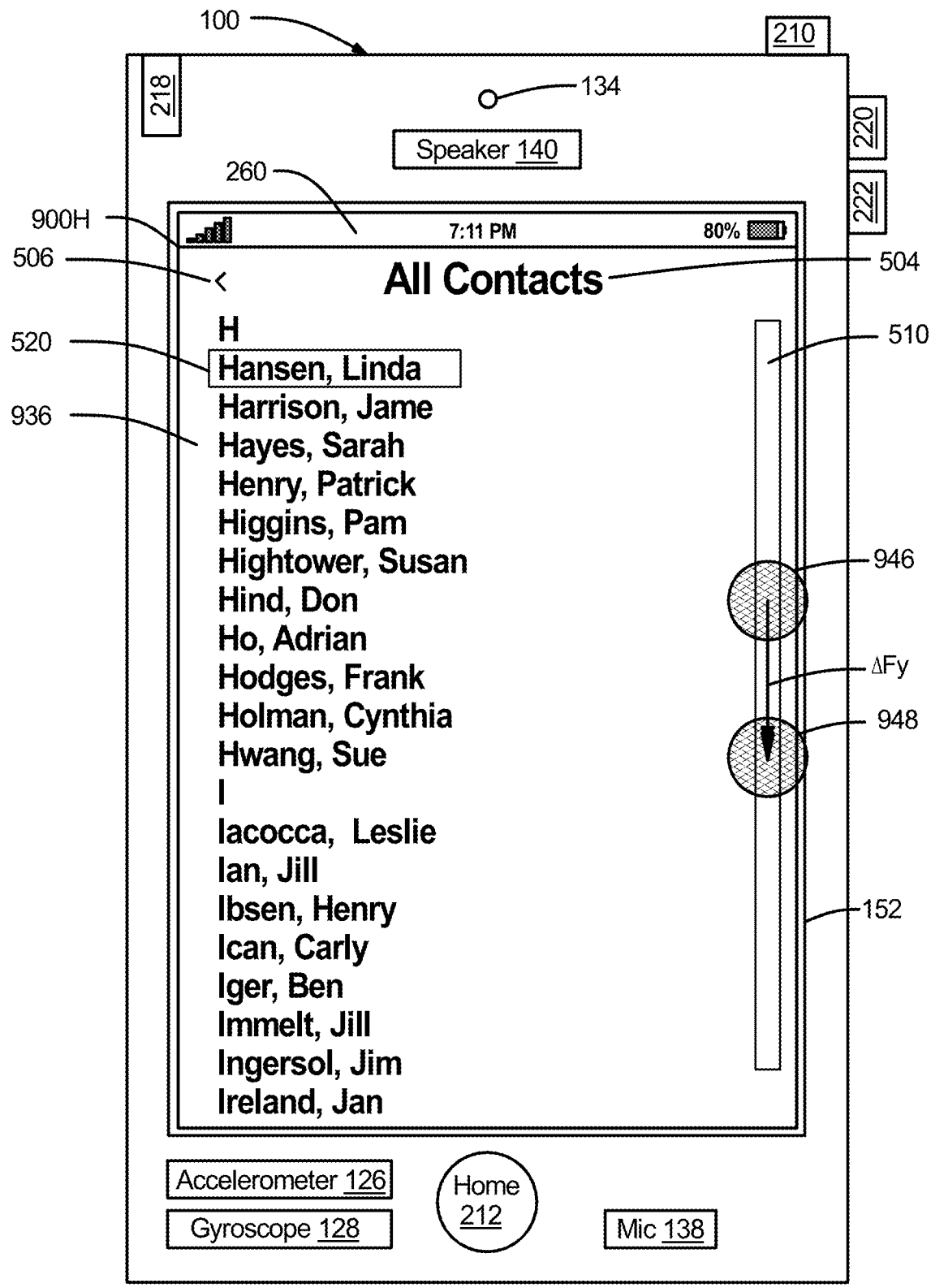
Figure 9I:
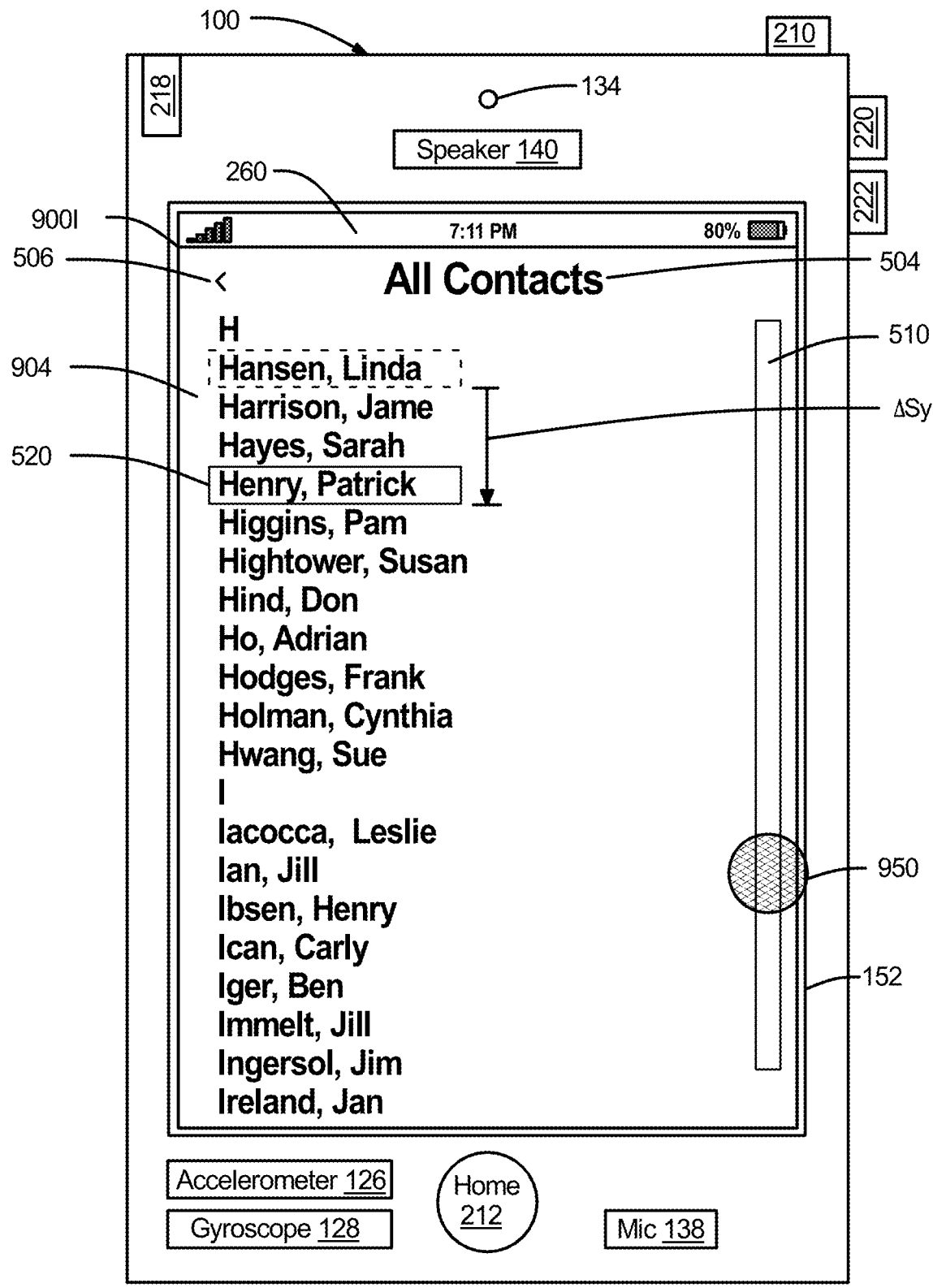

In a similar way, a user can perform a vertical slide finger gesture beginning anywhere on control icon 510 as illustrated in UI 900G, UI 900H, and UI 900I (FIG. 9G, FIG. 9H, and FIG. 9I). In response to detecting the initial change in the vertical position of a finger contact 938 from 940 to 942 (FIG. 9G), the device can display preselection 520 at the first item "Hansen, Linda" in the list of items (FIG. 9H). In response to detecting an additional change in the vertical position of a finger contact $\Delta Fy$ from 946 to 948 (FIG. 9H), the device can change the position of preselection 520 by an amount $\Delta Sy$ to the item "Henry, Patrick" as illustrated in UI 900I (FIG. 9I). In this example, $Ky=\Delta Sy/\Delta Fy$ is ~1. See FIGS. 10 and 12, and the associated discussion of K.

In lieu of performing one slide gesture, a user can perform two or more slide gestures, beginning anywhere on control icon 510, until the device changes the vertical position of item preselection 520 from the item "Hansen, Linda" to the item "Henry, Patrick."

Figure 9J:
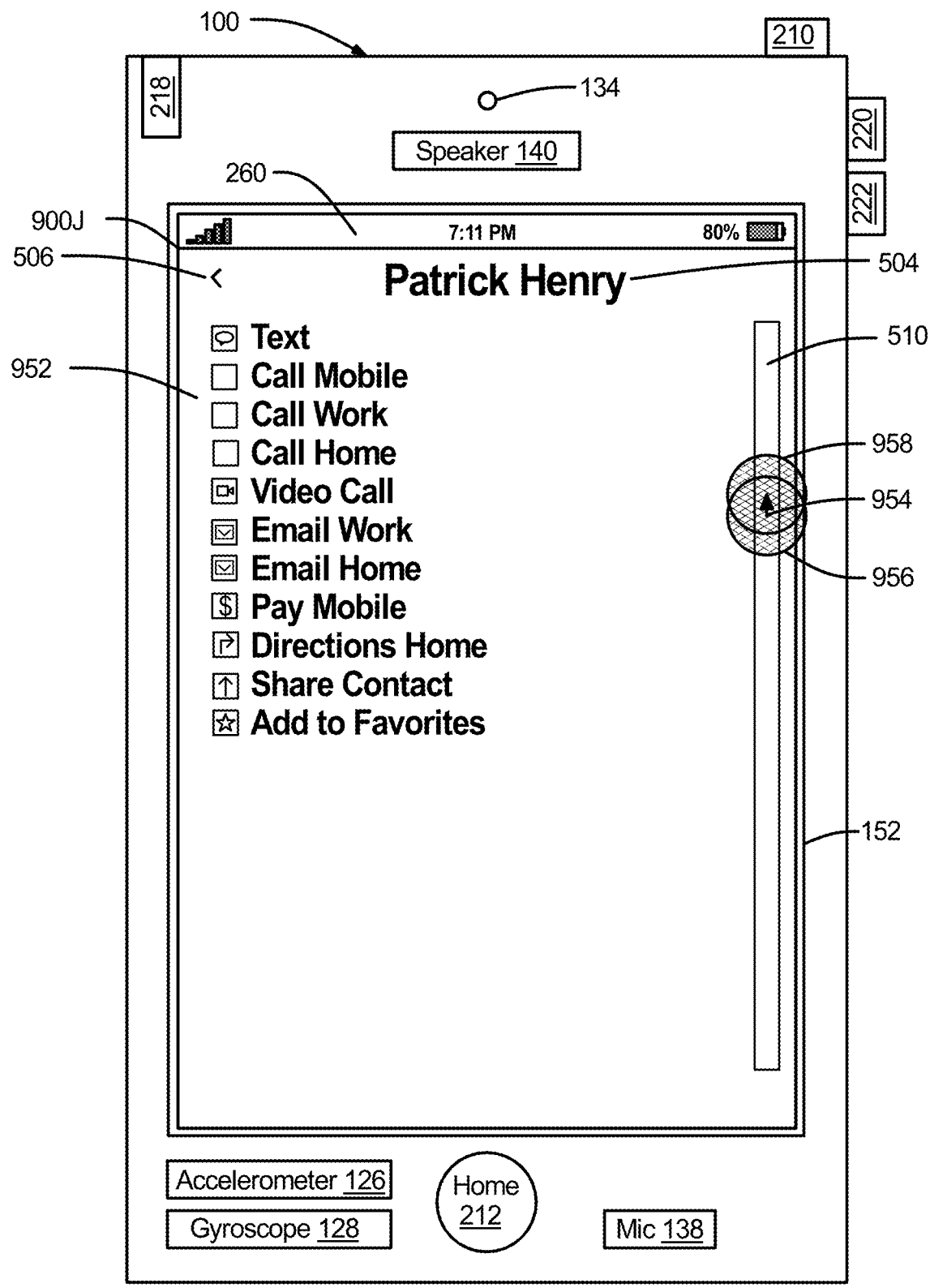

A user can perform a tap gesture 950 on control icon 510 (FIG. 9I). In response to detecting tap gesture on control icon 510, the device can display a fourth level list of items as illustrated in UI 900 J (FIG. 9J). In the example shown the fourth level list of items 952 (a child list of items) is a list named "Patrick Henry" with the list of contact actions available with respect to contact "Patrick Henry."

Figure 9K:
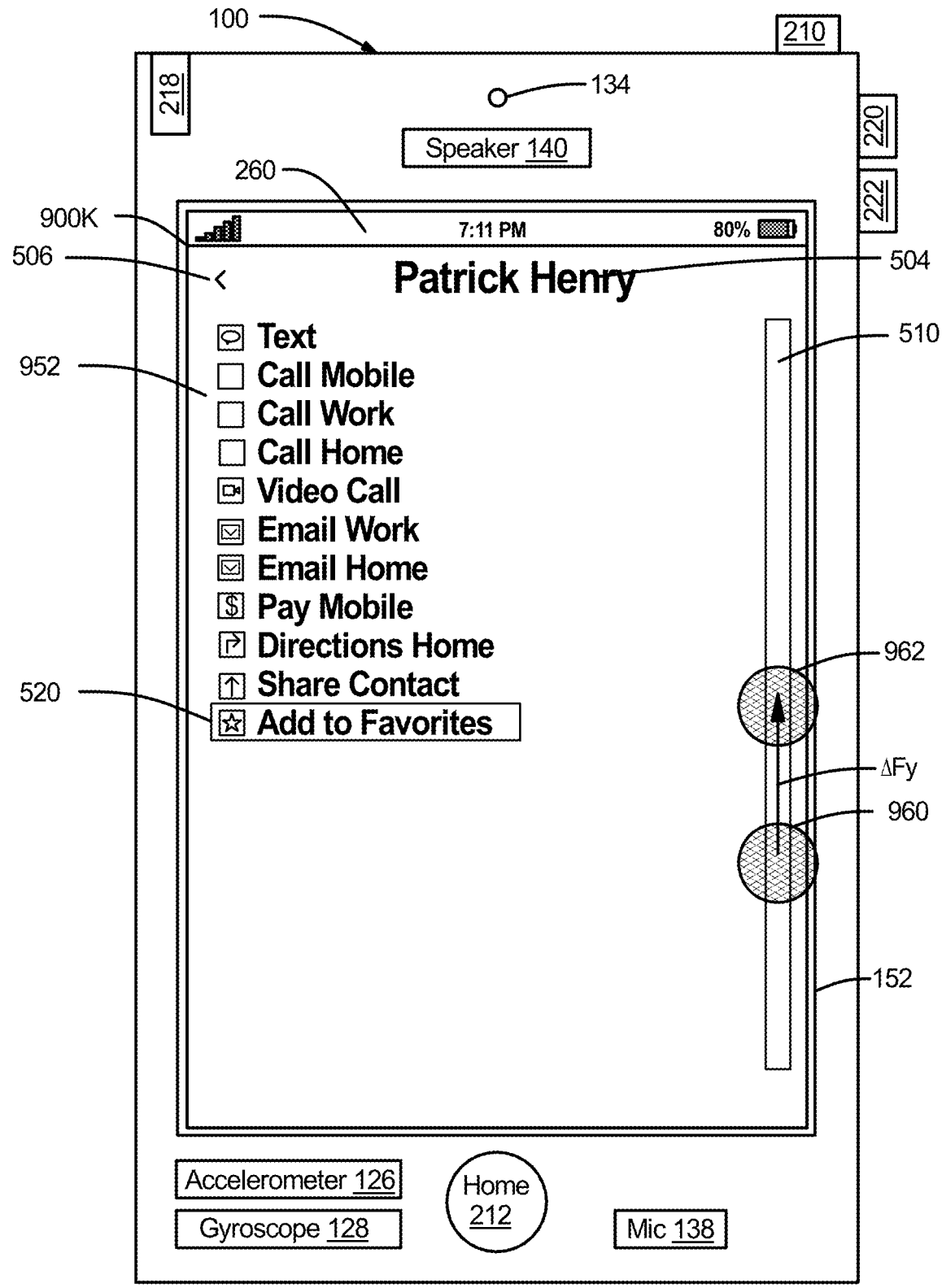
Figure 9L:
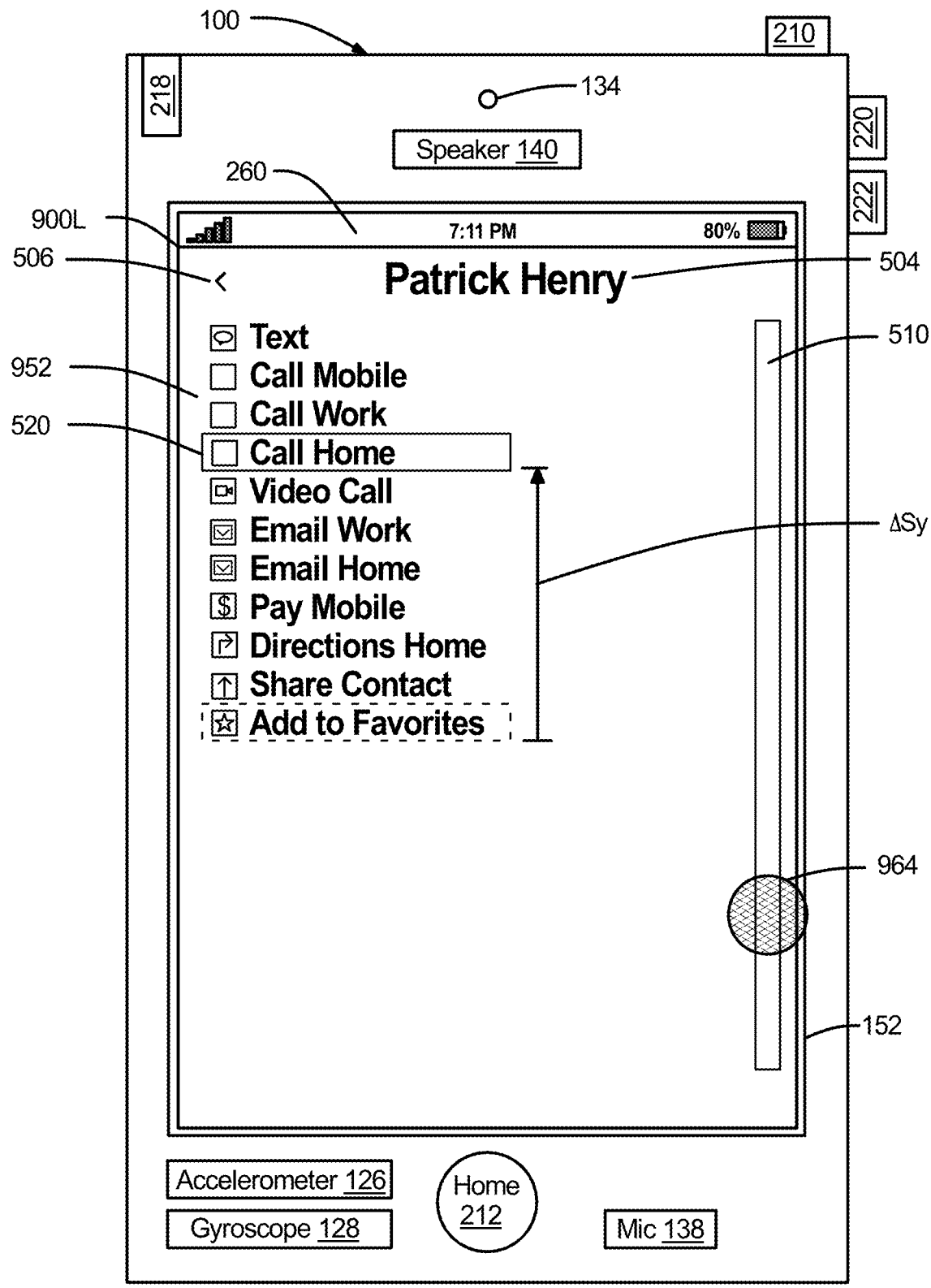

FIGS. 9J-9L illustrate displaying an item preselection in a list of items, changing the position of an item preselection in a list of items, and selecting a contact action item in a list of contact actions to initiate a contact action with respect to a contact.

In a similar way, a user can perform a vertical slide finger gesture beginning anywhere on control icon 510 as illustrated in UI 900J, UI 900K, and UI 900L (FIG. 9J, FIG. 9K, and FIG. 9L). In response to detecting the initial change 954 in the vertical position of a finger contact from 956 to 958 (FIG. 9J), the device can display preselection 520 at the item "Add to Favorites" in the list of items (FIG. 9K). In response to detecting an additional change in the vertical position of a finger contact $\Delta Fy$ from 960 to 962 (FIG. 9K), the device can change the position of preselection 520 by an amount $\Delta Sy$ to the item "Call Home" as illustrated in UI 900L (FIG. 9L). In this example, $Ky=\Delta Sy/\Delta Fy$ is >1. Again, see FIGS. 10 and 12, and the associated discussion of K.

In lieu of performing one slide gesture, a user can perform two or more slide gestures, beginning anywhere on control icon 510, until the device changes the vertical position of item preselection 520 from the item "Add to Favorites" to the item "Call Home"

Figure 9M:
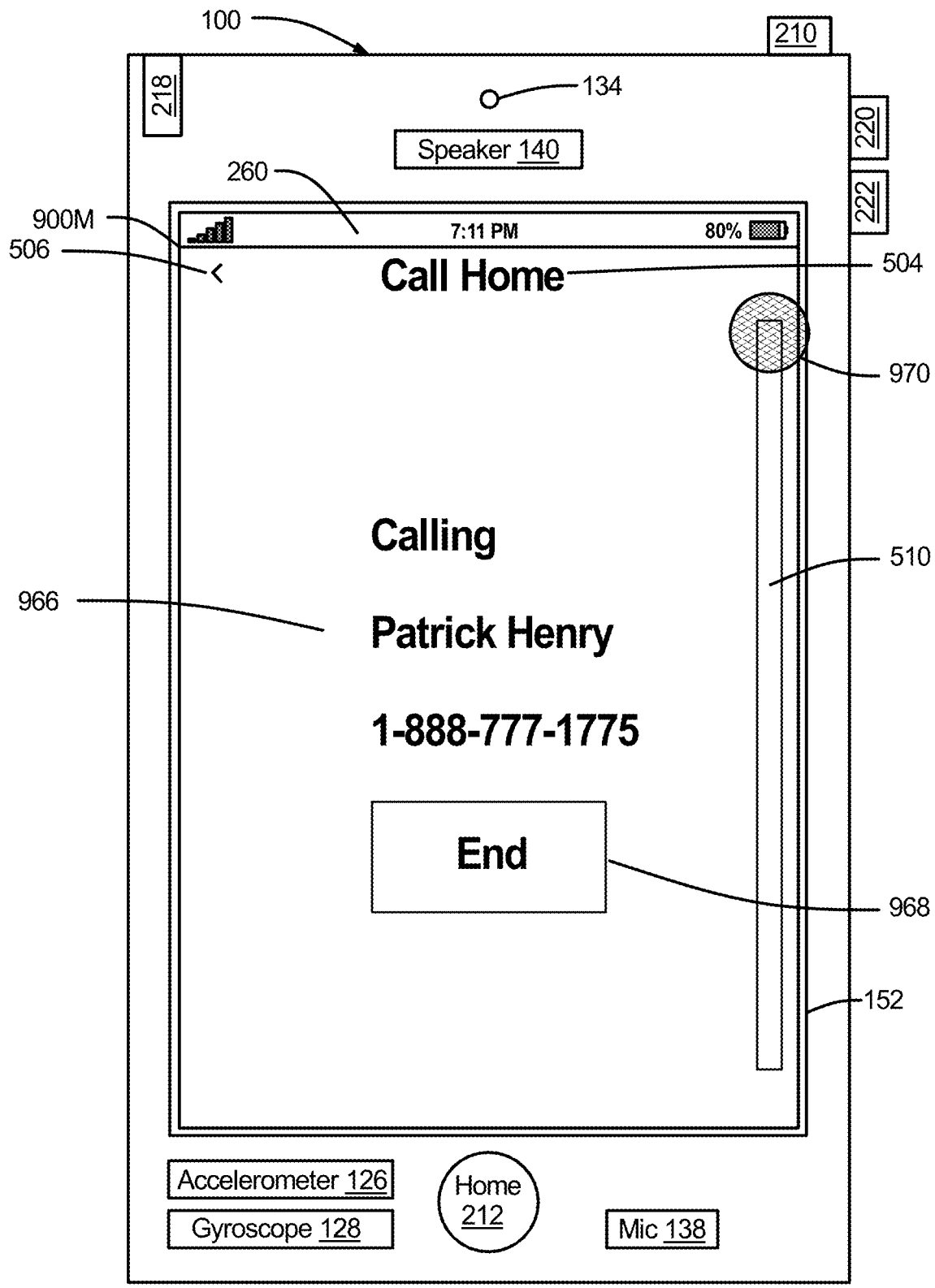

A user can perform a tap gesture 964 on control icon 510 (FIG. 9L). In response to detecting tap gesture on control icon 510, the device can initiate the action "Call Home" as illustrated in UI 900 M (FIG. 9M). A user can end the call with a tap on icon 968. In some embodiments, after a call is ended, the device can redisplay the prior level list (a parent list of items) of actions as illustrated in UI 900L (FIG. 9L).

A user can perform a tap gesture 970 on the top-end of control icon 510 as illustrated in FIG. 9M. In response to detecting tap gesture 970 on the top-end of control icon 510, the device can redisplay the prior level list (a parent list of items) of actions available with respect to item to Patrick Henry as illustrated in UI 900 L (FIG. 9L) without ending the call.

A user can perform an option gesture or control icon, a tap on the bottom-end on control icon 510 for example, to display a context specific option list of items. The option list of items can display items applicable to a list of items from which the option list of items was displayed with an "option" gesture on control icon 510 at the list of items. The option list of items can display items applicable to an item at a position of an item preselection in the list of items, from which the option list of items was displayed with an "option"

gesture on control icon 510 at the list of items. The display of an option list of items is available for any list of items, not just the examples described in reference to FIGS. 5, 6, 7, 8, and 9, but any list of items. An option lists of items is not required for any particular list of items as previously noted; option lists of items can be provided for any list of items where they can helpful to the user, for example, for performing an action with respect to a list of items, or for performing an action with respect to an item at a position of an item preselection in a list of items.

Figure 10A:
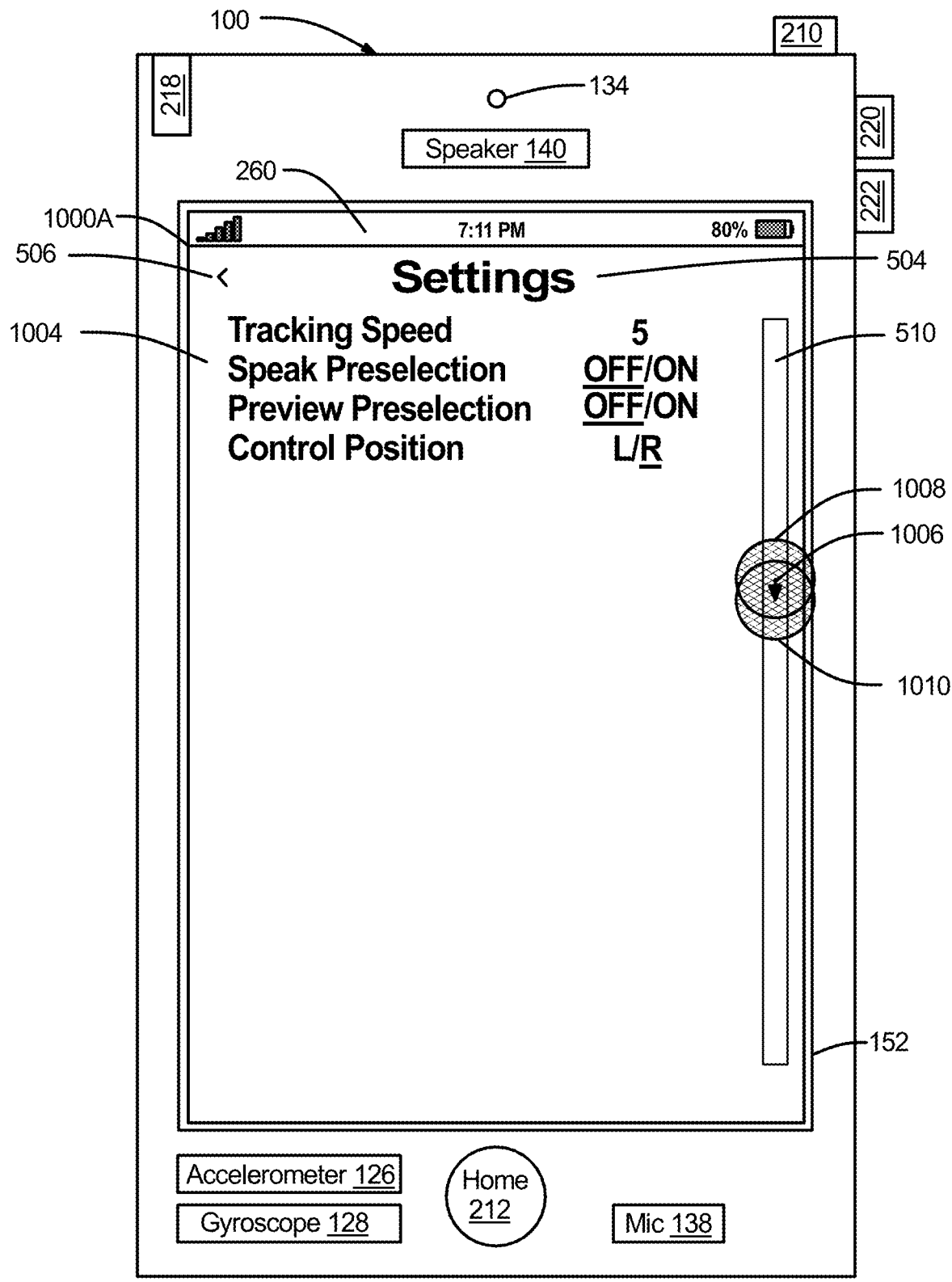
FIGS. 10A-10L illustrate an exemplary user interface and method for choosing accessibility settings for a graphical user interface and method for positioning an item preselection and selecting. The settings could apply to one app, a group of apps, or all apps running under a touch-based operating system. The method can include displaying an item preselection in a list of settings items, changing the position of an item preselection in a list of items, and selecting an item at the position of the item preselection within a hierarchically organized list of settings in accordance with some embodiments. In this example the settings are displayed on a smart-phone mobile computing device with a touch-sensitive display.

FIGS. 10A-10L illustrate an exemplary user interface and method for choosing accessibility settings using a graphical user interface and method for positioning an item preselection in a list of items and selecting an item at the position of an item preselection in a list of items. The settings could apply to one app, a group of apps, or all apps running under a touch-based operating system. FIG. 10A shows a list of settings items 1004. These include but are not limited to, the following: a tracking speed setting with a value of 1, 2, 3, 4, 5, 6, 7, 8, 9, or 10; a setting to configure the device to speak the name of the item at the position of the item preselection, with a value of OFF or ON; a setting to configure device to preview the item at the position of the item preselection, with a value of OFF or ON; and a setting to configure the display location of control icon 510. with a value of LEFT or RIGHT. This is an example of a two level hierarchically organized list of items.

Figure 10B:
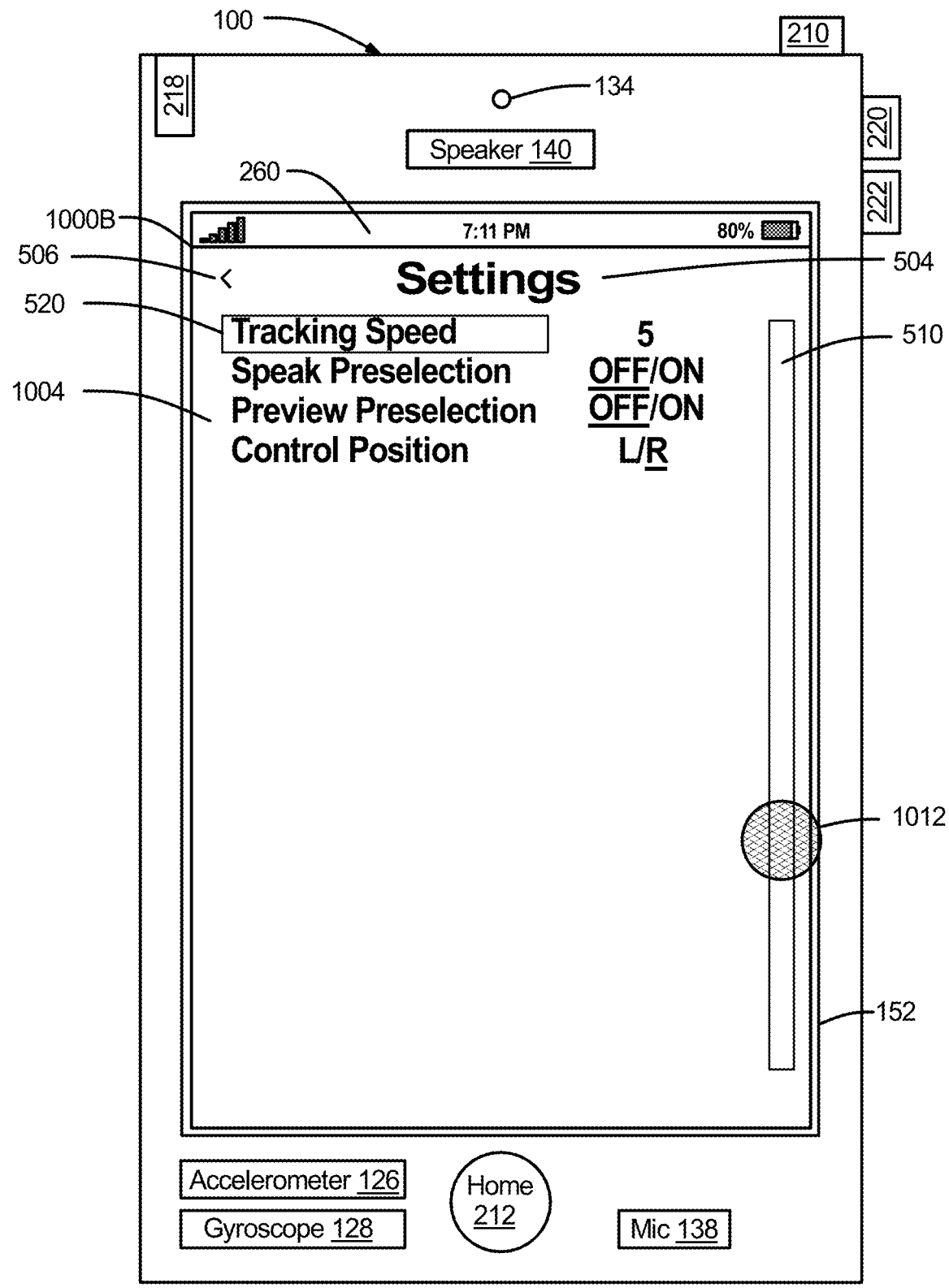
Figure 10C:
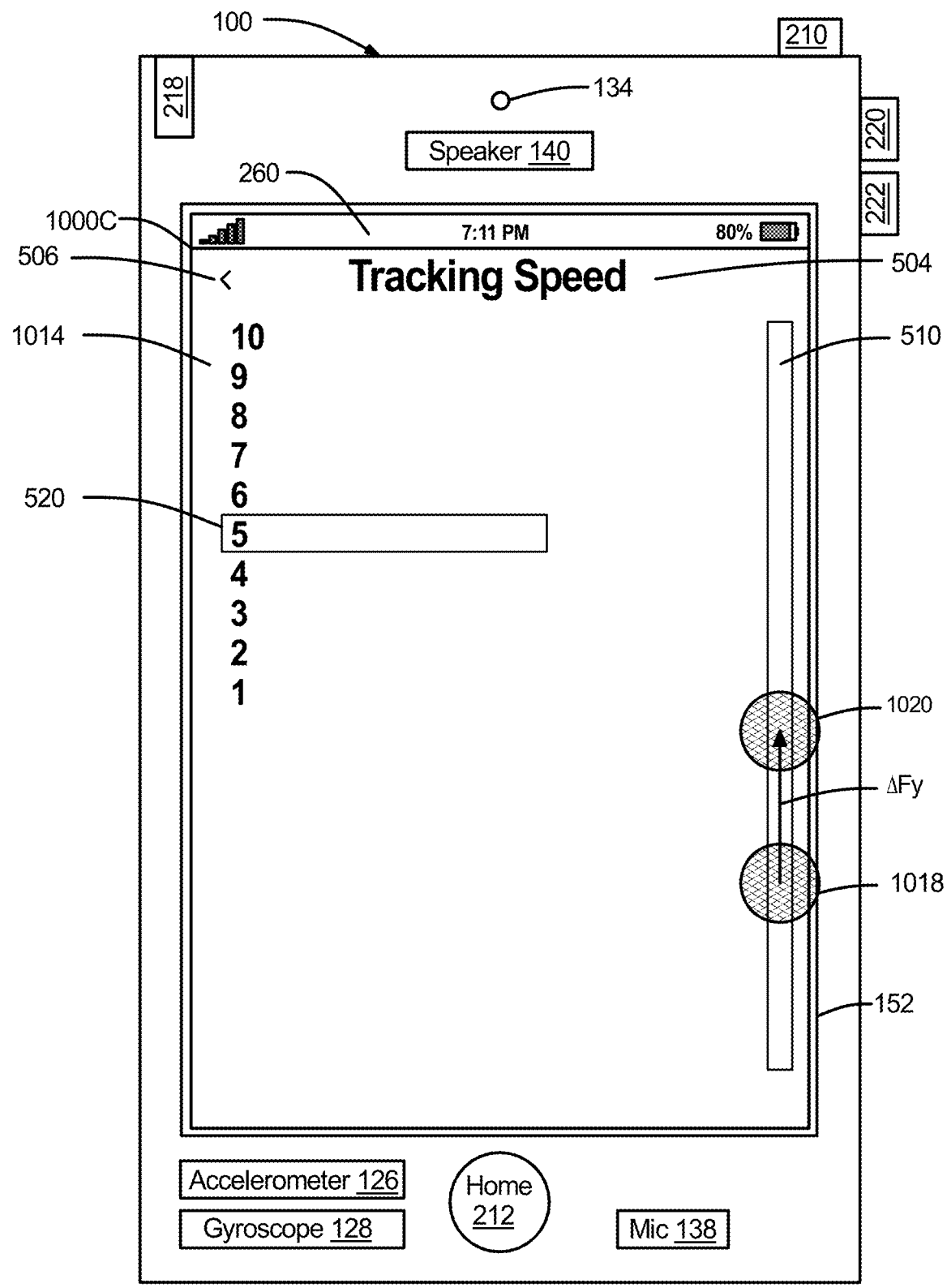
Figure 10D:
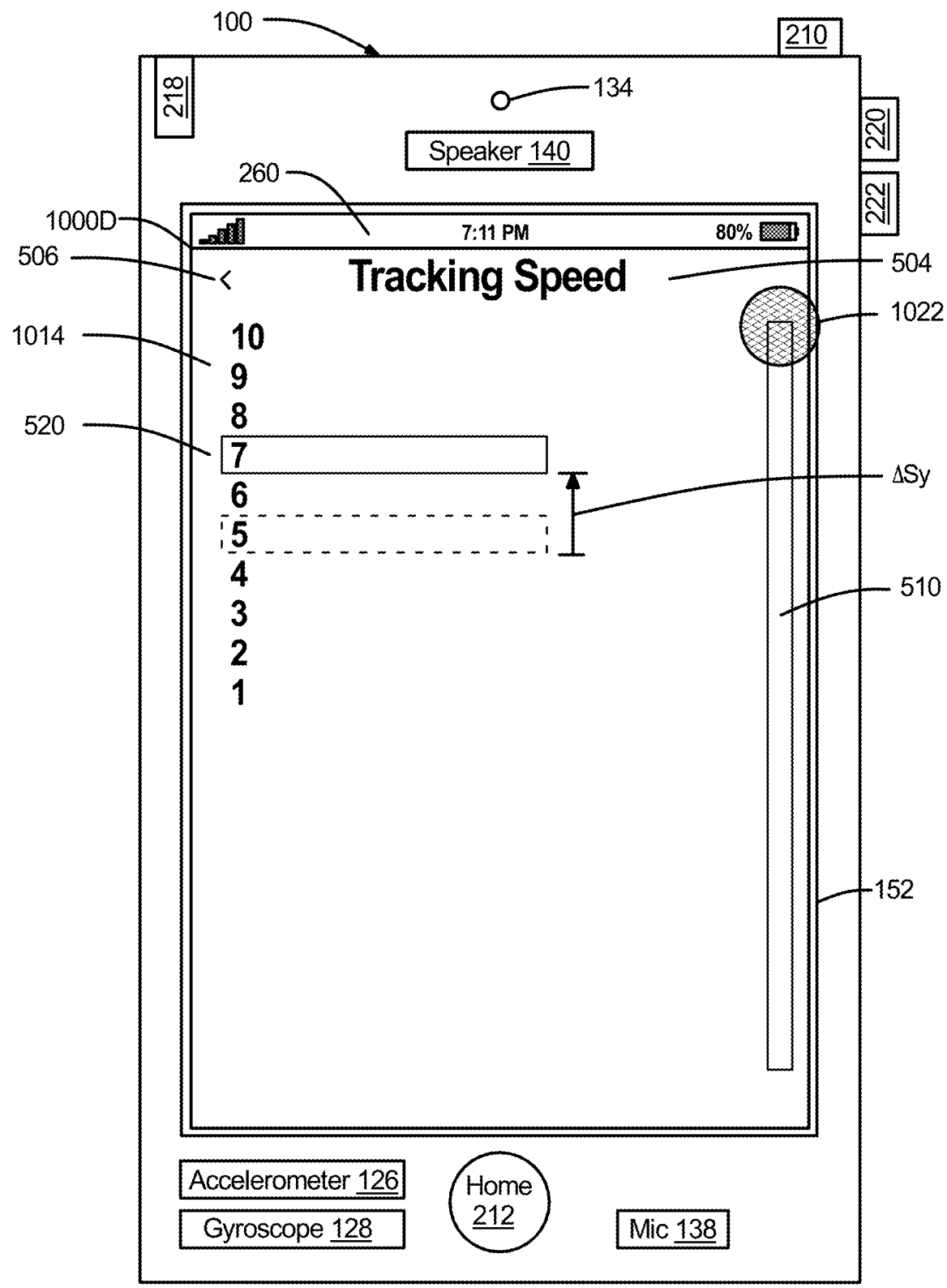
Figure 10E:
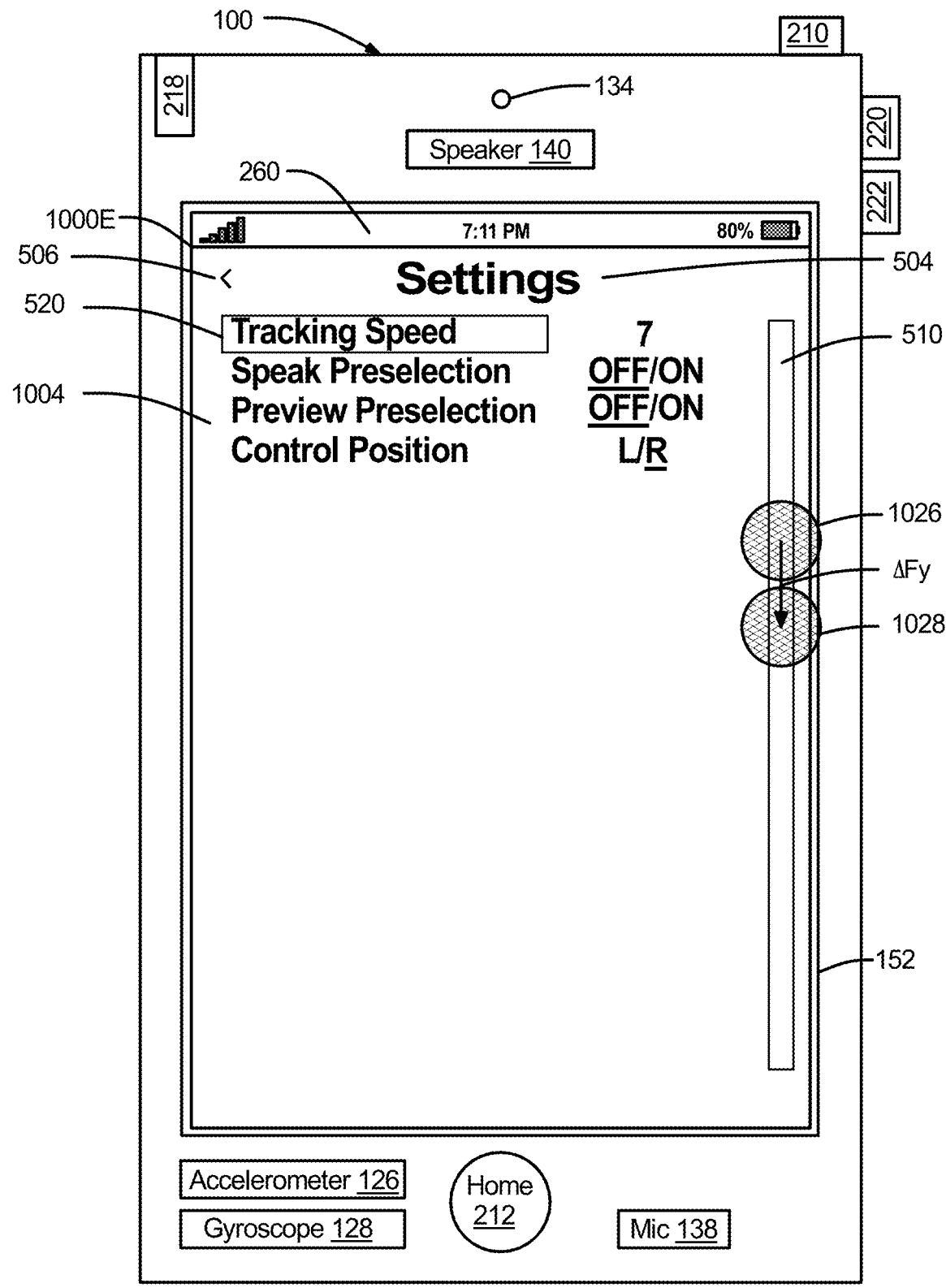

In response to detecting an initial change 1006 in the vertical position of a finger contact beginning anywhere on control icon 510 from 1008 to 1010 (FIG. 10A), the device can display preselection 520 at the item "Tracking Speed" in the list of items (FIG. 10B). In this example control icon 510 is a vertical line or thin vertical rectangle displayed near an edge of the touch-sensitive display. A user can perform a select gesture 1012 (a tap gesture for example) on control icon 510. In response to detecting the select gesture on control icon 510, the device selects the item "Tracking Speed" at the position of preselection 520 and displays the child level list of items comprising 10 possible tracking speeds. In this example, preselection 520 is displayed at the current tracking speed setting of 5 as illustrated in FIG. 10C. In response to detecting a change in the vertical position of a finger contact on control icon 510 from 1018 to 1020 (FIG. 10C), the device can change the position of preselection 520 to the item "7" in the list of items (FIG. 10D) and save the value 7 for the tracking speed. In response to detecting "up gesture" 1022 (a tap gesture on the top-end of control icon 510 for example), the device can display the prior level list of items (a parent list of items) 1004 (FIG. 10E). In an alternative embodiment, in response to detecting a select gesture on control icon 510 (a tap gesture for example), the device can display the parent list of items 1104 without waiting for a up gesture.

Figure 10F:
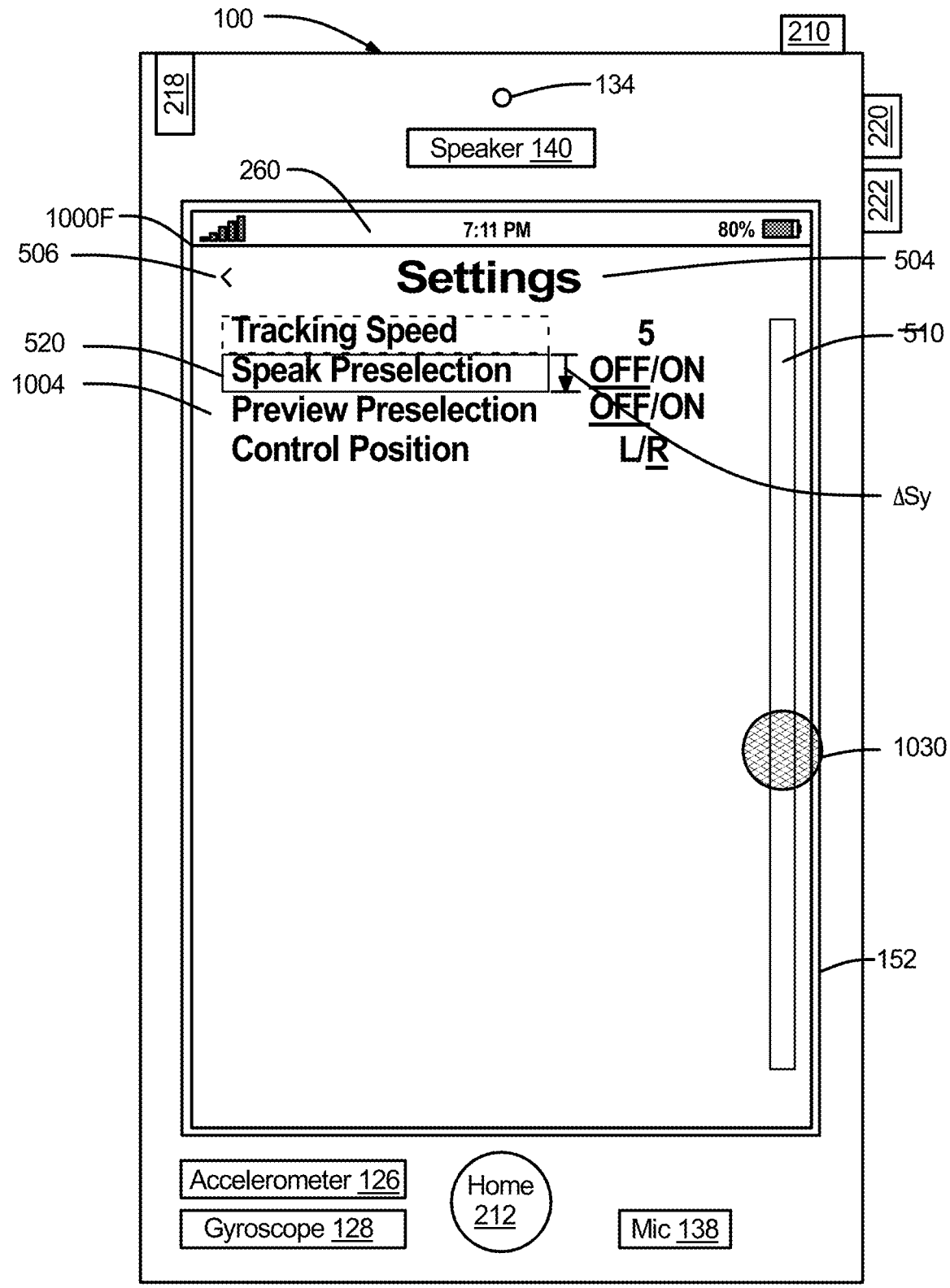
Figure 10G:
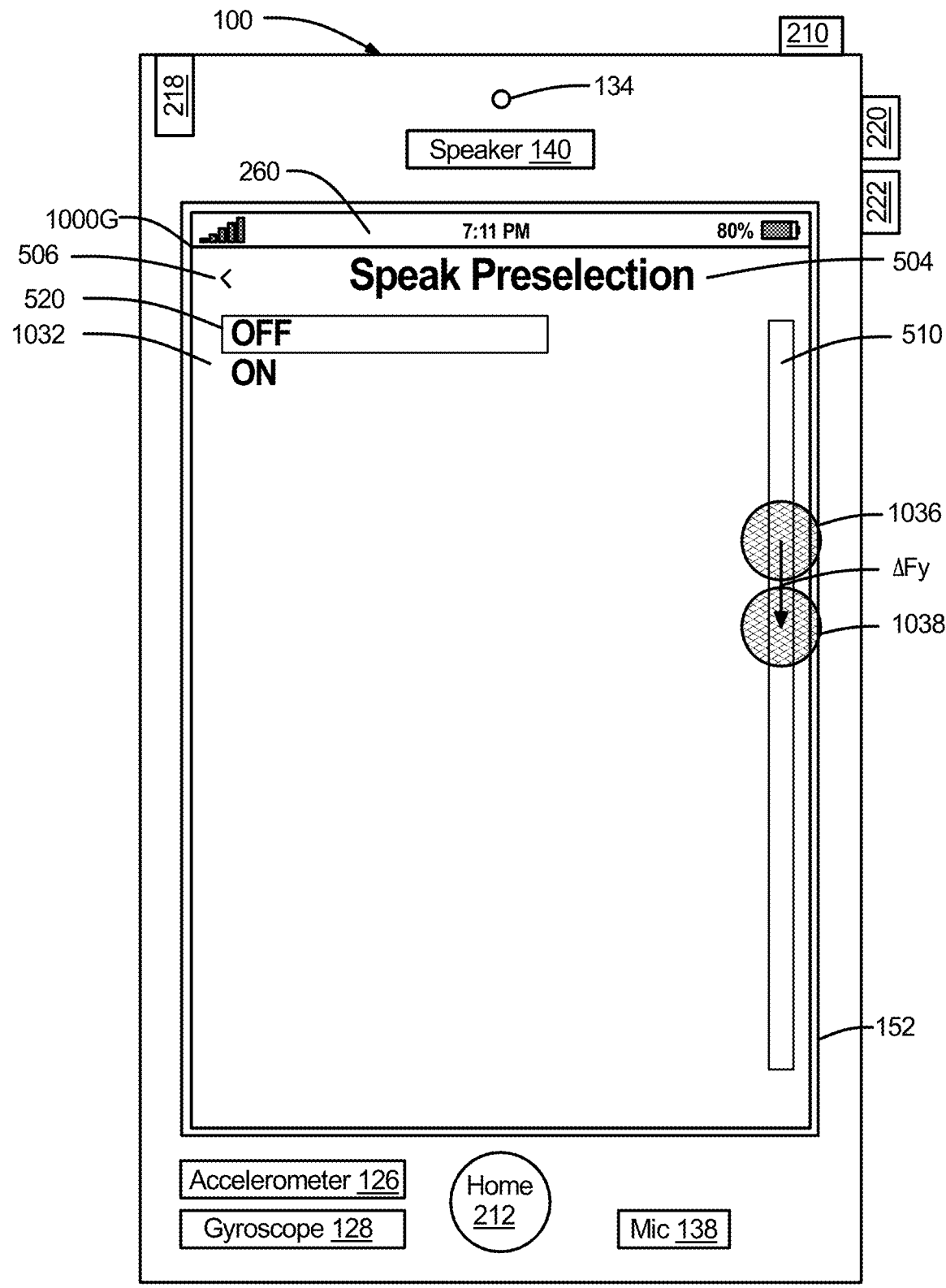
Figure 10H:
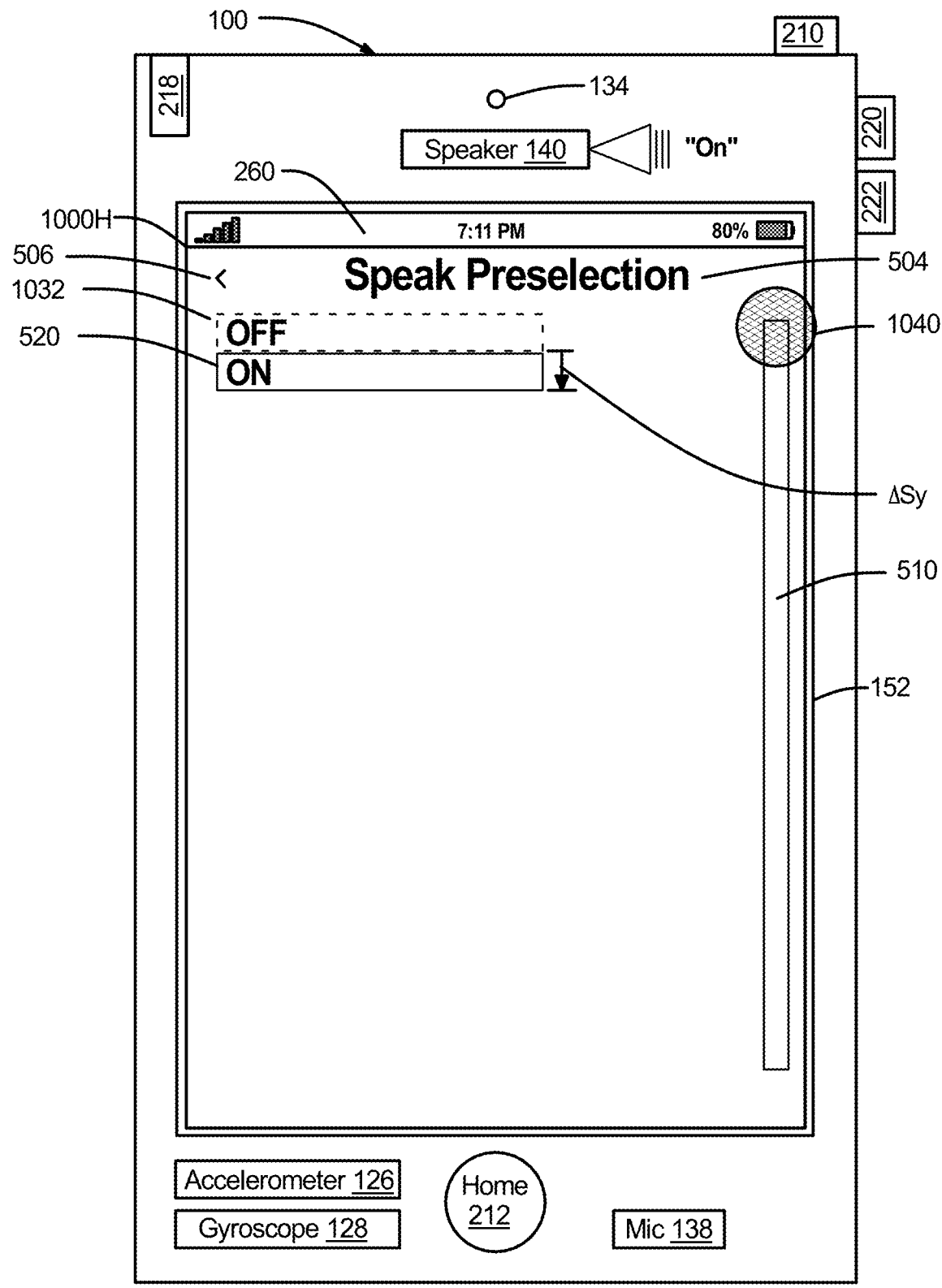

In response to detecting a change in the vertical position of a finger contact ΔFy beginning anywhere on control icon 510 from 1026 to 1028 (FIG. 10E), the device can change the position of preselection 520 by an amount ΔSy to the item "Speak Preselection" as illustrated in UI 10F (FIG. 10F). A user can perform a select gesture 1030 (a tap gesture for example) on control icon 510. In response to detecting the select gesture on control icon 510, the device selects the item "Speak Preselection" at the position of preselection 520 and displays the child level list of items comprising the switch positions OFF or ON (FIG. 10G) with preselection 520 positioned at the current state of "OFF" in this example.

In response to detecting a change in the vertical position of a finger contact on beginning anywhere on control icon 510 from 1036 to 1038 (FIG. 10G), the device can change the position of preselection 520 to the item "ON" in the list of items (FIG. 10H) and save the value ON for that setting. In addition, with speak preselection set to ON, the name of the item at the position of the preselection "ON" is spoken via the device speaker (or device earphones if they are connected).

Figure 10I:
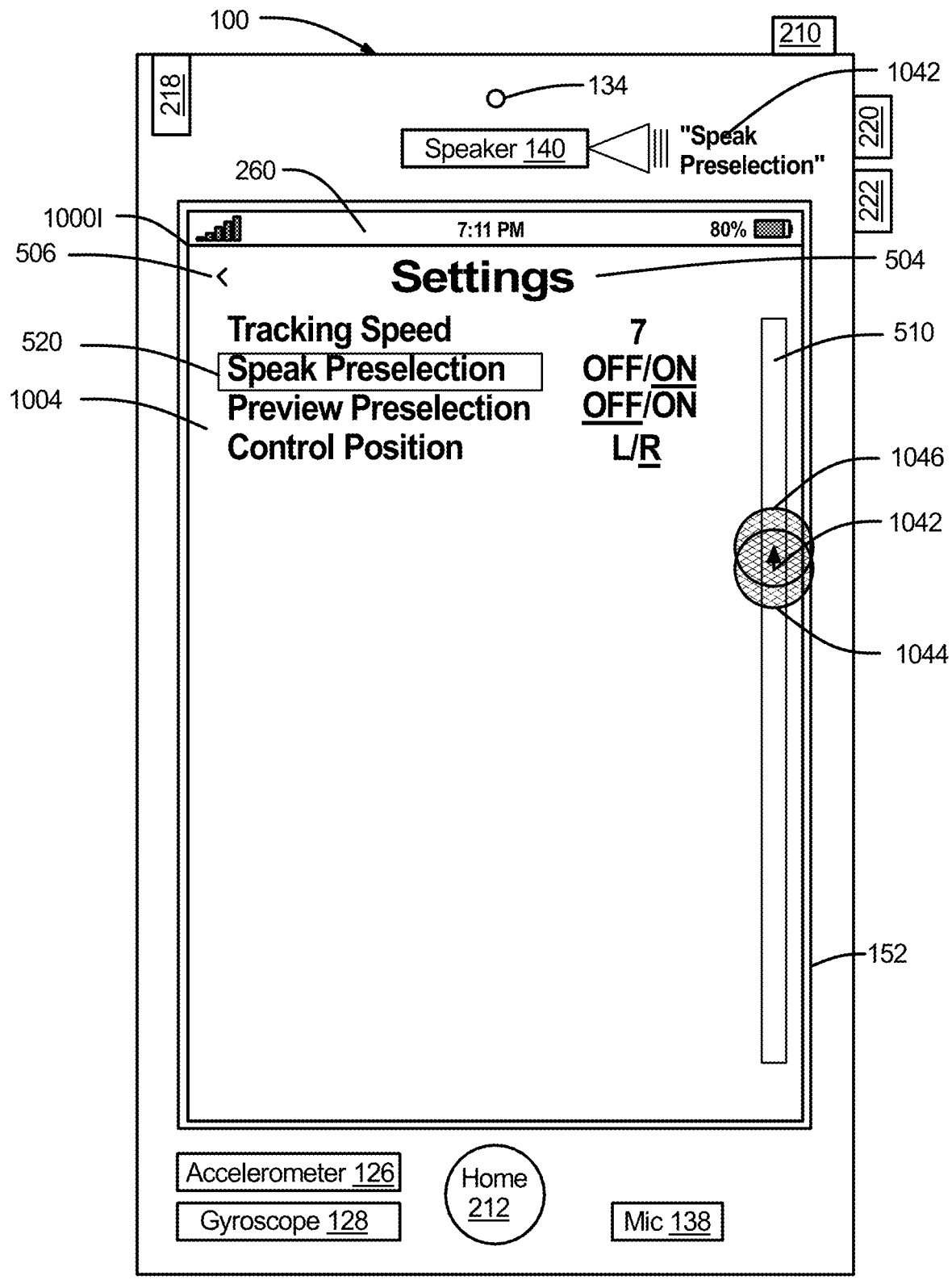

In response to detecting an "up gesture" (a tap gesture 1040 on the top-end of control icon 510 for example), the device redisplays the prior level list (a parent list of items) of items 1004 (FIG. 10I). In an alternative embodiment, in response to detecting a select gesture on control icon 510 (a tap gesture for example), the device can display the parent list of items 1004 without waiting for a up gesture.

In an alternative embodiment, in the case when two states for a setting are available, such as OFF/ON or L/R, a tap on control icon 510 can change the state to the other available state. Each successive tap on the control icon 510 can then change the state to the other available state and save the state.

In an alternative embodiment, in the case of multiple states, each successive tap on control icon 510 can change the state to the next available state and save the state. For the case of three states, with state 1 initially selected, the first tap could change the state to state 2 and save state 2, the next tap could change the state to state 3 and save state 3, and the next tap could change the state to state 1 and save state 1.

Figure 10J:
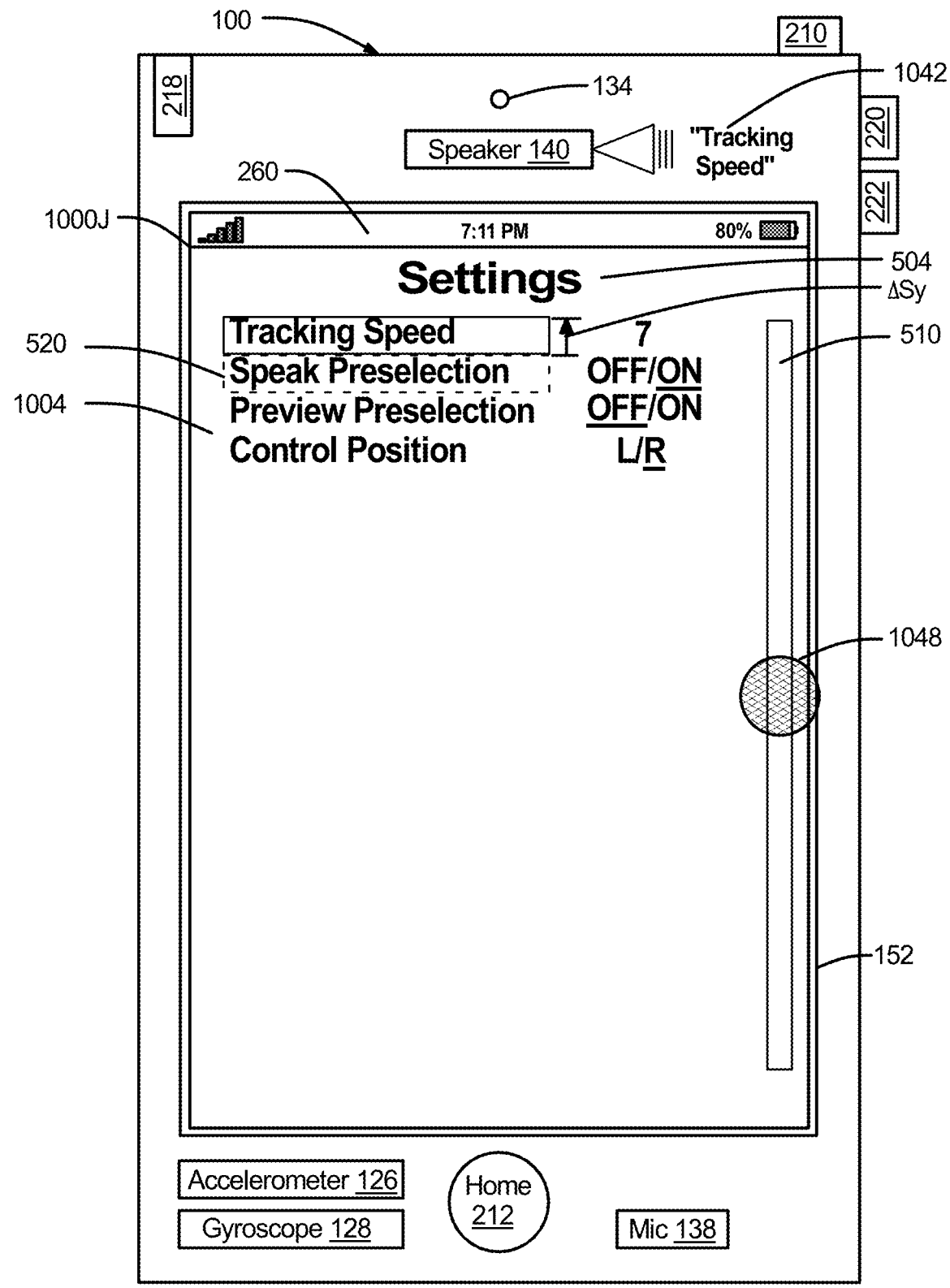
Figure 10K:
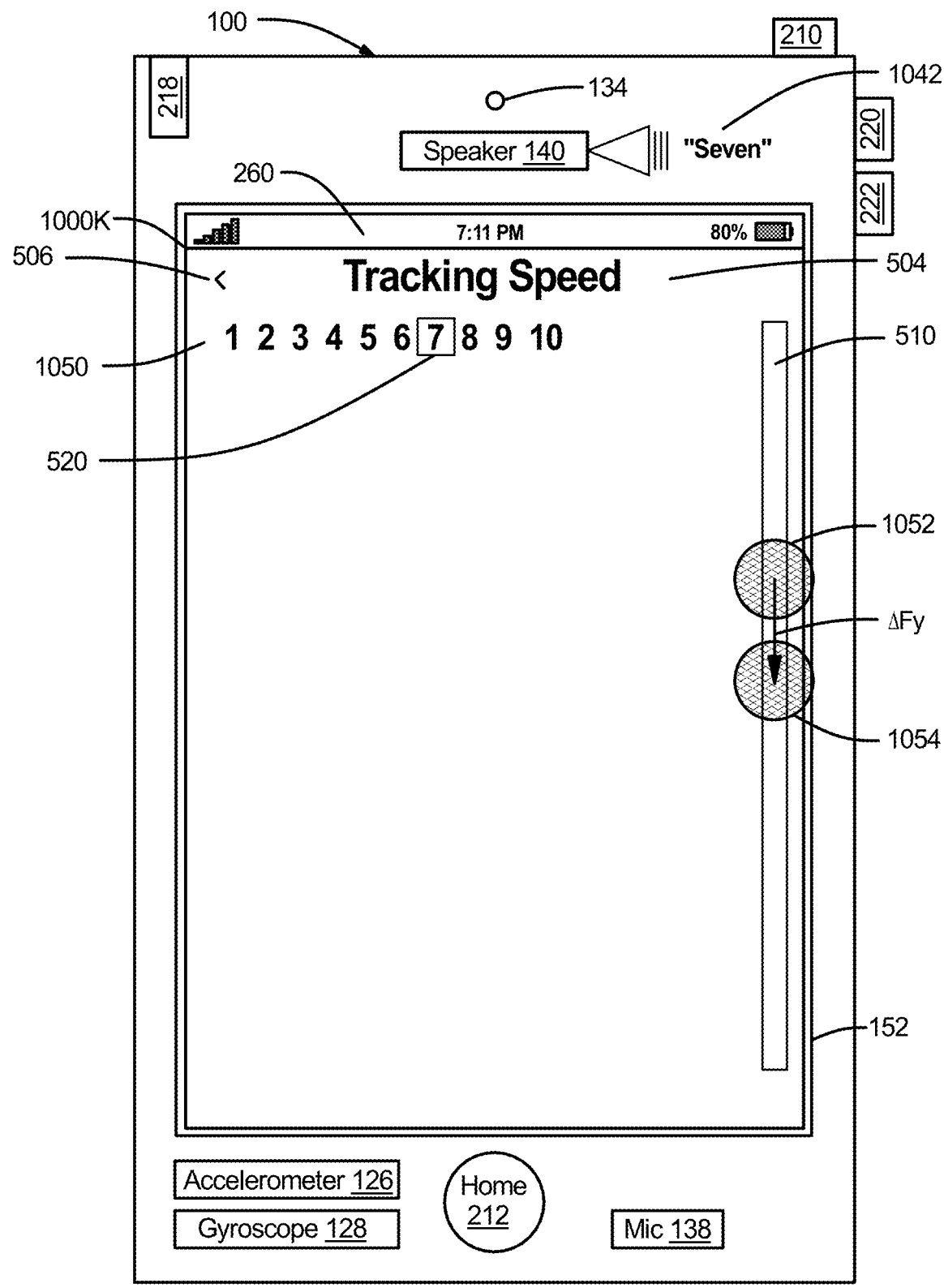
Figure 10L:
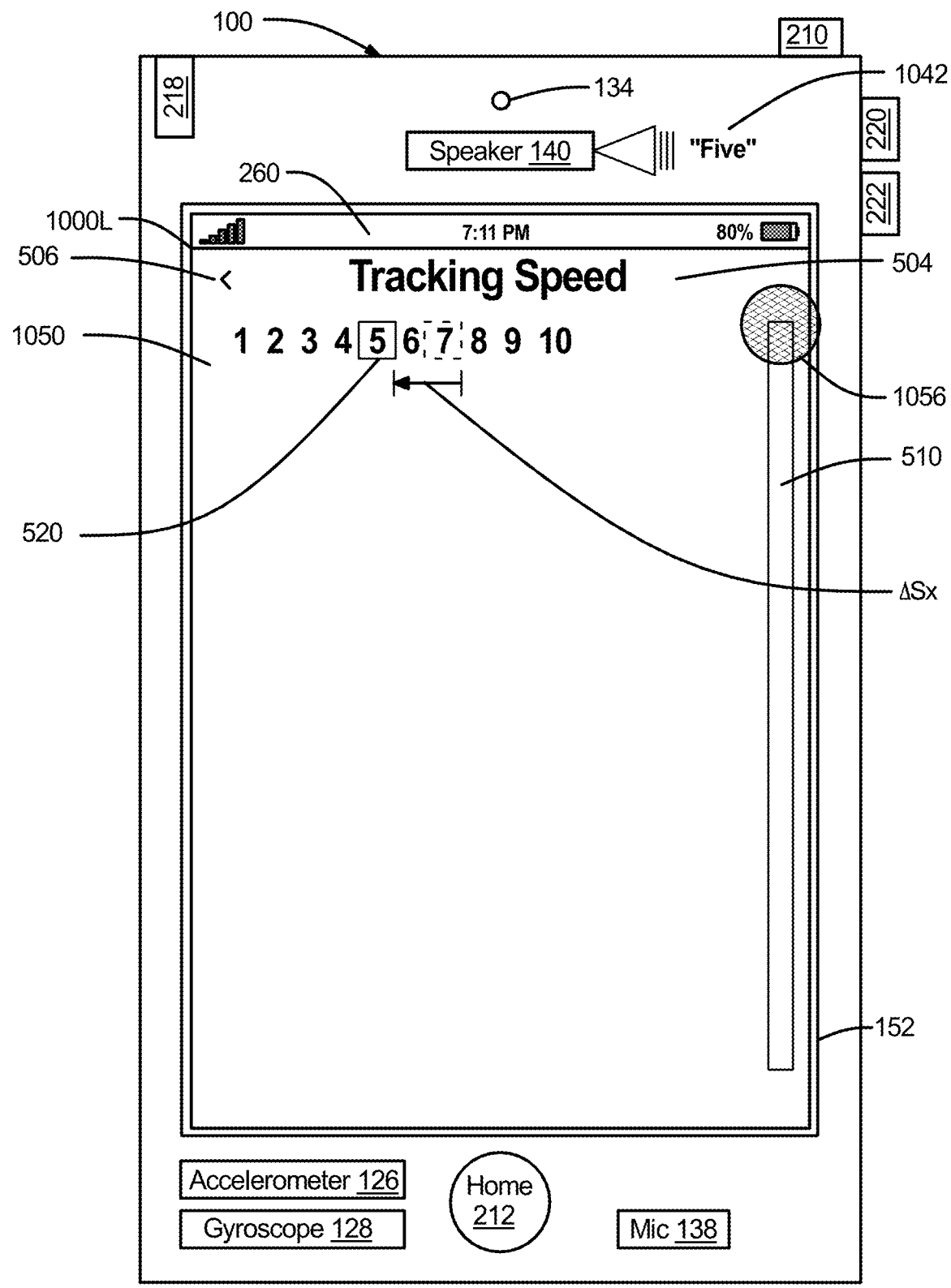

In response to detecting the initial change 1042 in the vertical position of a finger contact beginning anywhere on control icon 510 from 1044 to 1046 (FIG. 10I), the device can change the position of preselection 520 to the item "Tracking Speed" as illustrated in UI 10J (FIG. 10J). A user can perform a select gesture 1048 (a tap gesture for example) on control icon 510. In response to detecting the select gesture on control icon 510, the device selects the item "Tracking Speed" at the position of preselection 520 and displays the child level list of items comprising the items 1, 2, 3, 4, . . . 10 (FIG. 10K) with preselection 520 positioned at the current state "7" for this example. In this example the tracking speed settings are arranged in a row instead of a column as previously illustrated in FIGS. 10C-10C.

In response to detecting a change in the vertical position of a finger contact ΔFy beginning anywhere on control icon 510 from 1052 to 1054 (FIG. 10K), the device changes the position of preselection 520 by an amount ΔSx to the item "5" in the list of tracking speed settings (FIG. 10L) and saves the tracking speed setting value of 5. In this example, K=ΔSx/ΔFy<1.

In response to detecting "up gesture" (a tap gesture 1056 on the top-end of control icon 510 for example), the device can redisplay the prior level list of items 1004 (FIG. 10J). In an alternative embodiment, in response to detecting a select gesture on control icon 510 (a tap gesture for example), the device can display the parent list of items 1004 without waiting for a up gesture.

The multilevel list in this example is a two-level list. The top level is a list of settings categories (Tracking Speed, Speak Preselection) and the bottom level list is the setting value.

Accessibility—Tracking Speed: FIGS. 10A-10D and FIGS. 10J-10L illustrate exemplary user interfaces for a user to select a tracking speed setting. An example set of functions, for different tracking speed setting values of 1, 2, 3, 4, 5, 6, 7, 8, 9, or 10 is shown in FIG. 12.

The tracking speed setting can set the functional dependence of K. A change in a position of an item preselection within a list of items can be K times a change in position of a contact beginning anywhere on the control icon; K can be less than one, equal to one or greater than one. K can be a function of a time rate of change in a position of a contact beginning anywhere on the control icon.

In some embodiments, the change in position of the item preselection ΔS within a list of items can be proportional to a change in position of a finger contact ΔF (a change in position of a contact) on control icon 510. This can be written as ΔS=KΔF. In some embodiments, the value of K can be a function of a time rate of change in position of a finger contact (a time rate of change in position of a contact) on control icon 510.

Figure 12:
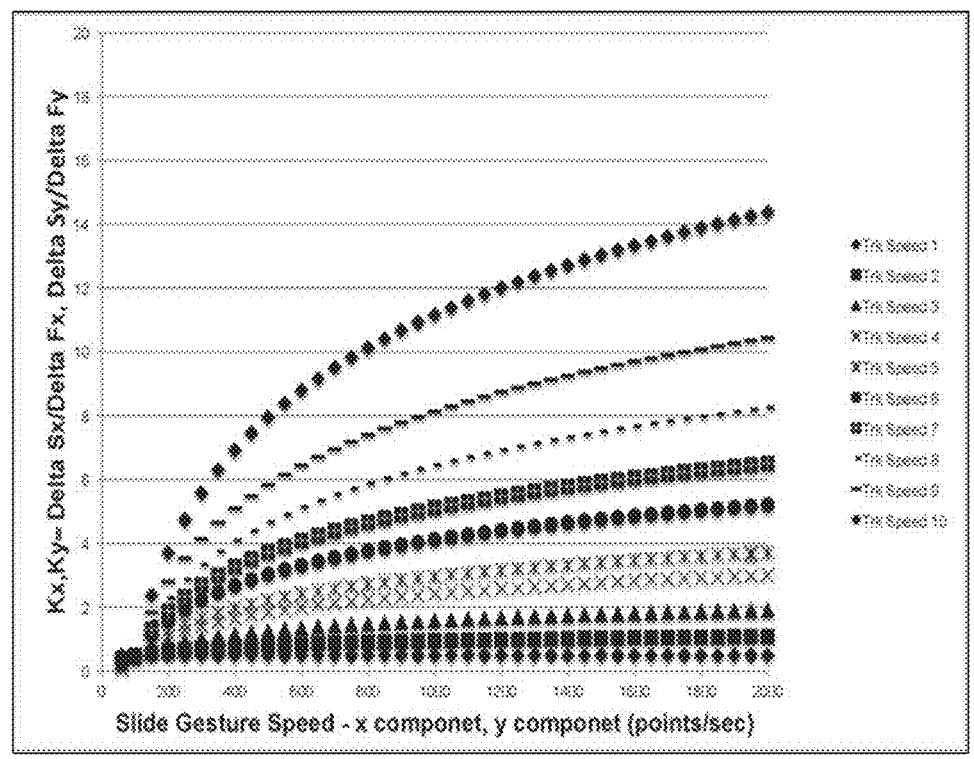
FIG. 12 illustrates an exemplary functional dependence of Kx on the x-component of the slide gesture speed, and Ky on the y-component of the slide gesture speed for slide gestures beginning anywhere on the control icon, for a "tracking speed" setting ranging from of 1 to 10.

An example functional dependence Kx or Ky for 10 different tracking speed settings is illustrated in FIG. 12. In the example shown, with a tracking speed setting of #6, the value of Kx or Ky, or more generally K, can range from about 0.3 to about 4.5 depending upon the time rate of change in position of a finger contact on control icon 510 (slide gesture speed along control icon 510. A user can roughly position the item preselection with K>1 with a high-speed slide gesture on control icon 510 and precisely position the item preselection with K<1 with a low-speed slide gesture on control icon 510.

Accessibility—Speak Preselection: FIGS. 10E-10I illustrates an exemplary user interface for a user to set "speak preselection" "OFF" or "ON." With "Speak Preselection" set to ON, the device can speak the name of the item at the position of the item preselection. Setting "speak preselection" to ON can enable "eyes-off" positioning of an item preselection in a list of items by a sighted, a visually impaired, or a blind user. In one embodiment, the device can speak the name of the item at a position of the item preselection when the preselection is first positioned at an item. In another embodiment, the device can speak the name of the item at a position of the item preselection when the preselection is positioned at an item, and the user lifts contact from control icon 510. In some embodiments, the user can choose the speech speed in a setting, similar to choosing a tracking speed setting, with speed values of 1, 2, 3, 4, 5, 6, 7, 8, 9, or 10 for example.

Accessibility—Preview Preselection: FIG. 10A illustrates an exemplary user interface for a user to set preview preselection setting to "OFF" or "ON." With "preview preselection" set to ON, the device can display or play a preview of the item at the position of preselection. Setting "Preview Preselection" to ON can enable the user to preview an item without opening the item. In one embodiment, the device can preview the item at a position of the item preselection when the preselection is first positioned at an item. In another embodiment, the device can preview the item at a position of the item preselection when the preselection is positioned at an item, and the user lifts contact from control icon 510.

Accessibility—Set Control Icon Display Position: FIG. 10A illustrates an exemplary user interface for a user to set the position of control ion. In the example shown, the user can position control icon 510 at or near the left or right edge of the display. A right-handed user would typically position control icon near the right edge of the display and a left-handed user would typically position control icon near the left edge of the display. In the case of a smart-watch computing device, the user can specify the smart-watch orientation on the user's wrist by selecting whether the home button or crown is on the left or the home button or crown is on the right.

We can see that there can be at least six cases for a vertical control icon, a horizontal control icon, a one-dimensional horizontal list of items, a one-dimensional vertical list of items, and a two-dimensional list of items:

a) a vertical control icon and a vertical one-dimensional list of items b) a vertical control icon and a horizonal one-dimensional list of items c) a vertical control icon and a two-dimensional list of items d) a horizontal control icon and a vertical one-dimensional list of items e) a horizontal control icon and a horizonal one-dimensional list of items f) a horizontal control icon and a two-dimensional list of items In the case of a horizontal control icon or vertical control icon, a slide gesture in one direction beginning any anywhere on the control icon can move the item preselection in one direction in a list of items, and a slide gesture in the opposite direction beginning any anywhere on the control icon and move the item preselection in the opposite direction in a list of items.

We can see that there can be at least three cases for a semi-circular control icon, a one-dimensional vertical list of items, one-dimensional horizontal list of items, and two-dimensional list of items:

a) a semi-circular control icon and a vertical one-dimensional list of items b) a semi-circular control icon and a horizonal one-dimensional list of items c) a semi-circular control icon and a two-dimensional list of items In the case of a semi-circular control icon, a slide gesture in a clockwise direction beginning any anywhere on the control icon can move the item preselection in one direction in a list of items, and a slide gesture in a counterclockwise direction beginning any anywhere on the control icon can move the item preselection in the opposite direction in a list of items. A tap on one end of the control icon can be defined as an "up" navigation gesture for displaying a parent list of items, and a tap on the opposite end of the control icon can be defined as an "option" gesture for displaying an option list of items.

Figure 11A:
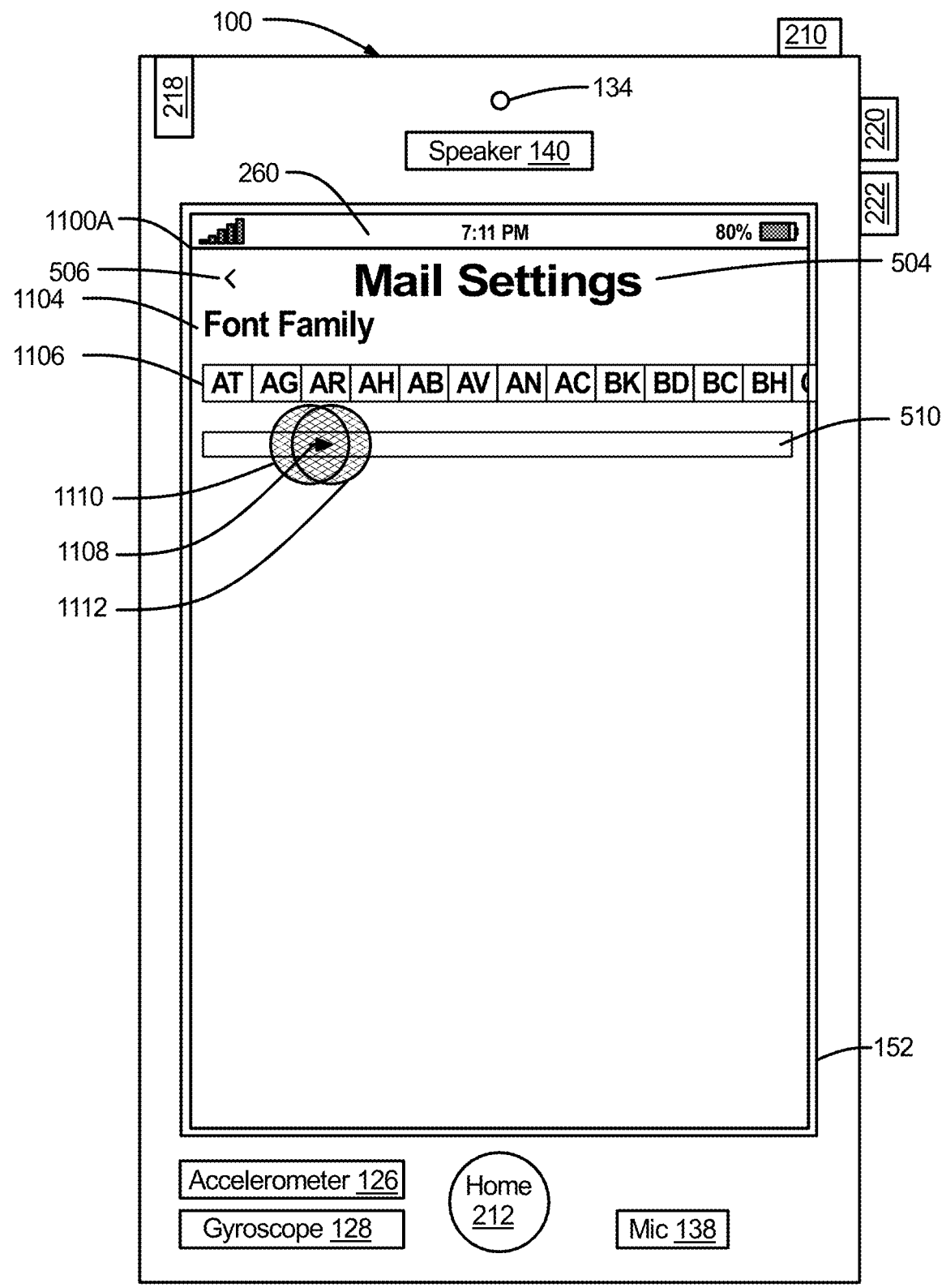
FIGS. 11A-11F illustrate an exemplary user interface and method for displaying an item preselection in a list of items, changing the position of an item preselection in a list of items, and selecting an item in a horizontal list of font attribute items for an application on a smart-phone mobile computing device with a touch-sensitive display, in accordance with some embodiments.
Figure 11B:
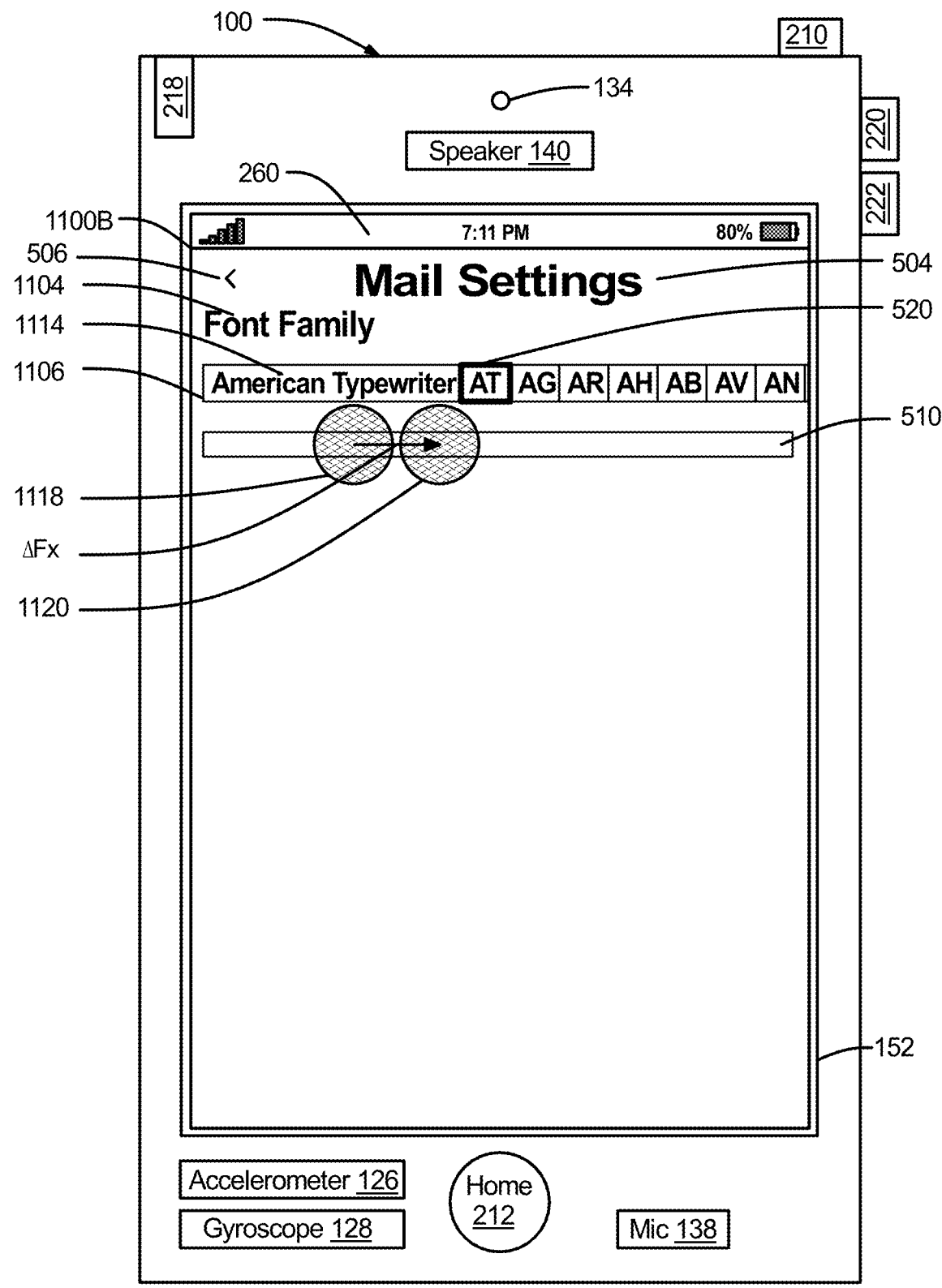
Figure 11C:
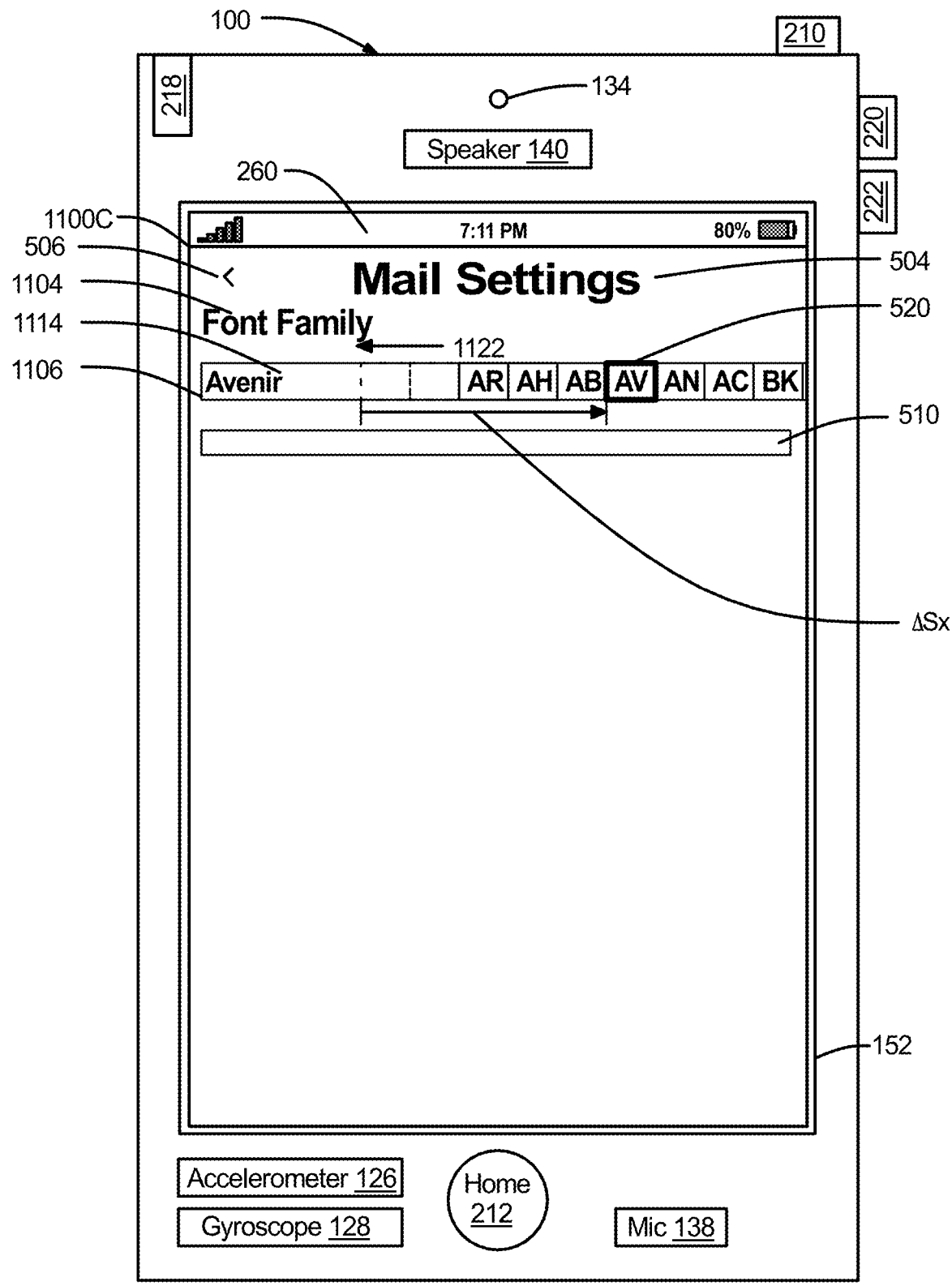

FIGS. 11A-11F illustrate an exemplary user interface and method for displaying an item preselection in a list of items, changing the position of an item preselection in a list of items, and selecting an item in a horizontal list of font attribute items for an application on a smart-phone mobile computing device with a touch-sensitive display, in accordance with some embodiments. In this example control icon 510 is a horizontal line or thin rectangle displayed on the touch-sensitive display FIGS. 11A-11C illustrates displaying an item preselection in a font family attribute list of items, changing the position of an item preselection in a font family attribute list of items, and applying to a content selection in editable text content, the font family attribute at the position of an item preselection in the font family attribute list of items. In response to detecting an initial change 1108 in the horizontal position of a finger contact from 1110 to 1112 (FIG. 11A), the device can display item preselection 520 at the first item "AT" in the list of items 1106 comprising a list of font families (FIG. 11B). In this example, the items are listed in a row. The items can be listed compactly using a two-letter abbreviation for each font family as illustrated in FIGS. 11A-11C. The device can also display the full name 1114 of the item "AT" at the position of preselection 520 (FIG. 11B). In this example, the full name of font family item "AT" is "American Typewriter." In response to detecting an additional change in the horizontal position of a finger contact from 1118 to 1120 (FIG. 11B), the device can change the position of preselection 520 to the item "AV" and display the full name of the item "Avenir" illustrated in UI 1100C (FIG. 11C), and save the value "Avenir" for the font family setting. The horizontal list of items 1106 can exceed the width of the viewing window in the UI and auto-scroll left or right as the item preselection is moved toward the right or left boundary. The list of font families could comprise an alphabetically ordered list of 50 to 100 font families where a modest number of items, comprising two-letter font family abbreviations, are visible within the width of the viewing window. In this example, the list has auto-scrolled left as denoted by the arrow 1122 as preselection 520 is moved to the item "AV".

Figure 11D:
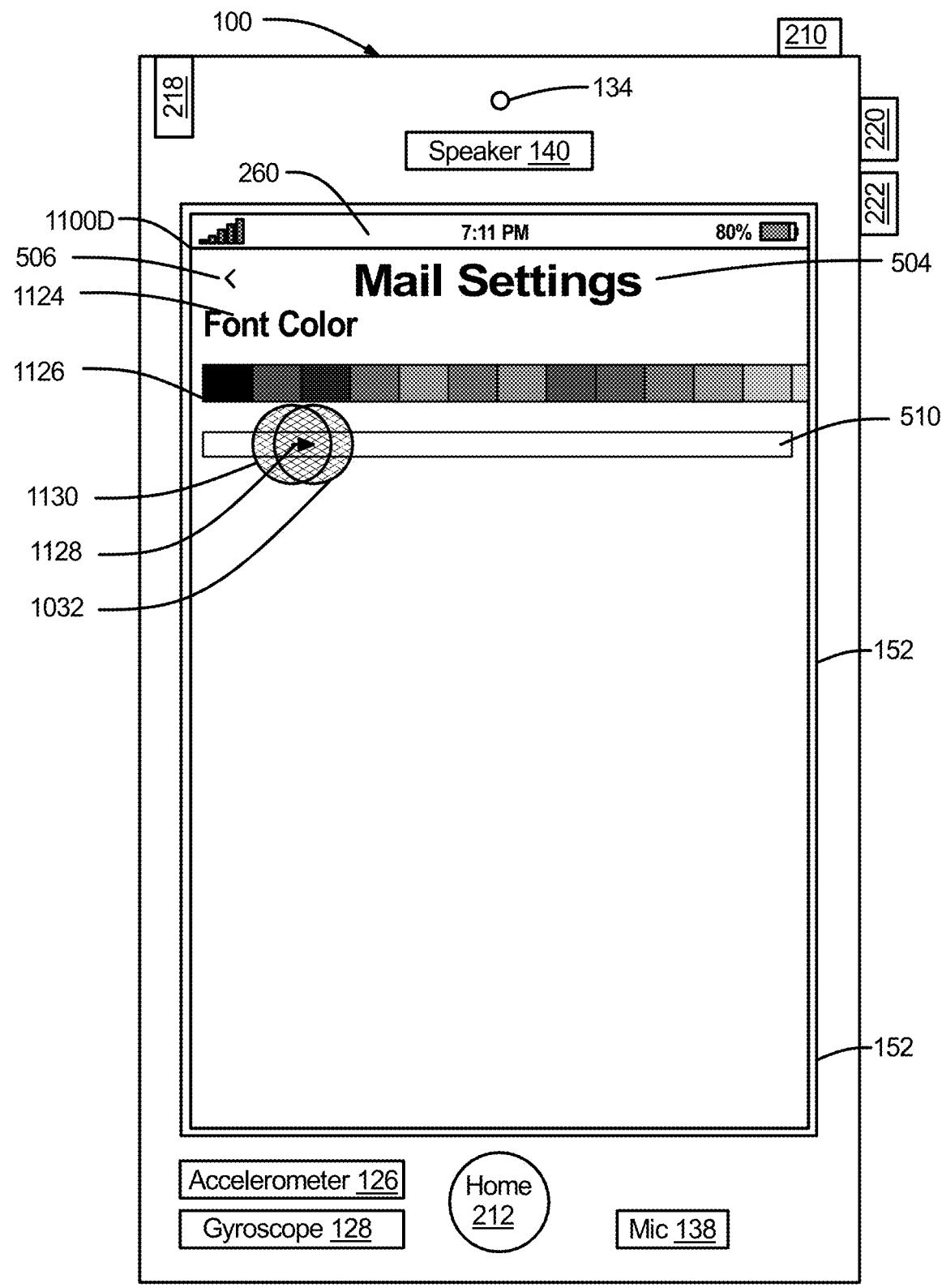
Figure 11E:
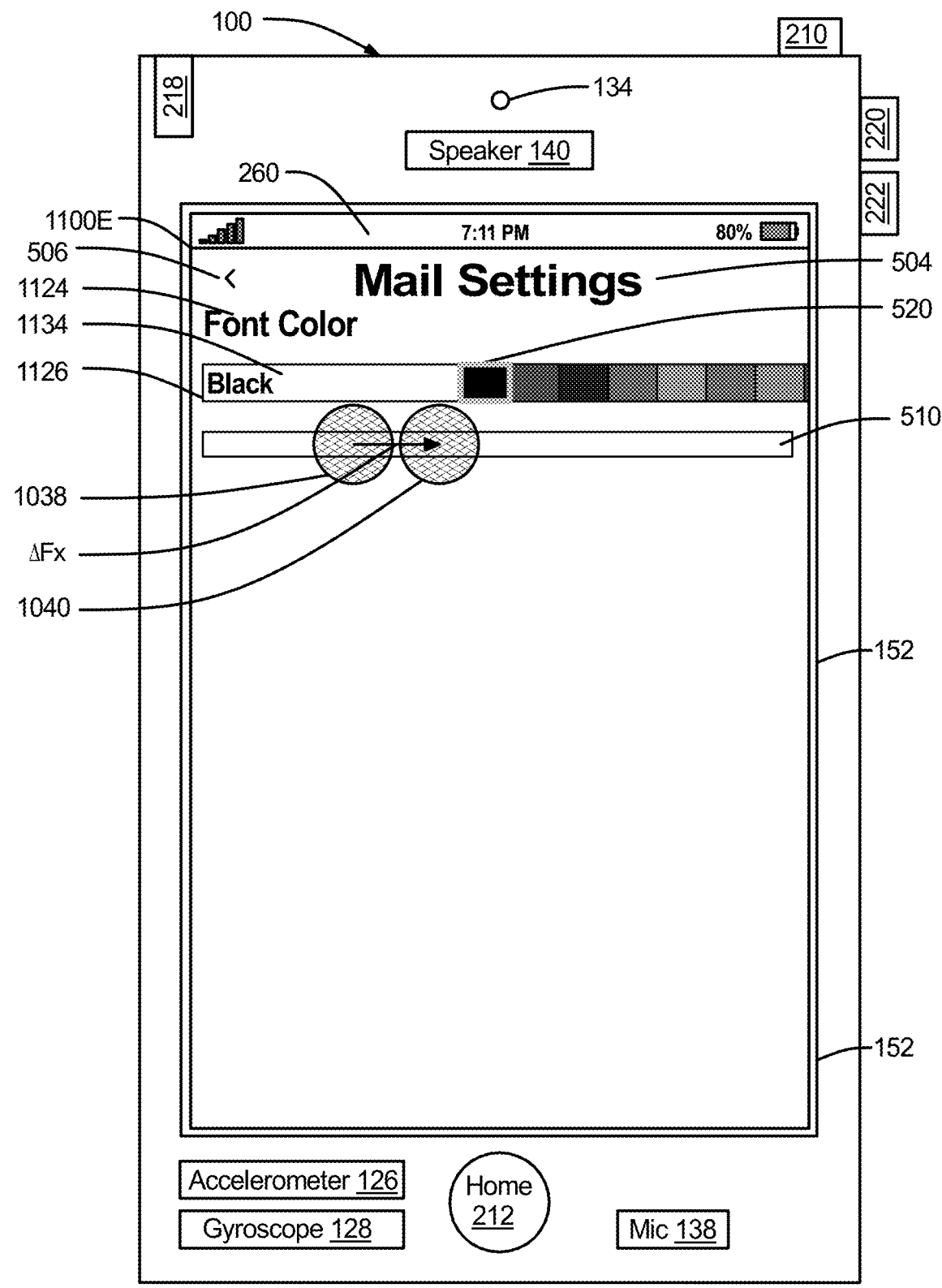
Figure 11F:
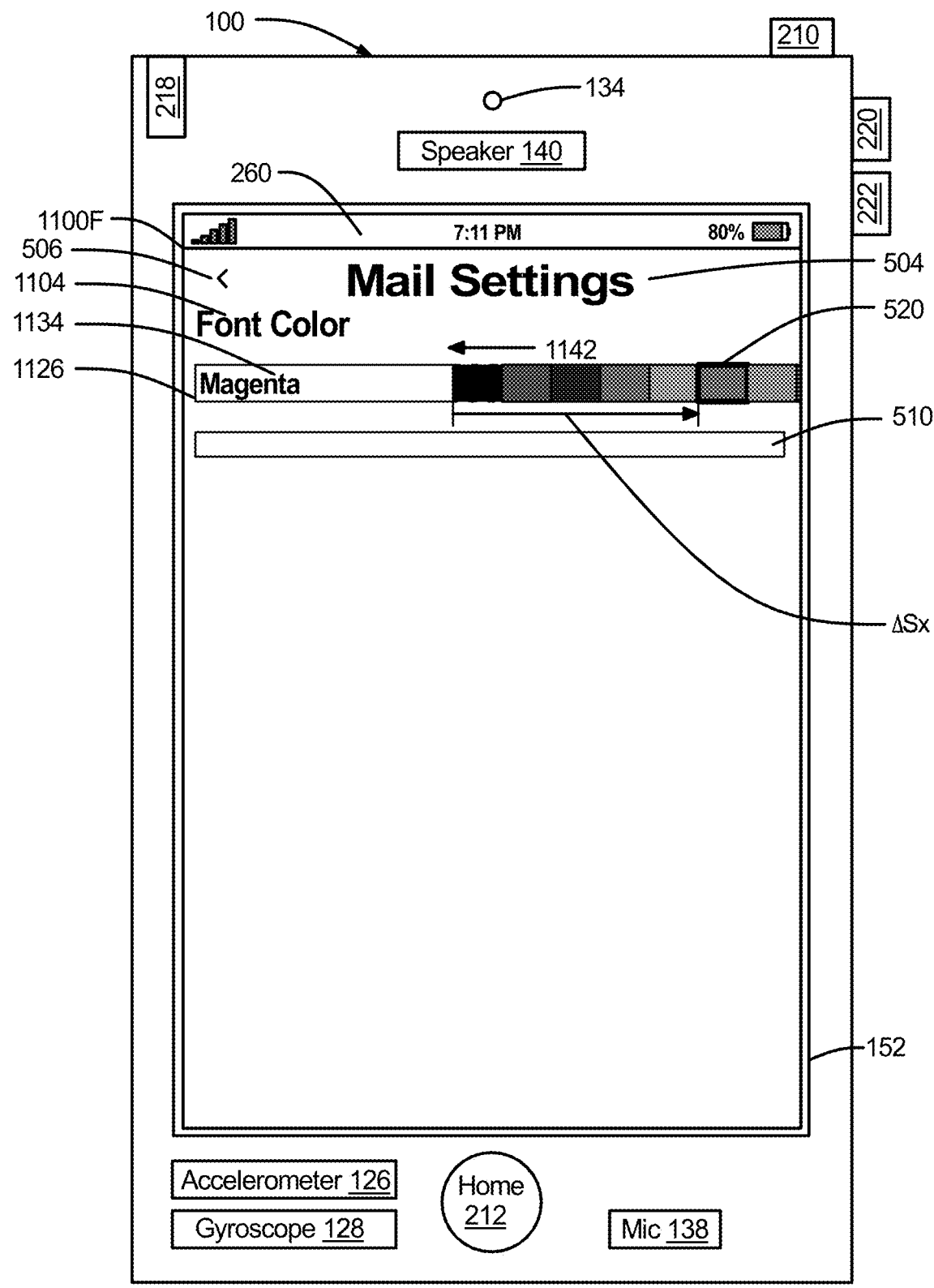

FIGS. 11D-11F illustrate this for displaying an item preselection in a font color attribute list of items, changing the position of an item preselection in a font color attribute list of items, and applying to a content selection in editable text content the font color attribute at the position of the item preselection. In response to detecting the initial change 1128 in the horizontal position of a finger contact from 1130 to 1132 (FIG. 11D), the device can display preselection 520 at the first item "black color square" in the list 1134 comprising a font color list of items (FIG. 11D). In this example, the items are listed in horizontal row. The items can be listed compactly using a color square for each font family as illustrated in FIGS. 11D-11F. The device can also display the full name 1124 of the color square at the position of preselection 520 (FIG. 11E). In this example, the full name of the item is "Black." In response to detecting an additional change in the horizontal position of a finger contact from 1138 to 1140 (FIG. 11E), the device can change the position of preselection 520 to the Magenta color square, and save the value "Magenta" for the font color setting, and display the full name "Magenta" as illustrated in UI 1100F (FIG. 11F). As in the previous example, the horizontal list of items 1126 can exceed the width of the viewing window in the UI, and the device can auto-scroll the list left or right as the item preselection is moved toward the right or left boundary. The list of font colors could comprise, for example, an ordered list of 48 standard crayon colors for the font color where a modest number of items (seven items in this example) comprising a color sample square are visible within the width of the viewing window. In this example, the list has auto-scrolled left as denoted by the arrow 1142 as preselection 520 is moved to the Magenta color square item.

In the example embodiments illustrated in FIGS. 11A-11F, the control icon is oriented horizontally, and a change in position of the finger contact on the control icon is in the horizontal (x) direction, and a change in a position of item preselection 520 is in the horizontal (x) direction. A change in the position $\Delta Sx$ of preselection 520, can be proportional to a change in position $\Delta Fx$ of a finger contact. This can be written as $\Delta Sx = Kx \Delta Fx$.

Accessibility Example—Set Tracking Speed Functions: As described above in reference to FIGS. 10A-10D and FIGS. 10J-10L, the tracking speed can be set to any number from #1 to #10. The tracking speed setting can set, for this example, the functional dependence of Kx on the x-component of the slide gesture speed for a finger contact on a horizontally oriented control icon 510. In other examples, the tracking speed setting can set the functional dependence of Ky on the y-component of the slide gesture speed for a finger contact on a vertically oriented control icon 510.

FIG. 12 illustrates an exemplary functional dependence of Kx on the x-component of the slide gesture speed, and Ky on the y-component of the slide gesture speed for slide gestures beginning anywhere on the control icon, for a "tracking speed" setting ranging from of 1 to 10. In the example shown, with a tracking speed setting of #6, the value of Kx or Ky can range from about 0.3 to about 4.5 depending upon the slide gesture speed (the time rate of change in position of a finger contact) along control icon 510. Accordingly, the user can roughly position the item preselection with K>1 with a high speed slide gesture on control icon 510 and the user can then precisely position the item preselection with K<1 with a low speed slide gesture on control icon 510.

Figure 13:
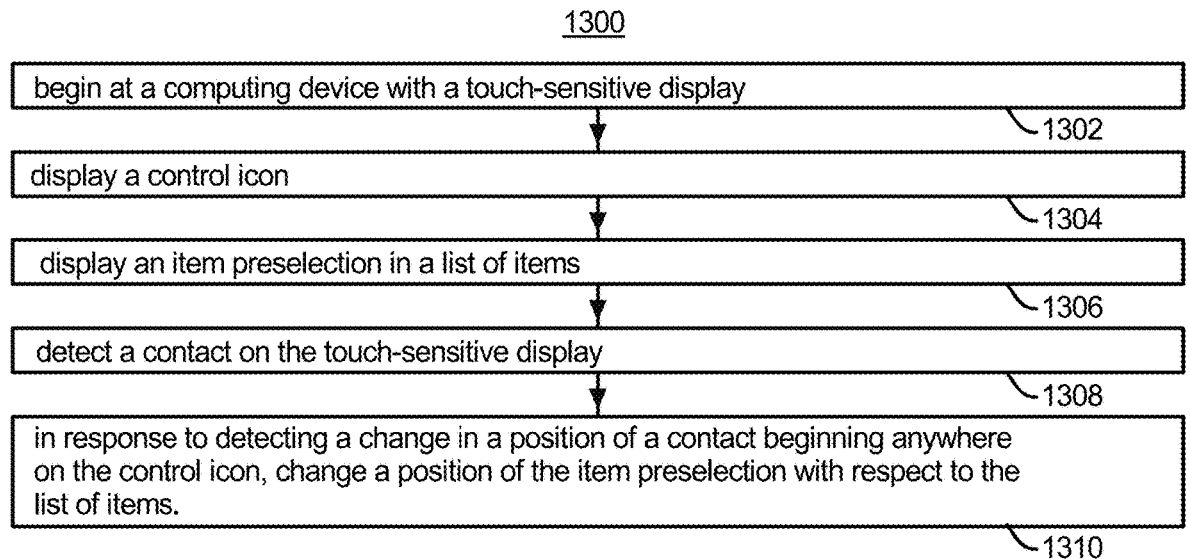
FIG. 13 is a flow diagram illustrating a method for positioning an item preselection in a list of items on a computing device with a touch-sensitive display in accordance with some embodiments.

FIG. 13 is a flow diagram illustrating a method for positioning an item preselection in a list of items on a computing device with a touch-sensitive display in accordance with some embodiments.

FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L, illustrate exemplary user interfaces for implementing the methods presented in the flow diagram shown in FIG. 13.

Figure 14:
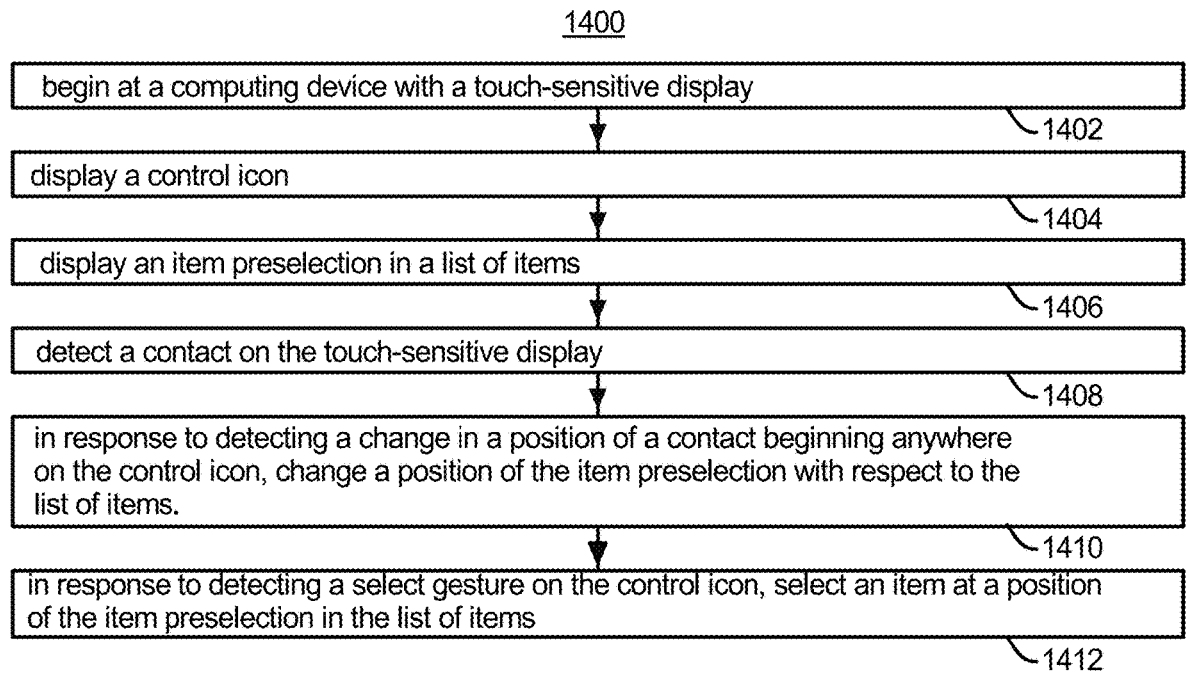
FIG. 14 is a flow diagram illustrating a method for positioning an item preselection in a list of items and selecting an item at the position of the item preselection in a list of items on a computing device with a touch-sensitive display in accordance with some embodiments.

FIG. 14 is a flow diagram illustrating a method for positioning an item preselection in a list of items and selecting an item at the position of the item preselection in a list of items on a computing device with a touch-sensitive display in accordance with some embodiments. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 14.

Figure 15:
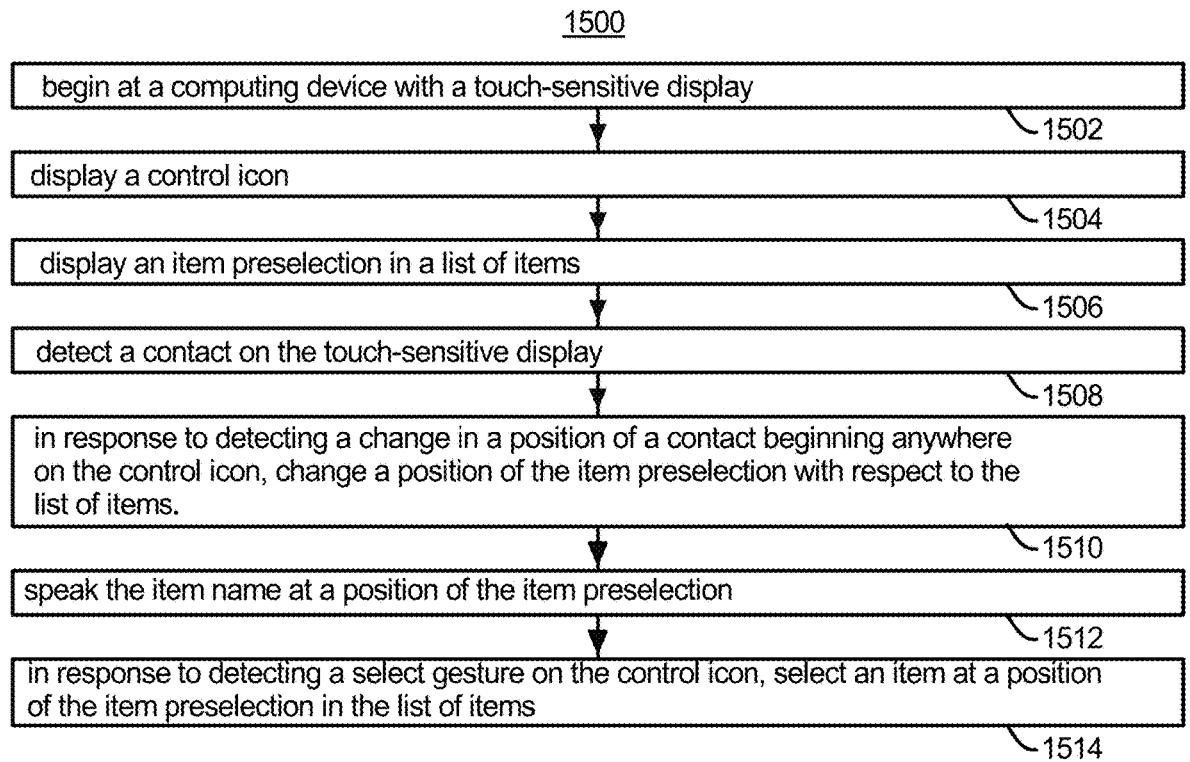
FIG. 15 is a flow diagram illustrating a method for positioning an item preselection in a list of items and selecting an item at the position of the item preselection in a list of items on a computing device with a touch-sensitive display in accordance with some embodiments. The method includes speaking the item name at the position of the item preselection for eyes off positioning of the item preselection.

FIG. 15 is a flow diagram illustrating a method for positioning an item preselection in a list of items and selecting an item at the position of the item preselection in a list of items on a computing device with a touch-sensitive display in accordance with some embodiments. The method includes speaking the item name at the position of the item preselection for eyes off positioning of the item preselection. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 15.

Figure 16:
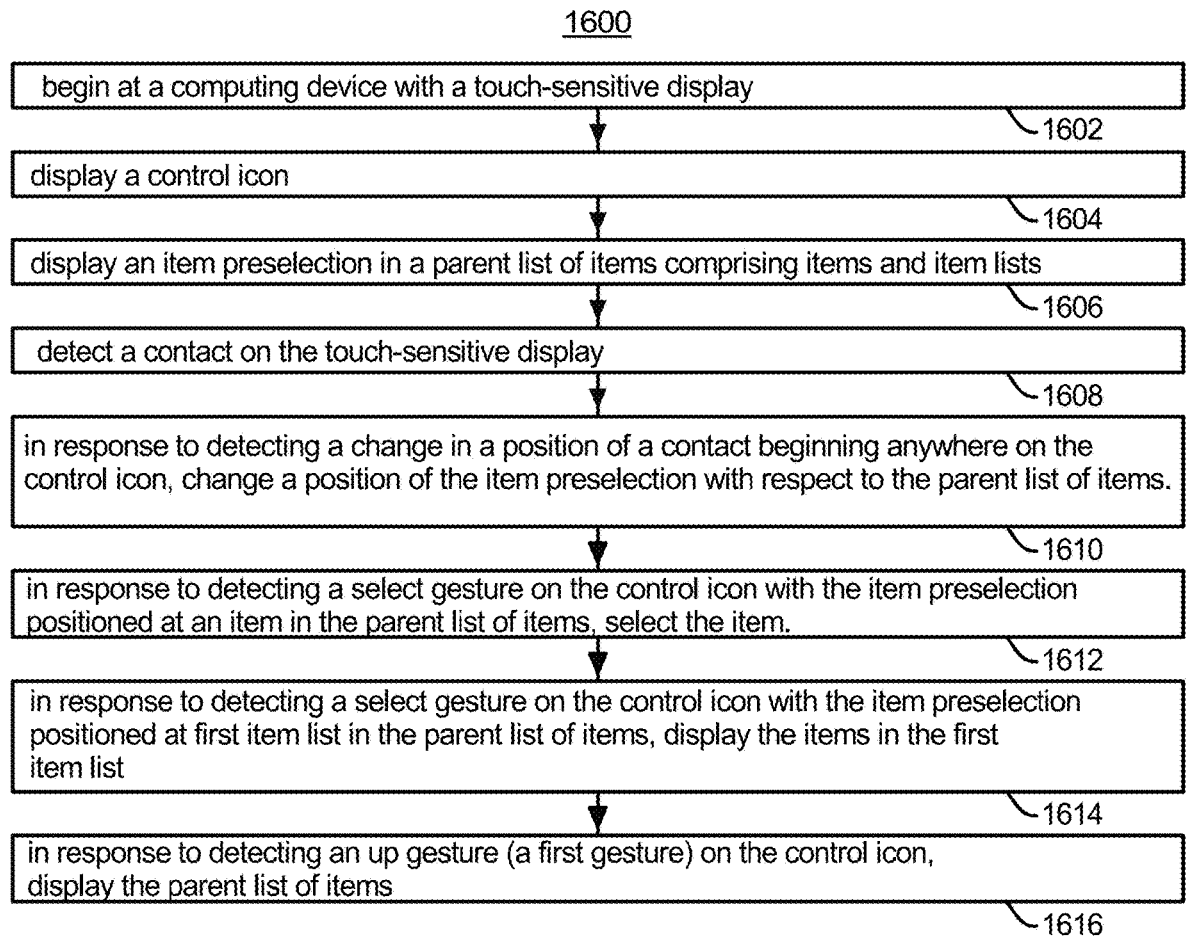
FIG. 16 is a flow diagram illustrating a method for positioning an item preselection in a list of items and selecting an item at the position of the item preselection in a list of items within a hierarchically organized list of items on a computing device with a touch-sensitive display in accordance with some embodiments.

FIG. 16 is a flow diagram illustrating a method for positioning an item preselection in a list of items and selecting an item at the position of the item preselection in a list of items within a hierarchically organized list of items on a computing device with a touch-sensitive display in accordance with some embodiments. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 16.

Figure 17:
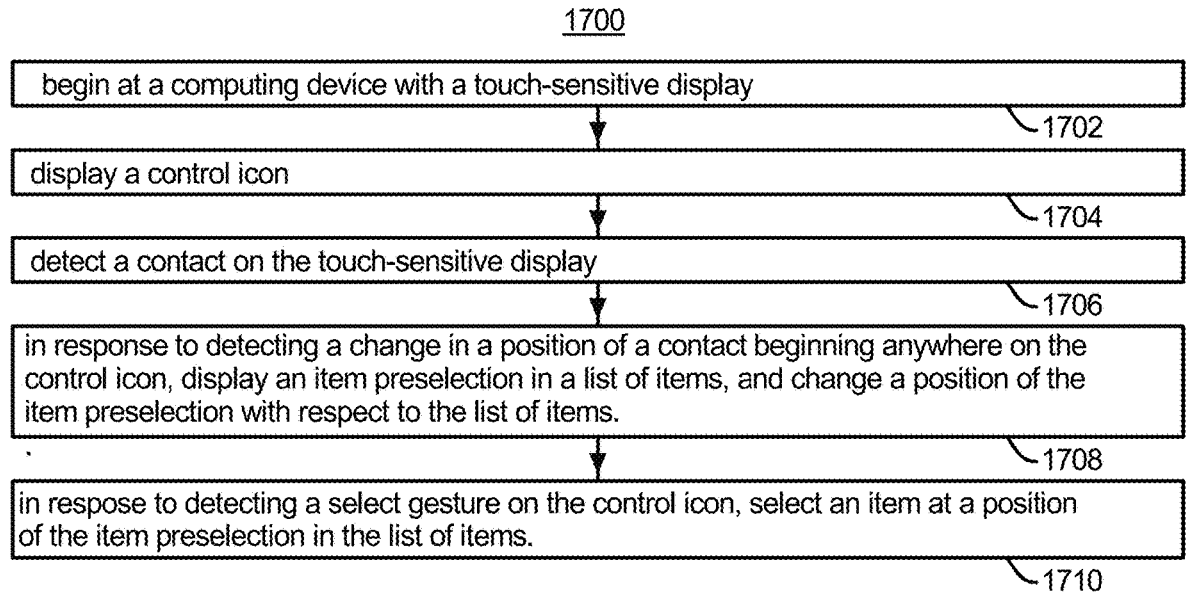
FIG. 17 is a flow diagram illustrating a method for positioning an item preselection in a list of items and selecting an item at the position of the item preselection in a list of items on a computing device with a touch-sensitive display in accordance with some embodiments. The method includes in response to detecting a change in a position of a finger contact on the control icon, displaying an item preselection in a list of items, and changing a position of the item preselection in the list of items.

FIG. 17 is a flow diagram illustrating a method for positioning an item preselection in a list of items and selecting an item at the position of the item preselection in a list of items on a computing device with a touch-sensitive display in accordance with some embodiments. The method includes in response to detecting a change in a position of a finger contact on the control icon, displaying an item preselection in a list of items, and changing a position of the item preselection in the list of items. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 1

Figure 18:
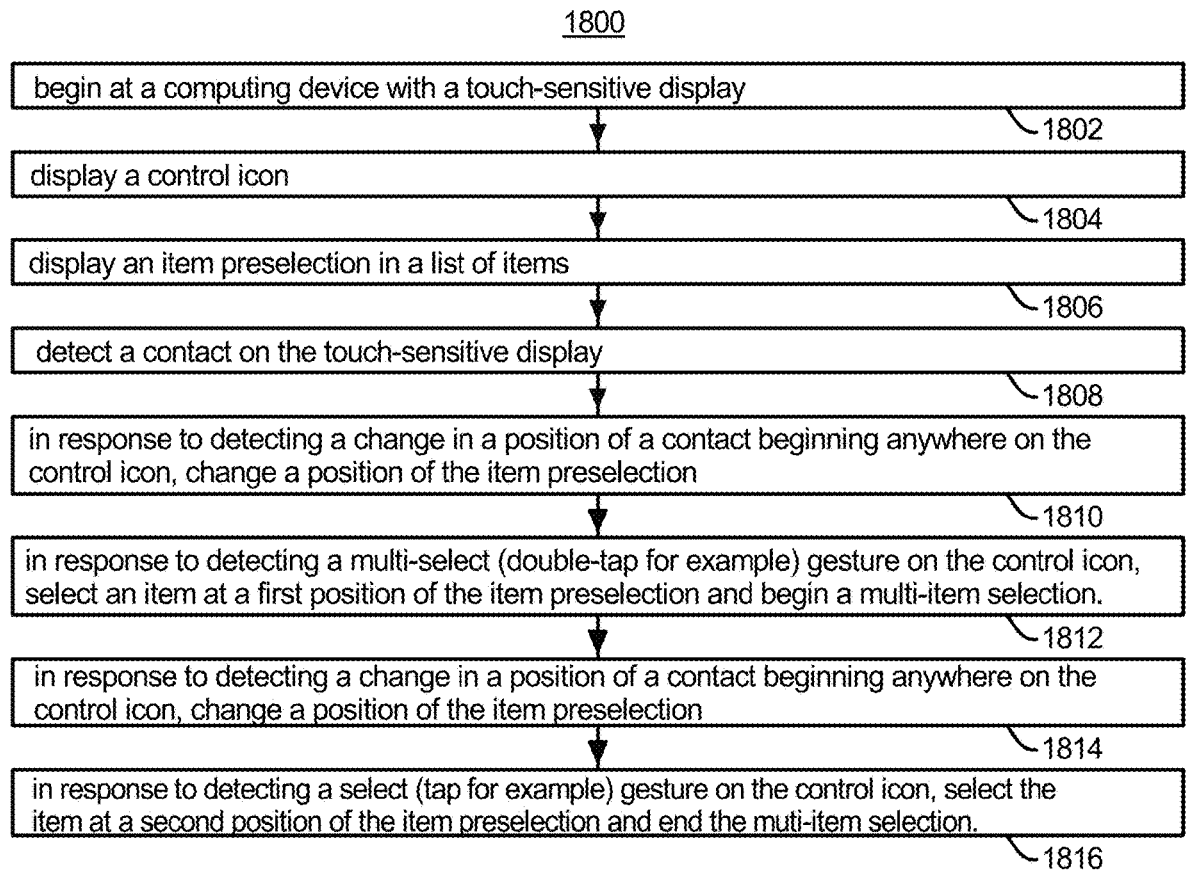
FIG. 18 is a flow diagram illustrating a method for positioning an item preselection in a list of items and selecting an item at the position of the item preselection in a list of items on a computing device with a touch-sensitive display in accordance with some embodiments. The method includes selecting more than one or more items in a list of items.

FIG. 18 is a flow diagram illustrating a method for positioning an item preselection in a list of items and selecting an item at the position of the item preselection in a list of items on a computing device with a touch-sensitive display in accordance with some embodiments. The method includes selecting more than one or more items in a list of items. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 18.

Figure 19:
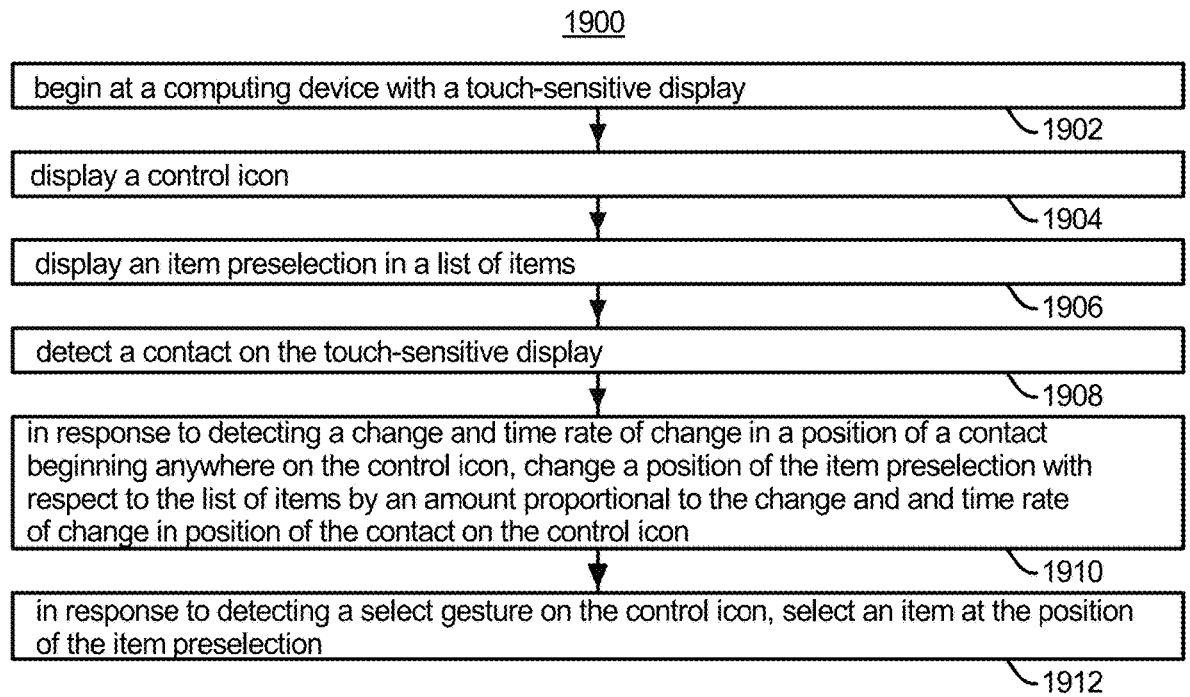
FIG. 19 is a flow diagram illustrating a method for positioning an item preselection in a list of items and selecting an item at the position of the item preselection in a list of items on a computing device with a touch-sensitive display in accordance with some embodiments. The method includes in response to detecting a change and time rate of change in a position of a contact on a control icon, changing a position of an item preselection with respect to the list of items by an amount proportional to the change and time rate of change in position of the finger contact on the control icon.

FIG. 19 is a flow diagram illustrating a method for positioning an item preselection in a list of items and selecting an item at the position of the item preselection in a list of items on a computing device with a touch-sensitive display in accordance with some embodiments. The method includes in response to detecting a change and time rate of change in a position of a contact on a control icon, changing a position of an item preselection with respect to the list of items by an amount proportional to the change and time rate of change in position of the finger contact on the control icon. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 19.

Figure 20:
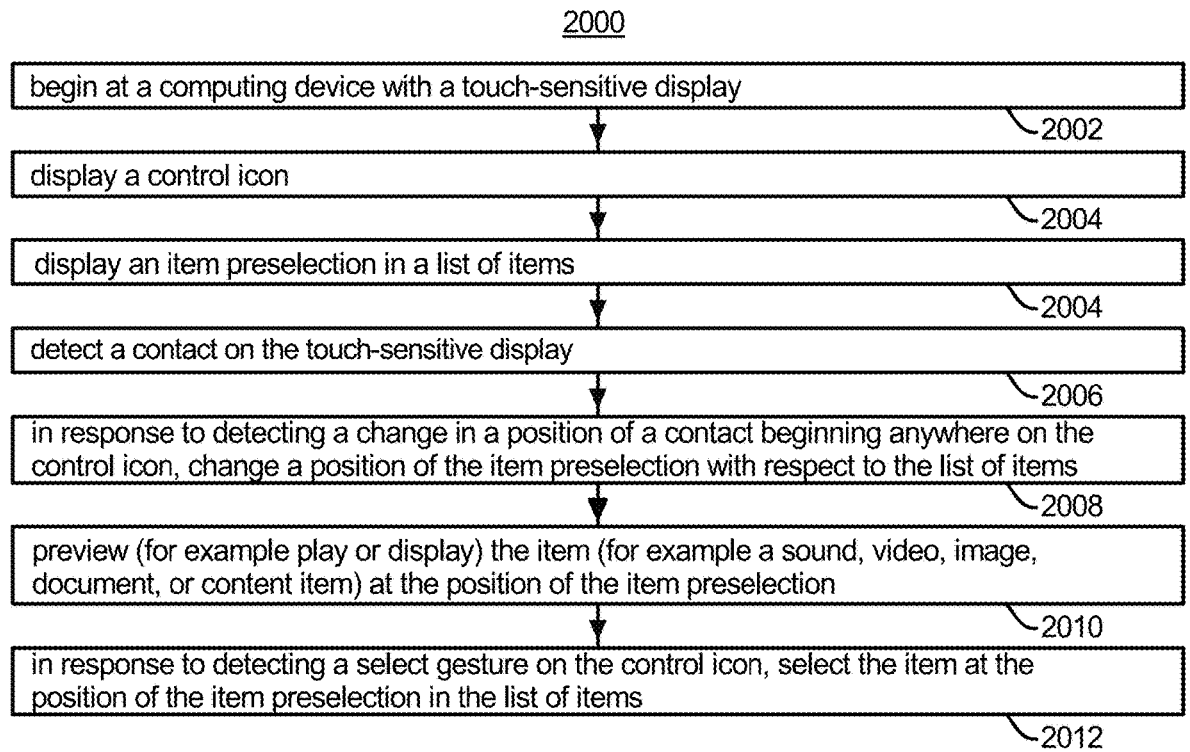
FIG. 20 is a flow diagram illustrating a method for positioning an item preselection in a list of items and selecting an item at the position of the item preselection in a list of items on a computing device with a touch-sensitive display in accordance with some embodiments. The method includes previewing (for example playing or displaying) the item (for example a sound, music, video, image, file, document, or content item) at the position of the item preselection.

FIG. 20 is a flow diagram illustrating a method for positioning an item preselection in a list of items and selecting an item at the position of the item preselection in a list of items on a computing device with a touch-sensitive display in accordance with some embodiments. The method includes previewing (for example playing or displaying) the item (for example a sound, music, video, image, file, document, or content item) at the position of the item preselection. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 20.

Figure 21A:
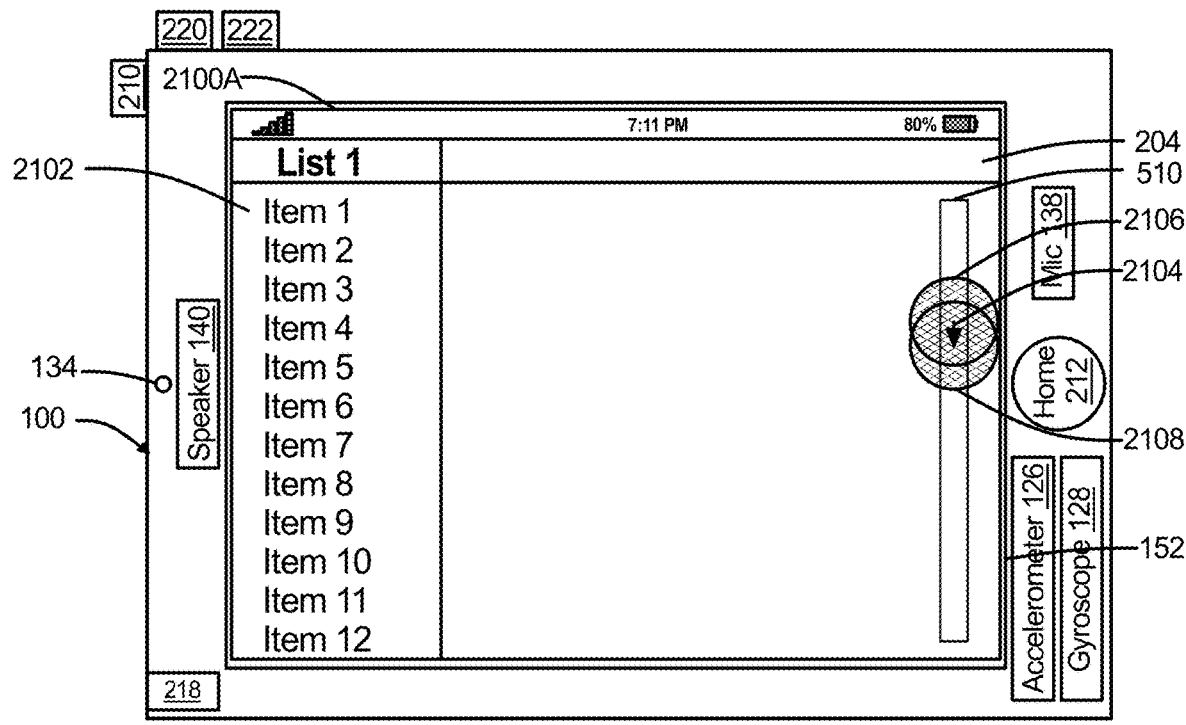
FIGS. 21A-21G illustrate an exemplary user interface and method for positioning an item preselection in a list of items on a computing device with a touch-sensitive display in accordance with some embodiments. The method includes in response to displaying an item preselection at a content item in a list of content items, displaying a preview of the content item.
Figure 21B:
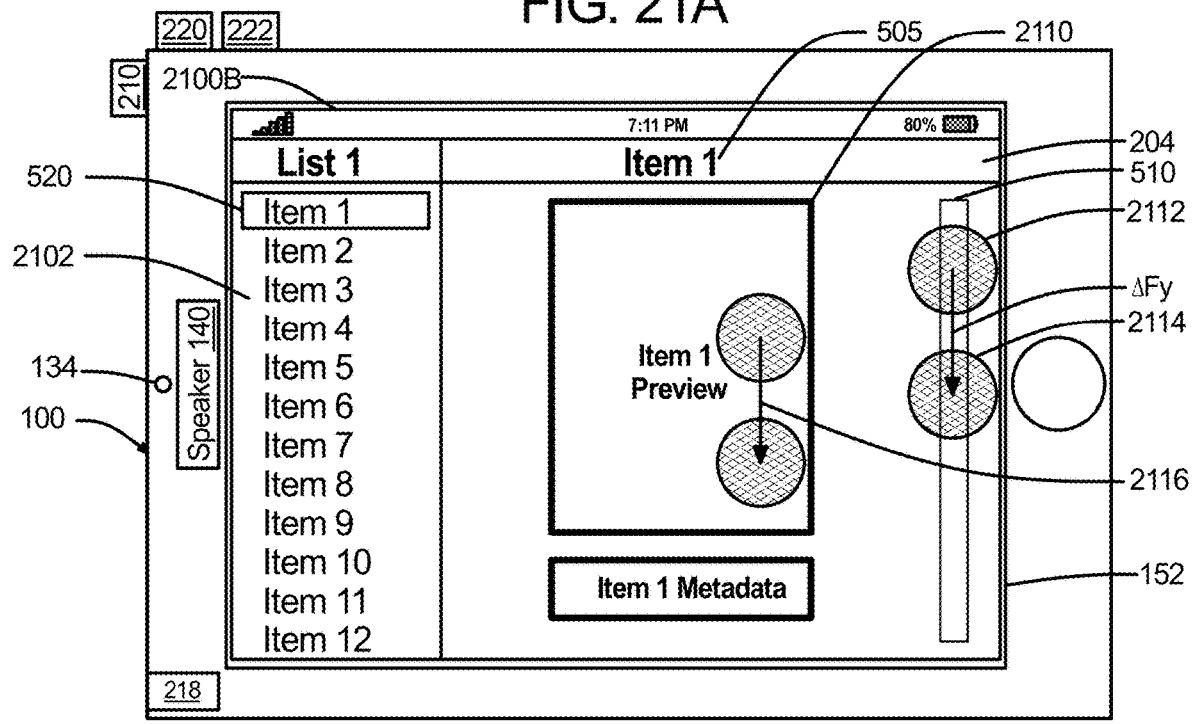
Figure 21C:
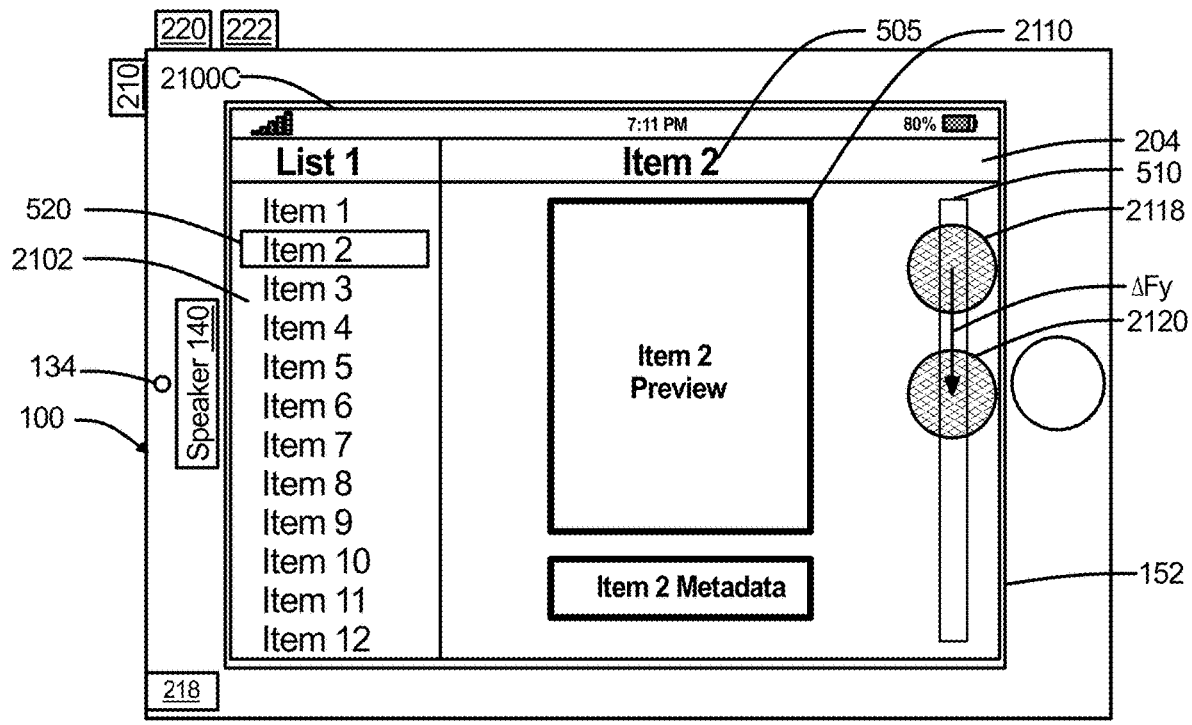

FIGS. 21A-21G illustrate an exemplary user interface and method for positioning an item preselection in a list of items on a computing device with a touch-sensitive display in accordance with some embodiments. The method includes in response to displaying an item preselection at a content item name in a list of content item names, displaying a preview of the content item. In this example control icon 510 is a vertical line or thin vertical rectangle displayed near an edge of the touch-sensitive display A user can perform a vertical slide finger gesture beginning anywhere on control icon 510 as illustrated in UI 2100A, UI 2100B, and UI 2100C (FIG. 21A, FIG. 21B, and FIG. 21C). In response to detecting the initial change 2104 in the vertical position of a finger contact from 2106 to 2108 (FIG. 21A), the device can display preselection 520 at the first item "Item 1" in the list of items 2102 and display a preview of Item 1 in viewing area 2110 (FIG. 21B).

In response to detecting an additional change in the vertical position of a finger contact ΔFy, beginning anywhere on control icon 510 from 2112 to 2114 (FIG. 21B), the device can change the position of preselection 520 by an amount ΔSy to the item "Item 2" and display a preview of Item 2 in viewing area 2110 (FIG. 21C).

Figure 21D:
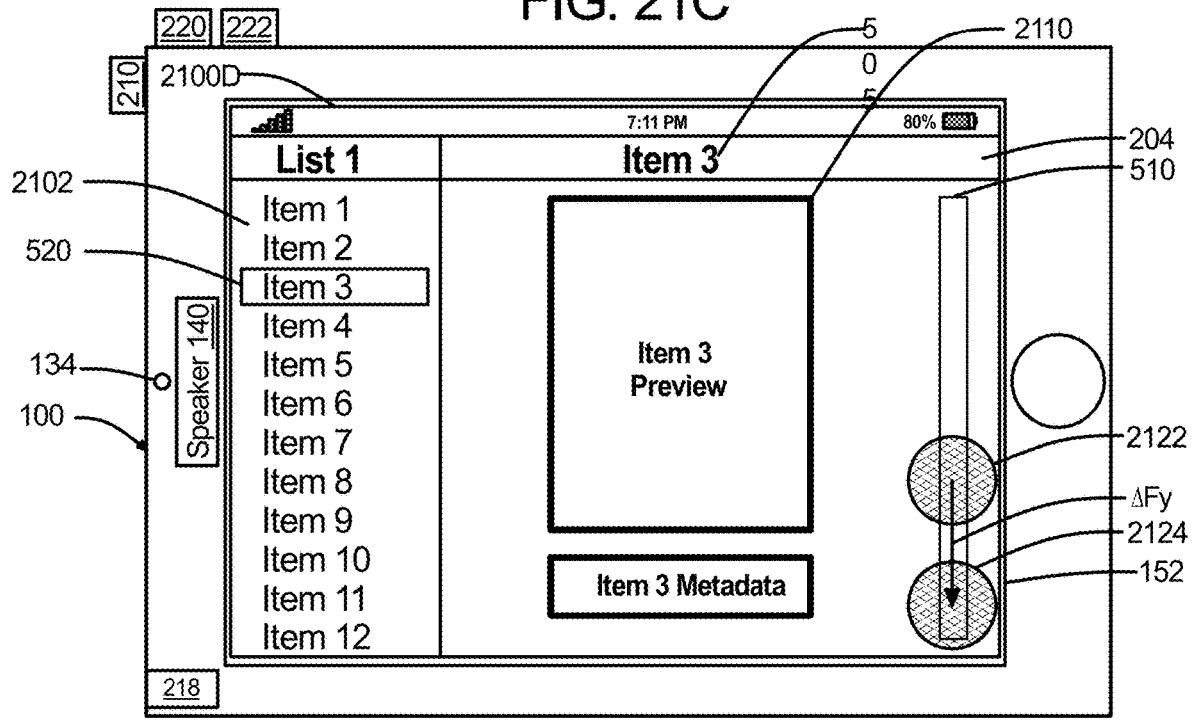

In response to detecting an additional change in the vertical position of a finger contact ΔFy, beginning anywhere on control icon 510 from 2118 to 2120 (FIG. 21C), the device can change the position of preselection 520 by an amount ΔSy to the item "Item 3", and display a preview of Item 3 in viewing area 2110 (FIG. 21D).

Figure 21E:
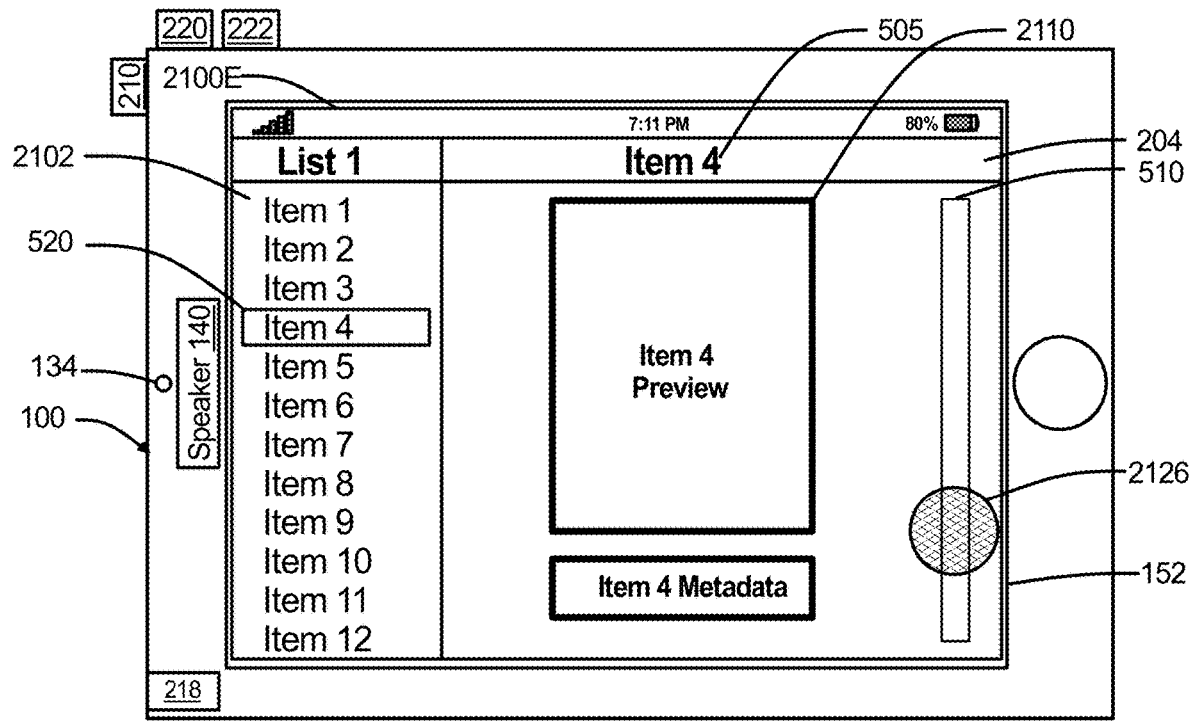
Figure 21F:
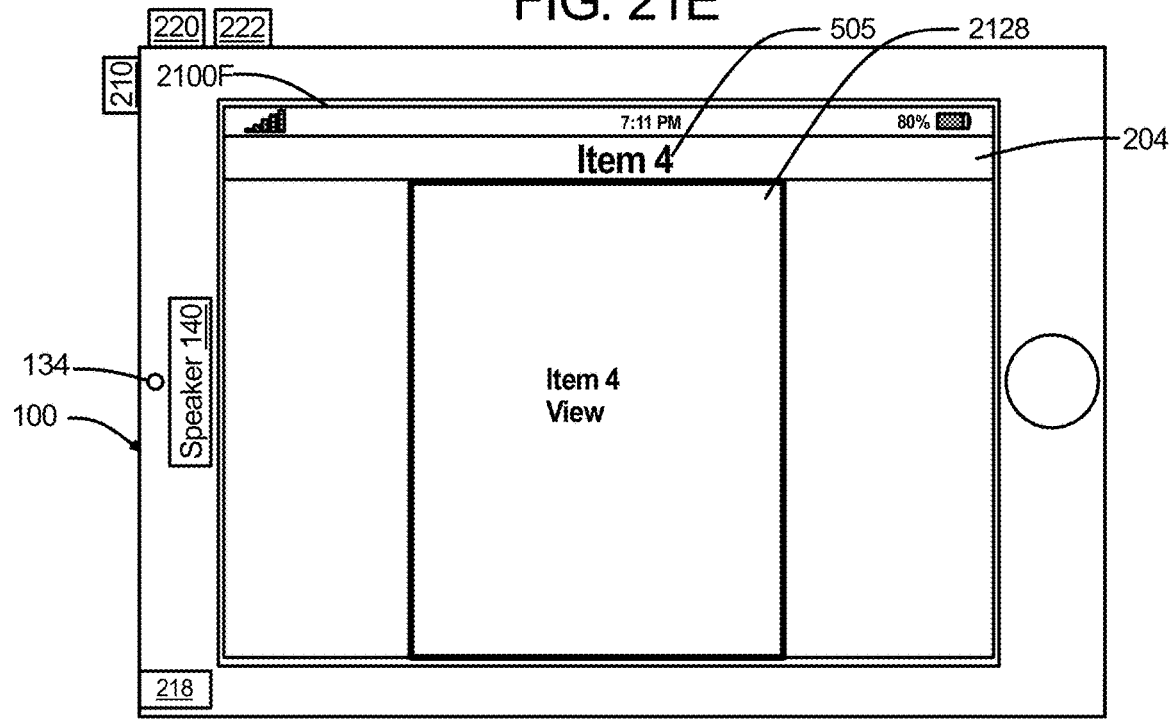

In response to detecting an additional change in the vertical position of a finger contact ΔFy, beginning anywhere on control icon 510 from 2122 to 2124 (FIG. 21D), the device can change the position of preselection 520 by an amount ΔSy to the item "Item 4", and display a preview of Item 4 in viewing area 2110 (FIG. 21E).

With preview preselection enabled, when an item preselection is displayed at an item, a preview of the item at the position of the item preselection can be displayed as illustrated in FIGS. 21B, 21C, 21D, and 21E. Accordingly, a user can preview any item in a list of items with a simple slide gesture on control icon 510 to position the item preselection at that item. In one example embodiment, "preview preselection" can be set "on" or "off" in a list of settings as previously described in reference to FIGS. 10A-10L. In another embodiment, preview preselection can be set on as the default setting.

The UI can also display a list name at the top of the display as shown in FIGS. 21B-21F. In the example shown the list name is List 1." The UI can also display the name 505 of the item selected in List 1. In the example shown the item name is Item 4.

A user can perform a select gesture 2126 on control icon 510 (FIG. 21E). In the example shown the select gesture is a tap gesture. In response to detecting select gesture 2126 on control icon 510, the device can display a full view 2128 of the item at the position of the item preselection.

Figure 21G:
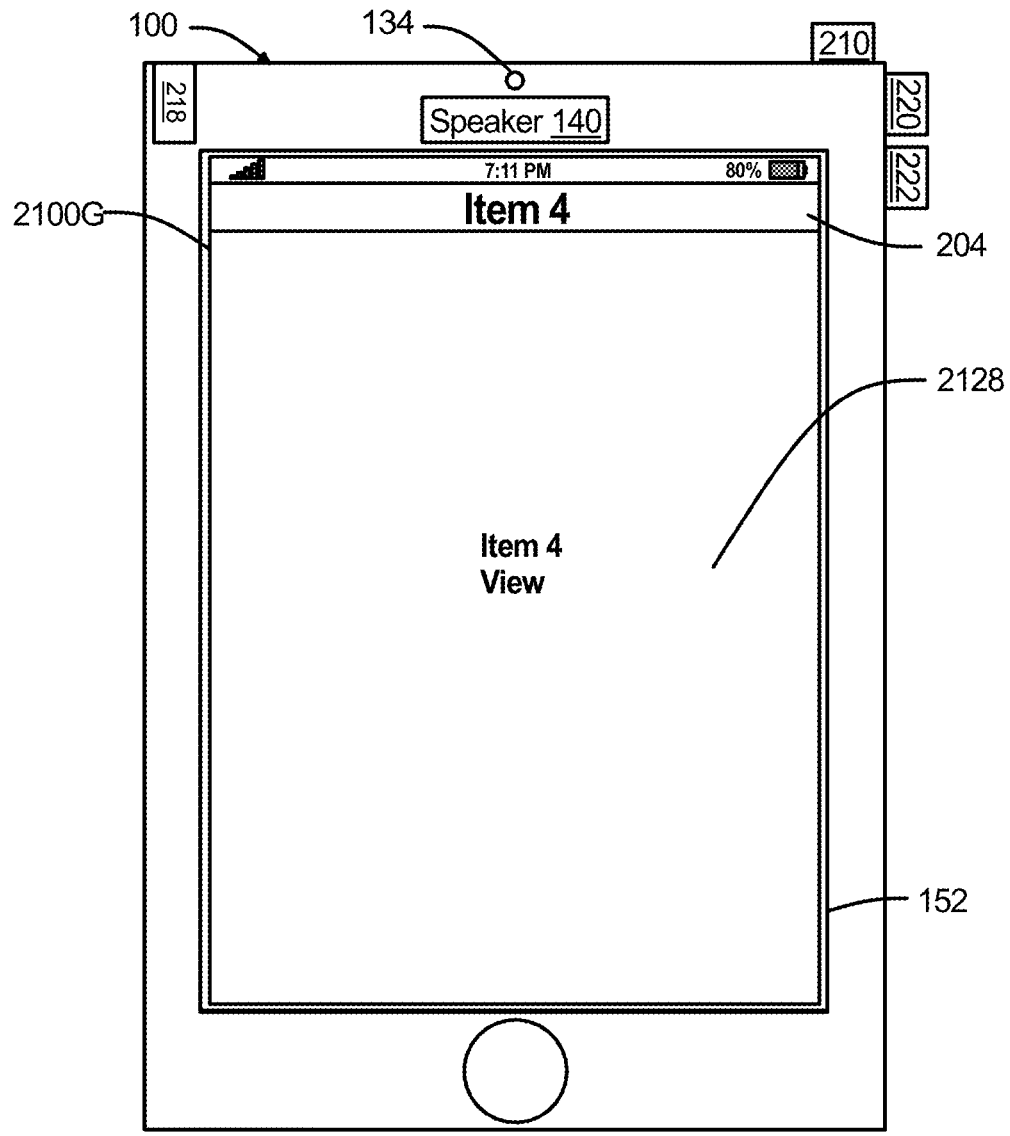

In one example embodiment, in response to detecting select gesture 2126 on control icon 510, the device can launch an application designed for viewing or editing the item at the position of preselection 520. For example, if the list of items is a list of files in a file app, then the file could be previewed with a preview app for that particular file type. In response to detecting a select gesture 2126 on control icon 510, the device could open the file with an app designed for viewing or editing that file type. This is illustrated in FIG. 21 F for the device in landscape orientation, and is illustrated in FIG. 21G for the device in portrait orientation.

A large number of example item types that can be previewed using the UI and method illustrated in FIGS. 21A-21G. These include, but are not limited to, the following:
a. list of emails received or sent—preview email message
b. 1-D list (a one-dimensional list of items) of photos—preview photo
c. 2-D list (a two-dimensional list of items) of photos—preview photo
d. list of books—preview book
e. list of book chapters in a book—preview book chapter
f. list of contacts—preview contact card
g. list of restaurants—preview restaurant menu
h. list of locations—preview location position on a map
i. list of locations—preview photo of location
j. list of locations—preview additional detail regarding the location
k. list of hotels—preview hotel photo and pricing
l. list of products or services for sale—preview details of product or service
m. list of links—preview linked item
n. list of ring tones or alert tone—preview ring tone or alert tone
o. list of photo image adjustments—brightness, contrast, color, etc—preview with adjustment applied to photo
p. list of font colors—preview with font color applied to selected text Previewing an item is not limited to displaying a preview of an item. A preview of an item can include playing a preview of an item. These include, but are not limited to the following:
a. a song
b. a ring tone
c. an alert sound
d. a video
e. a movie
f. an audio recording
g. a spoken version of the text in a message or email or document A large number of examples of a hierarchically organized list of items can be previewed using the UI and method illustrated in FIGS. 21A-21G for a single-level list, and using the UI and method illustrated in FIGS. 5A-5R, FIGS. 6A-6L, FIGS. 8A-8N, FIGS. 9A-9M for multilevel list navigation. These include, but are not limited to, a list of folders and files in a file app or a list of folders and photos in a photo app, using the following example methods:
a. position an item preselection at a folder item to preview the list of items in the folder
b. "select" gesture on control icon to display the list of items in the folder
c. "up" gesture on control icon to display "parent" folder containing a parent list of items
d. position preselection at a file or photo item to preview the item
e. "select" gesture on control icon to open and view or edit the item in an app for that file or image type There are a number of methods for previewing the item at a position of item preselection 520. These include, but are not limited to the following: 1) upon positioning an item preselection at at item, and 2) upon positioning an item preselection at the item and lifting finger contact from control icon 510.

Figure 22:
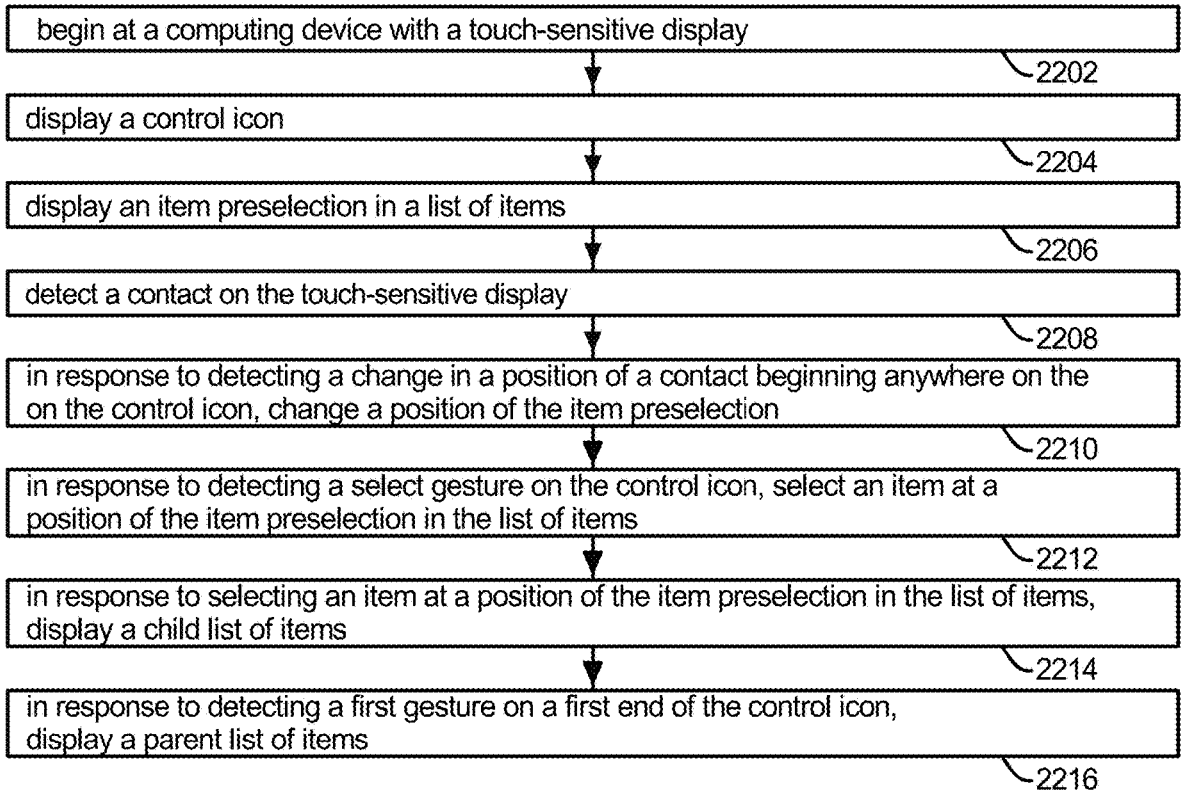
FIG. 22 is a flow diagram illustrating a method for positioning an item preselection in a list of items and selecting an item at the position of the item preselection in a list of items within a hierarchically organized list of items on a computing device with a touch-sensitive display in accordance with some embodiments.

FIG. 22 is a flow diagram illustrating a method for positioning an item preselection in a list of items and selecting an item at the position of the item preselection in a list of items within a hierarchically organized list of items on a computing device with a touch-sensitive display in accordance with some embodiments. The method can include in response to selecting an item at a position of the item preselection in a list of items, displaying a child list of items; the method can include in response to detecting a first gesture on a first end of the control icon, displaying a parent list of items. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 22.

FIGS. 23A-23L illustrate an exemplary user interface and method for displaying a content selection in editable content, displaying an item preselection in a list of content editing items; in response to detecting a change in a position of contact beginning anywhere on the control icon, changing a position of the item preselection in the list of content editing items; in response to detecting a select gesture on the control icon, selecting a content edit item at the position of the item preselection, and applying the content edit item to the selection in the content.

The method can include, in response to detecting a change in a position of contact beginning anywhere on the control icon, changing a position of the item preselection in the list of content editing items and applying the content edit item to the selection in content if the edit item is in a bottom level list of a hierarchically organized list of content edit items. An example of this is changing a position of the item preselection in the list of font color items and immediately applying the font color item to a text selection in text content; this enables a user to "tune" the font color in real time.

Figure 23A:
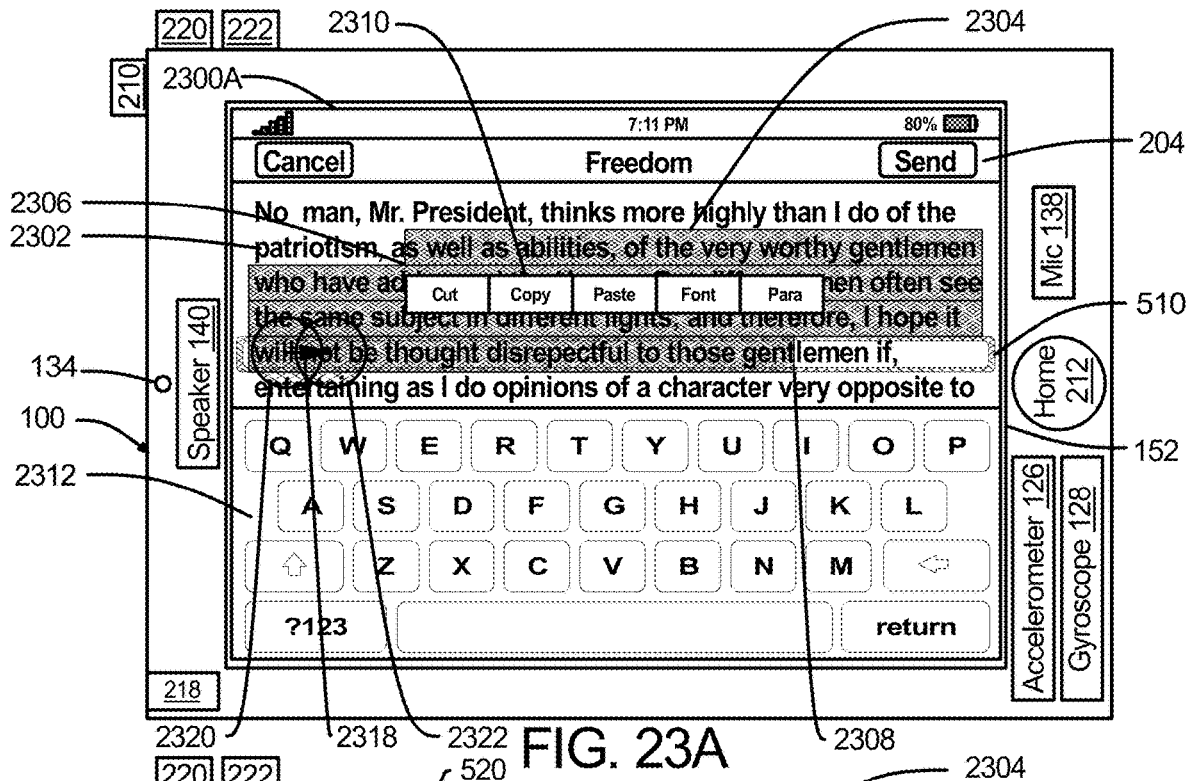
Figure 23B:
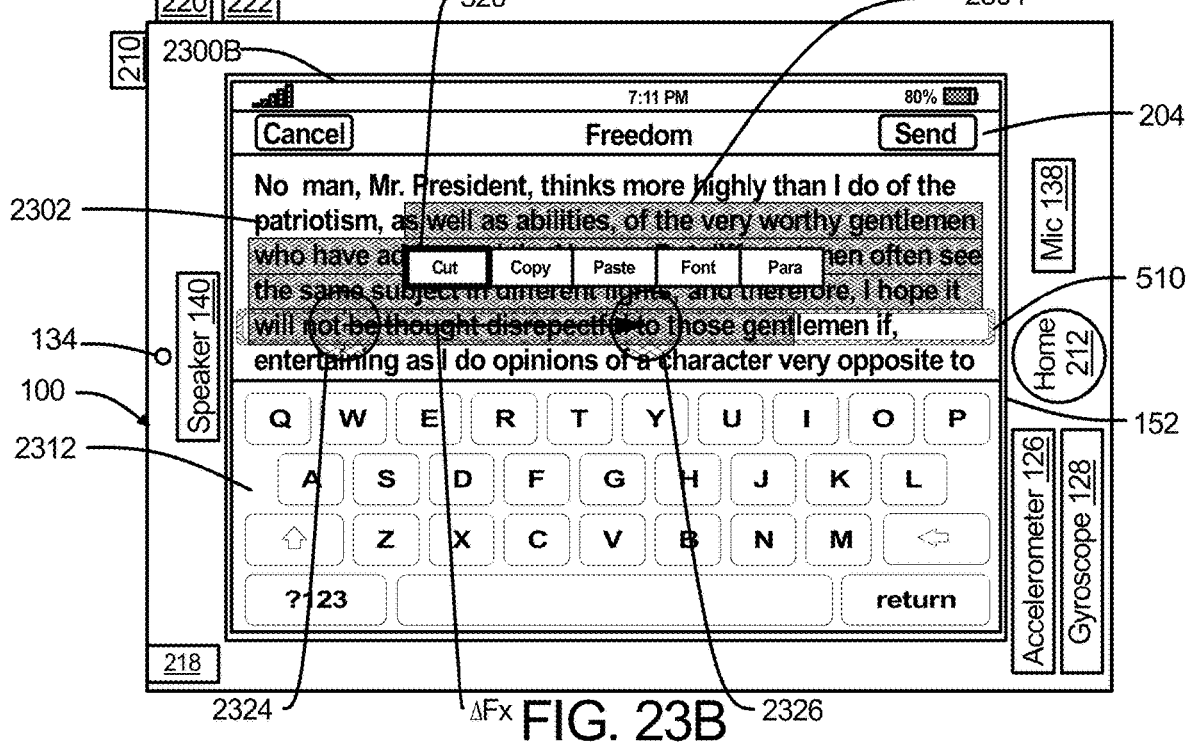
Figure 23C:
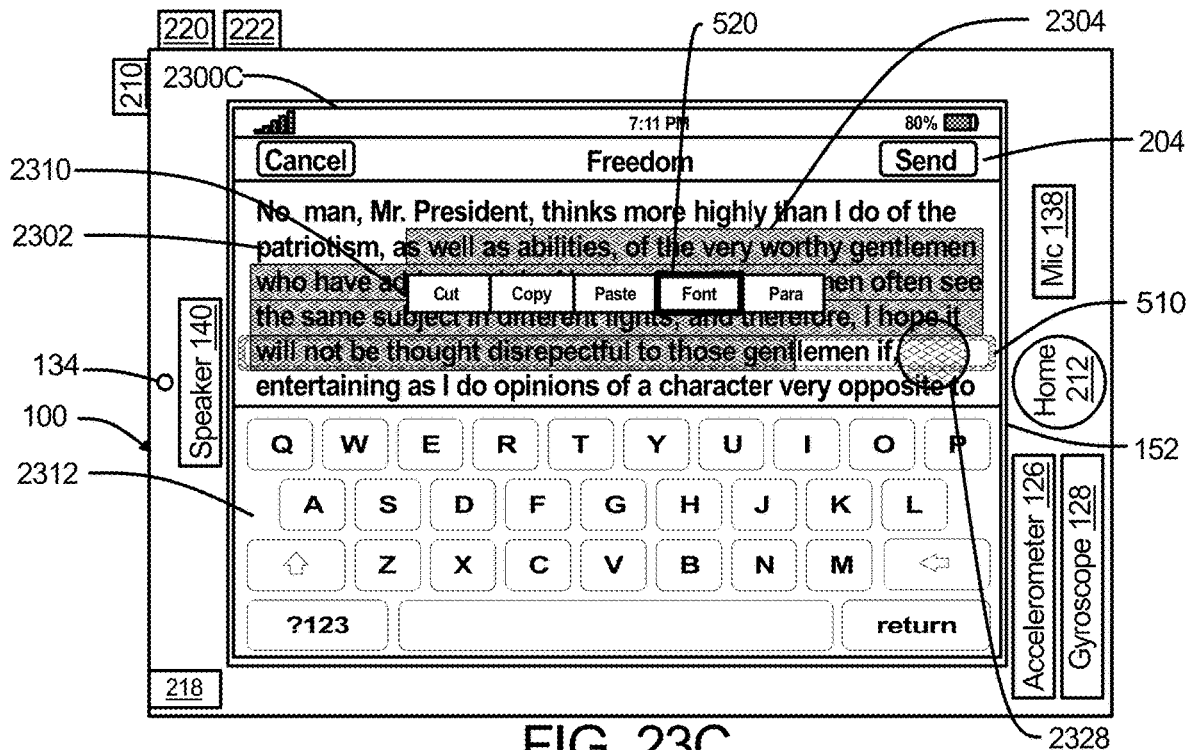

A user can perform a horizontal slide finger gesture beginning anywhere on control icon 510 as illustrated in UI 2300A and UI 2300B (FIG. 23A and FIG. 23B). In response to detecting the initial change 2318 in the horizontal position of a finger contact from 2320 to 2322 (FIG. 23A), the device can display preselection 520 at the first item "Cut" in the list of items (FIG. 23B). In the example shown, the items are edit actions that can be applied to a selected range of text 2304. In response to detecting an additional change in the horizontal position of a finger contact $\Delta Fx$ from 2324 to 2326 (FIG. 21B), the device can change the position of preselection 520 by an amount $\Delta Sx$ to the item "Font" as illustrated in UI 2300C (FIG. 23C). In lieu of performing one slide gesture, a user can perform two or more slide gestures, beginning anywhere on control icon 510, until the device changes the vertical position of item preselection 520 from the item "Cut" to the item "Font".

Figure 23D:
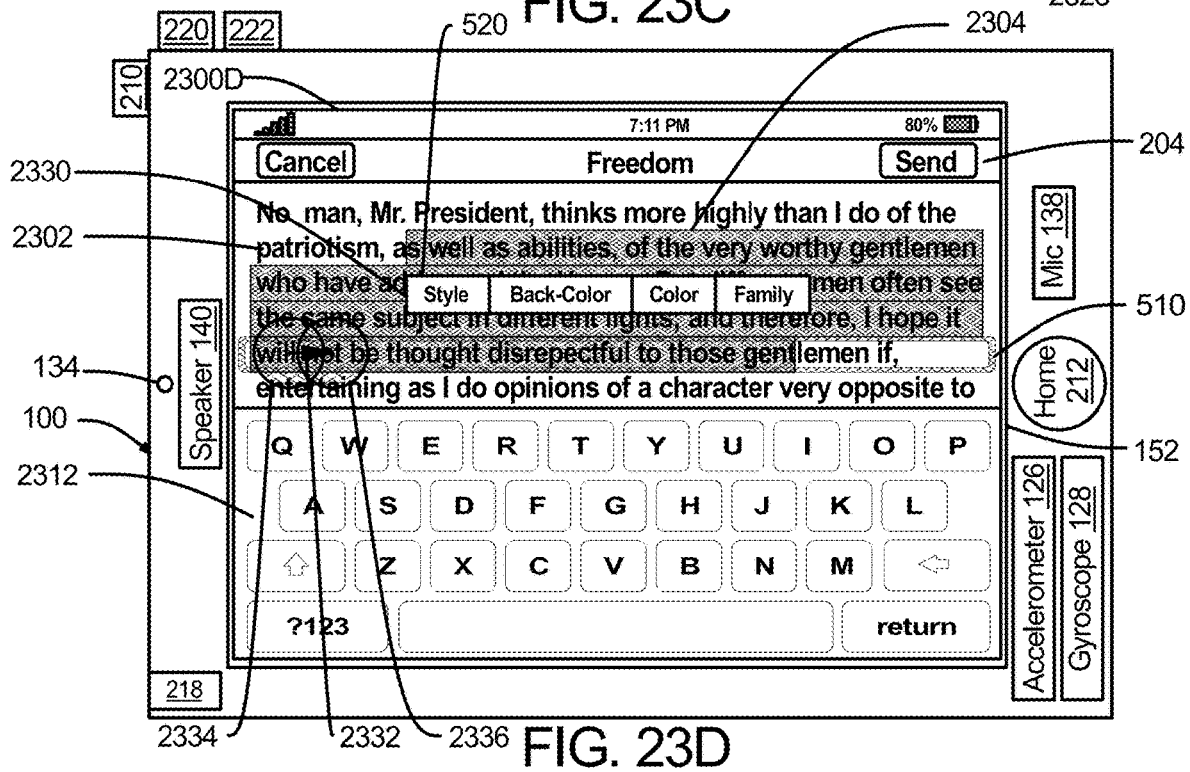

A user can perform a select gesture 2328 anywhere on control icon 510 (FIG. 23C). In response to detecting select gesture 2328 on control icon 510, the device can display a second level list of items as illustrated in UI 2300 D (FIG. 23D). In the example shown the second level list of items 2330 is a list font formatting options for choosing the Style, Back-Color, Color, or Family.

Figure 23E:
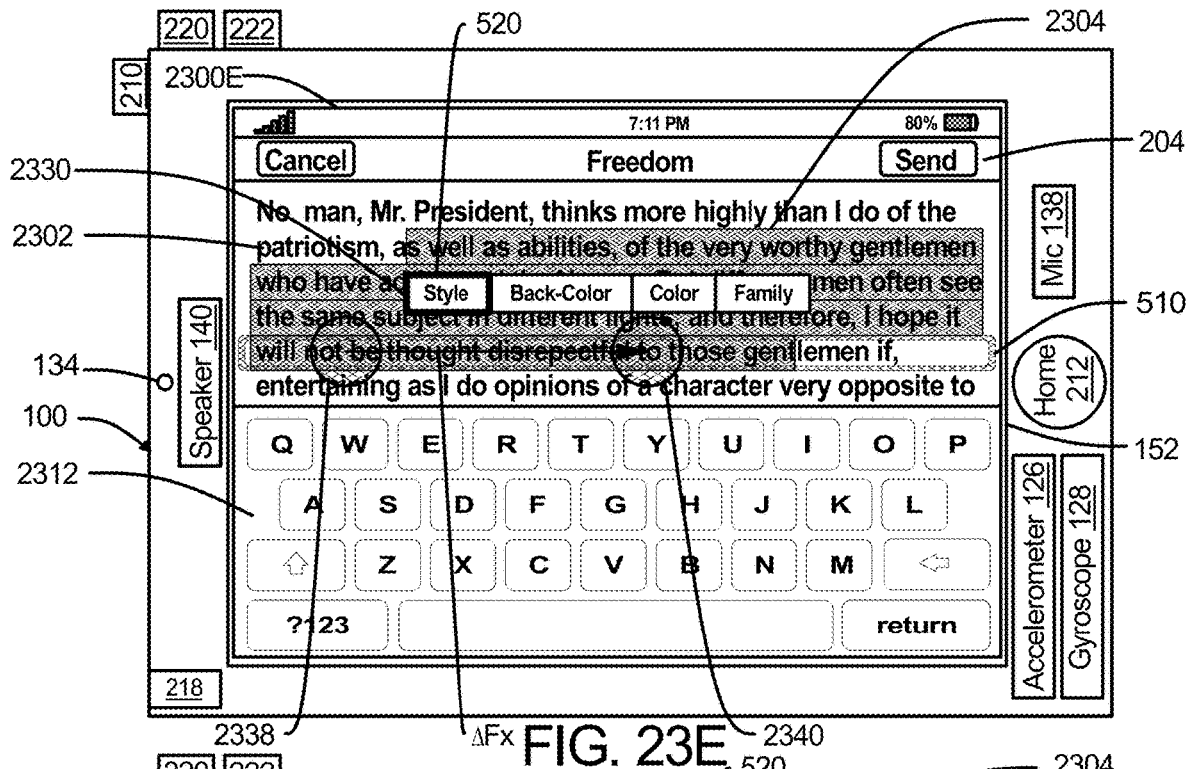

A user can perform a horizontal slide finger gesture beginning anywhere on control icon 510 as illustrated in UI 2300D and UI 2300E (FIG. 23D and FIG. 23D). In response to detecting the initial change 2332 in the horizontal position of a finger contact from 2334 to 2336 (FIG. 23D), the device can display preselection 520 at the first item "Style" in the list of items (FIG. 23E). In response to detecting an additional change in the horizontal position of a finger contact $\Delta Fx$ from 2338 to 2340 (FIG. 23E), the device can change the position of preselection 520 by an amount $\Delta Sx$ to the item "Color" as illustrated in UI 2300F (FIG. 23F).

Figure 23F:
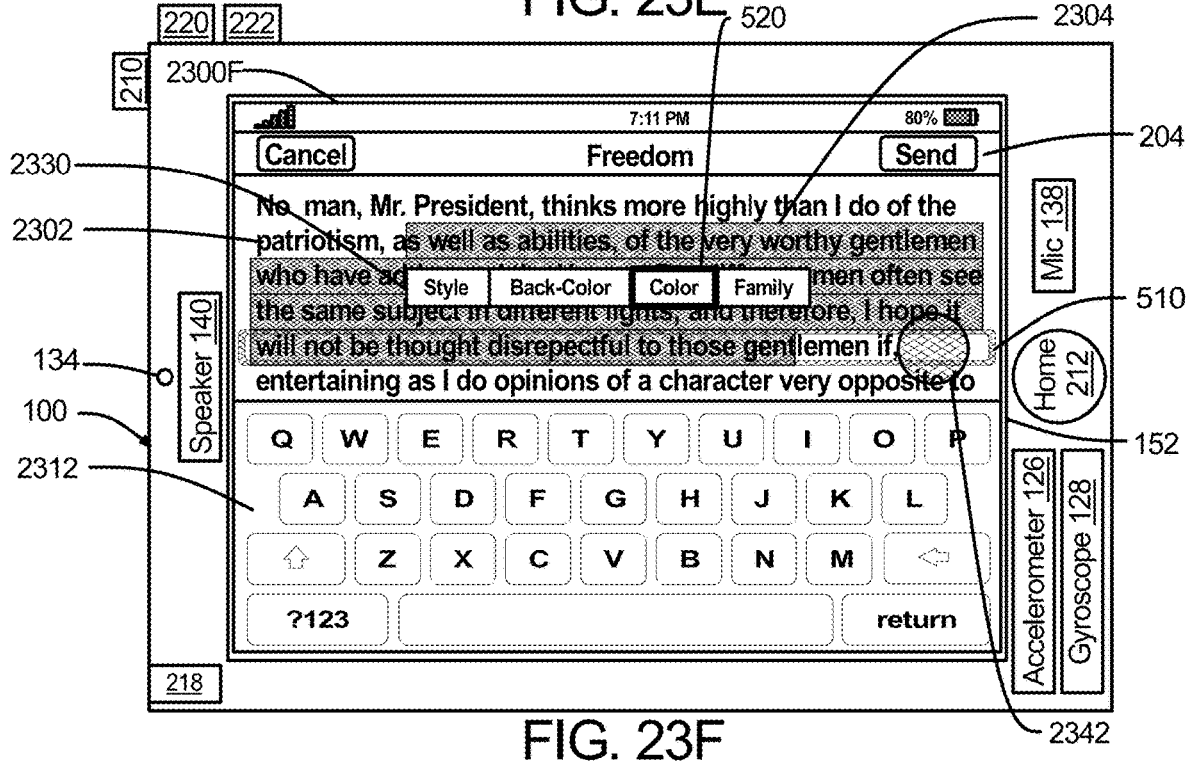
Figure 23G:
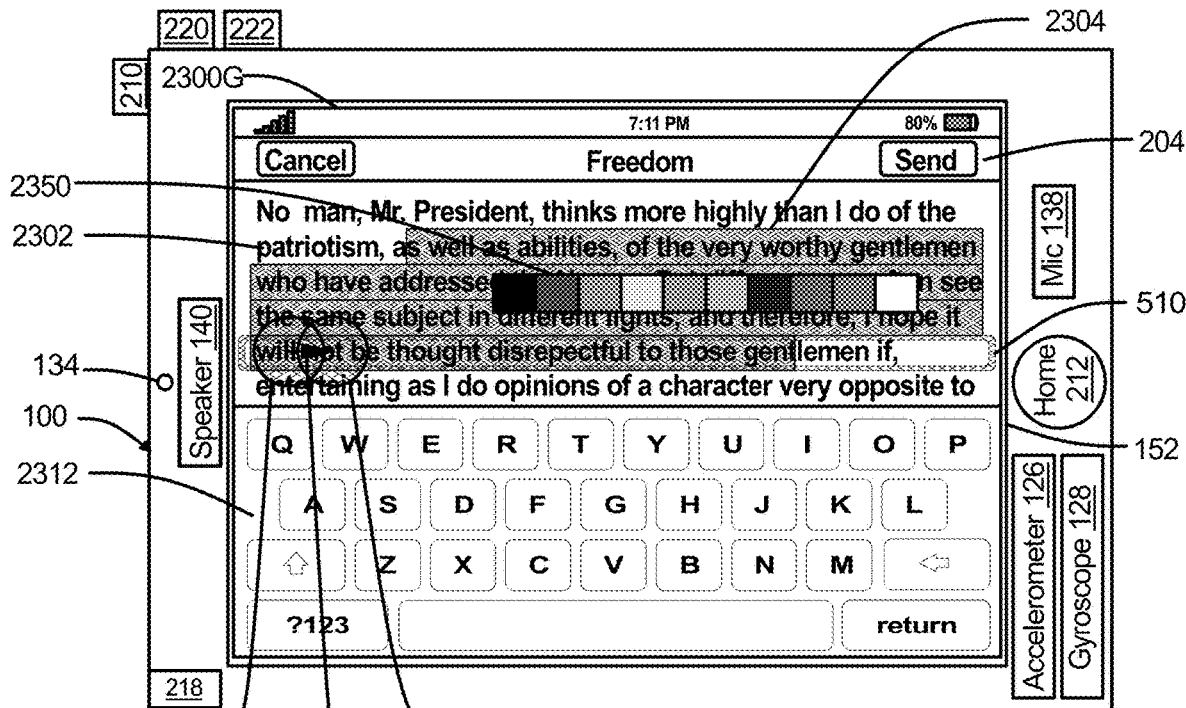

A user can perform a select gesture 2342 anywhere on control icon 510 (FIG. 23F). In response to detecting select gesture 2342 on control icon 510, the device can display a third level list of items (a child list of items) as illustrated in UI 2300G (FIG. 23G). In the example shown the third level list of items 2350 (a child list of items) is a list of items comprising font-color options for formatting font color (black, red, orange, yellow, green, cyan . . . ) for the selected range of text 2304.

Figure 23H:
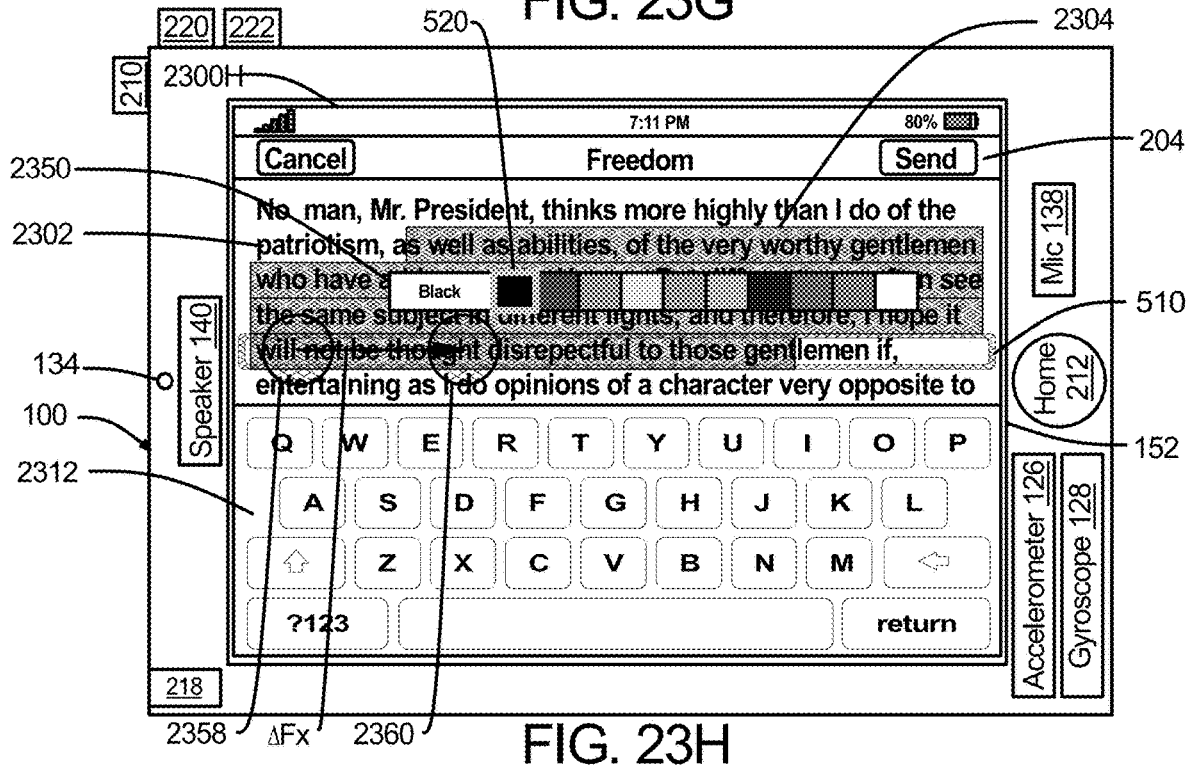

A user can perform a horizontal slide finger gesture beginning anywhere on control icon 510 as illustrated in FIG. 23G and FIG. 23H. In a first example embodiment, in response to detecting an initial change 2352 in the horizontal position of a finger contact from 2354 to 2356 (FIG. 23G), the device can display preselection 520 at the first color sample square in the list of items, and save the value of the item at the position of the item preselection, and apply the value of the item at the position of the item preselection to the selected range of text 2304. The device can also display the full name of the item at the position of the item preselection in the list of items. In this case the full name is "Black". The use of a short representation or abbreviation for each item enables a large list items to displayed within a small display width, while displaying the full name of the item at the position of the item preselection. In the example shown the list of items is displayed in abbreviated form as a row of colored squares.

Figure 23I:
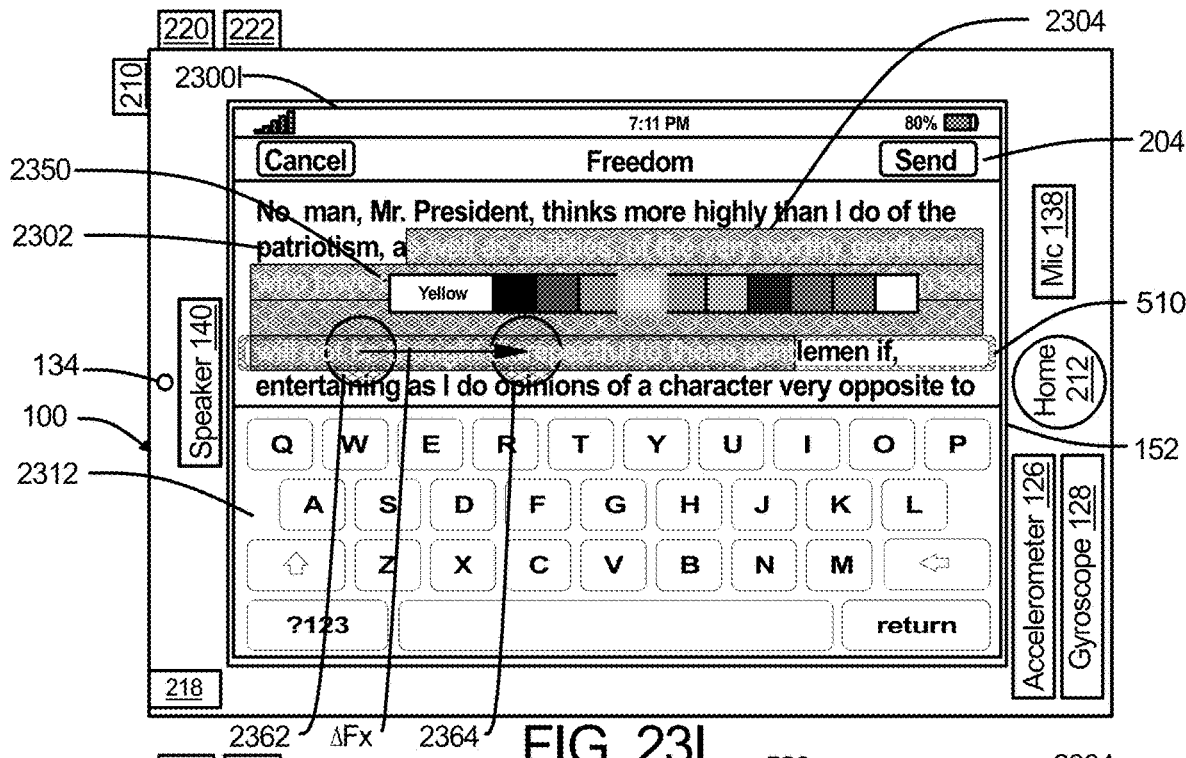

In response to detecting an additional change in the horizontal position of a finger contact ΔFx from 2358 to 2360 (FIG. 21H), the device can change the position of preselection 520 by an amount ΔSx to the item "Yellow" as illustrated in UI 23001 (FIG. 23I).

Figure 23J:
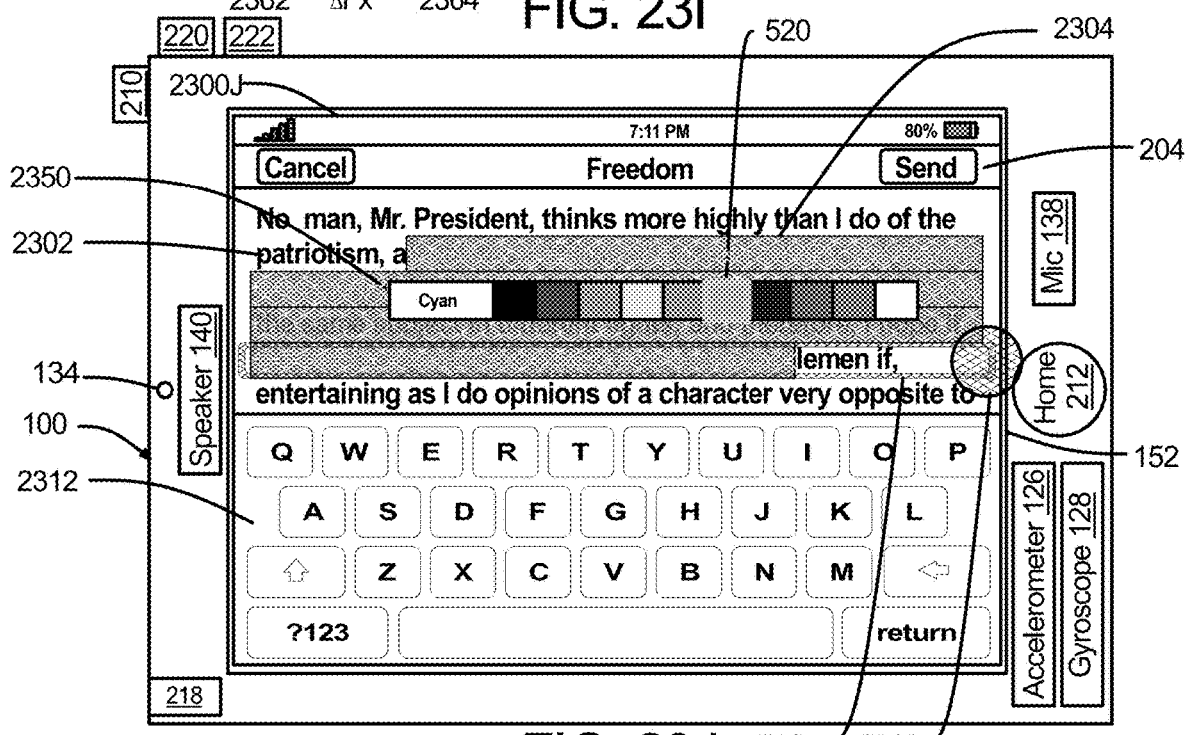

In response to detecting an additional change in the horizontal position of a finger contact ΔFx from 2362 to 2364 (FIG. 21I), the device can change the position of preselection 520 by an amount ΔSx to the item "Cyan" as illustrated in UI 2300J (FIG. 23J).

In this first example embodiment illustrated in FIGS. 23H-23J, the value of the item at the position of preselection 520 can be saved and applied to the selected range of text 2304 for each position of preselection in a list of item values. This enables a user view the result of applying the item to the selected range of text 2304 for each item in the list and "tune" the position of the item preselection in the list of items for a desired appearance. In a second example embodiment, the value of the item at the position of preselection 520 can be saved and applied to the selected range of text 2304 after the detection of a select gesture (a finger tap for example) on control icon 510.

Figure 23K:
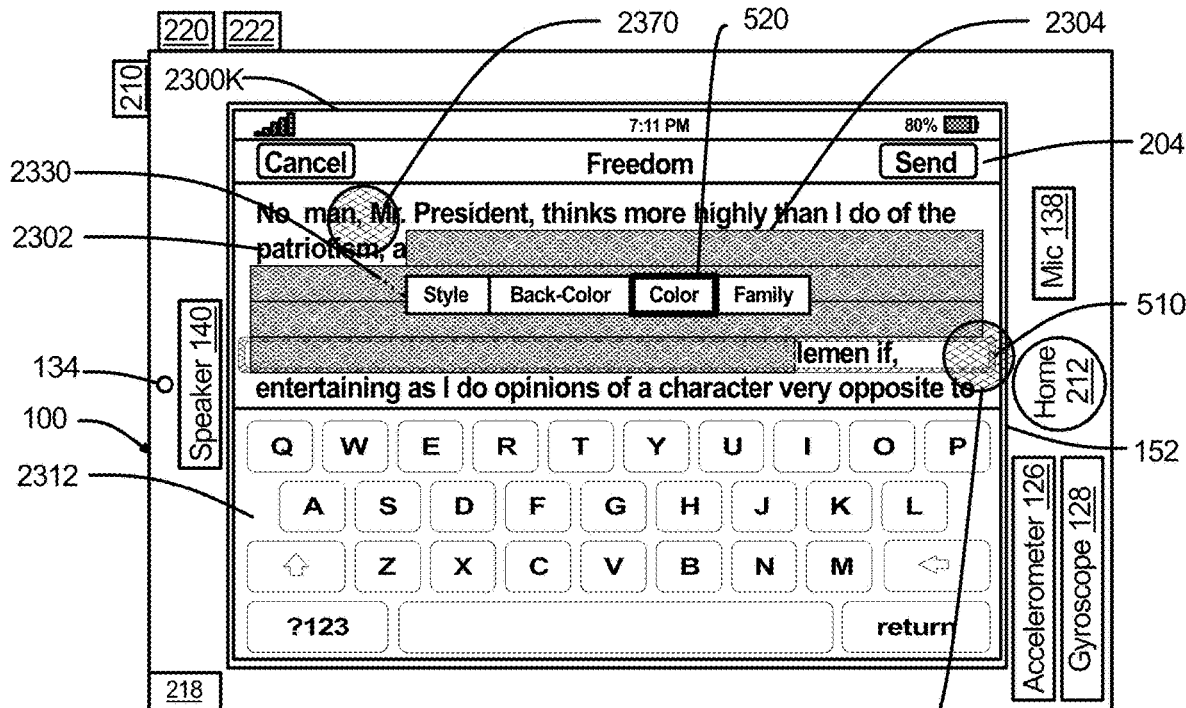

A user can perform an up gesture 2366 on control icon 510. In response to detecting an up gesture 2366 on control icon 510 as illustrated in FIG. 23J, the device can redisplay the prior level list of items (a parent list of items) as illustrated in FIG. 23K. In the example shown, the up gesture is a tap at or near the right end of control icon 510. The user can then position preselection 520 at a different item in the second level list of items 2330 (style, back-color, color, family). A user could perform another up gesture 2368 on control icon 510 (FIG. 23K). In response to detecting another up gesture 2368, the device can display the prior level list of items 2310 (cut, copy, paste, font, para) illustrated FIG. 23C. The user could then position preselection 520 at a different item in the first level list of items 2310.

Figure 23L:
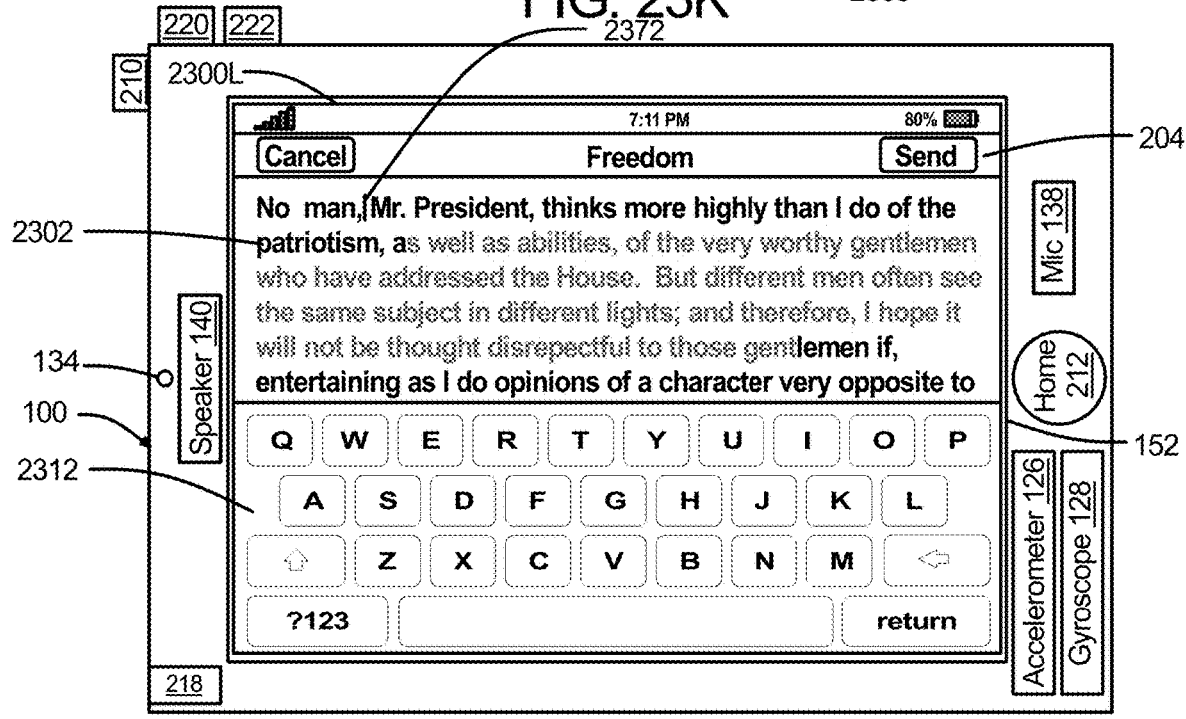

A user can perform a text selection cancel gesture 2370 anywhere on the text content 2302. In response to detecting text selection cancel gesture 2370, the device can cancel the display of selection 2304, cancel the display of control ion 510, display zero-length selection (the text cursor) 2372 at the location of a text selection cancel gesture 2370, and display text content 2302 with Cyan font color applied to the previously selected range, as illustrated in FIG. 23L.

FIG. 24 is a flow diagram illustrating a method for displaying a content selection in editable content, displaying an item preselection in a list of content editing items, in response to detecting a change in a position of contact beginning anywhere on the control icon, changing a position of the item preselection in the list of content editing items. The method can include applying to the content selection within the editable content the content editing item at the position of the item preselection in the list of content editing items if the edit item is in a bottom level list of a hierarchically organized list of content edit items. FIGS. 23A-23L illustrate exemplary user interfaces for implementing the methods presented in the flow diagram shown in FIG. 24.

FIG. 25 is a flow diagram illustrating a method for positioning an item preselection in a list of items on a computing device with a touch-sensitive display in accordance with some embodiments. The method includes in response to detecting a second gesture on a second end of the control icon, displaying an option list of items. The method includes positioning an item preselection in the option list of items and selecting an item at a position of the item preselection in the option list of items. FIGS. 5A-5R, FIGS. 6A-6L, FIGS. 7A-7D, FIGS. 8A-8N, FIGS. 9A-9M, FIGS. 10A-10L, FIGS. 11A-11F, FIGS. 21A-21G, and FIGS. 23A-23L illustrate exemplary user interfaces for implementing the methods presented in the flow diagram shown in FIG. 25.

FIG. 26 is a flow diagram illustrating a method for positioning an item preselection in a list of items on a computing device with a touch-sensitive display in accordance with some embodiments. The method can include, in response to detecting a second gesture on a second end of the control icon, displaying an option list of items applicable to the list of items. The method can include, in response to detecting a second gesture on a second end of the control icon, displaying an option list of items applicable to the item at the position of the item preselection in the list of items.

System/Device or User Defined Gestures: The user or system/device can define the meaning of additional gestures on control icon 510.

An "up" gesture (a first-gesture) for navigating up one level (to a parent list of items) in a hierarchically organized list, can be defined, for example, as a first-gesture on a first-end of the control icon. For example, the control icon can be a vertically oriented control icon, the first-gesture can be a tap gesture, and the first-end of the control icon can be the top-end of the control icon. For example, the control icon can be a horizontally oriented control icon, the first-gesture can be a tap gesture, and the first-end of the control icon can be the right end of the control icon. In another example, the control icon can be a horizontally oriented control icon, the first-gesture can be a tap gesture, and the first-end of the control icon can be the left end of the control icon. In another example embodiment, a parent list of items could be displayed in response to the detection of a gesture on an icon other than control icon 510.

An "option" gesture (a second-gesture) for displaying an option list of items of with respect to a list of items can be defined, for example, as a second-gesture on a second-end of the control icon. For example, the control icon can be a vertically oriented control icon, the second-gesture can be a tap gesture, and the second-end of the control icon can be the bottom-end of the control icon. For example, the control icon can be a horizontally oriented control icon, the second-gesture can be a tap gesture, and the second-end of the control icon can be the left-end of the control icon. In another example, the control icon can be a horizontally oriented control icon, the second-gesture can be a tap gesture, and the second-end of the control icon can be the right-end of the control icon. In another example embodiment, the option list of items could be displayed in response to the detection of a gesture on an icon other than control icon 510.

The positioning of preselection 520 and selection of items in an option list of items can use the same UI and method designed for a list. Upon detecting the selection of an option from an option list of items, the system can automatically redisplay the main list from which the option list of items was launched. Alternatively, the user can return from an option list of items to a main list with an "up gesture" on control icon 510.

User Selectable Gesture Position: In one example the position of the "up" gesture and "option" gesture on control icon 510 can be user selectable. In the case of a horizontally oriented control icon, a right-handed user may prefer the "up" gesture be defined as a tap on the right end of control icon 510 and a left-handed user may prefer the "up" gesture be defined as a tap on the left end of control icon 510. The "option" gesture can be defined as a tap on the end of control icon 510 opposite to the end for the "up" gesture.

Multi-Tap and Multi-Finger Gestures: A double-tap gesture on control icon 510 could be defined to perform a specified action. For example, a double-tap gesture on control icon 510 could be used for selecting an item in a multi-item selection, such as an additional contact name in a list of contacts as described in reference to FIGS. 6A-6L, or an additional text snippet in a list of text snippets. The system or user can also define the meaning of additional gestures on control icon 510. These include, but are not limited to, a two-finger tap gesture and a triple-tap gesture. The methods and UI of this disclosure may include the use of stylus gestures in conjunction with the use of finger gestures, or the use of stylus gestures in lieu of the use of finger gestures.

Alternative embodiments of the control: In some example embodiments, control 510 is a control icon displayed on a touch-sensitive display adjacent to a list of items as illustrated in reference to FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L. In other example embodiments, the control 510 can be thin rectangle shaped touch sensitive region near an edge of the touch-sensitive display. For example, the control 510 could be a thin rectangle shaped touch sensitive region on the device housing. Other embodiments could be implemented. These include, but are not limited to the following: a) a control as a touch sensitive surface adjacent to an edge of a touch-sensitive display with a touch sensitive control length comparable to the display length or width of the display; b) a control as a touch-sensitive surface in proximity to a touch-sensitive display with a touch sensitive control length comparable to the display length or width; c) a control as a separate touch-sensitive surface or device, such as a 1-D touchpad device accessible to the user, or a touch-sensitive device worn by the user.

We have shown several example control icon designs in FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L. There are other variations on the design of control icon 510 with respect to the size and shape of the icon and presence of transparent and/or semitransparent regions, and other features and aspects that may work equally well. The position, orientation, size, and shape of control icon 510 can changed to suit the needs of a particular application or use case. The length of control icon 510 can be chosen similarly. The position, orientation, size, color, and/or degree of transparency of control icon 510 may be user selectable to provide accessibility to a broad range of users. There are instances in which more than one control icon 510 could be displayed for increased accessibility or user flexibility. There are instances where both a vertically oriented and horizontally orientated control icon 510 could be displayed to better serve the needs of a particular use case. There are instances in which a semicircular or circular control icon could be displayed; for example, a semicircular or circular control could be displayed near the edge of a round touch-sensitive display on a smart-watch. For example, a semi-circular control could be displayed between the 12 o'clock position and 6 o'clock position near the right edge of a circular display. In this example, the "up" gesture on the control could defined as gesture on the top end of the control at the 12 o'clock position and the "option" gesture defined as gesture on the bottom end of the control icon at the 6 o'clock. In another embodiment, a semi-circular control could be displayed between the 12 o'clock position and 6 o'clock position near the left edge of a circular display. In some embodiments, the semicircular control could be a touch-sensitive surface in proximity to a touch-sensitive display.

There are other embodiments in which a touch-sensitive surface separate from the touch sensitive display could be employed to position an item preselection in a list of items and select an item at the position of the item preselection. One example is the use of a touchpad device for positioning an item preselection and selecting one or more items on a display. One example is the use of a touchpad device connected to a computing device running under a touch-based operating system—a tablet for example—to position an item preselection, and select one or more items, on the device display.

Display of an item preselection at a position in a list: In one example embodiment, an item preselection can be displayed at the first item in a list in response to the device detecting slide gesture in a first direction on control icon 510, and an item preselection can be displayed at the last item in a list in response to the device detecting a slide gesture in a second direction on control icon 510. In another example embodiment, an item preselection can be initially displayed at an item corresponding to the current state of an item; for example the current value of a setting in a list of settings; for example, the current date in a 1-D list (a one-dimensional list of items) or 2-D list (a two-dimensional list of items) of calendar dates. In another example embodiment the text of the item at the position of the item preselection could be displayed in larger font size to enhance accessibility.

Preselection Design: The item preselection denotes an item preselection of one item. The item preselection can be a simple rectangular frame sized to enclose one item. The size of the frame can be fixed to the size of the largest item or can auto-size to enclose the item. Other preselection designs could be employed. This includes, but is not limited to, an underline, a dot or arrow displayed adjacent to the preselected item, a colored highlight, displayed over the item, a change in font style for preselected text items, and a box for images and other non-text items.

Change in position of an item preselection in a list: In one example embodiment, an item preselection is displayed sequentially at item 1, item 2, item 3, item 4, item 5, item 6 in response to the device detecting one or more slide gestures in a first direction (a downward direction for example) on control icon 510, and an item preselection is displayed sequentially at item 6, item 5, item 4, item 3, item 2, item 1 in response to the device detecting one or more slide gestures in a second direction (an upward direction for example) on control icon 510. In a second example embodiment, an item preselection can be displayed sequentially at item 1, item 2, item 3, item 4, item 5, item 6, item 1, item 2, item 3, item 4, item 5, item 6, item 1, item 2, item 3, . . . in response to the device detecting one or more slide gestures in a first direction on control icon 510, and an item preselection is displayed sequentially at item 6, item 5, item 4, item 3, item 2, item 1, item 6, item 5, item 4, item 3, item 2, item 1, item 6, item 5, item 4, . . . in response to the device detecting one or more slide gestures in a second direction on control icon 510.

Auto-scroll a list of items: 1) Vertical Auto-scroll of a list of items—In those instances when a list has a vertical extent that exceeds the display vertical extent, the device can auto-scroll the list up (down). If an item preselection is moved to an item at a particular position with respect a display, for example near the bottom (top) edge of the display, then the device can scroll the list up (down). 2) Horizontal Auto-scroll of a list of items—In those instances when a list has a horizontal extent that exceeds the display horizontal extent, the device can auto-scroll the list left (right). If an item preselection is moved to an item at a particular position with respect a display, for example near the right (left) edge of the display, then the device can scroll the list left (right).

Methods: This disclosure includes methods comprising a computing device 100 with a touch-sensitive display implementing one or more of the methods selected from those described in reference to FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L, and those described in FIG. 13, FIG. 14, FIG. 15, FIG. 16, FIG. 17, FIG. 18, FIG. 19, FIG. 20, FIG. 22, FIG. 24, FIG. 25, and FIG. 26.

Device: This disclosure includes a device 100 comprising a display, one or more processors, memory; and one or more programs, wherein one or more programs are stored in memory and configured to be executed by the one or more processors, the one or more programs including instructions for implementing one or more of the methods selected from those described in reference to FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L, and those described in FIG. 13, FIG. 14, FIG. 15, FIG. 16, FIG. 17, FIG. 18, FIG. 19, FIG. 20, FIG. 22, FIG. 24, FIG. 25, and FIG. 26.

Computer Readable Storage Medium: This disclosure includes a computer readable storage medium storage medium storing one or more programs, the one or more programs comprising instructions, which when executed by a device 100 with a touch-sensitive display, cause the device to implement one or more of the methods selected from those described in in reference to FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L, and those described in FIG. 13, FIG. 14, FIG. 15, FIG. 16, FIG. 17, FIG. 18, FIG. 19, FIG. 20, FIG. 22, FIG. 24, FIG. 25, and FIG. 26.

Graphical User Interface: This disclosure includes graphical user interfaces for a computing device 100 with a touch-sensitive display selected from those described in reference to FIGS. 5A-5R, FIGS. 6A-6L, FIGS. 7A-7D, FIGS. 8A-8N, FIGS. 9A-9M, FIGS. 10A-10L, FIGS. 11A-11F, FIG. 12, FIGS. 21A-21G, and FIGS. 23A-23L, and those described in FIG. 13, FIG. 14, FIG. 15, FIG. 16, FIG. 17, FIG. 18, FIG. 19, FIG. 20, FIG. 22, FIG. 24, FIG. 25, and FIG. 26.

A 1-D list (a one-dimensional list of items) can be a one-dimensional array of items, and a 2-D list (a two-dimensional list of items) can be a two-dimensional array of items.

The foregoing disclosure, for the purpose of explanation, has included reference to specific embodiments. However, the illustrative discussions above are not intended to be exhaustive or to limit the device, method, or graphical user interface to the precise forms disclosed. Many modifications and variations are possible in view of the above teachings. The embodiments were chosen and described in order to explain the principals of the device, method, or graphical user interface and its practical applications, to thereby enable others skilled in the art to best utilize the device, method, or graphical user interface and various embodiments with various modifications as are suited to the particular use contemplated.

A portion of the disclosure of this patent document contains material that is subject to copyright protection. The applicant and copyright owner has no objection to the facsimile reproduction by anyone of the patent document or the patent disclosure, as it appears in the Patent and Trademark Office patent file or records, but otherwise reserves all copyright rights whatsoever.

The invention claimed is:

1. A mobile computing device, comprising:
a touch-sensitive display;
one or more processors;
a memory configured to store one or more programs;
the one or more processors is configured to execute the one or more programs to cause the mobile computing device to:
display a control icon;
display an item preselection mark at a position of an item in a list of items;
detect a contact on the touch-sensitive display; and
in response to detecting a change in a position of the contact beginning anywhere on the control icon,
change in a number of discrete steps the position of the item preselection mark in the list of items;
detect a gesture on the touch-sensitive display; and
in response to detecting a selection gesture on the control icon, select an item at a position of the item preselection mark in the list of items.

2. The mobile computing device of claim 1, wherein the control icon is displayed as a vertical line near an edge of the touch-sensitive display.

3. The mobile computing device of claim 1, wherein the list of items is a one-dimensional list of items.

4. The mobile computing device of claim 1, wherein the list of items is a two-dimensional list of items.

5. The mobile computing device of claim 1, further including instructions to cause the mobile computing device to:
in response to detecting a second gesture on a second-end of the control icon, display an option list of items applicable to an item at a position of the item preselection mark in a list of items.

6. The mobile computing device of claim 5, wherein: the control icon is displayed as vertical line near an edge of the touch-sensitive display, the second-end of the control icon is a bottom-end of the control icon, and the second gesture is a tap.

7. The mobile computing device of claim 1, further including instructions to cause the mobile computing device to:
in response to detecting a selection gesture on the control icon, select an item at a position of the item preselection mark in the list of items, and display a child list of items.

8. The mobile computing device of claim 7, further including instructions to cause the mobile computing device to:
in response to detecting a first gesture on a first-end of the control icon, display a parent list of items.

9. The mobile computing device of claim 8, wherein: the control icon is displayed as vertical line near an edge of the touch-sensitive display, the first-end of the control icon is a top-end of the control icon, and the first gesture is a tap.

10. The mobile computing device of claim 1, further including instructions to cause the mobile computing device to:
detect a time rate of change in a position of the contact, and
in response to detecting a change in a position of the contact beginning anywhere on the control icon, change in a number of discrete steps a position of the item preselection mark in the list of items by an amount proportional to a change and a time rate of change in a position of the contact.

11. The mobile computing device of claim 1, wherein the selection gesture is a tap.

12. The mobile computing device of claim 1, wherein the item preselection mark is displayed as a rectangle around an item.

13. The mobile computing device of claim 1, further including instructions to cause the mobile computing device to: speak the item at the position of the item preselection mark.

14. The mobile computing device of claim 1, further including instructions to cause the mobile computing device to: preview the item at the position of the item preselection mark.

15. A non-transitory computer readable storage medium storing one or more programs, the one or more programs comprising instructions that, when executed, cause a mobile computing device having a touch-sensitive display to:
display a control icon;
display an item preselection mark at a position of an item in a list of items;
detect a contact on the touch-sensitive display; and
in response to detecting a change in a position of the contact beginning anywhere on the control icon,
change in a number of discrete steps the position of the item preselection mark in the list of items;
detect a gesture on the touch-sensitive display; and
in response to detecting a selection gesture on the control icon, select an item at a position of the item preselection mark in the list of items.

16. The non-transitory computer readable storage medium of claim 15, wherein the control icon is displayed as a vertical line near an edge of the touch-sensitive display.

17. The non-transitory computer readable storage medium of claim 15, wherein the list of items is a one-dimensional list of items.

18. The non-transitory computer readable storage medium of claim 15, wherein the list of items is a two-dimensional list of items.

19. The non-transitory computer readable storage medium of claim 15, further including instructions that, when executed, cause a mobile computing device having a touch-sensitive display to:
in response to detecting a second gesture on a second-end of the control icon, display an option list of items applicable to an item at a position of the item preselection mark in a list of items.

20. The non-transitory computer readable storage medium of claim 19, wherein: the control icon is displayed as vertical line near an edge of the touch-sensitive display, the second-end of the control icon is a bottom-end of the control icon, and the second gesture is a tap.

21. The non-transitory computer readable storage medium of claim 15, further including instructions that, when executed, cause a mobile computing device having a touch-sensitive display to:
in response detecting a selection gesture on the control icon, select an item at a position of the item preselection mark in the list of items, and display a child list of items.

22. The non-transitory computer readable storage medium of claim 21, further including instructions that, when executed, cause a mobile computing device having a touch-sensitive display to:
in response to detecting a first gesture on a first-end of the control icon, display a parent list of items.

23. The non-transitory computer readable storage medium of claim 22, wherein: the control icon is displayed as vertical line near an edge of the touch-sensitive display, the first-end of the control icon is a top-end of the control icon, and the first gesture is a tap.

24. The non-transitory computer readable storage medium of claim 15, further including instructions that, when executed, cause a mobile computing device having a touch-sensitive display to:
detect a time rate of change in a position of the contact, and
in response to detecting a change in a position of the contact beginning anywhere on the control icon, change in a number of discrete steps a position of the item preselection mark in the list of items by an amount proportional to a change and a time rate of change in a position of the contact.

25. The non-transitory computer readable storage medium of claim 15, wherein the selection gesture is a tap.

26. The non-transitory computer readable storage medium of claim 15, wherein the item preselection mark is displayed as a rectangle around an item.

27. The non-transitory computer readable storage medium of claim 15, further including instructions that, when executed, cause a mobile computing device having a touch-sensitive display to: speak the item at the position of the item preselection mark.

28. The non-transitory computer readable storage medium of claim 15, further including instructions that, when executed, cause a mobile computing device having a touch-sensitive display to: preview the item at the position of the item preselection mark.

29. A graphical user interface on a mobile computing device comprising a touch-sensitive display wherein:
a control icon is displayed;
an item preselection mark is displayed at a position of an item in a list of items;
a contact on the touch-sensitive display is detected; and
in response to detecting a change in a position of the contact beginning anywhere on the control icon, the position of the item preselection mark in the list of items is changed in a number of discrete steps;
a gesture on the touch-sensitive display is detected; and
in response to detecting a selection gesture on the control icon, an item at a position of the item preselection mark in the list of items is selected.

30. The graphical user interface of claim 29, wherein the control icon is displayed as a vertical line near an edge of the touch-sensitive display.

31. The graphical user interface of claim 29, wherein the list of items is a one-dimensional list of items.

* * * * *